(12) United States Patent
Cuk

(10) Patent No.: US 6,388,896 B1
(45) Date of Patent: May 14, 2002

(54) LOSSLESS SWITCHING CONVERTER WITH DC TRANSFORMER

(76) Inventor: Slobodan Cuk, 27682 Gold Dust, Laguna Hills, CA (US) 92653

(*) Notice: Subject to any disclaimer, the term of this patent is extended or adjusted under 35 U.S.C. 154(b) by 0 days.

(21) Appl. No.: 09/816,423

(22) Filed: Mar. 22, 2001

(51) Int. Cl.$^7$ .............................................. H02M 3/335

(52) U.S. Cl. ....................................................... 363/16

(58) Field of Search ........................... 363/16, 131, 41, 363/55

(56) References Cited

U.S. PATENT DOCUMENTS

| | | | |
|---|---|---|---|
| 4,184,197 A | 1/1980 | Cuk et al. | |
| 4,257,087 A | 3/1981 | Cuk | |
| 5,166,869 A | 11/1992 | Hesterman | |
| 5,539,630 A | 7/1996 | Pietkiewicz et al. | |
| 5,790,005 A | 8/1998 | Santi et al. | |
| 6,304,460 B1 | * 10/2001 | Cuk | ............................ 363/131 |

OTHER PUBLICATIONS

R.D. Middlebrook and Slobodan Cuk, A General Unified Approach to Modelling Switching–Converter Power Stages, California Institute of Technology, PESC 76 Record, pp. 18–34 No Date.

Akio Nakamura, Junpei Ohta, "A New Reverse–Biased Choke Coil", TDK–Electronics Company Ltd., Tokyo, Japan, Proceedings of Powercom 9, 1982, pp. 1–7 No month.

Satoshi Frank Shiraki, "Reducing Magnetic Component Size with Reversed Biased Ferrite Core," Hitachi Magnetics Corporation, Edmore, Michigan, pp. 1–5 No Date.

* cited by examiner

*Primary Examiner*—Shawn Riley
(74) *Attorney, Agent, or Firm*—A. M. Fernandez

(57) ABSTRACT

A new switching converter operates at record high efficiency despite its small size and light weight and enables ultra high overload current capability owing to two novel methods: new Lossless Switching method eliminates switching losses by use of a precise sequence and timing of the four controllable switches, while novel DC Transformer structure provides a method to eliminate the stored DC energy in magnetics, which further increases efficiency and reduces the magnetics and converter size.

65 Claims, 102 Drawing Sheets

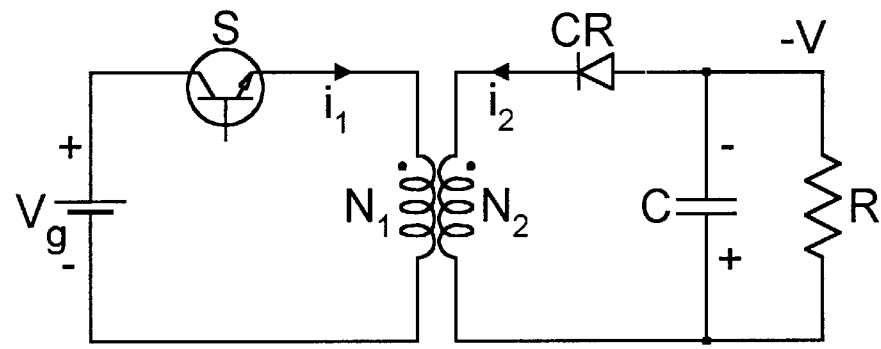
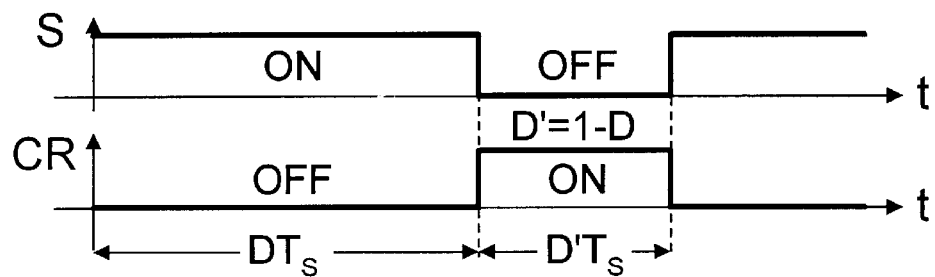
Fig. 4a (Prior Art)
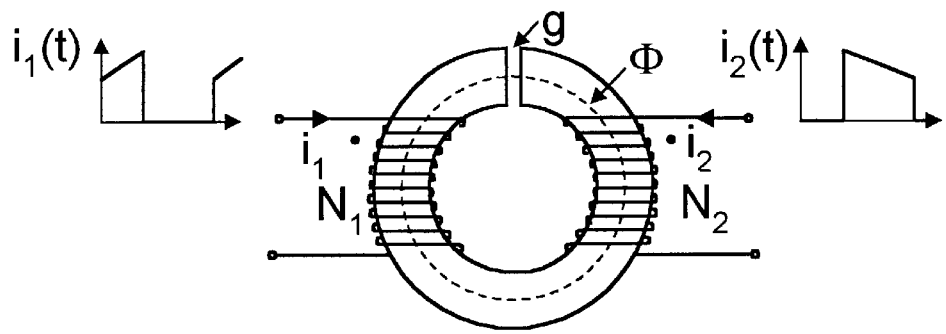
Fig. 4b (Prior Art)
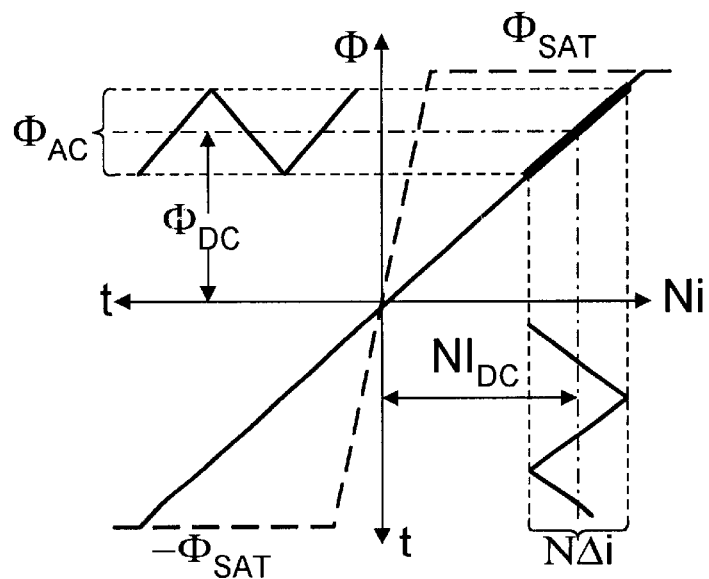
Fig. 4c (Prior Art)

$\Delta v = v_{L1} - v_{L2} = 2v_{L1} = 2v_{L2}$ $$W_M = L(I_1 + I_m - I_2)^2/2 = 0$$

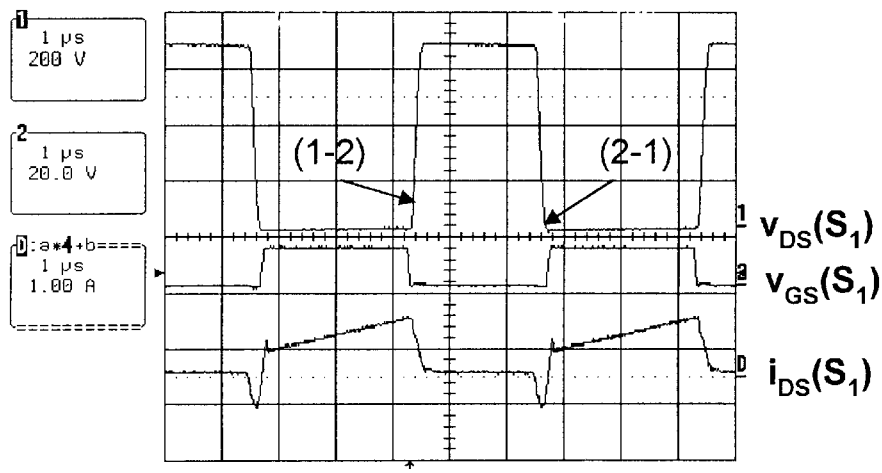
Fig. 19a
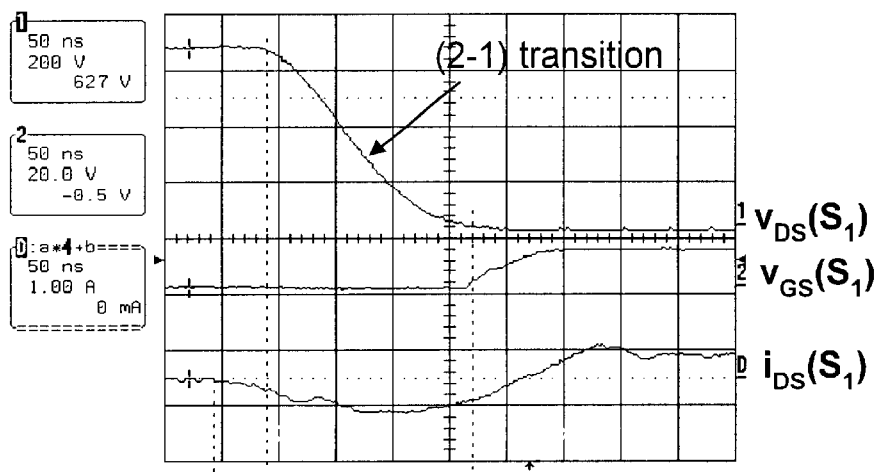
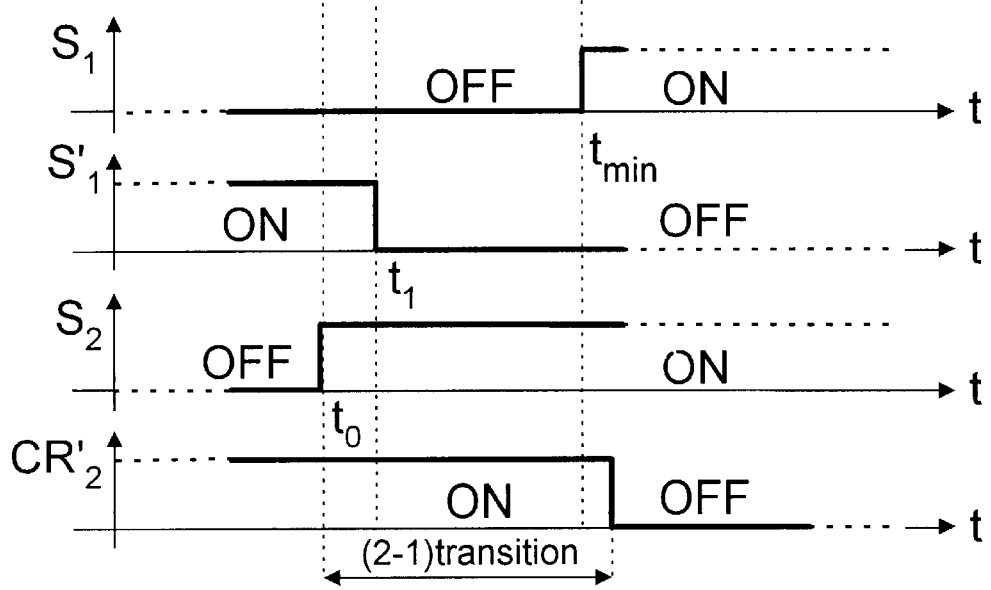
Fig. 19b

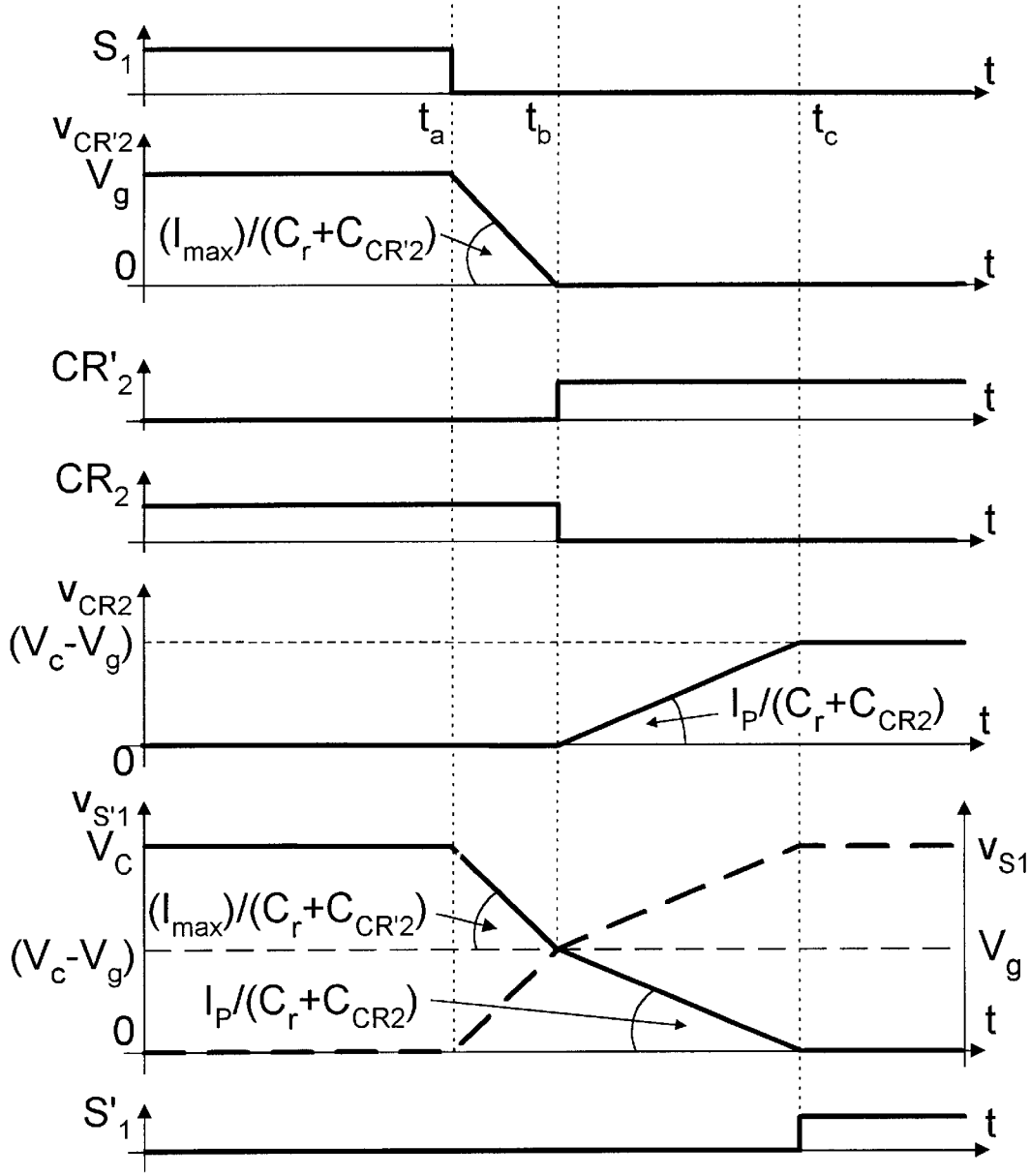

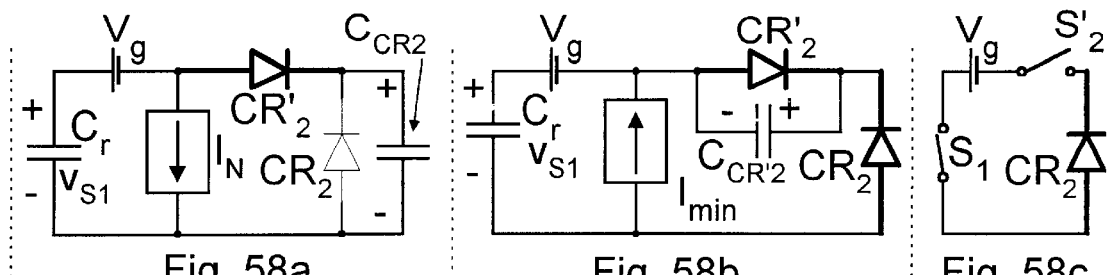
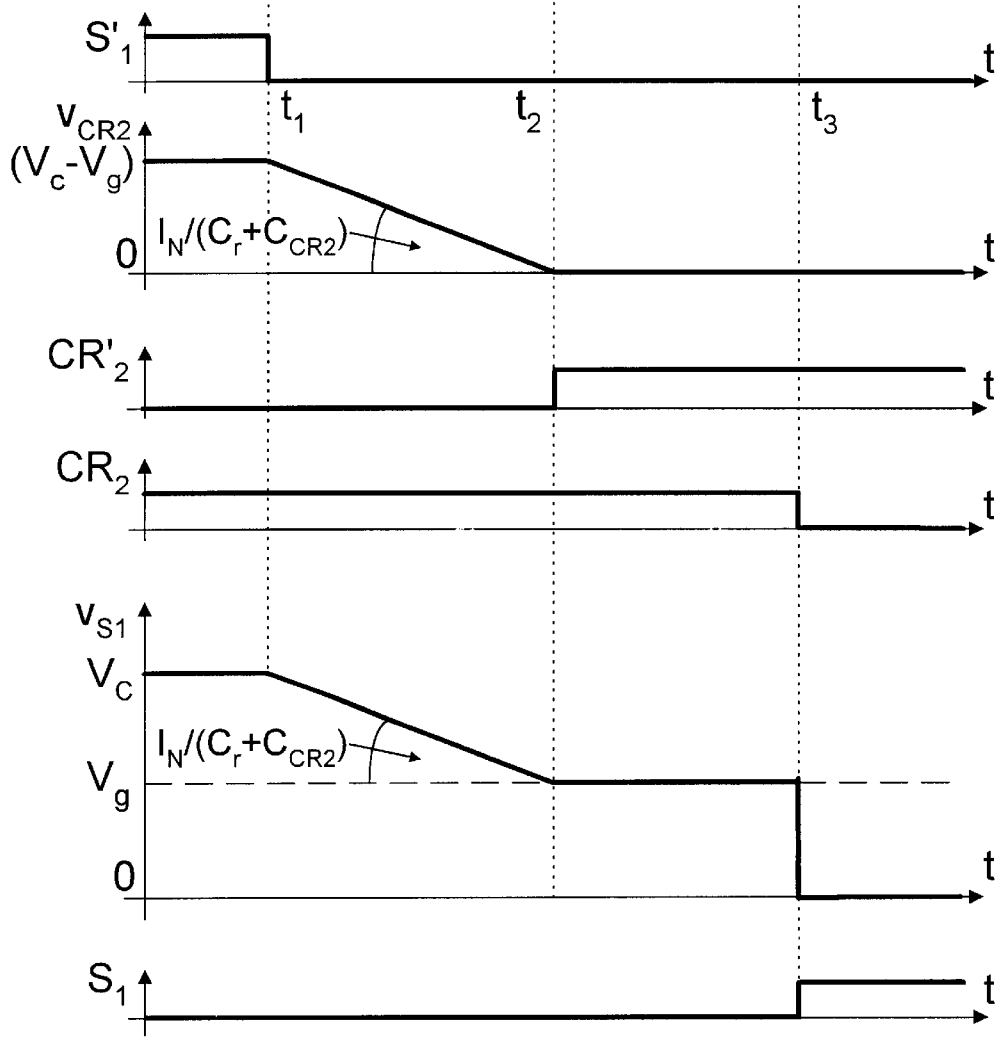
Fig. 58d

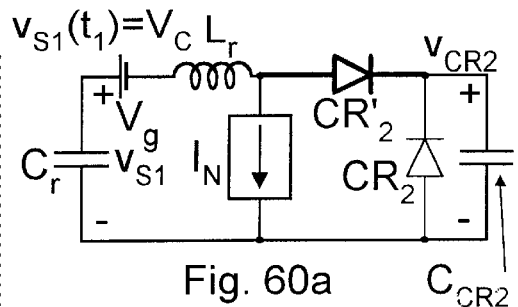 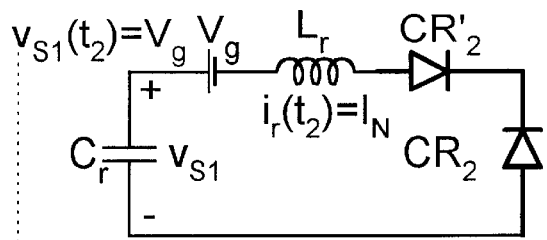 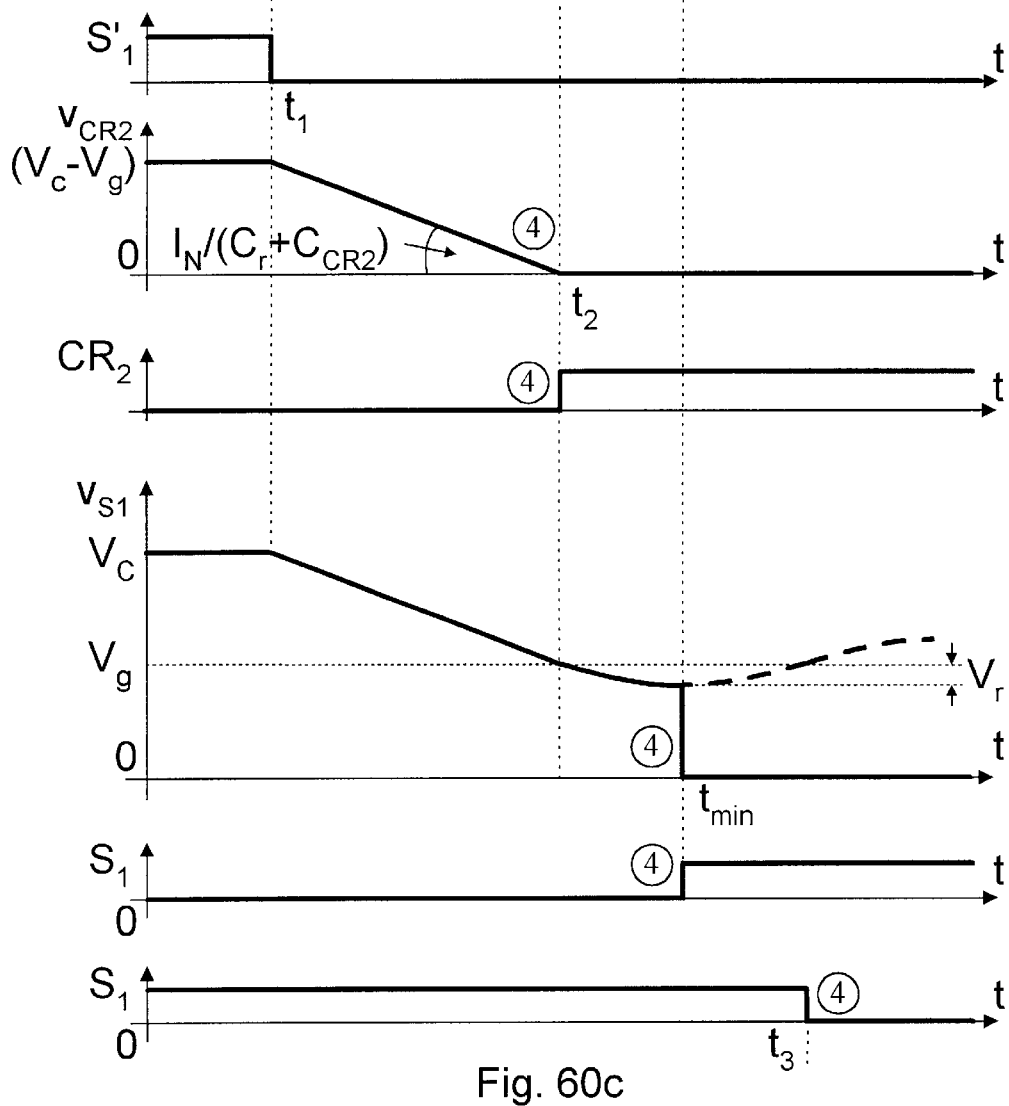
Fig. 60c $V_g$ = 270VDC $V_g$ = 380VDC

LOSSLESS SWITCHING CONVERTER WITH DC TRANSFORMER

FIELD OF THE INVENTION

This invention relates to the field of switching DC-to-DC power conversion and in particular to the new class of switching converters employing two novel methods: lossless switching method and method for novel magnetics structure. Lossless switching improves substantially the conversion efficiency, while new DC Transformer structure either minimizes or entirely eliminates the DC energy storage in magnetics core structures hence resulting in a very compact size of magnetics and efficiency improvements. Additional performance benefits are in increased DC overload current capability and reduced EMI noise with improved reliability.

BACKGROUND OF THE INVENTION

Definition and Classifications

The following notation is consistently used throughout this text in order to facilitate easier delineation between various quantities:

1. DC—Shorthand notation historically referring to Direct Current but by now has acquired wider meaning and refers generically to circuits with DC quantities;
2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta i_1$—The difference between instantaneous and DC components is designated with $\Delta$, hence $\Delta i_1$ designates the ripple component or AC component of current $i_1$;
6. $i_{CC}$—The composite current equal to sum of currents through the input switch $S_1$ and complementary input switch $S'_1$, that is $i_{CC}=i_{S1}+i_{S'1}$ The following common defining relationships and notations related to magnetic circuit descriptions is used consistently throughout:

1. Flux linkage $\lambda$ is the total flux linking all N turns and is defined as $\lambda=N\Phi$ and $\Phi$ is the total flux in the magnetic core;
2. Inductance L is defined as the slope of the $\lambda$-i characteristic, i.e., $L=\lambda/i$;
3. Flux density B is the flux per unit area defined by $B=\Phi/S$ where S is a magnetic core cross-section area;

Present invention imposes also a need to introduce completely new terminology for the two major novelties, neither of which is present in prior-art switching converter terminology:

1. New magnetic devices with substantially reduced size and increased efficiency made possible by a special switching converter structure and corresponding magnetic circuit structure;
2. Novel methods of switching, which make possible the complete elimination of switching losses (except for gate-drive losses) and thus result in the highest possible efficiency improvement.

The new magnetic devices come in two basic variants named as follows:

1. DC Transformer is a special magnetic structures with multiplicity of inductor windings on a common magnetic core, in which DC current flow of each winding and AC voltage polarity of each winding as imposed by a present invention non-isolated switching converter are such to result in the reduction of the total DC ampere-turns of all winding and hence in reduced DC flux in the common magnetic core and in some instances even substantially zero total DC Ampere-turns and substantially zero DC flux in the common core.
2. Isolated DC Transformer is a special magnetic structures having inductors and isolation transformer windings with the same performance features as DC Transformer but having in addition a galvanic isolation between the source and load.

Lossless Switching Methods require new definition of the switches, switching intervals and transition intervals they create as well as the respective duty ratio D as follows:

1. $S_1$, $S_2$, $S'_1$, $S'_2$—Switch designations respectively for input switch, output switch, complementary input switch, and complementary output switch and, at the same time, designate the switching states of the respective active, controllable switches as follows: high level indicates that active switch is turned-ON, low (zero) level that active switch is turned-OFF;
2. D—The duty ratio is defined as $D=t_{ON}/T_S$ where $t_{ON}$ is the ON time interval during which the input switch is closed (turned ON) and $T_S$ is the switching period defined as $T_S=1/f_S$ where $f_S$ is a switching frequency;
3. D'—The complementary duty ratio D' is defined as $D'=t_{OFF}/T_S$ where $t_{OFF}$ is the OFF time interval during which the input switch $S_1$ is open (turned OFF);
4. State-1 Interval—The time interval during which input switch $S_1$ and output switch $S_2$ are turned-ON (closed), while complementary input switch $S'_1$ and complementary output switch $S'_2$ are both turned OFF (open);

State-2 Interval—The time interval during which input switch $S_1$ and output switch $S_2$ are both turned OFF (open), while complementary input switch $S'_1$ and complementary output switch $S'_2$ are both turned ON (closed);

6. (1-2) transition interval—The time interval between State-1 and State-2 interval during which, in precisely defined sequence and timing, input switch $S_1$ and output switch $S_2$ reverse their state from ON to OFF while complementary input switch $S'_1$ and complementary output switch $S'_2$ reverse their state from OFF to ON;
7. (2-1) transition interval—The time interval between State-2 and State-1 interval during which, in precisely defined sequence and timing, input switch $S_1$ and output switch $S_2$ reverse their state from OFF to ON while complementary input switch $S'_1$ and complementary output switch $S'_2$ reverse their state from ON to OFF;
8. $CR_2$, $CR'_2$—Designation for the output switch and complementary output switch implemented as a current rectifier (CR) diodes and their corresponding switching time diagram. Since diode is a two-terminal passive switch, switching time diagram represents also the state of diode switch as follows: high level indicates that the diode is ON and low level that diode is OFF;
9. I—Designates one quadrant switch operating in the first quadrant. The Roman number (I through IV) within a rectangular box around ideal switch signifies limitation to particular one-quadrant operation;

10. CBS—Together with the rectangular box around the ideal switch and this symbol designates the Current Bi-directional Switch (CBS) as a three-terminal, controllable semiconductor switching device, which can conduct the current in either direction when turned ON, but blocks the voltage of only one polarity when turned OFF.

Switching Converter Categorizations

Over the last two decades a large number of switching DC-to-DC converters had been invented with the main objective to improve conversion efficiency and reduce the converter size. The past attempts to meet both of these objectives simultaneously have been hampered by the two main problems, which up to now seemed to be inherent to all switching DC-to-DC converters:

1. The large DC current bias present in the filtering inductors at either input or output of the converters (as well as the DC-bias current present in the isolation transformer of some of the isolated converters) resulted in a big size of the magnetic components, since an air-gap proportional to the DC current bias must be inserted in the AC flux path in order to prevent magnetic core saturation. This also resulted in a very inefficient use of the magnetic material, which was largely wasted. Even a relatively small air-gap, in the order of 1 mm (40 mils), drastically reduces the total inductance. This loss of inductance was compensated by either an inordinately large increase of the switching frequency (hence increase of losses) or by increasing the size of the magnetic cores, or both.

2. An implementation of soft switching methods to reduce significant switching losses at increased switching frequencies was DC load current dependent and required for its operation an unwanted large output inductor AC current ripple (larger than twice the magnitude of the maximum DC load current) thereby diminishing most of the recovered energy due to increased conduction losses caused by this large AC ripple current. Other soft-switching methods also resulted in additional undesirable loss mechanisms.

Magnetic Circuit Categorizations

The past efforts to solve the first problem and reduce the large size and weight of the magnetic components, inductor and transformer, together with the new method of the present invention has resulted in three major categories relative to the implementation of the magnetic components:

1. Separate Magnetics category in which all magnetic components are used as separate magnetic devices, one or more inductors each with DC current bias, and isolation transformer with or without DC current bias. This realization leads to maximum size and weight of the magnetic components and large energy storage due to the DC bias current in individual magnetic components.

2. Coupled-inductors and Integrated Magnetics category in which magnetic components are combined into a single magnetic structure in which total DC energy storage remained substantially equal to the DC energy storage of separate magnetic components when summed together. This magnetic realization resulted in size and weight reduction and some efficiency improvement, but the major problem associated with DC energy storage remained.

This clearly motivated the search for solution in a form of a switching converter of present invention with novel magnetic structure.

3. DC transformer category in which magnetic components are combined into a single magnetic structure in such a way that the total DC energy storage is reduced and in some cases completely eliminated.

Switching Method Classification

The demand for reduced size and weight of electronic power processing equipment to make it compatible with ever shrinking size of electronic signal processing equipment resulted in the continuous push toward increasing the switching frequency at which DC-to-DC switching converters operate: from initial 20 kHz level to 200 kHz and higher switching frequencies. This, in turn, results in proportionally increased switching power losses. Hence, the past efforts to reduce the converter conduction and switching losses resulted in a number of switching methods, which together with a new lossless switching method of the present invention constitute three broad categories:

1. Hard-switching method in which no attempts were made to reduce the switching losses;

2. Soft-switching method in which measures were taken to reduce the switch losses. Unfortunately, in most cases, the reduction of switching losses was accompanied by the increase of other losses, such as, for example, conduction losses of the switching devices due to the requirement for increased AC ripple currents or losses associated with energy stored in transformer leakage inductance or an additional external resonant inductor. These byproduct power losses clearly led to smaller net loss reduction and modest efficiency improvements. Thus, a third method relative to the switching mechanism is needed and is introduced in a present invention as:

3. Lossless switching method which fully eliminates the extra losses (except for gate-drive losses) of the soft-switching method and thereby results in substantial efficiency improvement.

Categorization by Number of Switches

The switching converters can also be classified into three major converter classes relative to a number of power switches employed, such as:

1. Two-Switch Converter class, example of which is the prior-art buck converter.

2. Three-Switch Converter class such as prior-art forward converter;

3. Four-Switch Converter class such as prior-art forward, half-bridge, and push-pull switching DC-to-DC converters.

The present invention employs four switches and thus belongs to the Four-Switch Converter class.

Prior-art Problems with DC Current Bias and Magnetic Core Saturation

The problem associated with the DC-bias of magnetic components (inductors and transformers) can be best understood with reference to the classical prior-art buck converter shown in FIG. 1a and the accompanied output inductor current waveform of FIG. 1b. Since the converter output supplies DC power to the load, the inductor in the buck converter must pass the DC component of the load current, which is $I_{DC}$. Hence, it clearly cannot be designated as an ordinary inductor used in alternating current (AC) applications as the inductor in FIG. 2a. An AC inductor is wound on magnetic core material in order to substantially increase its inductance value. For example, typical ferrite core material has at room temperature a relative permeability on the order of $\mu_r$=3000. Hence the inductance of the coil is magnified by a factor of 3000 simply by inserting the magnetic core material without any air gap as in FIG. 2a. The corresponding flux linkage λ versus current i characteristics is as in FIG. 2b with a high slope illustrating the high inductance value L (maximum attainable with that core material). The flux linkage excursions caused by the AC current are symmetrical around the center of the magnetic core operating characteristic (FIG. 2b). Even if a very small DC current $I_{DC}$ shown in FIG. 2b were to pass through the coil, the magnetic core material would saturate and instead of the desirable large inductive impedance, the inductor would look like a short circuit. Thus, to avoid core saturation, all present switching converters "solve" this DC-bias problem in a "brute-force" way by inserting an air-gap in the magnetic flux path as illustrated in FIG. 3a. This clearly reduces the inductance value proportionally to the inserted air-gap size (the larger the DC current, the bigger air-gap is needed, and hence the smaller is the resulting inductance value), as seen by the flux linkage characteristic of FIG. 3b for an un-gapped core (dotted lines) and gapped core (full lines) and their corresponding inductances L and $L_g$. Clearly three very detrimental factors did occur:

1. By insertion of the air-gap, the inductance value is drastically reduced. It is not uncommon to see the original un-gapped inductance L reduced by a factor of α=100 to α=1000 with the air-gap included. In order to compensate for this reduction of inductance, the switching frequency should be increased or a bigger core size is used, or combination of both.
2. The already small available AC flux linkage excursions due to the low saturation flux density $B_{SAT}$ of 0.3 T (telsa) for ferrite material, is further reduced due to the presence of the DC-bias in the core. For example, in typical applications, the DC-bias might correspond to a flux density of 0.25 T thus leaving only 0.05 T for the superimposed AC flux density. AC flux density excursions are indicated in thick lines in FIG. 3b. To increase the AC flux density excursions, larger core size is required or increased switching frequency, or both.
3. Due to the presence of positive DC bias, only one part of the saturation characteristic is utilized and another part of $\Delta B = B_{SAT} = 0.3$ T is wasted.

The DC-bias problem is not only limited to all inductors used up to now in DC-to-DC converters but is also present in many isolation transformers, such as for example in the popular flyback converter shown in FIG. 4a. This transformer does provide galvanic isolation and the ability to step-up or step-down the voltage through the transformer turns ratio, but contrary to the ordinary AC line transformer, it has a large DC-bias and requires a correspondingly big air-gap as shown in FIG. 4b. Hence the magnetic core is biased in one direction thus limiting the superimposed AC flux excursions as seen in FIG. 4c.

Let us now also quantify DC-bias effect on an output inductor design for a 5 V, 100 W buck converter. For a DC load current of $I_2$=20 A, and number of winding turns N=6 implemented on a ferrite core with saturation flux density $B_{SAT}$=0.3 T (telsa), $B_{DC}$=0.2 T is available for the DC-bias and the remaining 0.1 T for the superimposed AC flux excursions. To support NI=120 ampere-turns the required air-gap is calculated from ($l_g = \mu_0 NI/B_{DC}$=30 mils=0.75 mm), where ($\mu_0 = 4\pi 10^{-7}$ H/m) is the permeability of free space. If L is the inductance without air-gap, and $L_g$ is the inductance with air-gap $l_g$=0.75 mm, then the ratio of the two inductances is given by $L/L_g = \mu_r l_g/l_m$=50 where $\mu_r$ is the relative permeability of the ferrite material, which for typical materials used in switching converters $\mu_r$=3000, and $l_m$=45 mm is the mean magnetic path length of the core used. Thus, the maximum available inductance of a given core is reduced by a factor of 50. At higher power and especially higher DC load current levels this becomes progressively much more severe. It is not uncommon for some high power DC converter applications in the kilowatt range to see that after ferromagnetic material was inserted the inductance increased only by a factor of 2 or 3 over the inductance without any magnetic material due to the large air-gap needed to prevent saturation. Clearly, this is a tremendous waste of the magnetic material, which has the ability to increase the inductance 3000 times over that of an air-core coil. This is also the reason, why in switching converters in which isolation transformer has no DC bias, such as in the isolated Cuk converter, the transformer size is several times smaller in size and weight in comparison with the size and weight needed for the input and output inductors, which by far dominate the size and weight of the switching converter and also result in increased losses.

The loss of the inductance due to insertion of the air-gap in the flux path is compensated either by increasing the core cross-section or by increasing the switching frequency, or a combination of both would rapidly degrade the overall efficiency. Thus, it is very desirable to either reduce the DC-bias in the magnetic core, or, if possible, to eliminate it entirely.

In the past, there had been a number of attempts to correct this fundamental limitation of DC-to-DC converters, but with a very limited success. One approach was followed by magnetic manufacturers, such as Hitachi and TDK. In the article "Reducing Magnetic Component Size with Reverse Biased Ferrite Core" published in the Proceedings of the Powercon 6 conference, May 1979, author Shiraki (of Hitachi) proposed to add a permanent magnet to the air-gap and hence by proper orientation of the permanent magnet produce reverse bias the in the core in the direction opposite to the DC-bias created by the current of the magnetics winding as shown in FIG. 5a. The net effect is that the AC flux excursions are now extended into the negative core flux swing area as seen in FIG. 5b and FIG. 5c and would allow the core cross-section and volume reduction by up to 50%. The TDK corporation developed a line of PCH cores based on their reverse biased core modification as reported in the Proceedings of Powercon 9, July 1982 in article "A New Reverse Biased Choke Coil" by Nakamura and Ohta of TDK corporation. Note, however, that both approaches also include an air-gap and operate along the reduced, "thick link" slope as shown in FIG. 5b and FIG. 5c. Hence, the large reduction of inductance from its maximum inductance capability of the un-gapped core (dashed line in FIG. 5b and FIG. 5c) is still present. Another drawback is that the core can only support the designed-in maximum DC-ampere-turns. If this is exceeded, the core will saturate and the overload capability will be lost. Since the permanent magnet provides a fixed reverse bias independent of the DC load current, at no-load current, the magnetic flux is entirely along the negative part of the core flux saturation characteristic (FIG. 5c). In fact, the permanent magnet generates the maximum allowable bias but in the negative (reverse) direction. This will be compared later with the novel DC Transformer of the present invention in which there is an automatic self-balancing, such that at any DC load current, total DC Ampere-turns of all windings is zero. The other practical limitations, such as increased cost of the special cores with inserted permanent magnets, the extra loss due to added core loss of the permanent magnet, etc. rendered this approach unattractive, which is by now abandoned by both of these companies.

Another attempt to reduce or eliminate the DC-bias problem is to make use of a special converter circuit configuration instead of a special magnetic core structure. Such an approach is disclosed in U.S. Pat. No. 5,166,869 issued to Bryce L. Hesterman for "Complementary Electronic Power Converter" in which a "complementary transformer" is introduced. This transformer combines the input and output inductors into a coupled-inductor configuration in which the DC flux generated by the input inductor DC current is canceled by the flux generated by the output inductor DC current. The main drawback of the proposed converter is that it is capable of producing only the fixed input to output voltage conversion ratio determined by a fixed turns ratio of the two windings. Hence it cannot provide a regulated voltage through pulse-width modulation of the switches even over a limited input voltage range. From another point of view, there are other fixed conversion ratio converters such as 50% driven bridge type converters, which do not need inductors with DC-bias current for either input or output filtering, hence the DC-bias problem is not present. Thus, a highly desirable objective is to have a switching converter with a variable conversion ratio, capable of handling a wide range of input voltages and provide regulated output, and at the same time either completely eliminate the DC-bias or reduce it substantially.

Another possible approach is to combine input and output inductor windings into a common coupled-inductor structure as shown in FIG. 6a and as was disclosed in U.S. Pat. No. 4,184,197, "DC-to-DC Switching Converter" by S. Cuk and R. D. Middlebrook and U.S. Pat. No. 4,257,087, "DC-to-DC Switching Converter with Zero Input and Output Current Ripple and Integrated Magnetics Circuits" by S. Cuk. As described in the above patents, the basic prerequisite for combining the two windings on a common core is to have identical AC voltages across the two inductors before the coupling, and that the AC voltage matching is maintained over a wide operating range of duty ratio D as illustrated by the identical AC voltage waveforms in FIG. 6b (duty ratios $D_1$ and $D_2$) for the converter of FIG. 6a. In practical applications, a small mismatch of the AC voltages could be absorbed gracefully due to the ever-present leakage inductance between the two windings as explained below. Since the AC voltages are identical, the placement of the two windings on the same core in a coupled-inductor structure imposes the requirement for equal number of turns N (AC voltage ratio equal to turns ratio as in an ideal transformer), because in the simplified model the leakage inductance is not included. The proper understanding of the AC voltage polarity marking in coupled-inductor and integrated magnetic structures (polarity markings with dot-marked ends as in FIG. 6a) and the actual directions of the instantaneous and DC currents relative to those dot markings (currents $i_1$ and $i_2$ and their DC components $I_1$ and $I_2$ in FIG. 6a) is of critical importance for understanding not only previous inventions but is crucial for understanding the present invention.

Note the difference of this coupled-inductor structure and a transformer. The output inductor instantaneous current $i_2$ in the coupled-inductors of FIG. 6a flows into the dot-marked end, whereas in an AC transformer, the secondary current $i_2$ flows out of the dot-marked terminal. Thus, the corresponding DC component $I_2$ of the load current in the coupled-inductor structure also flows into the dot-marked end. Consequently, the generated DC fluxes $\Phi_1$ and $\Phi_2$ add together (FIG. 7c) resulting in a combined flux vs. ampere-turns characteristic of FIG. 7f.

Clearly, the air-gaps $g_1$ and $g_2$ of the two corresponding separate inductors of FIG. 7a and FIG. 7b add, resulting in larger total air-gap $g_1+g_2$ for the coupled-inductor core structure of FIG. 7c. Note that due to the larger total air-gap, the total effective permeance P in FIG. 7f (and hence corresponding inductance) is still further reduced from permeances of the separate cores in FIG. 7d and FIG. 7e.

The main advantage of the coupled-inductor structure is that it can reduce the ripple current on the output side dramatically and even produce zero output ripple current, as first disclosed in U.S. Pat. No. 4,184,197. As disclosed in U.S. Pat. No. 5,790,005 "Low Profile Coupled Inductors and Integrated Magnetics", the inventors E. Santi and S. Cuk have shown that the air-gap position plays the key role in zero ripple current adjustment. When the air-gap is solely placed on the side of input inductor as in FIG. 8a, the total leakage inductance $L_L$ effectively appears solely on the output inductor side as in the model of FIG. 8b. Since the converter of FIG. 6a generates identical AC voltages on the input and output inductors, the net AC voltage across this leakage inductance is zero ($\Delta v = v_{L1} - v_{L2} = 0$) leading to zero ripple current ($\Delta i_2 = 0$) in the output inductor.

Note that the ripple current on the input inductor remains relatively large due to presence of the air-gap. The only way to reduce that ripple would be to reduce the air-gap. Thus, one might be tempted to connect on purpose the coupled-inductors of FIG. 7c into the converter of FIG. 6a so that the output inductor dot-marked end is reversed and connected as in FIG. 9a to the junction between diode $CR_1$ and capacitor $C_1$. Note that with such connection the output inductor DC current $I_2$ will flow out of the dot-marked end. Hence, at least for one duty ratio D=0.5, and provided equal number of turns are used on both windings, a complete DC flux cancellation could be accomplished in the coupled-inductors magnetic core. Thus, the air-gap could be eliminated since the DC-ampere-turns of the two windings cancel. However, elimination of the ripple current is not possible even for this single operating point, since the model in FIG. 9b clearly points out that the small residual leakage inductor would now be subject to an AC voltage, which is two times larger than the input inductor AC voltage $v_{L1}$ resulting in huge circulating ripple current for both input and output inductors.

Clearly, what is needed is a special switching converter which inherently has the opposing flow of the DC currents in the input and output inductor windings (into the dot-marked end and out of dot-marked end respectively) and yet the respective AC voltage waveforms at the two inductors windings should be in phase with each other at respective dot-marked ends. Further constraint is to have identical or closely matching magnitudes of both AC voltages and DC currents. Yet an additional constraint is to maintain the above relationship over a wide operating range, that is a wide change of the duty ratio D. Note that even the first constraint of opposing DC current flows (for the net DC-ampere-turn reduction, if not complete cancellation) and the in-phase waveforms of the respective AC voltages is not realized in the prior art converter of FIG. 6a as well as in all other Coupled-inductors and Integrated Magnetics structures proposed in the past.

Out of a large number of possible switching converters, with input and output inductors only a handful of them even meet the pre-requisite for coupling them on a common magnetic core, that is to have identical AC voltage waveforms, both in terms of their in-phase relationship as well as their magnitudes. Thus, imposing the additional even more severe constraints, such as opposing DC current flows as well as their matching magnitudes, may appear at first too restrictive and impossible to achieve at all. This, however, is not the case, and solution is found in the form of the DC Transformer realization presented in Summary Section and Section on Detailed operation.

Prior-Art Problems with Hard-Switching and Soft-Switching Converters

One of the first soft-switching methods which provided reduction of switching losses was introduced by C. Henze, H. C. Martin and D. W. Parsley in "Zero-Voltage Switching in High-Frequency Power Converters Using Pulse-Width Modulation", *IEEE Applied Power Electronics Conference*, (IEEE Publication 88CH2504-9) pp33–40, 1988 record on a basic buck converter which belongs to Two-Switch Converter class and is shown in prior-art of FIGS. 10(*a–e*). In order to obtain zero-voltage switching at a constant switching frequency, the usual transistor-diode implementation of two switches is replaced with two MOSFET transistors, each of which is modeled as a parallel connection of an ideal switch with an anti-parallel parasitic body-diode and a parasitic drain-to-source capacitance, resulting in circuit models of FIGS. 10(*a–d*). The total switching cycle $T_S$ is broken down into 4 intervals by proper drive timing of the two switches S and S' as shown in FIG. 10*e*. Note that with two controllable switches, two well defined transition intervals are introduced during which both switches are OFF. The first transition interval ($t_N$ in FIG. 10*e*), starts when switch S is turned OFF (as in FIG. 10*a*) and is also known as the "natural" transition. By turning OFF the switch S, the inductor current $I_P$ is flowing naturally in a needed direction (represented by the current source $I_P$ on FIGS. 10*a–d*). This current source $I_P$ charges the parasitic capacitance $C_S$ of switch S and discharges parasitic capacitance $C_{S'}$ of switch S' until capacitance $C_{S'}$ is fully discharged at which instant the body-diode of switch S' clamps the voltage at zero and prevents reverse charging of parasitic capacitance $C_{S'}$ of switch S'. At that instance, the switch S' can be turned ON with zero switching losses (FIG. 10*b*), since the charge of $C_{S'}$ was already relocated to capacitance $C_S$ of the switch S (charged to $V_g$). Hence the converter state as in FIG. 10*c* is obtained for interval $D'T_S$. In order to perform the reverse process during the second transition interval, a negative inductor current $l_N$ is needed. The simplest method to accomplish this is to design the output inductor to have a large ripple current, such that its peak-to-peak ripple current is more than 2 times the maximum DC load current. As seen in the inductor current waveform in FIG. 10*e*, the instantaneous inductor current $i_L$ will at some point during $D'T_S$ interval reverse direction and become negative with magnitude $I_N$. Just before the end of complementary interval $D'T_S$ the switch S' is turned OFF initiating the so-called "forced" transition (since the inductor current is now intentionally forced to become negative by the converter circuit designed for large ripple). During this forced transition interval ($l_F$ in FIG. 10*e*), the converter states of FIGS. 10(*c–d*) apply and opposite to $t_N$ interval occurs: this negative inductor current $I_N$ charges parasitic capacitance $C_{S'}$ of switch S' and discharges parasitic capacitance $C_S$ of switch S until voltage $V_S$ of S reaches zero. At that instant body-diode clamps the voltage on switch S to zero forcing switch S to turn-ON at zero voltage in a lossless manner. Hence recycling of the charge stored in the parasitic capacitances $C_S$ and $C_{S'}$ is provided instead of being dissipated each cycle as in "hard-switching".

Even though soft-switching can be achieved on both active switches S and S' in this very simple manner, and the voltage stresses on the switches are as low as in the original hard-switching buck converter, the big disadvantage is that the magnitude of the output inductor ripple current must be higher than two times the maximum DC load current and this must be satisfied for a wide range of the operating duty ratio D, which makes output inductor ripple current requirement even higher. This, in turn, increases the conduction losses significantly and diminishes savings obtained by reduced switching losses. In addition, an increased size of output capacitor is needed to absorb this large ripple current and to reduce the output AC ripple voltage to acceptable level.

Another prior-art method of reduction of switching losses belongs to the Three-Switch Converter class, as disclosed by U.S. Pat. No. 4,415,959 issued to P. Vinciarelli, for "Forward Converter Switching at Zero Current". To force the main input power switch to switch at zero current in this quasi-resonant converter, the reactive components, small resonant inductor and small resonant capacitor are used to distort the main switch square-wave like current waveform into a sinusoidal-like current waveform. This makes possible turning ON and OFF of the main switch at zero current and reduces the switching losses caused by switch current and switch voltage overlap and by finite switching time characteristic of the semiconductor switching devices. Unfortunately, the increased RMS value of the switch current increases the conduction losses, thereby diminishing some of the switching loss reduction gained by zero current switching. More serious, however, is the fact that the dominant switching loss due to $\frac{1}{2}CV^2$ energy stored on the parasitic capacitance of the main switch still remains and is dissipated when that switch is turned ON. This switching loss is especially pronounced in applications operating from high input DC voltages, such as nominal 300 V DC input voltage in OFF-line applications, using rectified AC line as a DC source.

The converter disclosed in U.S. Pat. No. 4,441,146 issued to P. Vinciarelli for "Optimal resetting of the transformer's core in single-ended forward converters" belongs to the Four-Switch Converter class. The branch comprising the auxiliary switch and storage capacitance, and placed on transformer secondary was used with a sole purpose to form a "magnetizing current mirror" to reset the transformer's magnetic core and has not other roles. On the contrary, in the present invention, the branch comprising an auxiliary switch and an auxiliary capacitor is placed on the primary side of the novel switching converter topology accomplishing not only the transformer's magnetic core reset but also more importantly the elimination of switching losses.

The converter disclosed in the U.S. Pat. No. 5,291,382 issued to Isaac Cohen for "Pulse Width Modulated DC/DC Converter With Reduced Ripple Current Component Stress and Zero Voltage Switching Capability" also belongs to the Four-Switch Converter class. In this converter, the soft-switching at zero voltage is achieved in a method analogous to the buck converter of FIGS. 10(*a–e*). It is based on the small magnetizing inductance of the isolation transformer which results in large magnetizing ripple current, hence with the same soft-switching and efficiency limitations as in a soft-switching buck converter. However, since soft-switching is accomplished by large magnetizing ripple current of transformer and not with a large output inductor ripple current as in a buck converter, the undesirable effect of large output inductor ripple current of the buck converter on output ripple voltage is eliminated.

Yet another example of the Four-Switch Converter class is the prior-art converter disclosed in the U.S. Pat. No. 5,066,900 issued to John Basset for "DC/DC Converter Switching at Zero Voltage". In this converter, the leakage inductance of the transformer is used as a resonant inductor to force the reduction of switching losses. However, the use of the passive rectifier diodes for the two switches on the converter's output (secondary side) instead of the controllable switches with optimum switching time control as in the present invention, severely limits the loss reduction which can be achieved with this soft-switching technique.

The common to all above cited prior-art soft-switching converters is that although they employ different soft-switching methods on the members of Three-switch and Four-switch Converter class, they all utilize only the passive current rectifier switches for the two output switches. Even when synchronous rectifiers are implemented, their switching coincides with that of the replaced rectifier diodes, resulting in similar switching loss characteristics. To the contrary, the present invention, which belongs to the Four-switch Converter class uses in addition to the two active switches on the input sides also two active and controllable switches on the output secondary side, which are the Current Bidirectional Switch (CBS) semiconductor devices. Together with a special switching sequence and time control of all four controllable switching devices, present invention results in reduction of switching losses without increase of other losses, such as conduction losses, leakage losses, etc., as was the case with the prior-art soft-switching methods.

Present invention introduces novel lossless switching methods, which require specific converter topology, proper type of semiconductor switches, and precise sequence and drive timing for the four controllable switches.

SUMMARY OF THE INVENTION

A primary objective of this invention is to provide a switching DC-to-DC converter with the following three basic features:

1. Ultra high efficiency;
2. Elimination of the switching losses enabling very high switching frequency and reduction of the converter size and weight;
3. Very small size of the magnetics with ultra high output DC overload current capability.

All these basic features can be simultaneously realized with the present invention due to its novel characteristics:

1. New switching converter topology with four controllable switches;
2. Novel lossless switching method in a novel lossless switching topology;
3. New DC transformer structure with further reduction of size and method for near elimination of the stored DC energy in magnetics with further increase of efficiency.

Switching Converter Topology with Four Controllable Switches

The new lossless switching DC-to-DC converter is comprised of a Power Processing Stage with four controllable MOSFET switches and the Switching Time Control Box, which provides the needed switching sequence and timing control for all controllable switches to achieve lossless switching in a number of alternative ways. The invention is embodied in either non-isolated converter or isolated converter.

The isolated Power Processing Stage is comprised of an isolation transformer, input and output inductors, series input capacitor, auxiliary capacitor and four controllable switches. The input inductor is connected in series with the DC source and provides the non-pulsating (continuous) input current, while the output inductor is connected in series with the DC load and provides non-pulsating (continuous) output current. The input capacitor is connected in series with the input inductor and transformer primary. Input switch and complementary input switch are on the transformer's primary side, while output switch and complementary output switch are on the transformer's secondary side. The branch with the complementary input switch in series with auxiliary capacitance is positioned within converter in such a way to conduct AC ripple current only while the complementary input switch is closed.

Lossless Switching Method and Lossless Switching Topology

The AC ripple current of the complementary input switch together with the controllable output switch and the novel switching sequence and time control enables lossless switching operation, with efficiency and size performance not possible with prior-art soft-switching converters. The lossless switching method utilizes a resonance between the parasitic capacitances of the primary side switches and the leakage inductance of the isolation transformer in a novel way obtained through precise sequence and timing of switching of all controllable switches. Such special sequence and timing control results in the resonant current with three components, which provides switching with significantly reduced losses in comparison to classical soft-switching method, hence designated lossless switching.

DC Transformer Structure and Method for Reduction of Stored DC Energy

In further improvement of the present invention, the input inductor, the isolation transformer and the output inductor are combined on a common magnetic core to form a new magnetic device, an Isolated DC Transformer, with unique features. Conventional magnetic structures have large DC flux and thus need to include an air-gap to prevent saturation of the magnetic core with consequent loss of inductance and increase of overall size. In the novel Isolated DC Transformer, however, the combined DC-ampere-turns of all windings cancel, resulting in zero DC flux and hence elimination of air-gaps in the magnetic cores with consequent increase of inductances and decrease in size. Thus, the Isolated DC Transformer without an air-gap has high DC output current overload capability, small size and weight, and provides desirable ripple-free DC input and DC load currents. The DC stored energy is also reduced to zero leading to corresponding increase in efficiency.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2a demonstrates that a pure AC inductor with no DC current component is implemented with no air-gap in its magnetic core material path and FIG. 2b shows the flux linkage vs. current characteristic of the AC inductor of FIG. 2a.

FIG. 4a is a prior-art fly-back converter, FIG. 4b demonstrates that the transformer of the fly-back converter must have an air-gap, and FIG. 4c shows the large reduction of the transformer's magnetizing inductance of the fly-back converter of FIG. 4a due to the needed air-gap in the magnetic core.

FIGS. 10(a–d) illustrate the four circuit models of the prior-art, soft-switching buck converter and FIG. 10e is a timing diagram illustrating the need for a high ripple current $i_L$ with a required negative peak value $I_N$ to accomplish the soft-switching in the buck converter of FIG. 1a.

FIG. 14b illustrates the hard-switching switching time control of the two controllable active MOSFET switches of FIG. 14a.

FIG. 16b shows the switching sequence and timing control of the switching devices in the converter of FIG. 16a.

FIG. 17b shows the switching sequence and timing of the switching devices for the converter of FIG. 17a.

FIG. 19a shows the waveforms of the experimental converter with the novel lossless switching (2-1) transition at 1000 ns/div time scale, and FIG. 19b shows the expended view of the (2-1) transition of the waveforms in FIG. 19a at a time scale of 50 ns/div and corresponding lossless switching time control.

FIG. 20a illustrates the switched network obtained for a State-1 interval for the converter of FIG. 11a, and FIG. 20b illustrates the switched network obtained for a State-2 interval for the converter of FIG. 11a.

FIG. 21 is a graph showing the linear DC voltage conversion ratio of the present invention of FIG. 11a.

FIG. 22a illustrates a closed loop regulator for the converter of FIG. 11a, and FIG. 22b shows the variable duty ratio D provided by electronic control for the regulation of the output DC voltage of the converter in FIG. 22a.

FIG. 25a illustrates that two DC currents of opposing directions result in zero DC flux and FIG. 25b illustrates a magnetic circuit with two windings with opposing DC currents resulting in zero DC flux in the core, while

FIG. 29b is a graph showing operation on the positive part of magnetics material saturation characteristic for the magnetics of FIG. 29a.

FIG. 34a shows another embodiment of the DC Transformer of the present invention of FIG. 27 utilizing the DC Transformer with a small air-gap to adjust for zero ripple current in the output inductor and FIG. 34b shows a simplified equivalent magnetic circuit model for the DC Transformer circuit of FIG. 34a, while

FIG. 37b illustrates in an isometric view an embodiment of the magnetic core structure for the present invention in which the leakage leg LL is built using a custom core configuration for the converter of FIG. 37a.

FIG. 43b shows a new symbol of the Isolated DC Transformer model of FIG. 43a.

FIG. 46 illustrates the isolated version of the converter in FIG. 37a.

FIG. 55b shows the characteristic waveforms of the converter in FIG. 55a.

FIG. 56b shows a simplified mode of circuit in FIG. 56a.

FIG. 57a shows a simplified model of FIG. 56b. FIG. 57b shows a simplified model of FIG. 56c. FIG. 57c shows a detailed switching sequence and timing diagram and voltage waveforms of all switches during (1-2) transition interval.

FIG. 58a shows a model for the first subinterval of (2-1) transition interval for converter in FIG. 55a. FIG. 58b shows a model for the second subinterval of (2-1) transition interval during which both diode rectifiers are turned ON. FIG. 58c shows the circuit model showing that turn-ON of the input switch causes turn-OFF of complementary output rectifier switch. FIG. 58d shows the timing diagram of the characteristic waveforms during (2-1) transition interval for the converter of FIG. 55a.

FIG. 60a shows a circuit model for the linear subinterval of (2-1) transition interval. FIG. 60b shows simplified circuit model for the resonant subinterval of the (2-1) transition interval. FIG. 60c shows the timing diagram of the characteristic waveforms during (2-1) transition interval for the converter of FIG. 59a.

FIG. 62a illustrates the isolated converter with CBS output switch and n:1 step-down turns ratio of an isolation transformer. The waveforms in FIG. 62b show that the hard-switching voltage of output switch is reduced by turns ratio n in the isolated converter of FIG. 62a.

FIG. 63b shows one possible specific realization of the lossless switching time control for (2-1) transition for converter in FIG. 63a.

FIG. 64b illustrates four different (2-1) transition cases which can take place depending on the sequence and time of switching drive signal during (2-1) transition interval when the output switch $S_2$ is turned ON.

FIG. 68a illustrates a circuit model for the current-reversal subinterval during (2-1) transition. FIG. 68b illustrates the circuit model describing oscillations at the beginning of the follow on State-1 interval.

FIG. 70c illustrates that at duty ratio higher than 0.5, the complete discharge is also taking place but with resonant current not reduced to zero as in the case of FIG. 70a.

FIG. 75a illustrates the equivalent current for (1-2) transition with resonant inductor included and for subinterval in which the complementary output switch is turned OFF. FIG. 75b illustrates the equivalent circuit for the subinterval in which the complementary output switch is turned ON.

DETAILED DESCRIPTION OF THE INVENTION

Basic Hard-Switching Converter Topology

The unique DC Transformer configuration and lossless switching features of the present invention provide together a switching DC-to-DC converter which overcomes the problems of the prior art converters and results in high efficiency, increased overload capability, and increased power density. However, for purposes of easier understanding, the basic operation of the switching converter is first introduced in FIG. 11a without a detailed DC Transformer structure and with ideal single-pole double-throw switches, each switch with two positions $S_1$ and $S'_1$, and $S_2$ and $S'_2$. The converter consists of the input inductor $L_1$ and output inductor $L_2$, which maintain the continuity of the input and output currents at all operating conditions and hence result in non-pulsating input and output currents. In addition, in the middle of the converter, there is another so-called middle inductor $L_m$ (given that terminology for easier distinction and since it is in the middle of the converter). Its role will be explained later after some analysis reveals its properties. The converter also features three capacitors, an input capacitor $C_1$, an auxiliary capacitor C, and an output capacitor $C_2$. Note that the output capacitor $C_2$ is directly across the output voltage and is included only to make a more effective second-order output filter to further reduce the switching ripple. Thus, while capacitor $C_2$ is always included in the practical implementation for ripple voltage reduction, it is not essential for the converter switching operation and is therefore left out from this analysis and in further discussions. This leaves the auxiliary capacitor C and input capacitor $C_1$, which are involved in the switching process.

Figure 11A:
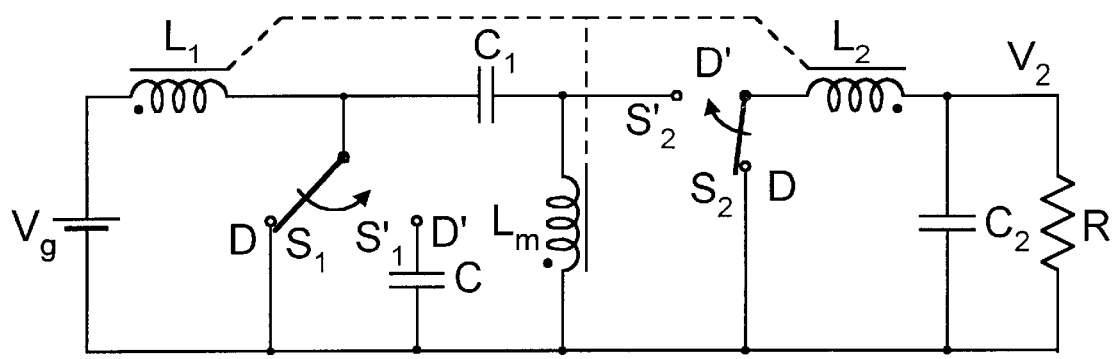
FIG. 11a is a simplified circuit diagram of the present invention using two single-pole, double-throw switches
Figure 11B:
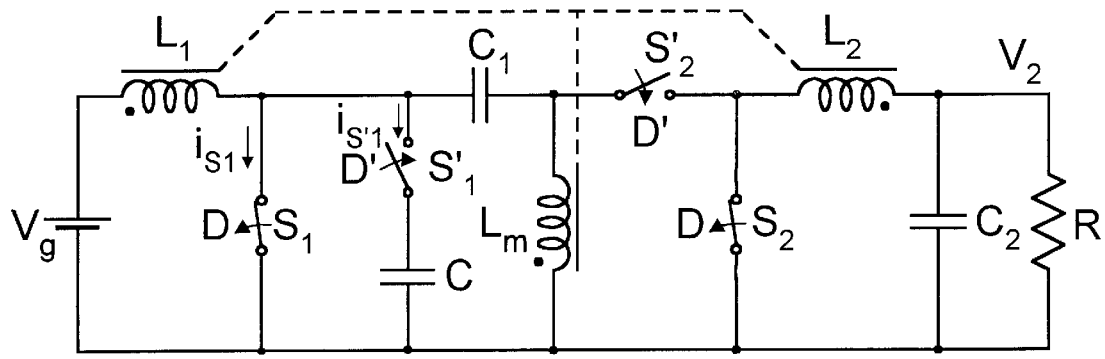
FIG. 11b shows those switches implemented as an input switch $S_1$, complementary input switch $S'_1$, an output switch $S_2$ and a complementary output switch $S'_2$, the synchronized operation of which is shown in FIG. 11c in a timing diagram defining the relative states of the ideal switches in the circuit diagram of FIG. 11b.

Each of the two single-pole, double-throw switches of FIG. 11a is replaced by two single-pole, single-throw switches to result in converter of FIG. 11b with four switches: input switch $S_1$, complementary input switch $S'_1$, output switch $S_2$, and complementary output switch $S'_2$. As seen in FIG. 11b, the $S_1$ and $S_2$ switches are operated in-phase, that is, in this idealized version, they are operated so that both are turned ON at the same time and kept on for time interval $DT_s$ and then turned OFF at the same time and kept OFF for complementary interval $D'T_s$, where $D'=1-D$ is the complementary duty ratio. Complementary switches $S'_1$ and $S'_2$, as the name suggests, are operated in a complementary way, that is out-of-phase with respect to their counter-parts, switches $S_1$ and $S_2$ respectively as also reinforced with the timing diagram of FIG. 11c. Note that this idealized switching will result in "hard-switching" operation of the converter and a more complex drive will be needed for the soft-switching and lossless switching methods introduced later.

Review of the Key Features of the New Switching Converter

The solution to the two key problems facing prior art switching converters and provided by the present invention are briefly summarized here:

1. Elimination of the DC bias from the converter magnetic circuits;
2. Elimination of the switching losses.

The detailed description of the operation and verification of the key performance characteristics are provided later in two detailed sections, one on DC Transformer magnetics and the other on Lossless Switching, while here, only a summary of the main features is presented.

Solution to Magnetic Saturation Problems and Excess Energy Storage

Figure 12A:
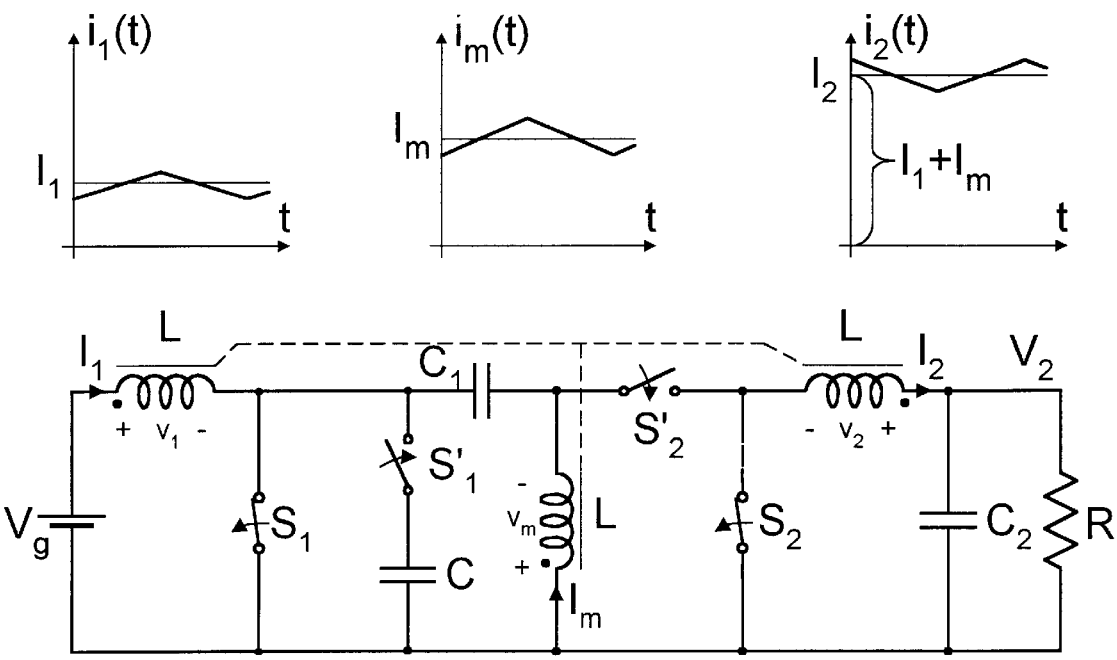
FIG. 12a illustrates a non-isolated embodiment of the present invention.

If the three inductors in the converter of FIG. 12a were not coupled and are used as separate inductors with inductance value L, each inductor will have to use an air-gap proportional to its DC current in order to prevent the saturation of the magnetic core. This, in turn, will result in the energy stored in the air-gap, designated as $W_M$, proportional to product of the square of DC current and inductance value L according to the classical formula. As all three inductors do have respective DC current levels $I_1$, $I_m$ and $I_2$, the total DC energy storage is given by formula $$W_M = \tfrac{1}{2} L I_1^2 + \tfrac{1}{2} L I_m^2 + \tfrac{1}{2} L I_2^2 \qquad (1)$$

Figure 12B:
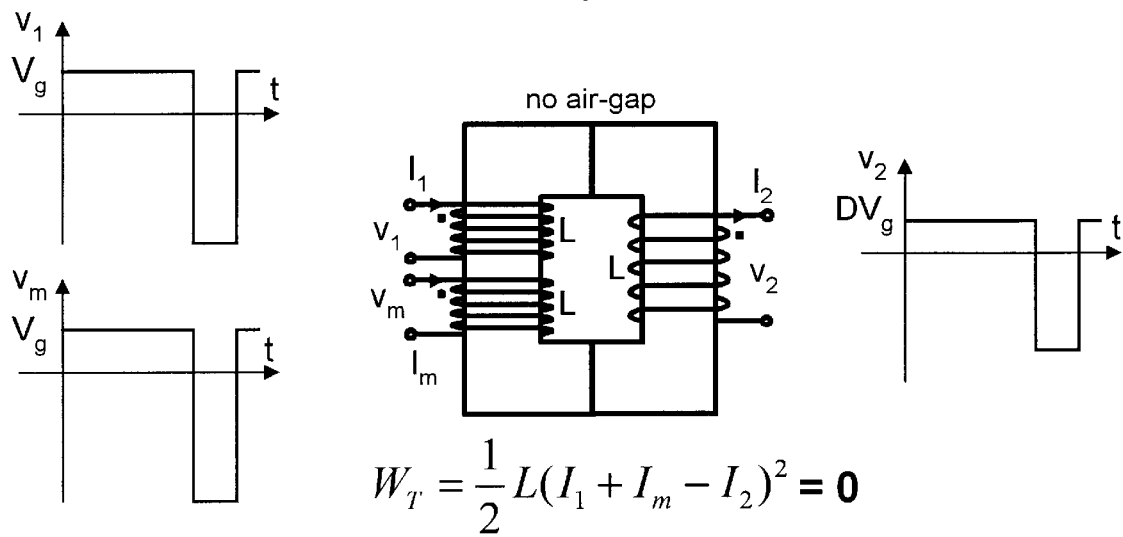
FIG. 12b shows an un-gapped DC Transformer structure with no DC energy storage in the magnetic field.

The unique property of the converter in FIG 12a is that the DC Ampere-turns of all three windings can be placed on the common magnetic core as in FIG. 12b, so that the DC Ampere-turns of all three windings are cancelled, resulting in zero DC flux in common magnetic core. This makes possible the use of an ungapped common magnetic core. Hence the DC energy stored in the common magnetic core is given by:

$$W_M = \tfrac{1}{2} L (I_1 + I_m - I_2)^2 = 0 \qquad (2)$$

Another important feature is that there is no stored DC energy in the core over a wide range of the operating duty ratio D, and any DC load current.

Figure 13A:
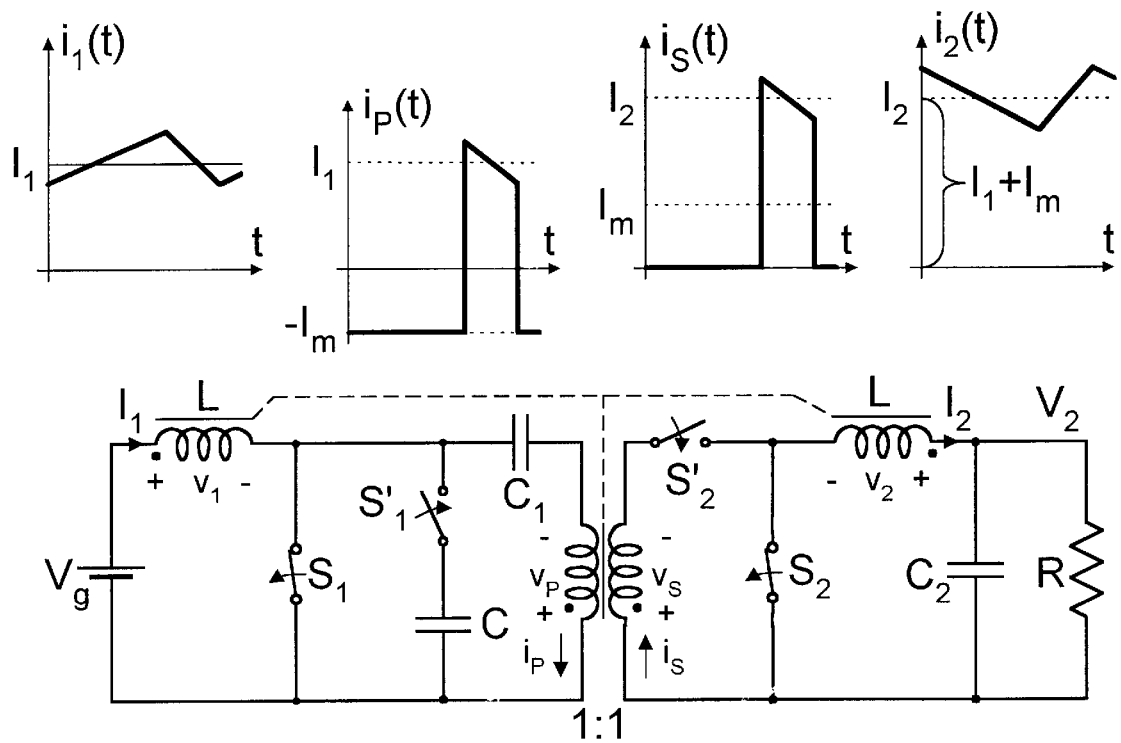
FIG. 13a illustrates an isolated embodiment of the present invention.
Figure 13B:
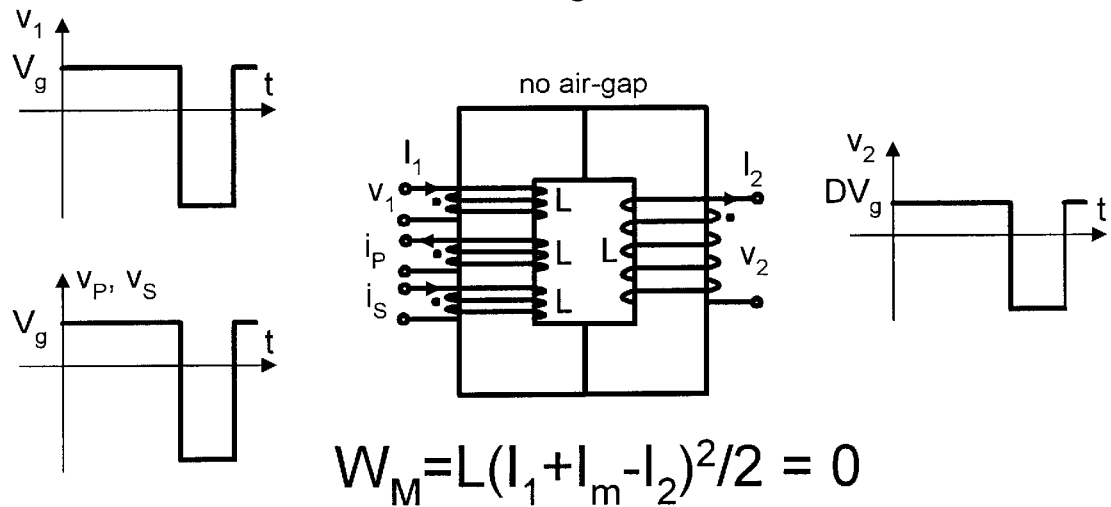
FIG. 13b shows an un-gapped Isolated DC transformer with no DC energy storage in the magnetic field.

The same fundamental property is maintained in the isolated version of the converter shown in FIG. 13a, in which the middle inductor is simply replaced by the 1:1 turns ratio isolatio transformer. In that case, the magnetizing inductance of the isolation transformers has the same DC bias current $I_m$ as middle inductor had before.

The elimination of the DC energy stored in the magnetic core, results in the following benefits:

1. The full core flux capability, up to positive and negative saturation limits, can be used for AC flux excitations.
2. The reduction of the size and losses of the magnetic device.

Elimination of the Switching Losses with Lossless Switching Method

Hard Switching Implementation and Hard-switching Losses

Figure 11C:
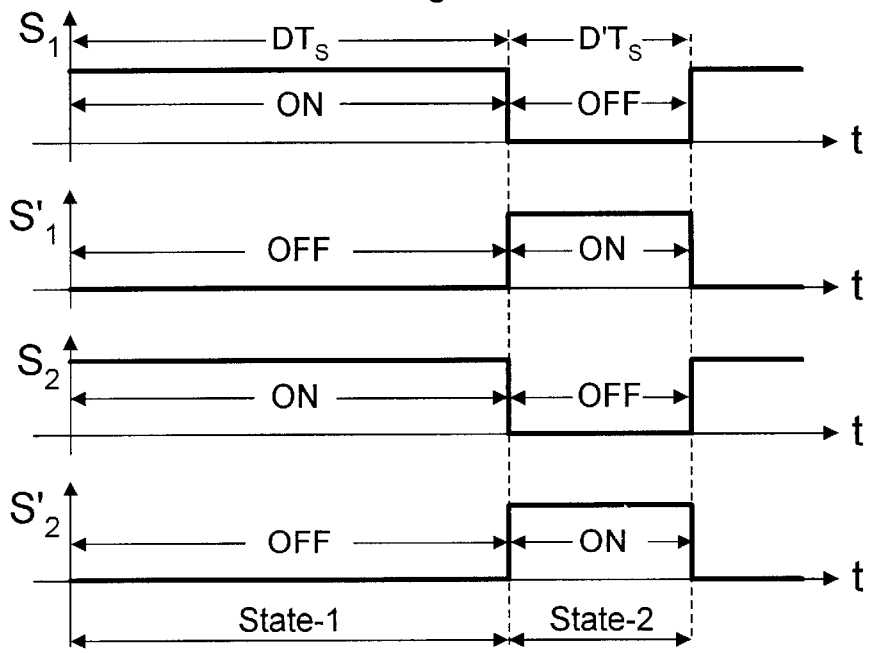
Figure 14A:
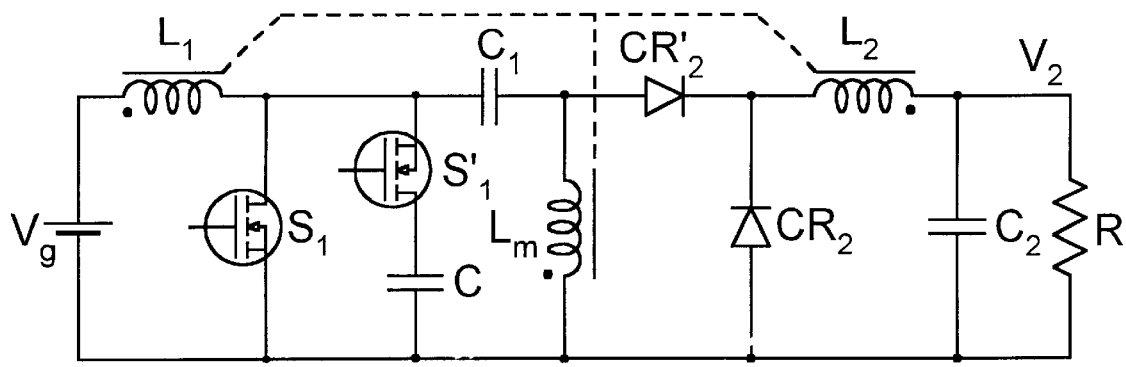
FIG. 14a illustrates the converter version of the present invention with diode rectifier implementation for output switch and complementary output switch.
Figure 14B:
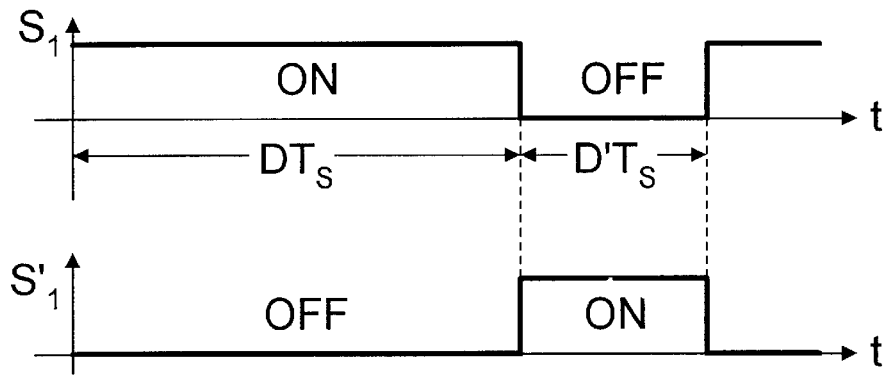

The switching time diagram of FIG. 11c corresponds to "hard-switching" operation of the converter and substantial switching losses will result when all four ideal switches are replaced with actual semiconductor switching devices as in FIG. 14a and with switching time control of FIG. 14b:

1. The input switch and complementary input switch are three-terminal, controllable switching devices (MOSFETs), which can be externally controlled by proper gate drive signals such as those in FIG. 14b;
2. The output switch and complementary output switch are two-terminal, passive switching devices (diodes), which are turned ON and OFF only when particular conditions are imposed on its two-terminals by the converter circuit operation.

Figure 15:
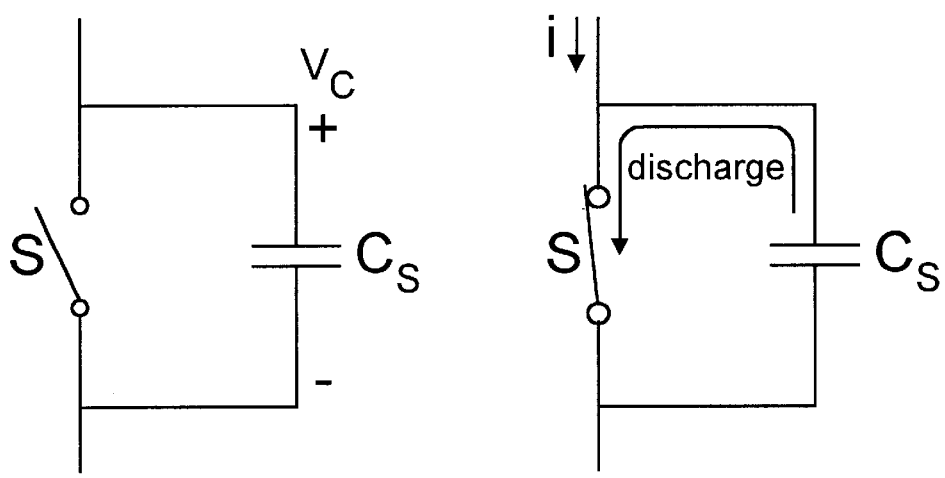
FIG. 15 shows how the energy stored on parasitic capacitance of the switch when switch is open is all dissipated in a hard-switching manner when switch is closed.

Each semiconductor switching device in FIG. 14a, whether it is a a MOSFET transistor, or a diode, can be in its OFF state represented with an open switch with a lump parasitic capacitance $C_S$ in parallel, as shown in FIG. 15, which is charged to the OFF voltage $V_C$ of the device. The energy $W_E$ stored in this parasitic capacitance is all dissipated once the switch S is closed as seen in FIG. 15 and results in the hard-switching power loss $P_L$, which is directly proportional to switching frequency:

$$W_E = \tfrac{1}{2} C_S V_C^2 \qquad (3)$$

$$P_E = f_S W_E = \tfrac{1}{2} f_S C_S V_C^2 \qquad (4)$$

For typical high voltage switches, $V_C$=595 V and for $C_S$=237 pF, we get stored energy $W_E$=42 W/MHz and $P_E$=8.4 W loss for $f_S$=200 kHz. Even if just one out of four switches is operating in a hard-switching mode the resulting 8.4 W switching losses represent more than 7.8% efficiency loss in a case of this 100 W converter.

Soft-Switching Method

Figure 16A:
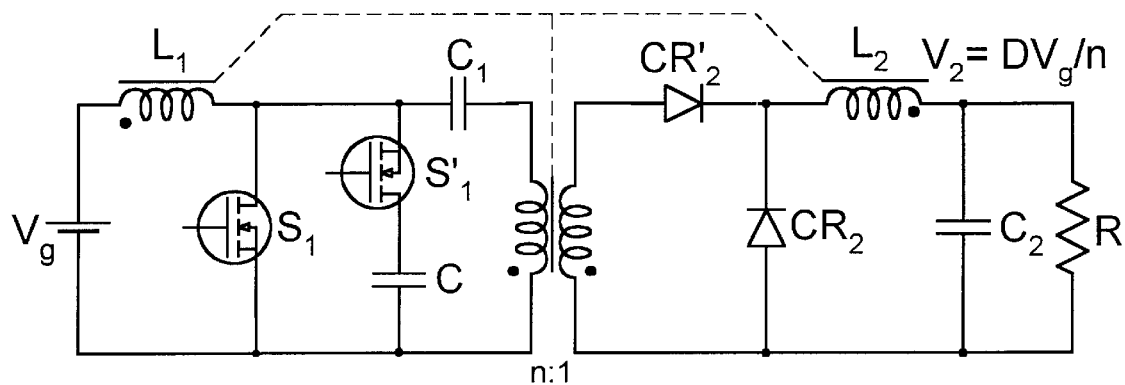
FIG. 16a illustrates a soft-switching embodiment of the present invention with isolation transformer and secondary-side rectifier diodes.
Figure 16B:
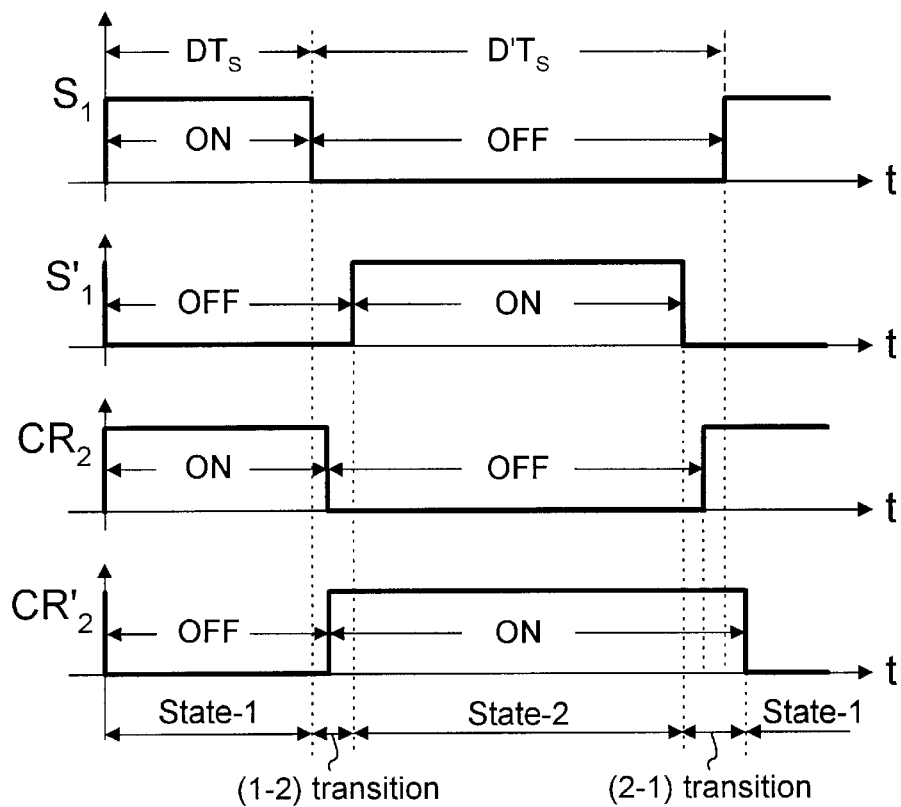

Some switching loss reduction can be obtained by use of the soft-switching method, in which resonant inductor $L_r$ is inserted in series with input energy transferring capacitor $C_1$ as in FIG. 16a. The two controllable switching devices in the converter of FIG. 16a are now provided with modified switching timing control having a so called "dead-time" as shown in FIG. 16b during which both active switches, the input switch and complementary input switch are turned-OFF. This results in two transition intervals during which the states of all for switches are changed. This soft-switching method is implemented with passive rectifier diodes for output switch and complementary output switch which automatically change their states during transition intervals in response to the converter conditions, and results in only limited reduction of losses as described in later Detailed Lossless Switching section. This is to be expected, since controllable switches with possible switching sequence and timing control were not used for output switch and complementary output switch.

Lossless Switching Method

Figure 17A:
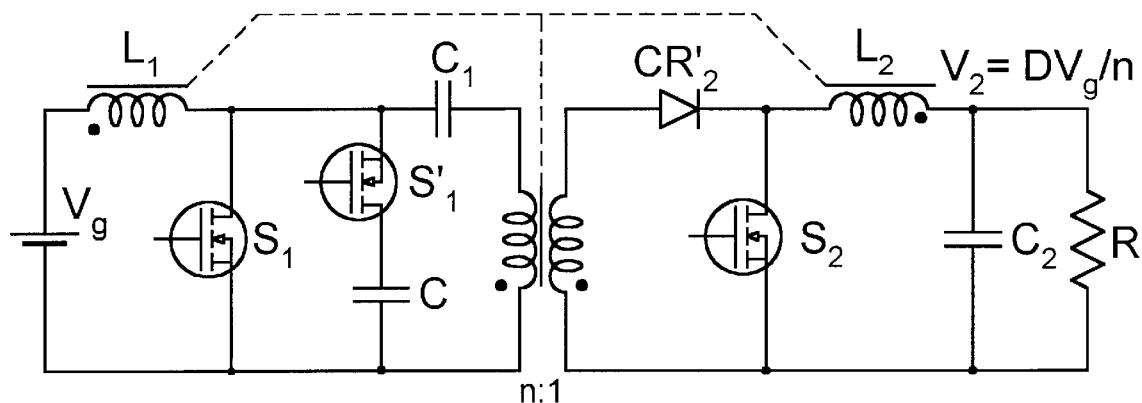
FIG. 17a illustrates a lossless switching embodiment of the present invention with three controllable MOSFET switches and a rectifier diode.
Figure 17B:
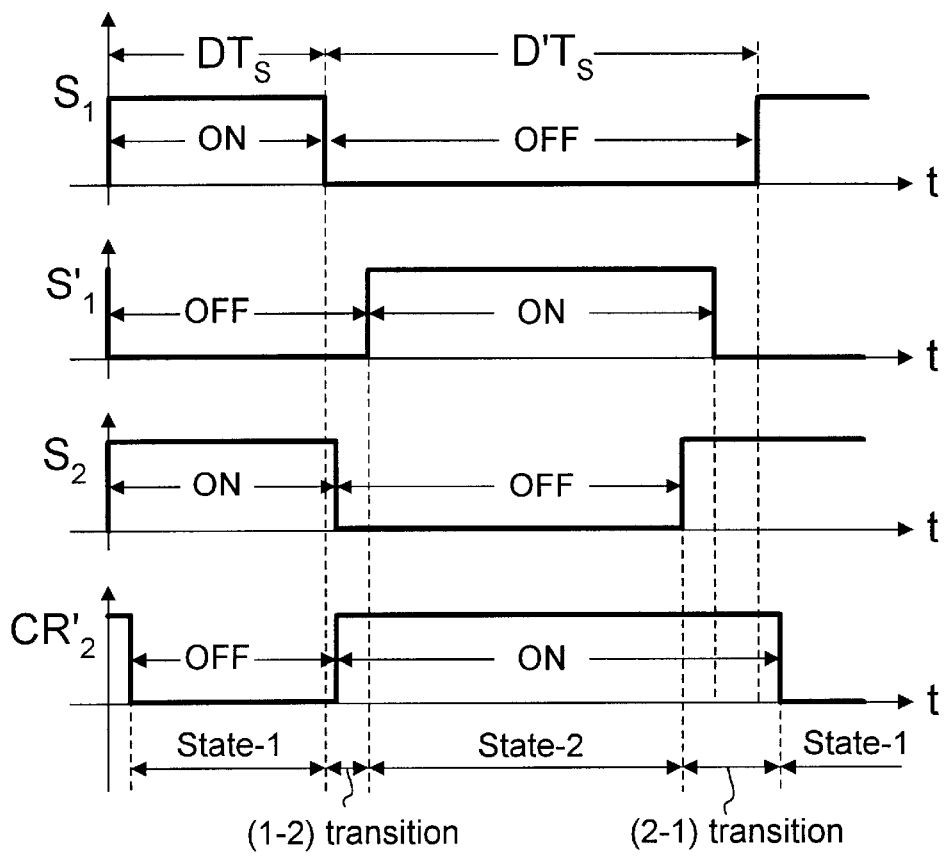

For lossless switching method, the output rectifier switch $CR_2$ of FIG. 16a is replaced with a controllable MOSFET switch as in FIG. 17a. This introduces an additional degree of control over the sequence and timing of the switching during the transition interval, which could eliminate all switching losses without introducing the additional losses as in soft-switching method. While the timing for the first (1-2) transition stays the same as in the soft-switching method, the timing control of the switches for the second (2-1) transition is completely changed as seen in FIG. 17b. It is this sequence and timing of switching, which enable complete lossless switching during the (2-1) transition. Note how the output switch $S_2$ is turned ON before complementary input switch is turned OFF to initiate the (2-1) transition interval. Transition (2-1) in a soft-switching method, however, starts when the complementary input switch is turned ON as seen in FIG. 16b. Note that such a choice of switching sequence and timing control for output switch is just one of many possible alternatives for either complete elimination of switching losses or much reduced switching losses compared to soft switching method. For example, as shown later, the output active switch $S_2$ could be turned ON at anytime before or at the instant when its parasitic body-diode would turn ON in response to the circuit conditions. A number of such cases is discussed in detail in later section. Thus, it is the correct sequence and timing of switching of four switches during (2-1) transition, which provide lossless switching. Such complexity of the switching sequence and timing control first encountered in present invention requires a complete redefinition of the transition intervals and the states of the converter, as introduced in section Definitions and Classifications.

Note that the typical switching will be such that the (1-2) and (2-1) transition intervals are short in comparison with the State-1 and/or State-2 intervals. For example, State-1 and State-2 intervals may for 200 kHz switching frequency be of the order of 2500 ns each, while the transition intervals could be on the order of 50 ns to 200 ns. However, the introduced lossless switching methods as described herein will also work well even when transition times are comparable to the State-1 and/or State-2 intervals. Thus, without the loss of generality of the method, the assumption on short transition intervals is made in order to simplify analysis and understanding of the novel lossless switching methods Hard-switching and Lossless Switching Experimental Comparisons The conventional hard-switching and novel lossless switching performance of the (2-1) transition are compared on an experimental prototype of a 400 V to 5 V, 20 A switching DC-to-DC converter operating at a fixed 200 kHz switching frequency (5000 ns switching period $T_S$) and 50% duty ratio D. In this example, the isolation transformer with 27:1 step-down turns ratio resulted in the transformer leakage inductance reflected to the primary side of $L_r = 27$ $\mu$H, which acted as a resonant inductor during both transition intervals. The (1-2) transition was kept lossless by proper switching sequence and time control. On the other hand, the (2-1) transition was in one case made hard-switched with the simple switching time control of FIG. 18b, and in the other case, it was made lossless with the specific switching sequence and time control of FIG. 19b.

Figure 18A:
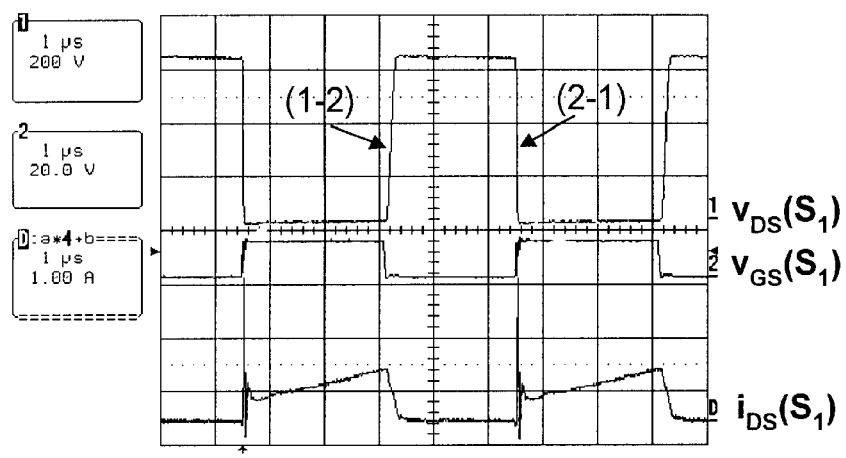
FIG. 18a shows the waveforms of the experimental converter with hard-switched (2-1) transition shown at 1000 ns/div time scale.

From the experimental voltage waveforms of the drain-to-source voltage of the input switch shown in FIG. 18a for a hard-switched version and in FIG. 19a for the novel lossless switching version of the new converter, one could hardly tell the difference between their (2-1) transition intervals because of the large and coarse time scale of 1000 ns per division. However, once the time scale is expanded 20 times to 50 ns per division as in (2-1) transitions of FIG. 18b and FIG. 19b, the dramatic differences can be observed. The lossless switching (2-1) transition in this experimental example is made by using controllable MOSFET switch as output switch and switching sequence and time control of FIG. 19b, which results in one of the most effective lossless resonant exchange of charge between the parasitic capacitances of input switch and complementary input switch.

Figure 18B:
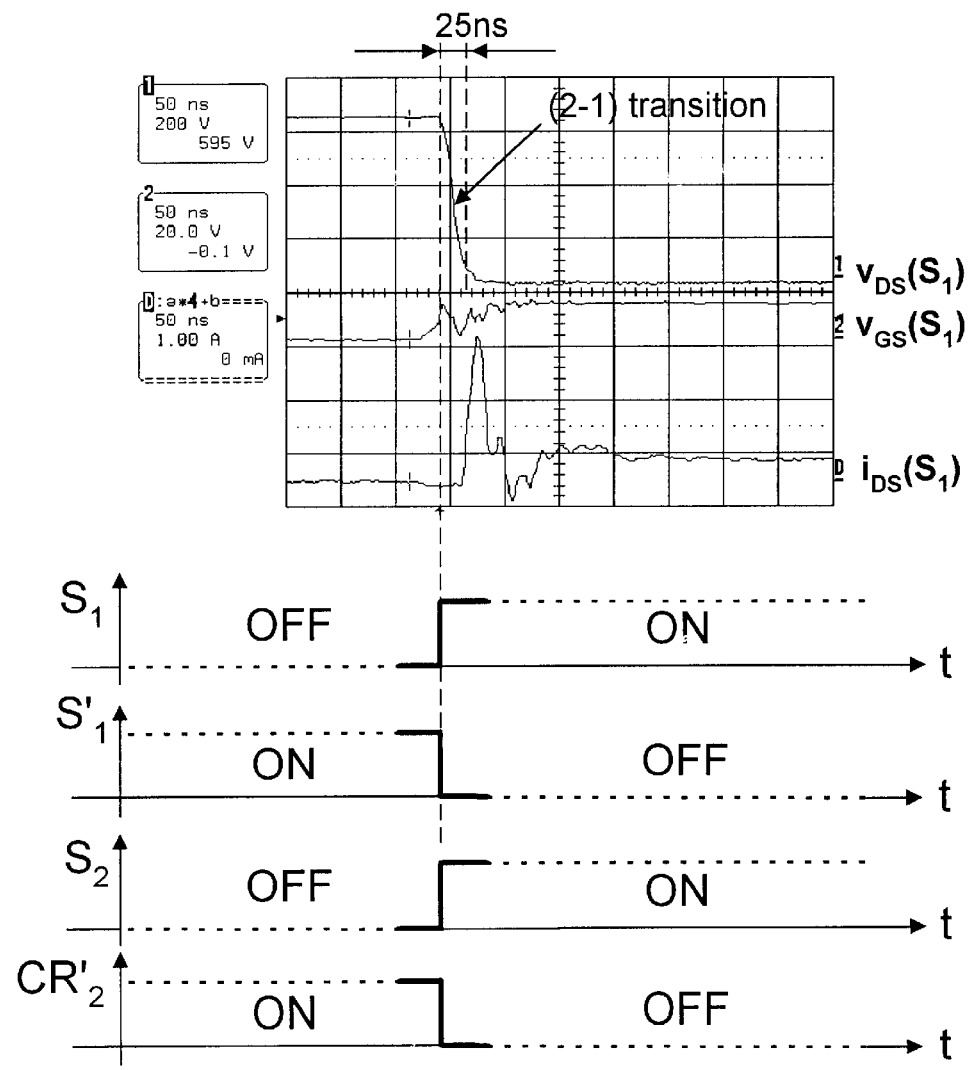
FIG. 18b shows the expanded view of the (2-1) transition of the waveforms in FIG. 18a with a time scale of 50 ns/div and corresponding hard-switching time control.

The hard-switching of FIG. 18b is the consequence of the simple hard-switching time control: simultaneously with turning OFF the complementary input switch $S'_1$ and complementary output switch $CR'_2$, the input switch $S_1$ and the output switch $S_2$ are turned ON. The gate-to-source voltage waveform of input switch $V_{GS}(S_1)$ shows that the input switch is turned ON at its maximum blocking voltage of $V_C = 595$ V resulting in hard-switching losses of 8.4 W as described earlier. Despite high switching speed of the input switch which is completely turned ON after only 25 ns, the (2-1) transition results in another drawback: high current spike noise which is 3 times higher than the peak switch current at full load as seen from input switch drain-to-source current $i_{DS}(S_1)$. This results in high EMI noise in addition to large switching losses.

The lossless switching experimental waveforms of FIG. 19b are result of the more complex switching sequence and time control pattern of FIG. 19b. Note how the input switch gate-to-source voltage goes "high" (turning ON the MOSFET input switch) at the instant when the voltage across the input switch is already reduced to zero, thus resulting incomplete elimination of switching losses due to parasitic capacitances. This was also confirmed by measurement of losses and corroborated with the low temperature rise on the input switch. Furthermore, the input switch current $i_{DS}(S_1)$ has no overshoot and is very smooth with no spikes resulting in reduced EMI noise due to extended (2-1) transition time from 25 ns in hard-switched case to 180 ns in a lossless switching case Thus, the erratic, noisy and lossy hard-switched transition is replaced by a, smooth and efficient lossless switching (2-1) transition by use of the controllable CBS output switch with the proper switching sequence and time control of FIG. 19b.

This example clearly points out the importance of the correct sequence and timing of switching time control of controllable MOSFET switches during short (2-1) transition interval of 250 ns, which is only 0.5% of the total switching period of 5000 ns. Appropriate switching sequence and time control is also implemented during the (1-2) transition to result in the lossless switching performance of that transition as well. However, the detailed timing of that transition is left for analysis in later section, since the mechanism of this transition resulting in lossless operation is much easier to understand.

DETAILED DESCRIPTION OF DC TRANSFORMER

Steady-state Analysis

Figure 1A:
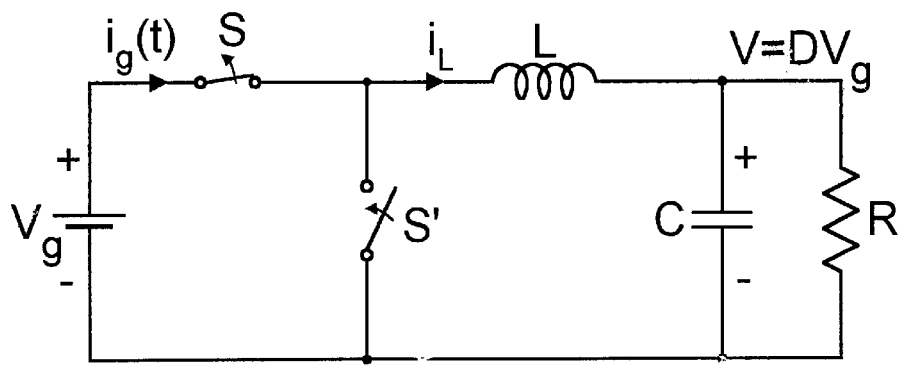
FIG. 1a illustrates prior-art buck converter topology and FIG. 1b illustrates complementary switching of S and S' switches and output inductor current.
Figure 1B:
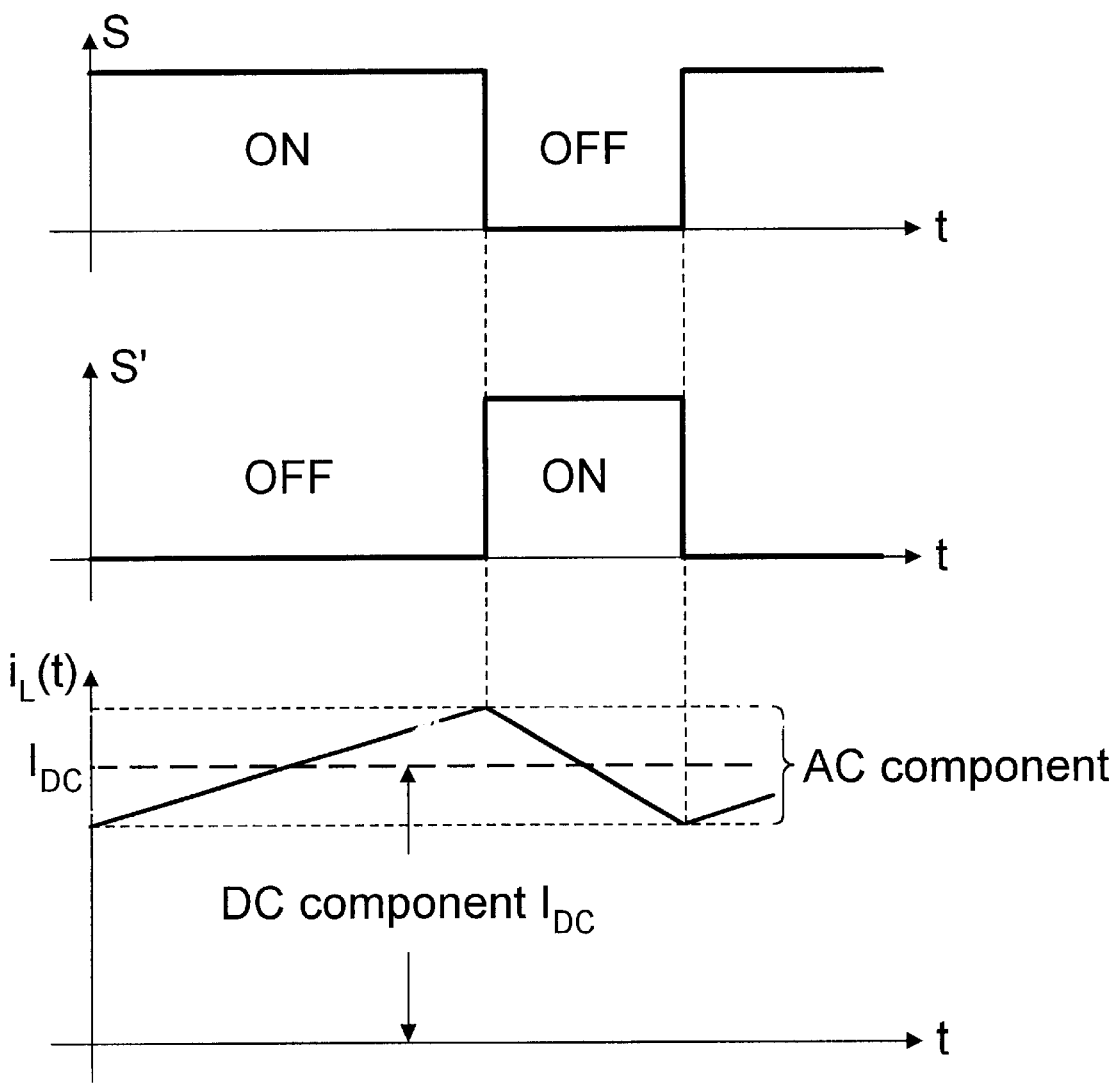

A simple switching converter such as the prior-art buck converter of FIG. 1a was easy to analyze and understand. The present invention even in its simplified forms of FIG. 11a and FIG. 11b is more complex. As the first step, the existence of steady-state operation must be proved; that is after a number of repetitive switching at constant switching frequency $f_S$, all capacitors in the circuit must be charged to finite DC voltages and all inductors must conduct corresponding finite DC currents. Thus, in order to prove the existence of such a steady state operation, and find the actual DC voltages on capacitors and DC currents in inductors as a function of the steady-state duty ratio D, the input voltage $V_g$, and DC load current $I_2$, the state-space averaging method is employed as described in more details in the book "Advances in Switched-Mode Power Conversion", vol. I. vol. II, and vol. III, by S. Cuk and R. D. Middlebrook, or in the technical paper, "A General Unified Approach to Modeling Switching Converter Power Stages", by the same authors and published in Proceedings of Power Electronics Specialists Conference (PESC), June 1976.

Figure 20A:
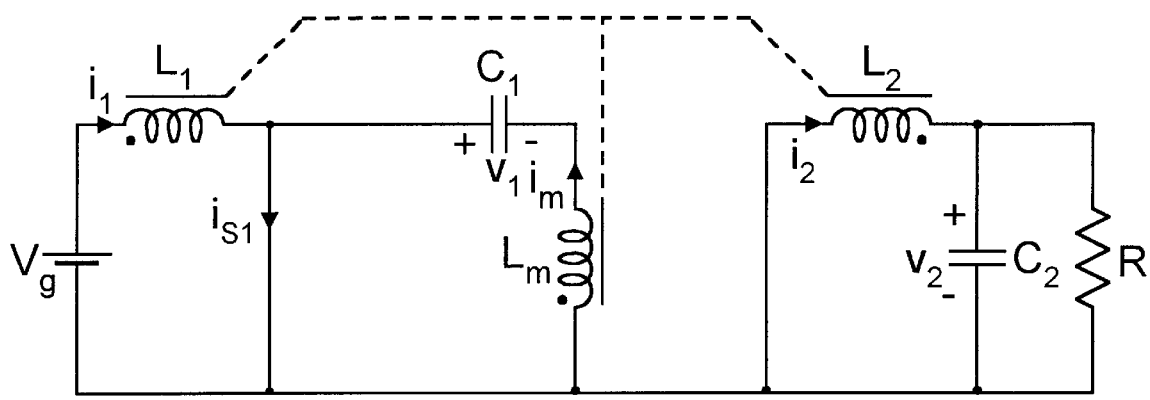
Figure 20B:
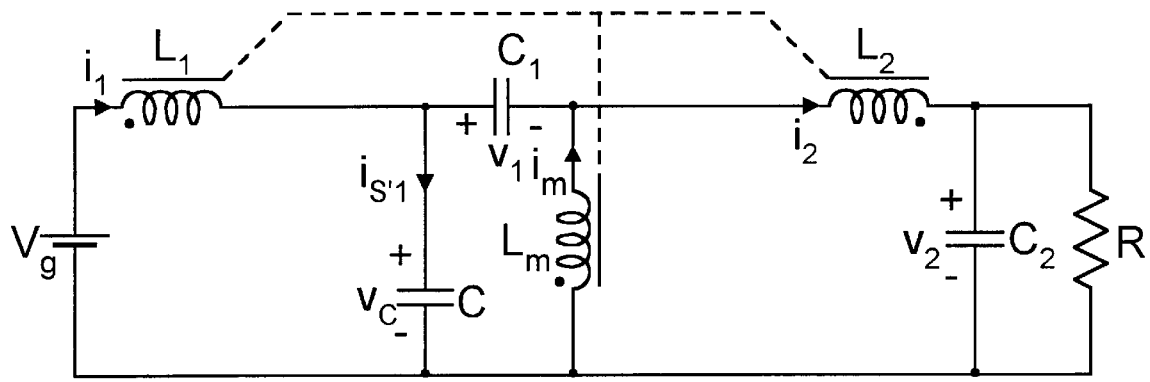

The proper mutual coupling of three inductor windings in FIG. 11a and FIG. 11b is an integral part of the converter and largely responsible for one of its unique performance. However, for the purpose of calculating steady-state (DC) quantities by use of the state-space averaging method, the actual mutual coupling between the windings is not needed. The analysis starts with writing the complete state-space equations for the two switched networks obtained: one for the State-1 interval as shown in FIG. 20a and another one for the State-2 time interval as shown in FIG. 20b. Once again, the magnetic coupling shown in those figures is considered not present for purposes of steady-state calculations. In both switched networks of FIG. 20a and FIG. 20b, the assumed directions of the inductor currents and polarity of the DC voltages on capacitors are as marked. If the actual calculations result in, for example, DC voltages with a negative sign, then the above assumed polarity is not correct and the opposite voltage polarity is the actual capacitor voltage polarity. The state-space equations are then averaged with respective duty ratios D and D' as the weighting factors and the steady-state criterion imposed. The resulting five equations with five unknowns, DC voltages $V_1$, $V_2$, and $V_C$ and DC currents $I_1$ and $I_m$ are then solved in terms of the known quantities, duty ratio D, input voltage $V_g$, and the load current $I_2$ to result in the following steady-state solution:

$$V_1 = V_g \quad V_C = V_g/(1-D) \quad V_2 = DV_g \tag{5}$$

$$I_1 = DI_2 \quad I_m = (1-D)I_2 \tag{6}$$

Figure 21:
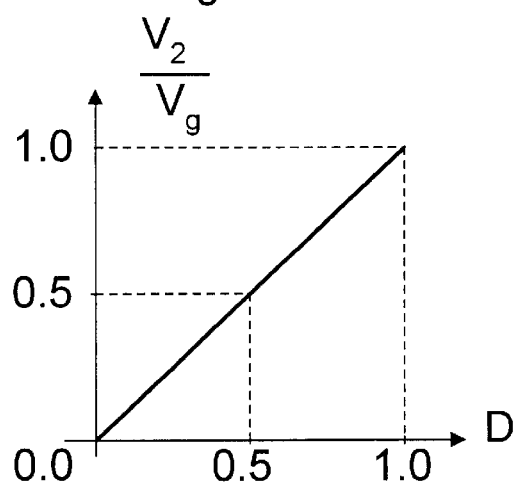

The steady-state solution given by equations (5) and (6) also confirms that this converter does have a finite steady-state, as it was also confirmed by building experimental prototypes and verifying the above steady-state conditions both qualitatively and quantitatively. Note also that since all solutions in (5) and (6) came out with the positive sign, the actual directions of the inductor currents and polarity of the capacitor voltages are as assumed in FIG. 20a and FIG. 20b. The same holds true for the capacitor voltages so that the actual polarity of the capacitor DC voltages is as originally assumed, so that the positive DC voltage source between input terminal and common input terminal results in the positive DC output voltage between the output terminal and common output terminal, where input and output common terminals in this case of the non-isolated converter are connected together to a common point, usually designated as ground. Thus, the converter of FIG. 11b is polarity non-inverting and has the same DC conversion ratio as the conventional buck converter of the prior art, that is $V_2/V_g = D$. This DC conversion ratio is a linear function of duty ratio D as shown in FIG. 21. In many practical applications the galvanic isolation between DC input voltage source and output DC load is not required and a simpler non-isolated configuration is often preferred. However, in the majority of applications where a non-isolated converter is adequate, positive input to positive output voltage conversion is required, so that the polarity non-inverting feature of the present invention is a distinct advantage.

It appears that the present invention has the same limitation as the buck converter, which is that the converter is only capable of the step-down conversion and could not provide a voltage higher than the input DC voltage. This is, however, not the case, and the constraint is removed by the introduction of the isolated extension of the present invention as shown in FIG. 13a, FIG. 16a and FIG. 17a.

Figure 22A:
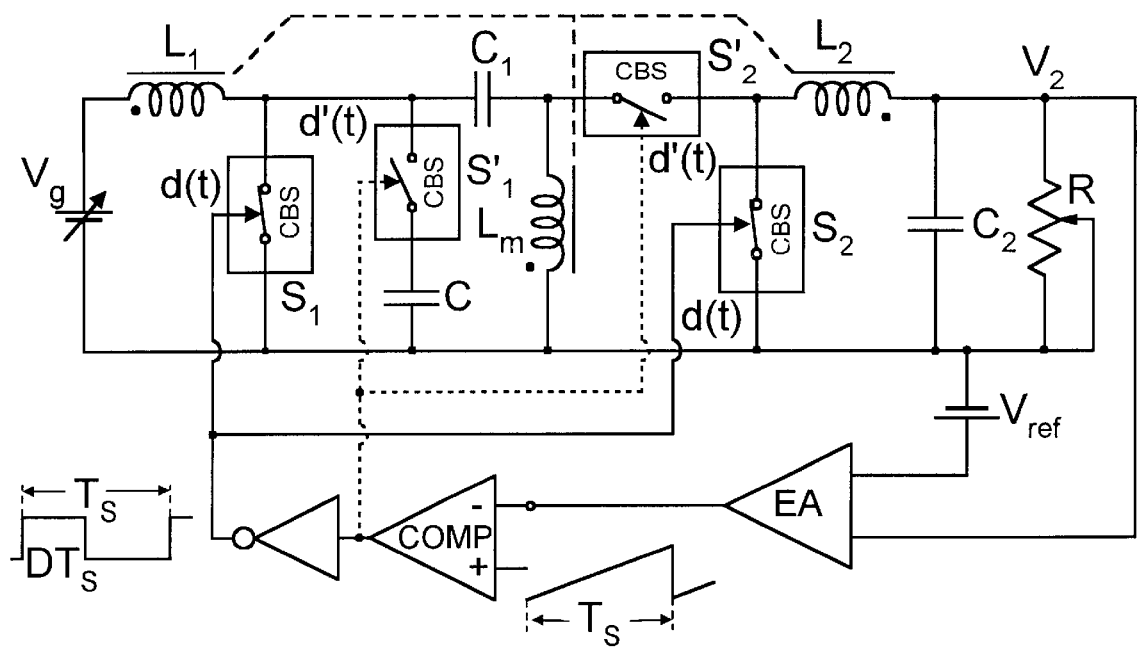
Figure 22B:
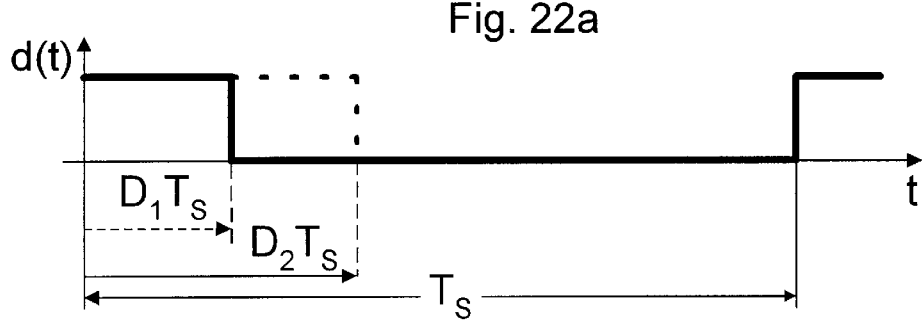

In most practical applications, the output voltage is required to be regulated and kept constant despite a large variation of the input DC source voltage and a large variation of the output DC load current. Both of these variations can be absorbed and the output voltage regulated by closing the conventional feedback control loop around DC-to-DC converter to obtain a regulated DC supply as in FIG. 22a. The feedback control loop modulates the duty ratio D shown in FIG. 22b as needed to provide the regulated output voltage. Thus, it is important that the switching converter operation and its key features are effective over the wide range of operating duty ratio D such as, for example, from D=0.33 to D=0.66 for a 2:1 input DC voltage range or from D=0.2 to D=0.8 for a 4:1 input voltage range. The three fundamental properties of the present invention described below are indeed preserved over the wide range of the operating duty ratio.

Three Fundamental Properties

Relationship Among DC Currents of the Three Inductors

From the two DC current equations in (6) one can derive easily a very simple and most remarkable relationship among the three DC inductor currents, which is at the root of the unique performance of this converter. Namely by adding DC currents of the input inductor $I_1$ and the middle inductor $I_m$ from (6) we obtain this key relationship among input inductor, middle inductor and output inductor DC currents:

$$I_1 + I_m = I_2 \tag{7}$$

A quite unexpected result in obtained: the fundamental relationship (7) is independent of the operating duty ratio D, even though both the input inductor DC current $I_1$ and middle inductor DC current $I_m$ are each strongly dependent on operating duty ratio D as per (6). Note also the essential role played by the middle inductor, which provides just the needed DC current $I_m$ so that relationship (7) would hold true for any duty ratio D. Without the recognition of this relationship neither a very compact and highly efficient magnetics could be realized nor the lossless switching method could be made without it.

Figure 23:
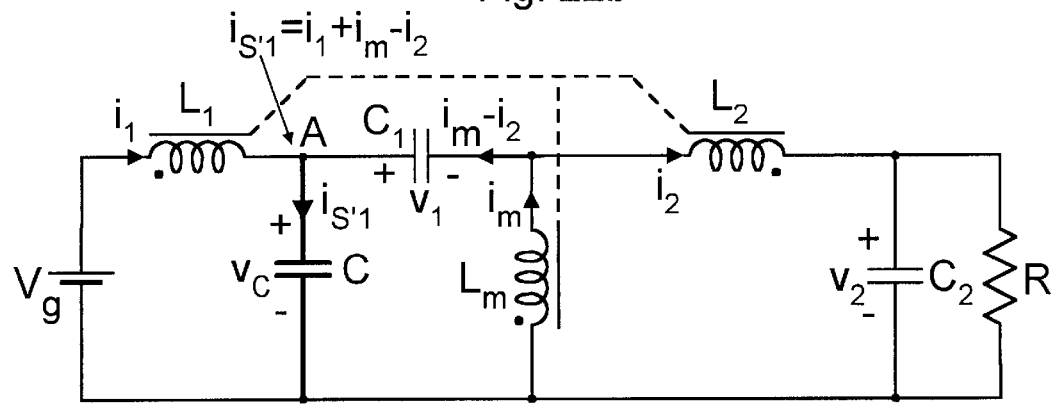
FIG. 23 illustrates the switched network for State-2 interval used to establish the fundamental relation among the currents of the three inductors of the present invention.

This very unique and crucial relationship can also be verified in an alternative and simple way by just inspection of the switched-network during State-2 interval displayed in FIG. 23. The summation of the instantaneous currents (both DC currents and superimposed AC ripple currents) at the node A in FIG. 23 leads to the complementary input switch current $i_{S'T}(t)$ expressed in terms of the three inductor currents $i_1$, $i_m$ and $i_2$ as:

$$i_{S'T}(t) = i_1(t) + i_m(t) - i_2(t) \tag{8}$$

This equation can be further separated into two relationships, one relating the DC components of the inductor currents (which are denoted here and elsewhere in the text with capital letters) and the AC ripple components (which are denoted here and elsewhere in the text with Δ sign). Thus we have:

$$I_{S'T} = I_1 + I_m - I_2 \tag{9}$$

$$\Delta i_{S'T}(t) = \Delta i_1(t) - \Delta i_2(t) \tag{10}$$

Note, however, that the DC component $I_{S'1}$ of the current in complementary input switch $S'_1$ must be zero $$I_C = 0 \tag{11}$$

in order to balance the charge of the auxiliary capacitor C during the State-2 time interval. Thus, the complementary input switch during State-2 must have a net zero DC current $I_{S'1} = 0$. Otherwise, a positive DC current $I_C$, for example, would every cycle charge this capacitor and thereby would keep increasing its DC voltage $V_C$ up to infinity. Yet, the state-space averaging confirms that this capacitor will have a finite DC voltage given by $V_C = V_g/(1-D)$ as in (5). Thus, with (11), equation (9) reduces to the same result as equation (7).

Relationship Among the AC Voltages of the Three Inductors

Figure 24A:
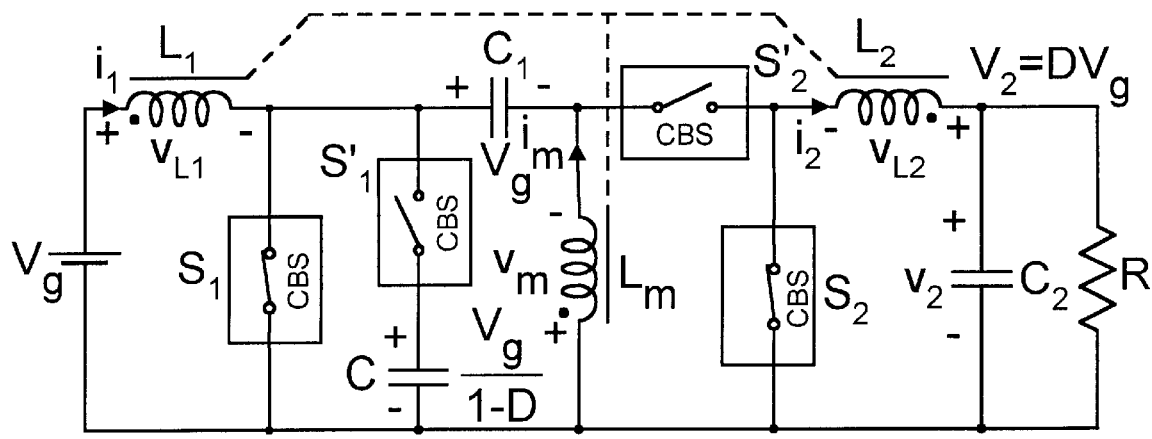
FIG. 24a illustrates the converter of FIG. 11a with directions of the inductor currents and positive polarities of the inductor voltages during State-1 interval and FIG. 24b shows the AC voltages present on the three inductors of FIG. 24a during a complete cycle of $T_S$.
Figure 24B:
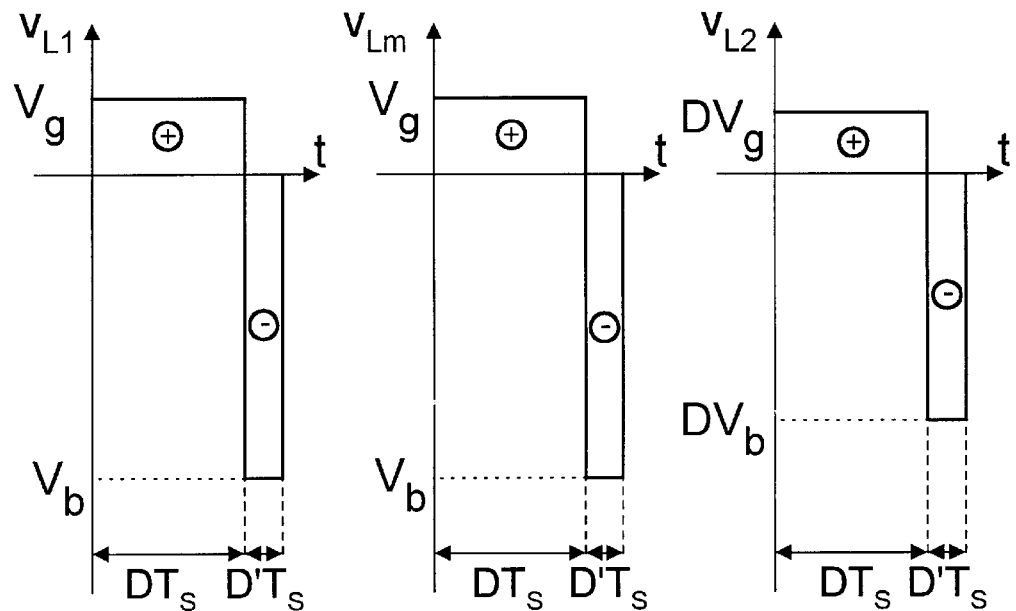

The actual direction of all DC inductor currents is already established by equations (6) and is as in FIG. 24a. Of critical importance for fully understanding the unique performance features of this converter is to also establish the actual polarity of the AC voltages on three inductors. Then the correlation of these actual AC voltages of three inductor windings with the actual directions of their respective DC currents will lead to some really very surprising results. To facilitate the polarity determination of AC voltages on inductors, the DC voltages of all three capacitors are explicitly shown in terms of $V_g$ and duty ratio D in FIG. 24a. The AC voltages on the inductors are designated as $v_{L1}$, $v_{L2}$, and $v_m$ and their positive polarity marked with positive (+) sign as shown in FIG. 24a, which also coincides with dot-marked end designations. The actual time domain voltage waveforms on these inductors can be deduced to be as in FIG. 24b, by simply looking at inductor voltage levels during the time interval when input switch $S_1$ and output switch $S_2$ are closed, and when they are open in the schematic of FIG. 24a. Thus one can easily establish that all three inductor AC voltages are in-phase relative to the positive polarity designations marked in FIG. 24a (and the corresponding dot-marked designations). Furthermore, one can ascertain the following important relationship among their magnitudes:

$$v_{L1} = v_m \tag{12}$$

$$v_{L2} = Dv_m \tag{13}$$

The first relationship (12) is also easily seen from the loop consisting of $V_g$, $L_1$, $C_1$, and $L_m$, in which input capacitor $C_1$ and DC voltage source $V_g$ are short for alternating current (AC), which AC-wise puts input inductor $L_1$ in parallel with middle inductor $L_m$ hence they share the identical AC voltage. Furthermore, it is important to observe that this relationship holds true for any operating duty ratio D, since (12) is independent of duty ratio D.

The relationship (13) can likewise easily be deduced from the voltage waveforms during State-1 interval when input switch $S_1$ and output switch $S_2$ are closed. For $S_1$ closed, $v_{L1} = V_g$; for $S_2$ closed $v_{L2} = DV_g = Dv_{L1}$, hence $v_{L2} = Dv_{L1} = Dv_m$ for State-1 interval. Since both voltages $v_{L1}$ and $v_{L2}$ must be volt-second balanced, their magnitudes in State-2 interval are respectively $V_b$ and $DV_b$, where $V_b$ is given by:

$$V_b = V_g D/(1-D) \tag{14}$$

Relationship Between DC Current and AC Voltages of the Three Inductors

The previous two sections have dealt with two fundamental relationships among the three inductors:

1. Relationship among the magnitudes of the DC currents of the three inductors;
2. Relationship among the magnitudes of the AC voltages of three inductors as well as their phase relationships (whether they are in phase or out of phase relative to dot-marked ends).

At first, this subtitle may appear ill-defined: what kind of relationship could exist among dislike physical quantities, DC currents and AC voltages, which are heretofore used in separate DC and AC analysis in circuit theory?

As shown before in equations (5) and (6), the new switching converter imposes not only the magnitude of DC currents in each inductor winding of the converter, but also the actual direction of the DC currents in the inductor windings (the positive directions of DC currents are shown by the arrow in the converter of FIG. 24a). In addition, the switching converter also imposes both the magnitude of the DC voltages on all capacitors as in (5), and AC voltages on inductors including the specific polarity of the AC voltages as established by the waveforms in FIG. 24b.

Let us now separate the consideration of the DC currents in the windings from the AC voltages of the same windings placed on a common single-loop magnetic core. For simplicity of the discussion, we will at first limit the considerations to just the input inductor and output inductor in FIG. 24a and assume that they carry DC currents only. The presence of the AC voltage will then be taken into account afterwards.

Figure 25A:
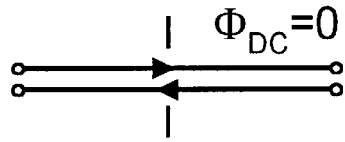

What links the DC currents and their direction in the winding to the DC flux orientation around a straight current carrying conductor goes back to the basic electromagnetic laws and Oersted's discovery in 1820 establishing a direct connection between the constant electric current and magnetism. The orientation of the DC flux established around the conductor is uniquely dependent on the direction of the DC current in the wire. If another straight conductor is placed right adjacent to the first conductor, but carrying the current in opposite direction such as shown in FIG. 25a, the two opposing DC currents produce DC fluxes which cancel each other and result in zero DC flux around the conductors.

Figure 25B:
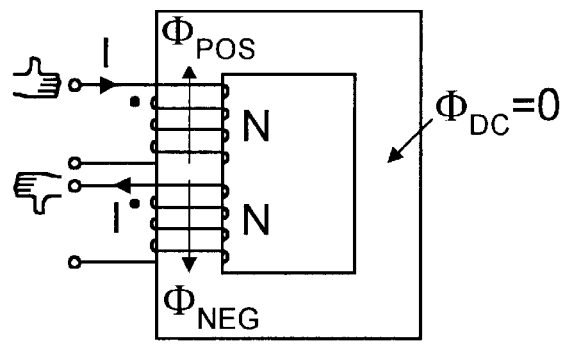

The same holds true, if the two conductors are arranged as in FIG. 25b as two windings on a common core made out of ferromagnetic material. Due to much higher permeability of the magnetic material than the air, almost all DC flux generated by the DC current in each winding is contained in the magnetic core, and thus the leakage flux in the air can be neglected in the first approximation. If each winding in FIG. 25b has the same number of turns N and carries the same DC current (I) but, as a direct analogy to FIG. 25a, the DC currents flow in opposing directions, the total DC flux in the magnetic core is zero. However, how do we know, what is opposing current direction? Here we can invoke the classical right hand rule. By placing the fingers of the right hand around the winding in the direction of the current flow through the winding turns, the thumb will point the actual direction of the DC flux. Let us now chose the flux direction of the top winding of FIG. 25b to be positive and let us also designate with dot-mark the end of this winding into which the current flows. If a current in another winding placed on the same core generates the DC flux in the same direction, then the end of second winding into which the DC current is flowing will also be designated as dot-marked end. Thus, after determining the dot-marked ends of the windings, we can establish the following simple rule:

The DC current flowing into dot-marked end generates positive DC flux, while the DC current flowing out of the dot-marked end generates negative DC flux.

This rule only correlates the direction of the DC currents and the generated DC fluxes, but not their magnitudes. However, the Ampere's Circuital Law gives also quantitative relationship as well as directional relationship. From Ampere's law the DC flux is directly proportional to DC-ampere-turns NI, i.e., the product of number of turns N and DC current I. Thus, equal number of turns N of the two windings of FIG. 25b will result in equal magnitude but opposing direction of generated DC fluxes and in zero DC flux in the core of FIG. 25b.

Figure 25C:
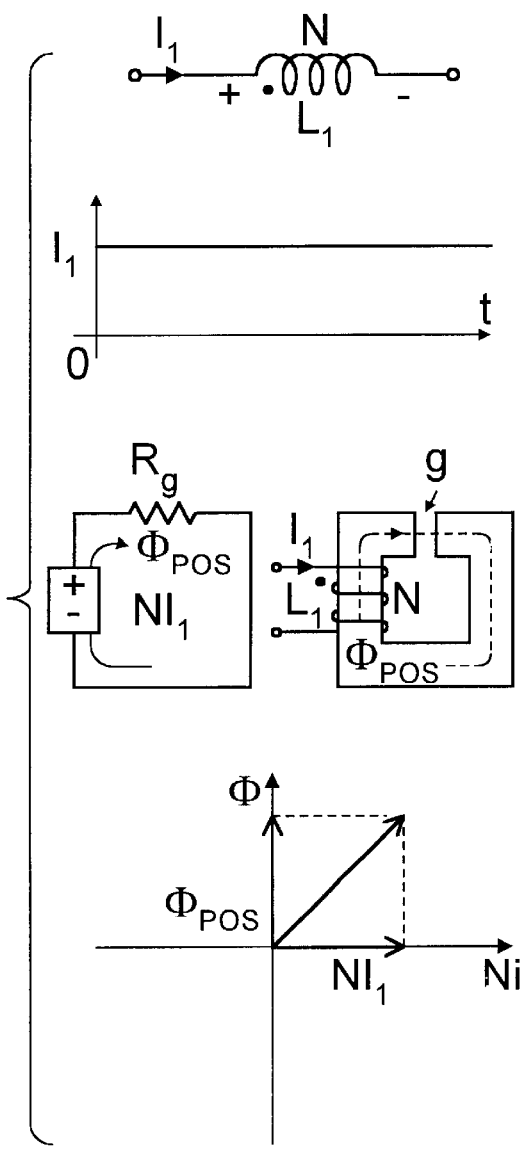
FIG. 25c illustrates how a DC current flowing into a dot-marked end generates positive DC-ampere-turns and positive DC-ampere-turns and positive DC flux.
Figure 25D:
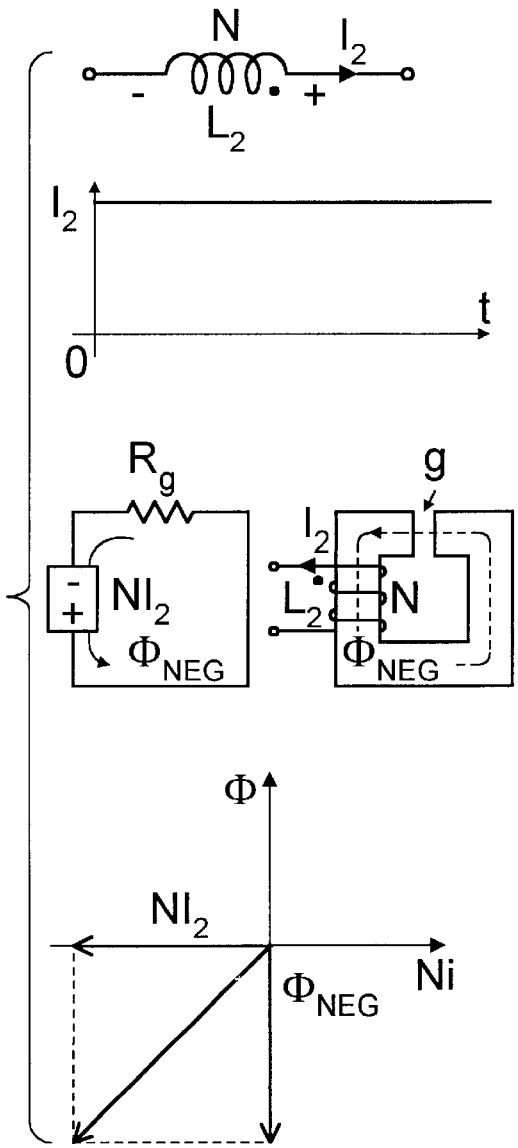
FIG. 25d illustrates how a DC current flowing out of dot-marked end generates negative DC-ampere-turns and negative DC flux.

We can now apply these criteria to the input and output inductor windings of the converter of FIG. 24a, which are shown in FIG. 25c, and FIG. 25d respectively. The input inductor DC current flows into dot-marked end and generates positive DC ampere-turns $N_1 I_1$ and results in positive DC flux in the core as seen in FIG. 25c. The output inductor DC current flows out of dot-marked end and thus generates negative DC-ampere-turns $(-N_2 I_2)$ and results in negative DC flux in the core. The same can be observed from reluctance models of FIG. 25c and FIG. 25d. If the two windings of the two inductors are placed on the common core analogous to FIG. 25b, the total DC-ampere-turns are given by $$\Sigma NI = NI_1 - NI_2 = -N(1-D)I_2 \quad (15)$$

where (6) was used to eliminate $I_1$ dependence. Clearly from (15) the total DC-ampere-turns are reduced, but still not eliminated. In addition they depend on duty ratio D.

Note that the above analysis was entirely based on DC currents alone and did not yet invoke AC voltages on the inductor windings. However, in order to get the DC-ampere-turns subtraction as described above, the input and output inductors have to be placed on a common core. Once the two windings are on a common core, since they have AC voltages imposed on them by the converter switching operation, the AC voltages must in addition obey the Faraday's Law of Electromagnetic Induction, imposing an additional requirement of identical AC voltages per turn of each winding. Since to meet the DC flux criteria, equal number of turns is already selected for two windings, which would require that the AC voltages of two windings match each other in magnitude as well as in polarity relative to the dot-marked ends (hence, are in phase). However, this was already established by three inductor waveforms in FIG. 24b except for a slight mismatch of the output inductor and input inductor AC voltage magnitudes, which will be discussed later.

Figure 26A:
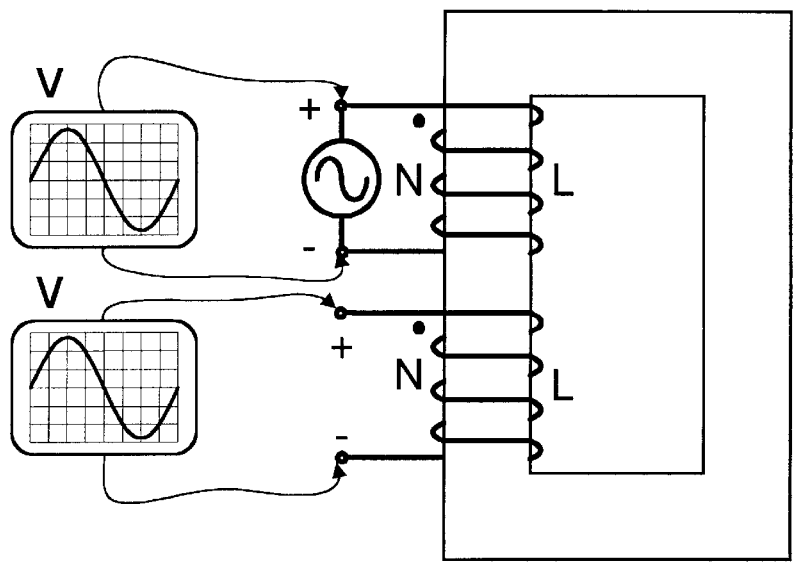
FIG. 26a illustrates the electrical test determining dot-marked ends at which AC voltages are in phase and FIG. 26b illustrates dot-marked end determination for the DC Transformer windings of the present invention of FIG. 27.
Figure 26B:
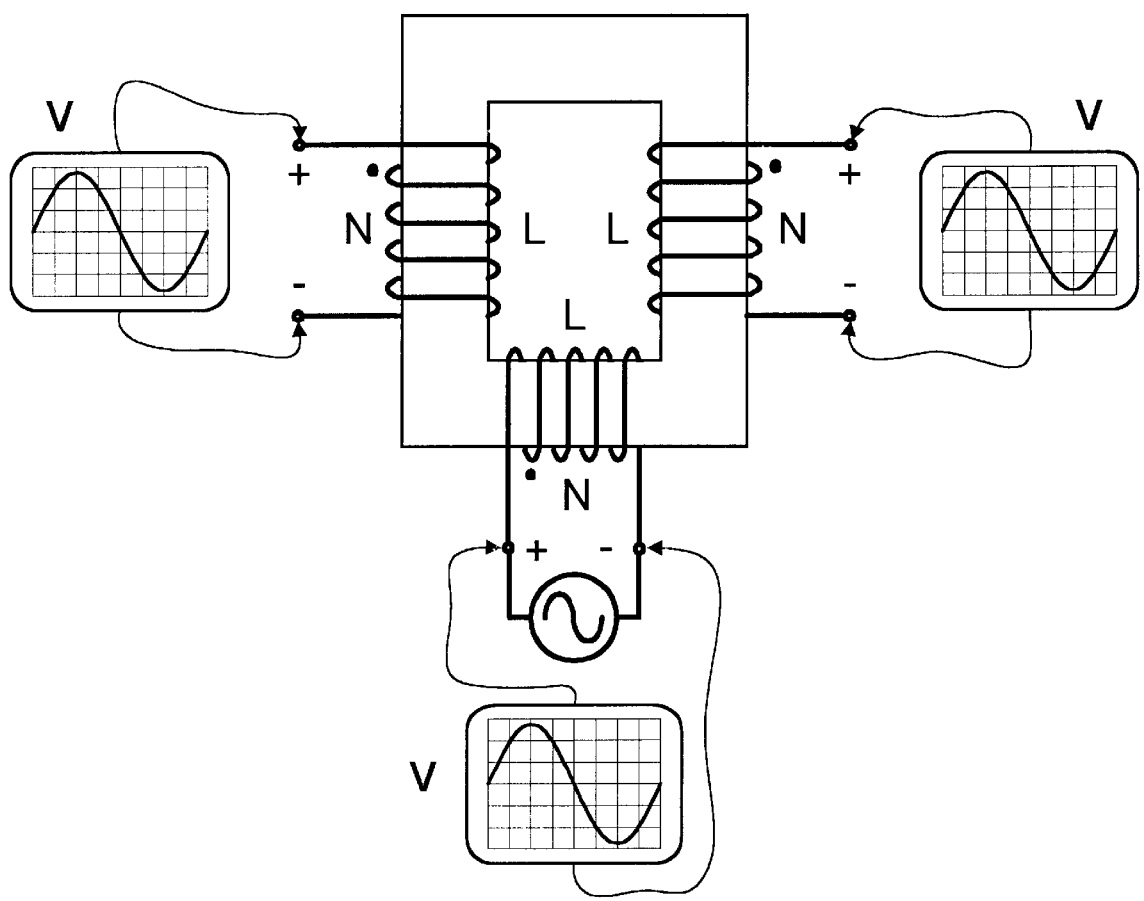

The previous right hand rule already determined the dot-marked ends of the windings. We can now confirm those markings by an alternative approach based on simple AC electrical test as per FIG. 26a. One winding in FIG. 26a is excited with an alternating voltage waveform, such as siusoidal voltage. The induced AC voltage in another winding is then measured. The winding ends at which applied and induced voltages are in phase define the dot-marked ends as in FIG. 26a. This test method can be extended to determine dot-marked ends for any number of windings on a common core. The case for three windings is shown in FIG. 26b.

Note, however, that there is still middle inductor winding with its DC current $I_m$ as in FIG. 24a. From (12), the middle inductor has the AC voltage waveform identical to the input inductor and hence can be placed on the common core. In that case, all three windings of the converter of FIG. 24a with the same number of turns N for each winding can be placed on the common core to result in the DC Transformer of FIG. 26b. The middle inductor DC current is, however, also flowing into dot-marked end, and from above rule contributes positive DC ampere-turns and from (6) they are equal $$NI_m = N(1-D)I_2 \quad (16)$$

From (15) and (16) the total DC ampere-turns are given by $$\Sigma NI = N(I_1 + I_m - I_2) = 0 \quad (17)$$

to result in total DC ampere-turns equal to zero and thus in the total DC flux zero in the common magnetic core. Note how the middle inductor DC current supplies just the right DC current to insure that total DC-ampere-turns and total DC flux are zero for any operating duty ratio.

DC Transformer

Referring back to FIG. 24b, the AC voltages of the input inductor $L_1$ and the middle inductor $L_m$ are identical (perfectly matching), while the AC voltage of the output inductor $L_2$ at duty ratio D=0.9 is 90% matching in magnitude, thus slightly mismatched from the other two. As shown earlier all three inductor voltages are in-phase at dot-marked ends designation in FIG. 24a, and all three windings have the same number of turns N. Since all three voltages nearly match in magnitude, thus nearly matching volts/turns, we can couple them into a single magnetic circuit structure without any air-gap as indicated in FIG. 26b, which forms an entirely new magnetic component, named here DC-to-DC Transformer or simply DC Transformer because of its unique operation.

First Step—Determination of Dot-Marked Ends

From the above discussions, the absolute polarity of the AC voltages of the three inductors is critical. The first step is, therefore, to determine the absolute polarity of these voltages by applying, the test AC voltage to the middle inductor and then measuring the AC voltages on all three windings as shown in test set-up of FIG. 26b. The inductor winding ends at which said AC voltages are in phase are designated as dot-marked ends and are so marked with round dot symbols, and will be considered as winding ends at which referenced AC voltage are positive. The DC current flowing into dot-marked ends will be also considered of positive direction. The other end of each winding will from hereon be referred to as unmarked end of the respective winding and will be considered as the winding end at which a referenced AC voltage is negative. Note that for simplicity of testing, the number of turns of the input, output and middle inductor windings are chosen to be equal resulting in equal induced voltages in FIG. 26b. The importance of the particular choice of identical number of turns for the operation of the converter is established below.

Second Step—Connection to Input and Output Terminals

The next step is to properly connect the DC Transformer windings to the input DC source, output DC load and common terminal. There are eight possible different winding connections, out of which only two are correct. Thus, in order to make sure that the winding ends are connected properly, the following simple procedure should be followed: connect the dot-marked end of the input inductor to the positive terminal of input DC voltage source, the dot-marked end of the output inductor to the positive terminal of the output DC load, and finally, the dot-marked end of the middle inductor to the common terminal of the DC input source and common terminal of the output DC load. The proper connection of the DC Transformer to the input source and output load terminals will ensure that the DC-ampere-turns of the input inductor and middle inductor are positive, since their respective DC currents flow into the dot-marked ends of their respective windings, and thus result in positive DC fluxes in the magnetic core. On the other hand, the output inductor DC current flows out of the dot-marked end, and thus will contribute negative DC ampere-turns and result in negative DC flux in the core. Therefore, the potential for the reduction of the DC flux in the magnetic core is established.

Third Step—Choose Equal Number of Turns

Figure 27:
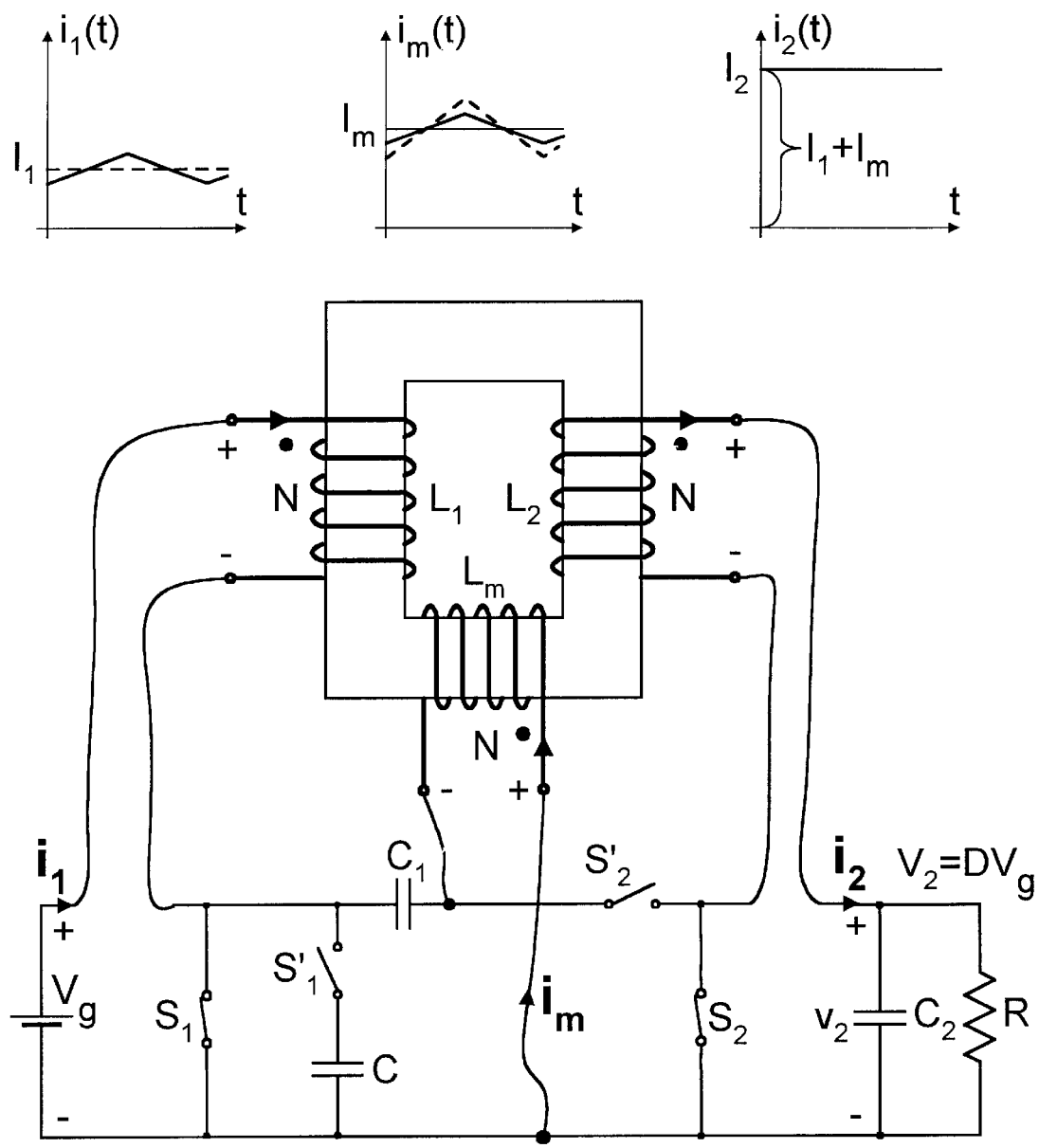
FIG. 27 illustrates first embodiment of the present invention.

The first two steps have only established the necessary pre-requisites, but are in themselves not sufficient to guarantee the successful implementation and operation of the DC Transformer. The third requirement is:

The input inductor, the middle inductor and output inductor must have identical number of turns N as shown in FIG. 27, hence $$N_1 = N_2 = N_m = N \quad (18)$$

Together with the fundamental relationship given by (7), (18) results in $$\Sigma NI = N_1 I_1 + N_m I_m - N_2 I_2 = N(I_1 + I_m - I_2) = 0 \quad (19)$$

From (19), the net DC ampere-turns in the single-loop magnetic circuit of the present invention in FIG. 27 is zero, resulting in zero DC flux in the magnetic core and therefore in potentially full utilization of the magnetic material since the air-gap in the flux path is completely eliminated. Note that this complete cancellation of the DC ampere-turns is valid for any operating duty ratio D, since the relationship (19) is independent of the duty ratio D. In fact, the DC flux cancellation is also valid for any number of turns N, as long as all three windings have the same number of turns.

Note that the equal number of turns condition (18) simultaneously satisfied two necessary requirements:

1. The net DC-ampere-turns in the magnetic core without air-gap must be zero;
2. The applied AC voltages on the three windings of the DC Transformer, imposed by converter, should stand in the same ratio as their respective number of turns.

The second condition is clearly readily satisfied between the input inductor and middle inductor which stand in 1:1 voltage ratio (see FIG. 24b) just as their windings turns ratio requires. The output inductor AC voltage is somewhat mismatched, since for duty ratio D=0.9, for example, the output inductor winding should have 0.9 N turns for perfect match. However, the mismatch in the AC voltages by using also N turns for the output inductor winding could be somewhat compensated by the proper placement of that inductor in the single-loop magnetic core structure of the DC Transformer as explained below.

Fourth Step—Optimum Placement of DC Transformer Windings

Figure 29A:
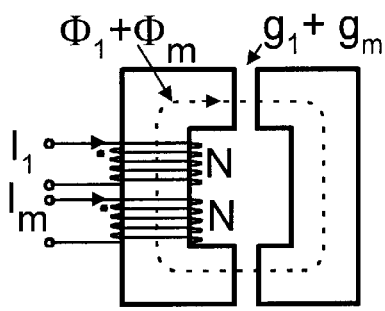
FIG. 29a illustrates an input inductor and a middle inductor for the converter of FIG. 11a combined into one magnetic element which must have an air-gap.
Figure 29B:
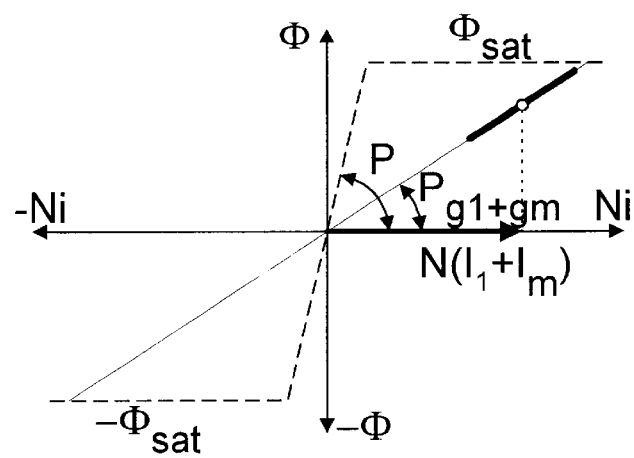
Figure 29C:
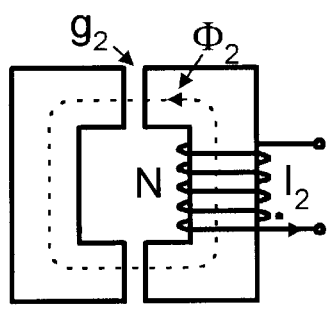
FIG. 29c illustrates that a separate output inductor for the converter of FIG. 11a must have an air-gap and FIG. 29d is a graph showing that the direction of the load current $I_2$ is such that the negative ampere-turns lead to the operation on the negative part of the magnetic material saturation characteristic.
Figure 29D:
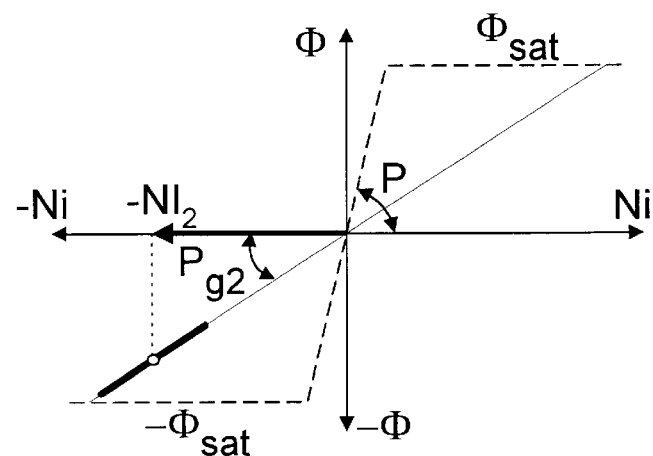
Figure 29E:
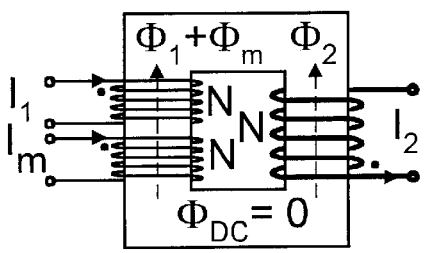
FIG. 29e illustrates another embodiment of the present invention using single-loop magnetic core DC Transformer implementation without any air-gap and FIG. 29f is a graph of the flux vs. ampere-turns characteristic for the DC Transformer of FIG. 29e showing the large slope of the un-gapped material and operation is centered in the middle of the magnetic material saturation characteristic.
Figure 29F:
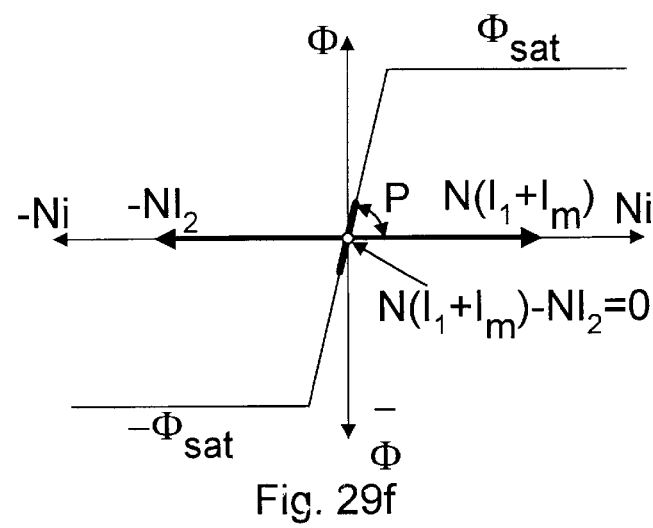

To accommodate the mismatch in their AC voltages, the output inductor and middle inductor windings are best placed on the opposite legs of a UU magnetic core as seen in FIG. 29e so as to obtain the high relative leakage inductance between those two windings and hence reduce the output inductor ripple current. This and several other methods to minimize this ripple current in the output inductor and to even achieve near zero ripple current at one operating duty ratio, are introduced in a later section. Similarly, the input inductor and middle inductor are placed side-by-side as in FIG. 29e also to increase the relative leakage between those two windings. However, since their AC voltages are already perfectly matched, the ripple current in the input inductor will be the same as in the middle inductor. By slightly increasing the number of turns of the input inductor winding the input current ripple can be steered into the middle inductor. This situation is shown as dashed lines in the current diagram of FIG. 27. The ampere-turns imbalance due to the slightly increased number of turns is very small and can readily be neglected.

Figure 28A:
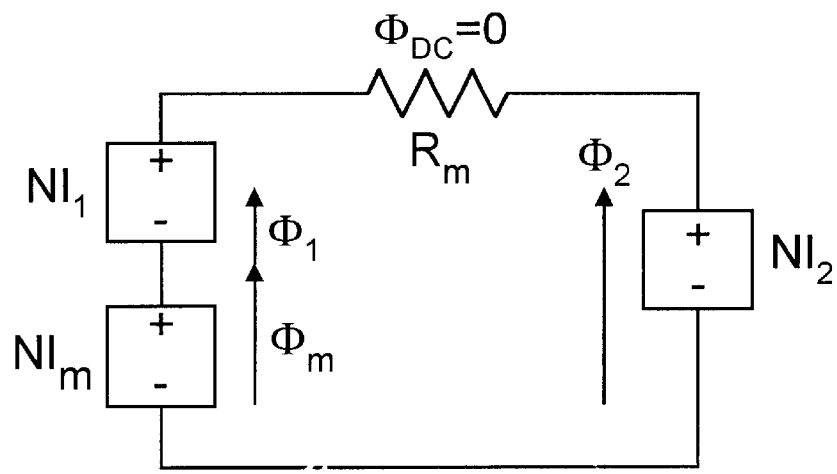
FIG. 28a is a diagram of the DC reluctance model of the DC Transformer in FIG. 27.

The DC reluctance model of the DC Transformer in FIG. 27 is shown in FIG. 28a to lead to zero net DC flux, since positive DC flux generated by input inductor and middle inductor is exactly canceled by the negative DC flux of the output inductor as predicted by (19).

The importance of the following two conditions cannot be overemphasized:

1. All windings must have the same number of turns;
2. The directions of the flow of the DC currents in the windings and the AC voltage polarity of respective windings must agree relative to dot-marked ends.

Figure 28B:
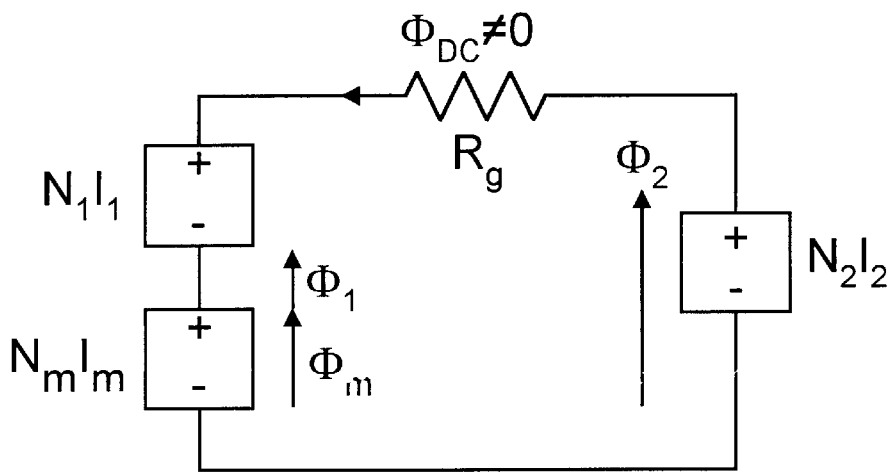
FIG. 28b is a diagram of the DC reluctance model for the case of unequal number of turns of the inductor windings and substantial DC flux in the magnetic core of FIG. 28c which has larger air-gap due to the windings number of turns mismatch.
Figure 28C:
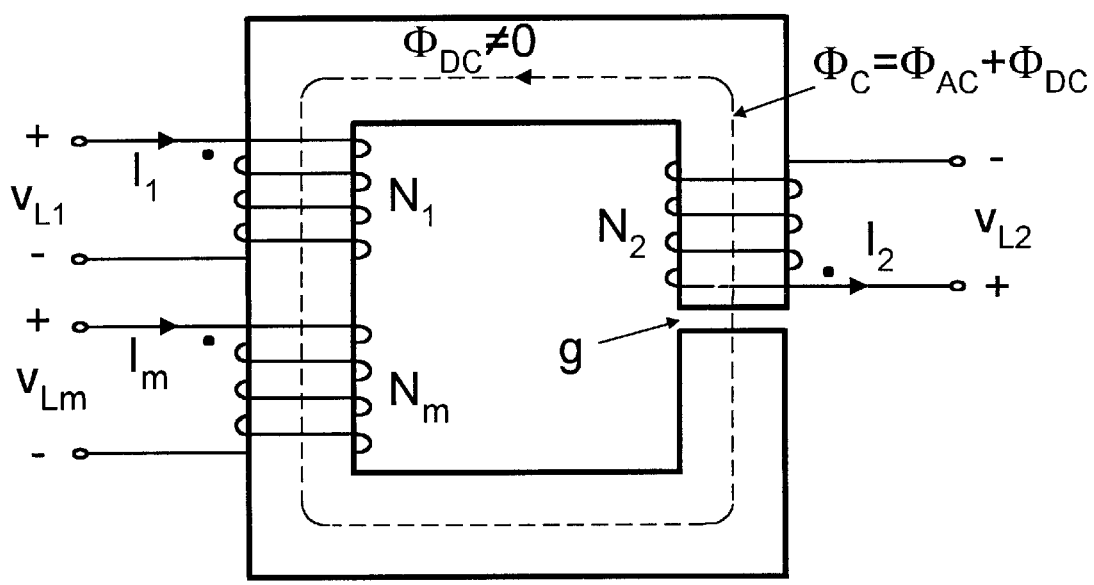

For example, if one were to use different number of turns $N_1$, $N_2$, and $N_m$ for the three inductors, despite the special relationship (7), there will be a potential great mismatch of the DC-ampere-turns as seen in model of FIG. 28b, and a large gap in the magnetic circuit implementation as in FIG. 28c must be used to prevent saturation due to large total DC-ampere-turns. Clearly, such potentially large mismatch in the turns ratio would also lead to a large mismatch of the AC voltages and hence could result in huge ripple currents on all windings making it completely impractical.

Let us now show an alternative way to assemble the DC Transformer step-by-step, as outlined in FIGS. 29a–f. First as in FIG. 29a the inductors $L_1$ and $L_m$ with identical number of turns N, are placed side-by-side into common Coupled-Inductor structure. Since the DC currents $I_1$ and $I_m$ in FIG. 27 are both flowing into the dot-marked ends of their respective windings, their DC-ampere-turns $NI_1$ and $NI_m$ are adding, resulting in the flux vs. ampere-turns characteristic of FIG. 24b, displaying the combined DC flux. Note also that due to the DC currents flowing into the dot-marked ends (positive DC-ampere-turns), the core is biased along the positive-half of the magnetic material saturation characteristic (toward positive saturation end). The corresponding individual air-gaps for each separate winding $g_1$ and $g_m$ are also added to result in a total core air-gap $g_1+g_m$ as shown in the core of FIG. 29a. The separate core for the output inductor $L_2$ is shown to have an air-gap $g_2$ in order to support the total DC-ampere-turns $NI_2$. It is important to observe that the corresponding DC flux in this case is along the negative-half of the magnetic material saturation characteristic. This is because the output inductor DC current $I_2$ is flowing out of the dot-marked end of its winding.

It is now easy to understand why the cores of FIG. 29a and FIG. 29c can be replaced with a single core of the DC Transformer of FIG. 29e without any air-gap. As seen in the combined flux vs. ampere-turn characteristic of FIG. 29f, the positive DC-ampere-turns $N(I_1+I_m)$ exactly cancel the negative DC-ampere-turns $NI_2$ to result in net zero DC flux in the core. Note also that the AC flux excursions will now be along the original steep slope of the characteristic, indicating high permeance of the magnetic core material and high inductance of windings on the magnetic core with no air-gap.

In addition, theoretically, any amount of the DC overload current could be supported without saturation, since there is an automatic compensation by the windings themselves. In this idealized picture of the single-loop magnetic circuit in which any leakage flux is neglected, the increased DC load current $I_2$ causes proportionally increased DC currents $I_1$ and $I_m$ to compensate for it and to still keep the operation at zero DC-bias and zero DC flux in the core. In reality, the ever present built-in leakage flux will limit the maximum DC overload capability in the DC Transformer in an analogous manner to that in an AC transformer.

DC Transformer Model

The magnetic structure of FIG. 27 is justifiably named a DC Transformer because:

1. The absence of the air-gap in the AC transformer indicates indicates only a small energy storage due to small magnetizing current of the ungapped AC transformer; similarly the absence of the air-gap in the DC Transformer of FIG. 27 indicates the absence of DC energy storage. This elimination of DC energy storage is the fundamental reason why the new DC Transformer results simultaneously in substantially reduced size of magnetic core, increased efficiency and increased overload capability.
2. The AC transformer does not require air-gap for its operation, since induced AC ampere-turns in the output winding oppose and almost match the AC ampere-turns of the input winding to result in small net AC ampere-turns of AC magnetizing current; the DC Transformer, likewise, results in the cancellation of DC-ampere-turns of all windings and thus operates without any air-gap.
3. This DC Transformer tolerates large DC currents in all windings without saturation, much like the AC transformer tolerates large AC currents in its windings without causing magnetic core saturation.

Figure 30:
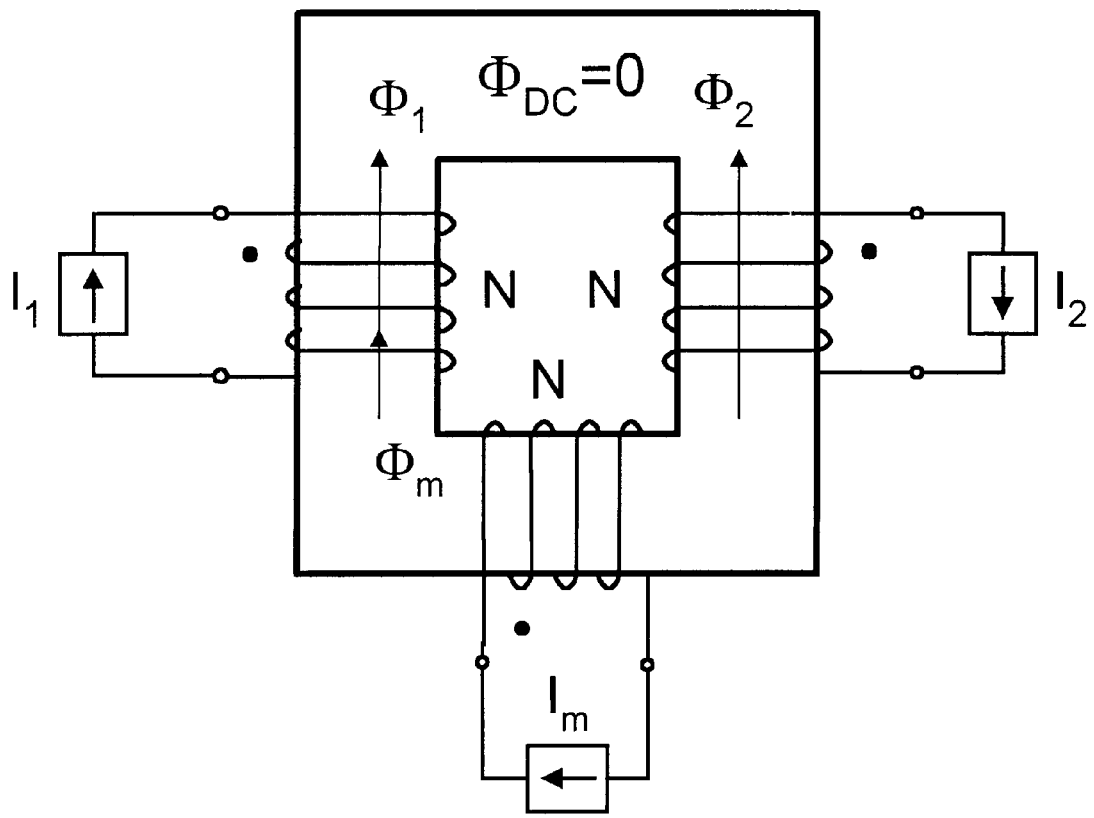
FIG. 30 illustrates a model of the DC Transformer of FIG. 27 with each inductor winding conducting respective DC-bias currents.
Figure 31:
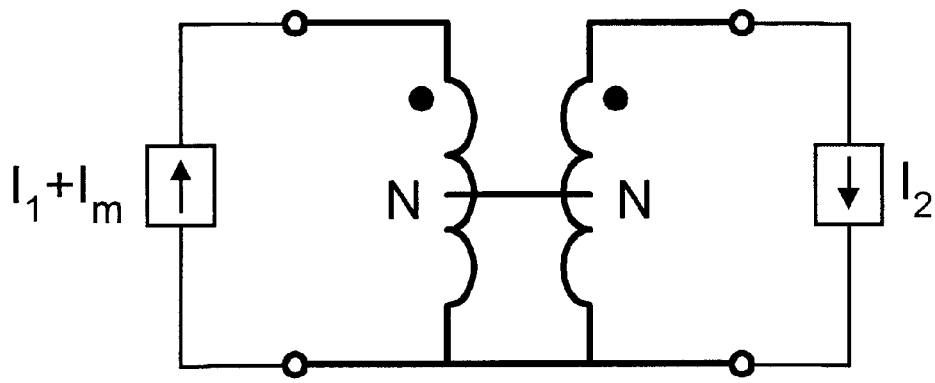
FIG. 31 shows a new symbol of the DC Transformer model of FIG. 30.

The DC Transformer is once again displayed in FIG. 30 in which each inductor winding is shown excited with the respective DC current source. Together with the designated equal number of turns N, zero DC flux in the core is obtained. This new magnetic component, the DC Transformer, needs also a new symbol which should in a simple graphic form remind of its basic properties. The symbol of FIG. 31 has an input winding absorbing a DC current of magnitude $I_1+I_m$ and an output winding delivering the DC current $I_2$. The placement of the dots at windings and the directions of these currents is such to lead to DC-ampere-turns cancellation with designated number of turns N. To signify that the DC power is transferred from input to output winding, a straight line through both windings is drawn as in FIG. 31. This also will come in handy to quickly distinguish this DC Transformer symbol from the classical AC transformer symbol. Finally, to indicate the difference with its later isolated counter-part of FIG. 43b and the lack of galvanic isolation, the common (bottom) terminals are connected together.

Alternative Configurations

Figure 32A:
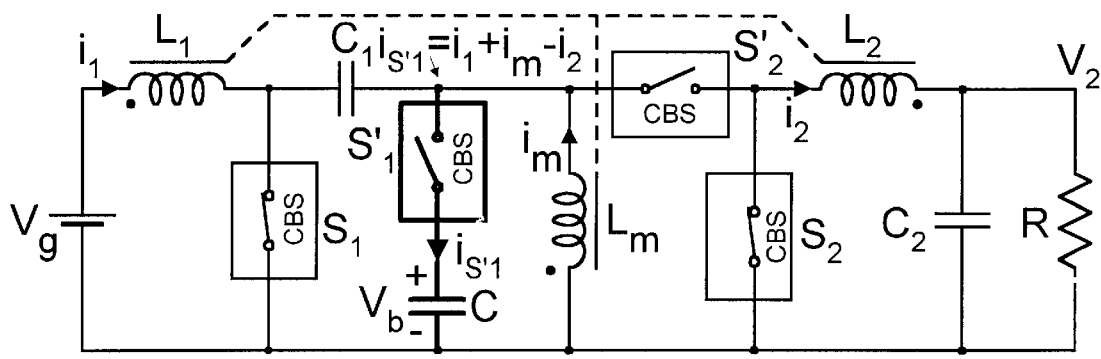
FIGS. 32(a–l) illustrate twelve equivalent transformations of the present invention shown in FIG. 27, all of which share a common property: the current in complementary input switch always equals $i_1+i_m-i_2$, where the directions of the three inductor currents are designated in FIG. 27. Note: the branch with the auxiliary capacitor and complementary input switch $S'_1$ is highlighted with heavy lines in each figure.
Figure 32B:
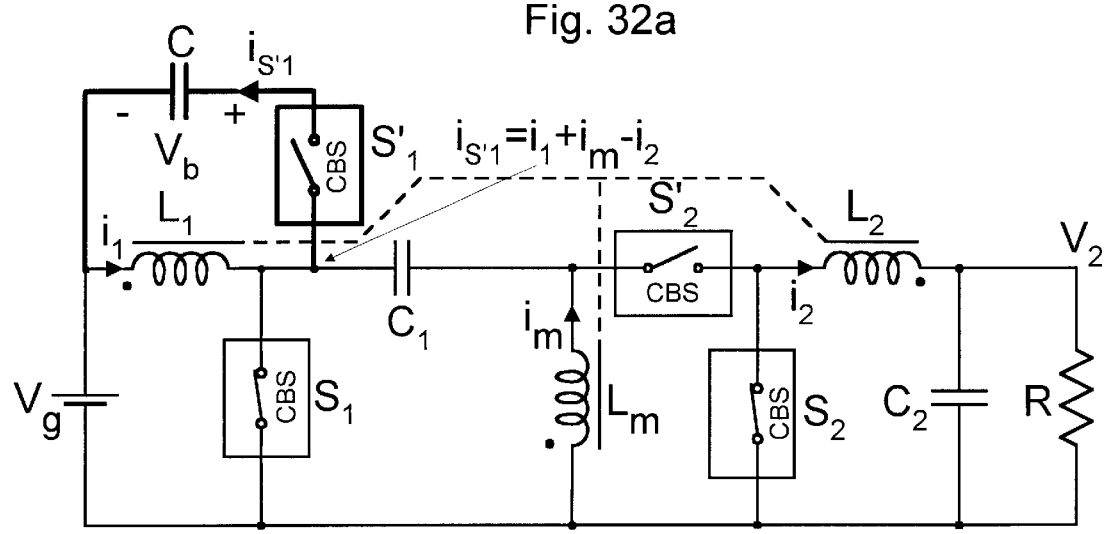
Figure 32C:
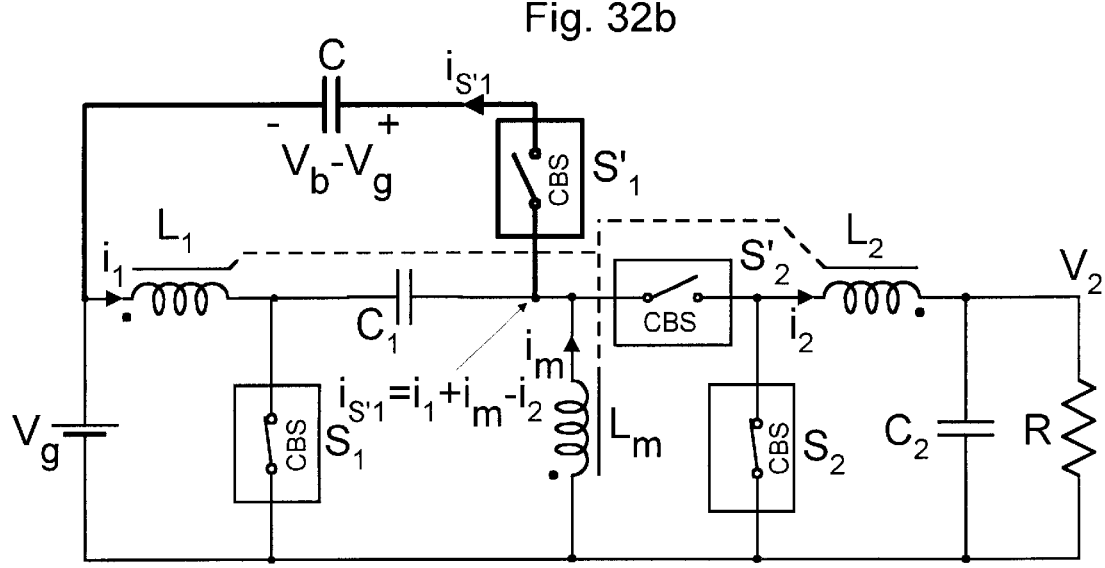
Figure 32D:
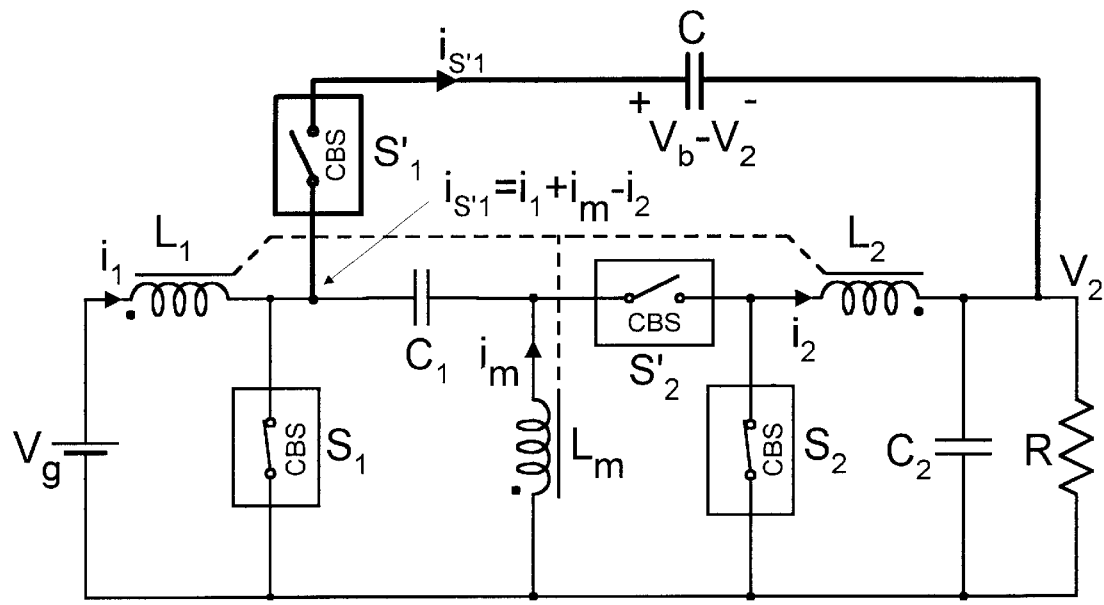
Figure 32E:
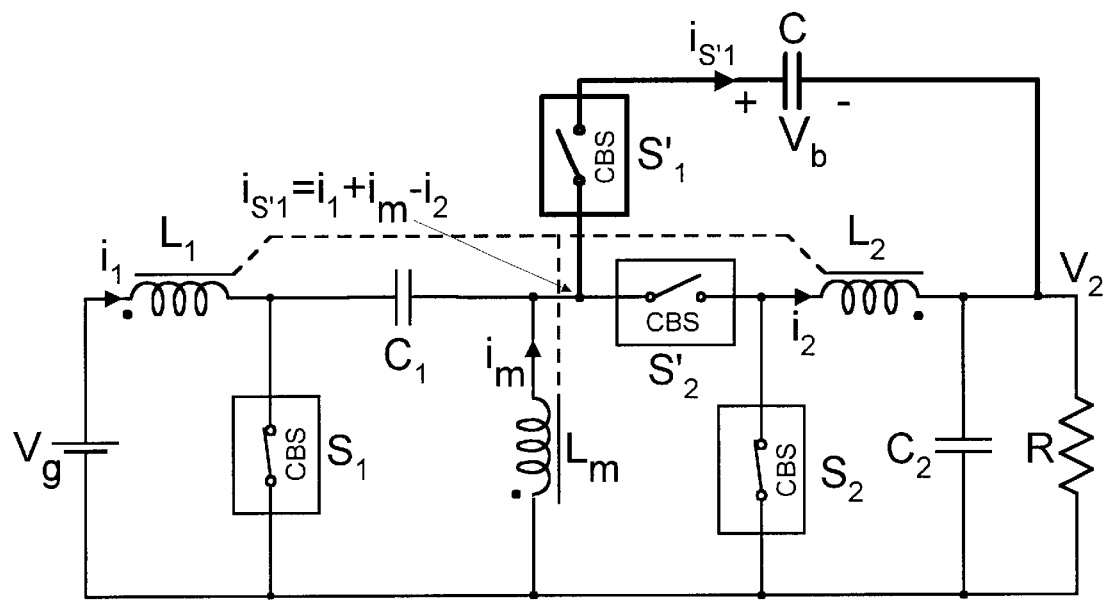

Note that the fundamental relationship (8) and its consequence (7) will all be maintained even if numerous configuration rearrangements are made to the original converter of FIGS. 11a and 11b. The branch with the series connection of the auxiliary capacitor C and complementary input switch $S'_1$, shown highlighted with heavy lines, can be connected in many different ways as illustrated in FIGS. 32a–l without altering the fundamental properties (7) and (8) and hence having same DC Transformer and converter operation as well as lossless switching performance described later in details. For example, this branch can be connected in parallel with the middle inductor $L_m$ as in FIG. 32a or in parallel with the input inductor $L_1$, as in FIG. 32b. In both cases, the DC voltage on the auxiliary capacitor C will be changed to the new steady-state value $V_b$ given by (14). Another alternative is to connect this branch between the positive terminal of the input voltage source and the unmarked end of the middle inductor $L_m$, as shown in FIG. 32c. Still two other possibilities are as in FIG. 32d and FIG. 32e.

Figure 32F:
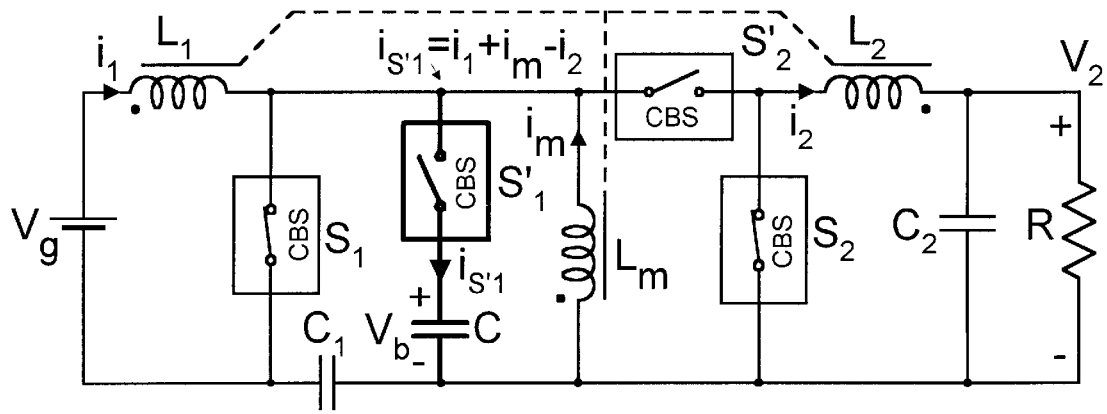

Further modifications can be obtained after moving input capacitor $C_1$ to the bottom return current path as in FIG. 32f. This would have a clear disadvantage that the common ground between input and output is lost and either the source or the load would be floating. Nevertheless, the isolated version obtained from such non-isolated converter would rectify that deficiency, as seen later in section on Isolated DC Transformer switching converter. Then the branch with auxiliary capacitor C and complementary input switch $S'_1$ can be connected in parallel with middle inductor as in FIG. 32f. The advantage of this configuration is that the auxiliary capacitor has reduced DC voltage $V_b$ given by (14), while at the same time, switches $S_1$ and $S'_1$ are in a preferable position for the so-called high-side driver implementation as described later. Other viable transformations of the basic converter configuration are shown in FIGS. 32(g–l). In all these equivalent transformations of the basic converter configuration, irrespective of different positions of the branch with complementary input switch, it always has a DC voltage which is linear combination of voltages $V_g$, $V_b$, $V_C$, and $V_2$.

Besides those variants shown in FIGS. 32(a–l), there is still a large number of ways this branch with auxiliary capacitor C and complementary input switch $S'_1$ can be placed between other nodes of the basic converter circuit and still satisfy fundamental relationship (8). There are literally hundreds of other equivalent transformations of the basic converter configuration shown in FIG. 11a and FIG. 11b, which are obtained by relocation of the other components, such as, for example, the input inductor and/or the output inductor from the top to the bottom leg (return current path) of the converter such as in FIG. 32j. Just as in the case of relocation of input capacitor to the bottom leg, the desirable feature of the common ground between the source and the load will be lost in this non-isolated converter case. Nevertheless, the isolated counterpart will rectify that and result in isolated version with two separate grounds.

Figure 32G:
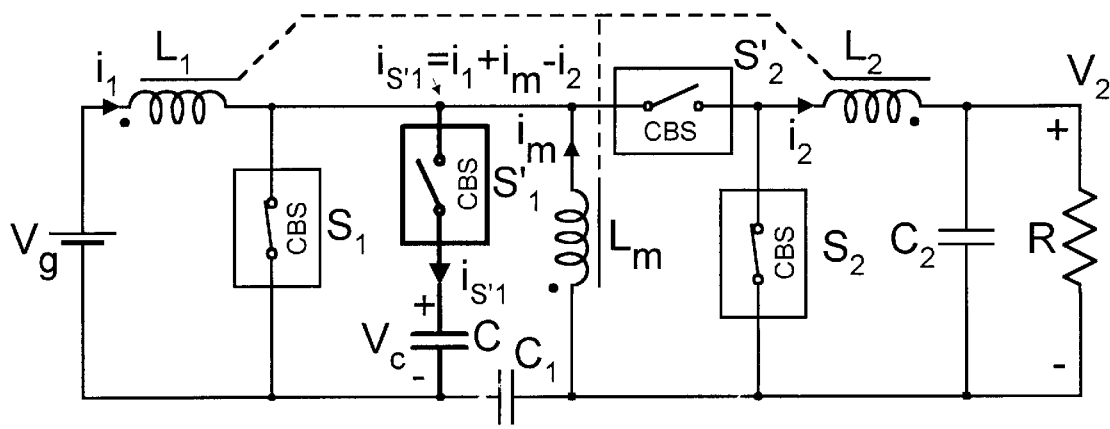
Figure 32H:
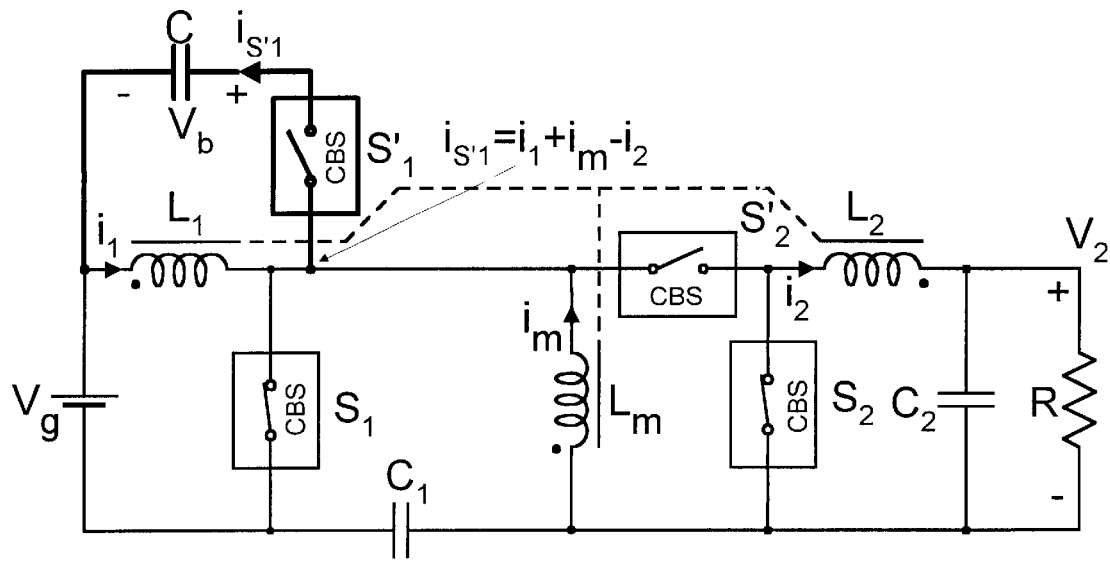
Figure 32I:
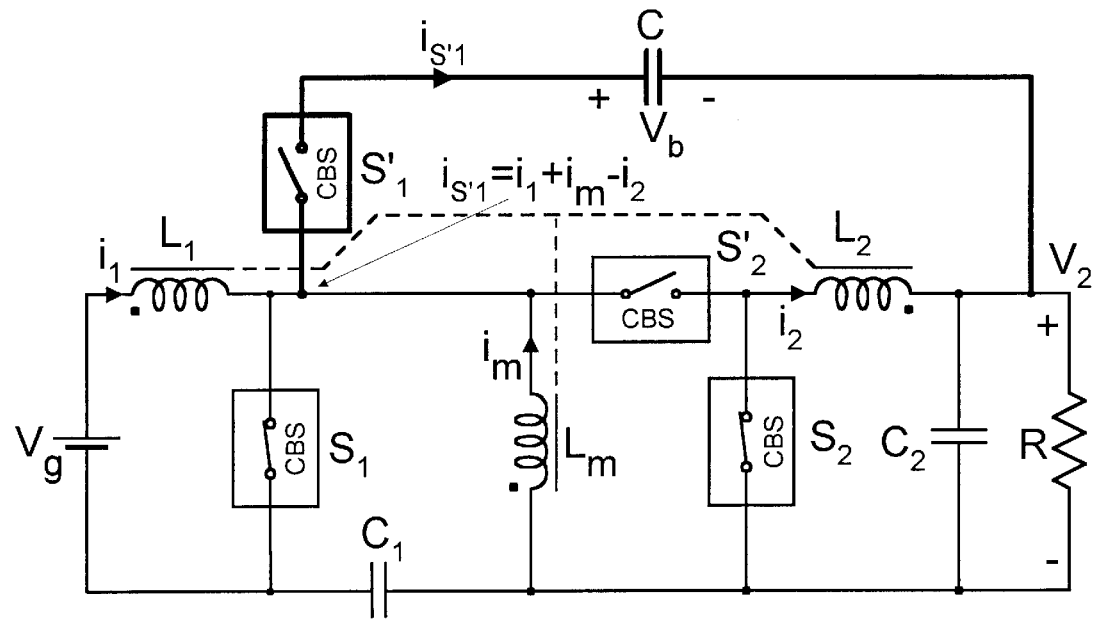
Figure 32J:
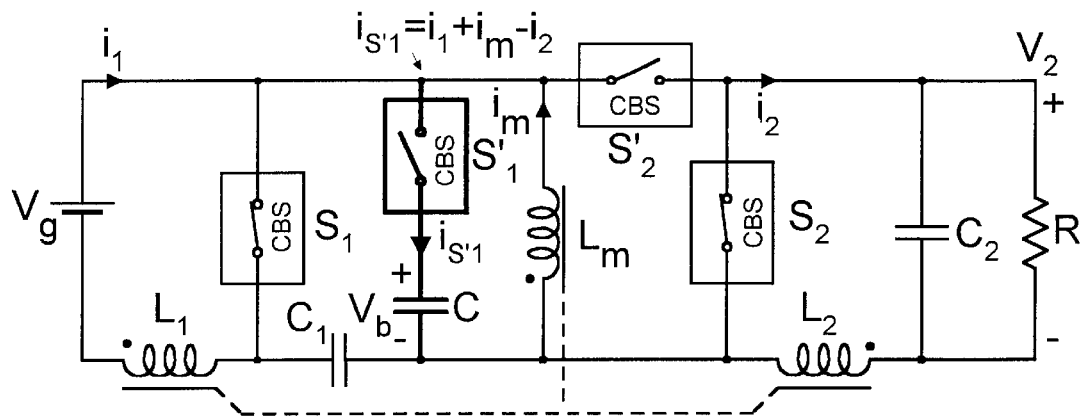
Figure 32K:
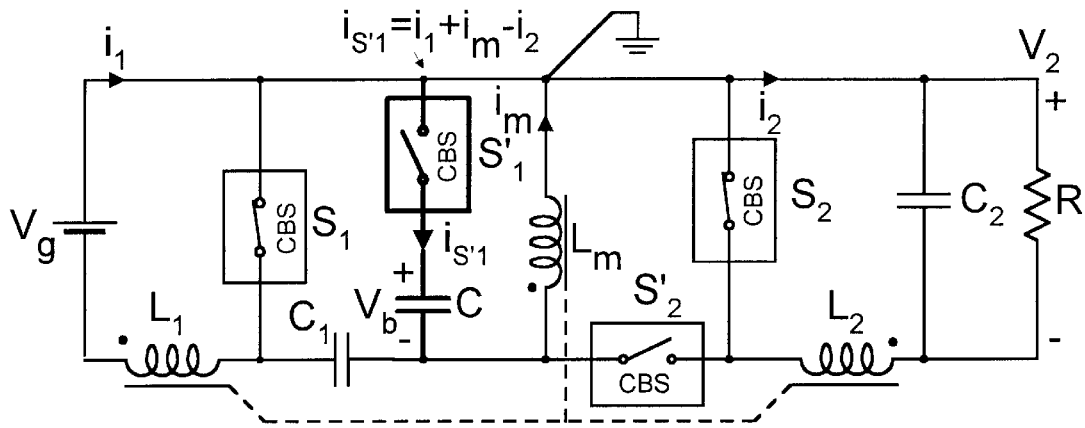
Figure 32L:
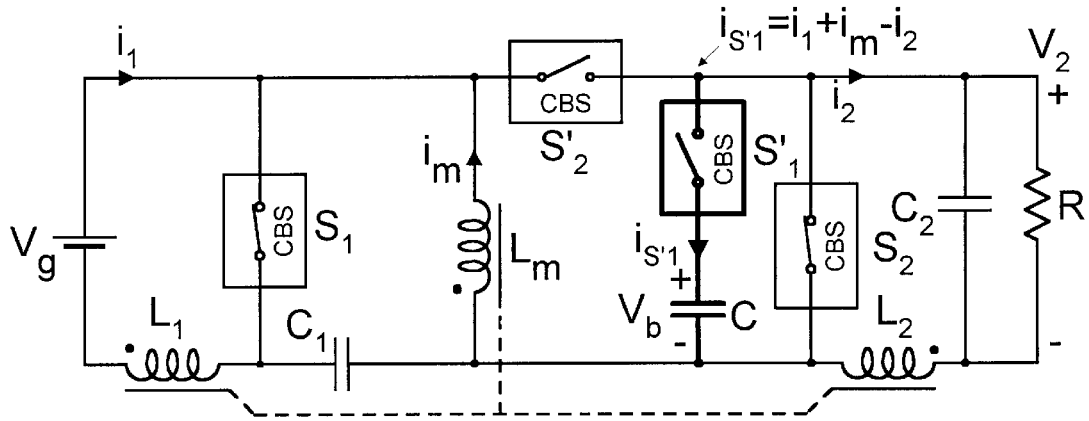
Figure 33A:
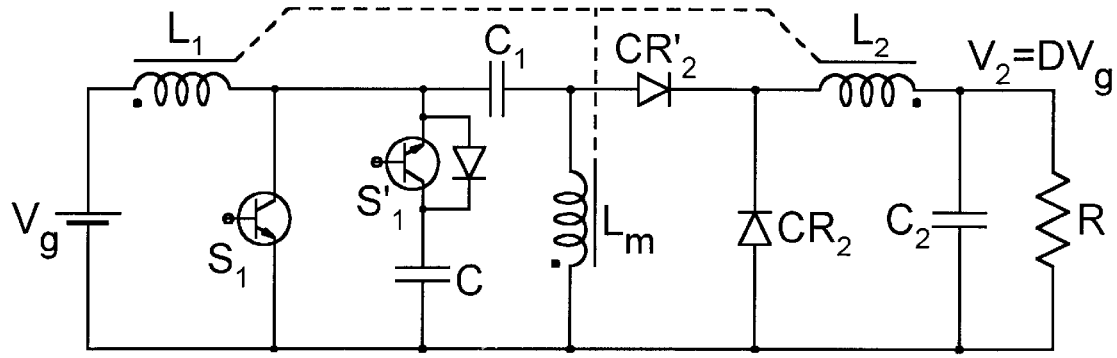
FIG. 33a illustrates the converter of FIG. 27 with bipolar NPN transistors on the input side and current rectifiers on the output side. Note: the extra diode across $S'_1$ switch to provide current bi-directional flow in that switch.
Figure 33B:
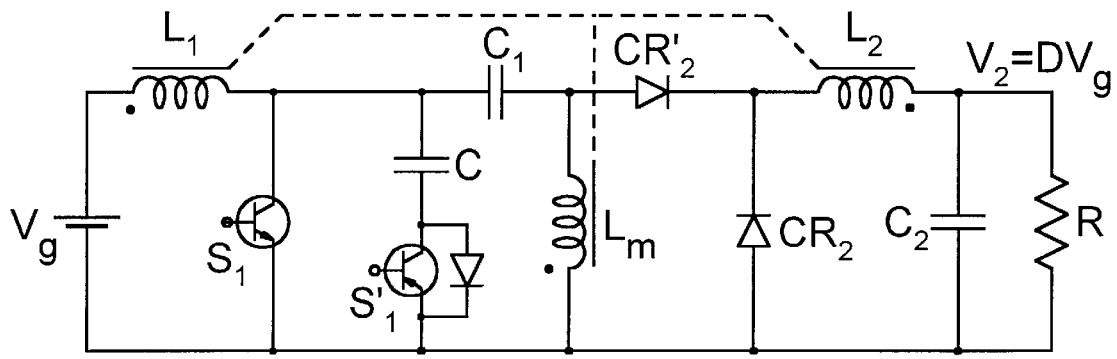
FIG. 33b illustrates the PNP bipolar transistor on the input side to facilitate direct drive with grounded emitter of two bipolar transistors.
Figure 33C:
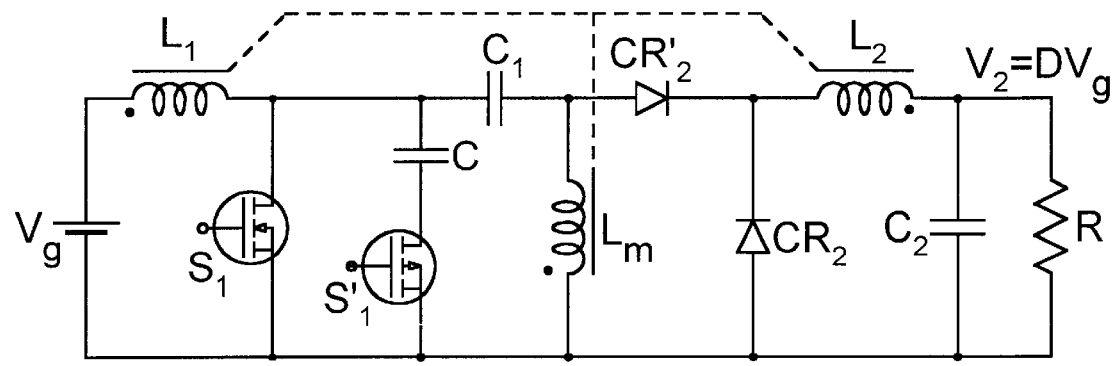
FIG. 33c illustrates the input switch and complementary input switch of FIG. 27 replaced by MOSFET devices.
Figure 33D:
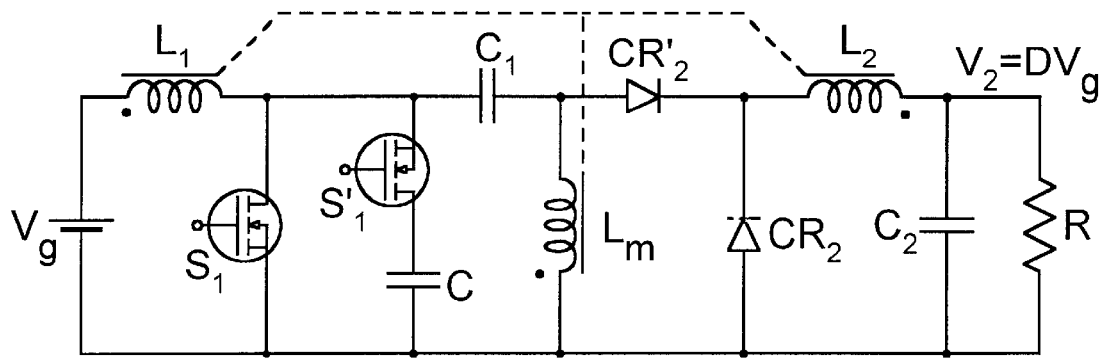
FIG. 33d illustrates the high side driver configuration of two N-channel MOSFET transistors.
Figure 33E:
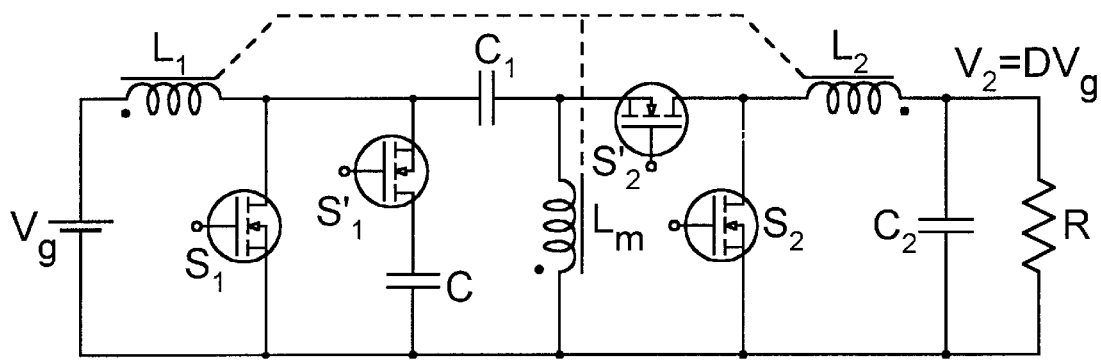
FIG. 33e illustrates an all-MOSFET transistor implementation of the invention in FIG. 27.
Figure 33F:
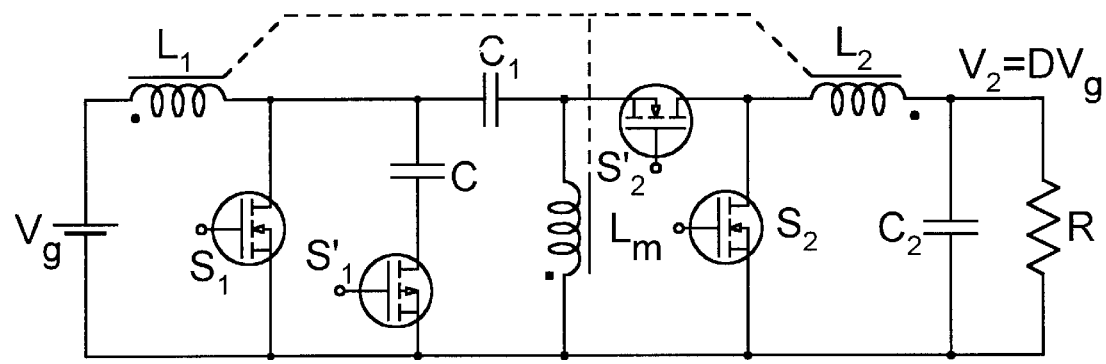
FIG. 33f illustrates the PNP-MOSFET transistor on the input side to facilitate direct drive.

Furthermore, when the complementary output switch $S'_2$ is also relocated to the bottom leg of converter in FIG. 32j the non-isolated converter of FIG. 32k is obtained. Note that in this converter, the positive terminals of input DC source and output DC load can have a common ground as shown in FIG. 32k, to result in negative input to negative output converter. Yet another variant is shown in FIG. 32l in which branch with auxiliary capacitor and complementary input switch is placed in parallel with output switch.

Note however, that all these relocations of components within same loop, are just the variants of the very same basic new switching converter of FIG. 11a and FIG. 11b. This is easily proved by the state space averaging analysis method mentioned earlier. The state-space equations for all these converter variants are identical to the state-space equations of the basic new switching converter of FIG. 11a and FIG. 11b, thus, all these converter variants result in identical responses, both dynamic as well as steady-state. For example, the relocation of input inductor $L_1$ to the bottom leg as in FIG. 32j and FIG. 32k, results in the same two loop equations (for State-1 and State-2) as for the basic converter of FIG. 11a and FIG. 11b.

Note that all these alternative connections of the branch with auxiliary capacitor C and complementary input switch $S'_1$ and repositioning of other components such as input inductor, input capacitor, output inductor, complementary output switch, etc., as described above would all have one thing in common: the complementary input switch current $i_{S'_1}(t)$ during State-2 interval is given by (8). Since this relationship (8) is preserved, all the unique properties of the basic new converter are preserved and present in any of its numerous equivalent transformations of FIGS. 32a–l as well as in many other configurations not shown above but satisfying condition (8). For example, a combination of the two two-end branches (comprising complementary input switch and auxiliary capacitor) from alternatives in FIGS. 32(a–l) could be made in such a way to form a combined (compound) three-end branch with a single complementary input switch connected with one end to two auxiliary capacitors. Hence, each end of this compound three-end branch can be connected to converter's nodes in such a way to satisfy condition (8), which will preserve unique performance of converter at the expense of increased complexity with additional components. We will thus use condition (8) as a fundamental means description for attaching the branch with auxiliary capacitor C and complementary input switch $S'_1$ in all variety of possibilities. The skilled in the art might find some other alternative converter's modifications, whose operation would encompass the same relationship (6), hence they all will be exactly other variants of this original converter configuration.

It should be emphasized that in all the above variants, the current through the branch with the complementary input switch $S'_1$ and auxiliary capacitor C is AC only, since $I_C=0$ as per (9). Thus, the complementary input switch S'$_1$ will also carry only the AC ripple current component, which is small compared to DC load current. Hence the complementary input switch conduction losses will be very small in comparison to the conduction losses of the input switch S$_1$, which is the power switch whose current is directly dependent on the DC load current. Just like the complementary input switch S'$_1$, the auxiliary capacitor C is also a small size and low loss component, since it carries the same small AC ripple current component only. Thus, the branch with the auxiliary capacitor and complementary input switch S'$_1$ contributes very little to the total converter losses but is critically importance, since it enables existence of the two fundamental relationships (7) and (8).

However, since this branch current is AC only, the complementary input switch S'$_1$ must be implemented with a current bi-directional switch, such as, for example, an NPN bipolar transistor in parallel with a diode as in FIG. 33$a$. The input switch S$_1$, however, does not have to be current bi-directional, and could be implemented with NPN bipolar transistor only as shown in FIG. 33$a$. The switches S$_2$ and S'$_2$ can in their simplest implementation consist of diodes, such as rectifier diodes CR$_2$ and CR$_2$' as in FIG. 33$a$. The NPN bipolar transistor S'$_1$ in FIG. 33$a$ could be replaced with a PNP transistor S'$_1$ of FIG. 33$b$, which is now in a preferable grounded emitter configuration for direct drive, instead of the floating drive required for the circuit of FIG. 33$a$. However, both configurations in FIG. 33$a$ and FIG. 33$b$ have limitations that neither soft-switching nor lossless switching could be implemented since input switch S$_1$ is not a CBS switch. This is circumvented by implementing input switch and complementary input switch with MOSFET devices as in FIG. 33$c$ and FIG. 33$d$ as CBS switches, which together with proper drive sequence and timing restores the soft-switching performance. All four MOSFET switching devices implementation as in FIG. 33$e$ and FIG. 33$f$ with proper switching sequence and timing control enables the lossless switching performance of the present invention. As an added benefit, the MOSFET implementation instead of bipolar transistors allows operation at higher switching frequencies, thus resulting in smaller size of energy storage capacitive and inductive components. In addition this also simplifies the drive circuitry. The added benefit is that the diode is already built into the MOSFET device, and no external diode is needed as in FIG. 33$b$ for complementary input switch. Furthermore, the parasitic body-diode in the input S$_1$ MOSFET switch will prevent discontinuous conduction mode at light load currents, since the input front end is current bi-directional as a whole.

The P-channel S'$_1$ MOSFET of FIG. 33$c$ is replaced by an N-channel S'$_1$ MOSFET in FIG. 33$d$. While this switch requires a floating drive as the bipolar counter-part in FIG. 33$a$, this is still preferred in many applications due to the availability and effectiveness of special Integrated Circuit (IC) driver chips, the so called "high-side drivers", which are designed for just such drive conditions and even provide the necessary timing delays for soft switching implementations.

Finally, for low voltage applications in which there is a need for reduction of the output conduction losses, the current rectifiers CR$_2$ and CR$_2$' on the output side are replaced by MOSFET devices as in FIG. 33$e$. Furthermore, the use of all MOSFET devices enables an effective implementation of the lossless switching. Some applications might favor the configurations in FIG. 32$a$ or FIG. 32$f$ which have a lower DC voltage on auxiliary capacitor C given by $V_b=DV_g/(1-D)$ compared to its voltage $V_C=V_g/(1-D)$ in configuration of FIG. 11$b$. The ratio of their DC voltage ratings is $V_b/V_C=D$. Thus, at duty ratio D=0.5, the voltage rating of the auxiliary capacitor is 2 times lower when placed in position as in FIG. 32$a$ in comparison to its position as in FIG. 11$b$. Later the isolating embodiment will take advantage of both: low voltage rating of auxiliary capacitor C and high-side-drive configuration. Other positions of auxiliary capacitor lead to even lower voltage ratings of capacitor C.

AC Voltages Mismatch

In addition to many similarities described earlier, there is one important difference between the classical AC transformer and the DC Transformer of FIG. 27. In the AC transformer, the AC voltage is applied to the primary winding and the secondary winding has only induced AC voltage source, but not externally applied AC voltage. In the DC Transformer, however, all windings are driven by externally applied AC voltage sources. Thus, a potential for mismatch between induced and applied AC voltages. In that case, a ripple current will occur proportional to the voltage mismatch and inversely proportional to the inherent leakage inductance.

The DC Transformer of FIG. 34$a$ with equal number of turns N as in FIG. 29$e$ but with a small air-gap placed in the flux path is one way to better match the AC voltages and further reduce the ripple current in the output inductor. In the DC Transformer of FIG. 34$a$, through the magnetic coupling between the inductor windings, the induced voltage in the output inductor is $v_m$, while the AC voltage generated by switching action of converter and applied to the same output inductor winding is $Dv_m$. Let us now show how this AC voltage mismatch on the same output inductor winding can be absorbed gracefully thanks to the intentionally increased leakage flux in the magnetic core of FIG. 34$a$ and by strategically placing the three windings on the magnetic core of FIG. 34$a$.

The windings for inductors L$_1$ and L$_m$ of FIG. 34$a$ are placed on the same leg of the UU magnetic core structure, and intentionally placed side-by-side (not on top of each other) to achieve some leakage inductance between the two. Since their AC voltages are identical over the whole operating range, a near-zero ripple current in input inductor can be obtained by slightly adjusting the turns ratio of the input inductor winding as discussed earlier, and therefore Electromagnetic Interference (EMI) noise will be reduced.

On the other hand, the output inductor winding L$_2$ is placed intentionally on the opposite leg of the UU magnetic core of FIG. 34$a$, to take the advantage of the large leakage flux $\Phi_1$ so created between the middle inductor and output inductor windings. This leakage flux will then provide substantial built-in leakage inductance to reduce output inductor AC ripple current as explained below.

To maximize the benefit of the leakage flux, a small air-gap is placed on the side where the output inductor L$_2$ is as shown in FIG. 34$a$. This air-gap placement will result in most of the leakage flux associated with windings L$_1$ and L$_m$, and small or negligible leakage flux associated with winding L$_2$, resulting in the equivalent circuit model with large leakage inductance L$_L$ on the side of windings L$_1$, and L$_m$ as shown in FIG. 34$b$. Note that the small leakage between the windings L$_1$ and L$_m$ is in this analysis neglected to simplify the model and focus on the main effect. Thus, the windings L$_1$ and L$_m$ being excited with identical voltages $v_{L1}=v_{Lm}=v_m$ are merged into one winding in the model of FIG. 34$b$. The voltage divider composed of L$_L$ and L$_M$ (L$_M$ is a magnetizing inductance of inductor L$_m$, where L$_m$=L$_L$+L$_M$) steps down the input voltage $v_m$ by an inductive divider ratio r=I$_M$/L$_m$ to voltage rv$_m$. Thus, for r=0.8 and D=0.8 the input and output AC voltages in the model of FIG. 34c are identical presenting a zero net AC voltage to equivalent leakage inductance $L_e=L_L\|L_M$, and hence result in zero ripple current on the output inductor.

Note that at the same time, due to the very small total air-gap in this structure, the residual ripple current on the input side is also reduced, since the middle inductor inductance $L_m$ is very large. Thus, both zero-ripple current in output inductor as well as very small ripple current in middle inductor $L_m$ are achieved simultaneously. In addition, due to identical voltages on input inductor $L_1$ and middle inductor, the ripple current can also be steered away into the middle inductor winding thus resulting in or near zero ripple current in both input and output inductors and small residual ripple in the middle inductor as illustrated in the current waveforms of FIG. 27 obtained under this matching condition. This leakage flux will also lead to second-order DC flux in the magnetic core leg with windings $L_1$ and $L_m$, thus establishing DC-bias in that leg. By increasing cross section of that leg, DC flux density in said leg can be reduced.

To provide better matching of the AC voltages, the number of turns of output inductor winding can also be changed slightly from number of turns N, since the already existing small air-gap could tolerate small DC-ampere-turn mismatch.

Evaluation of the Output Inductor Ripple Current

Figure 34A:
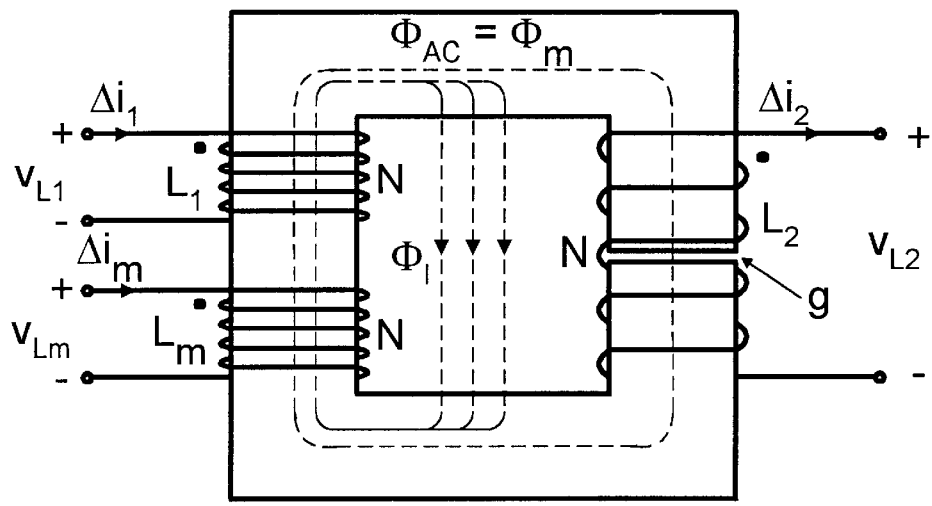
Figure 34B:
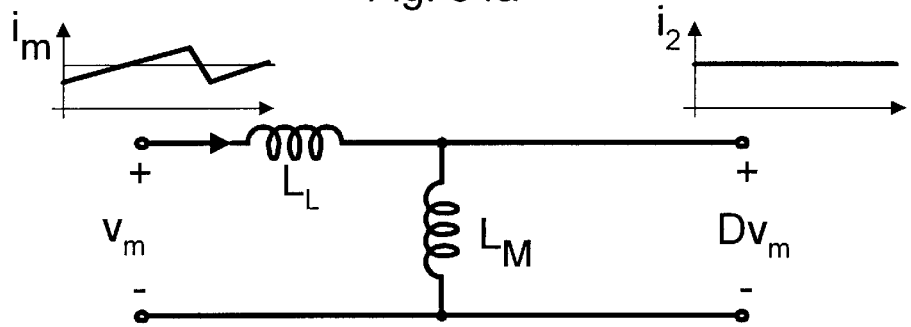
Figure 34C:
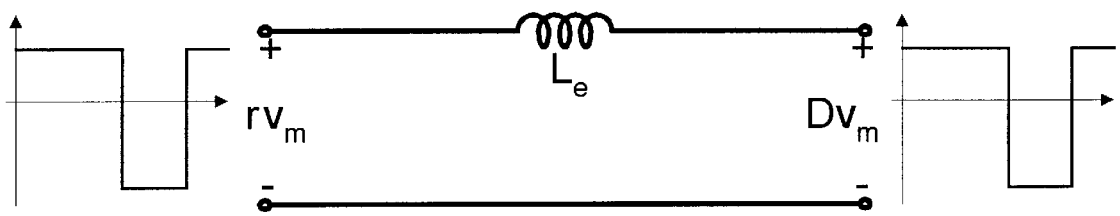
FIG. 34c illustrates a model of FIG. 34a further simplified and FIG. 34d illustrates an equivalent circuit model demonstrating zero-ripple current on the output.
Figure 34D:
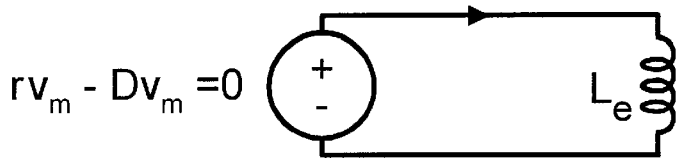

From the model in FIG. 34d, the output ripple current clearly depends on the very small equivalent leakage inductance $L_e$ and not on the large inductance $L_2$ of the output inductor. Thus, it would appear that the ripple current magnitude increases rapidly when operating duty ratio is away from the zero-ripple condition. However, this is not the case. Despite the small value of the equivalent leakage inductance $L_e$, the voltage across it is not the full output voltage V, but instead, as in FIG. 34d, the small mismatch voltage, which is quantified in the formula for the maximum output inductor ripple current at duty ratio D given by:

$$\Delta i_{2M}=(D-D_{ZR})VT_S/L_e \qquad (20)$$

where $D_{ZR}$ is the duty ratio at which zero ripple current is obtained, V is the regulated output DC voltage, $T_S$ is the switching period, and $L_e$ is the equivalent leakage inductance reflected to the output inductor side. Clearly the voltage mismatch is given by $(D-D_{ZR})V$ and is only the fraction of the output DC voltage V. If the output inductor number of turns is adjusted, it is relatively easy to move duty ratio for zero-ripple current to $D_{ZR}=0.5$ with some trade-off in an increased DC flux in core and a small air-gap introduction. If an input voltage change from 40 V to 60 V (1:1.5 dynamic range) were needed, this would correspond to duty ratio change from 0.6 to 0.4. Thus, (20) would reduce to $\Delta i_{2M}=0.1\ VT_S/L_e$ in which the voltage mismatch is 10% of the output DC voltage. For example, if the 100 W converter is regulated at V=5 V, and for $T_S=10\ \mu sec$ (switching frequency of 100 kHz), even a very small equivalent leakage inductance of only $L_e=1\ \mu H$ would result in acceptable maximum ripple current of 5 A. Since the converter is capable of delivering high DC load currents of 40 A, 60 A and higher without saturation, this ripple current is relatively small and has little impact on the overall efficiency.

Figure 35A:
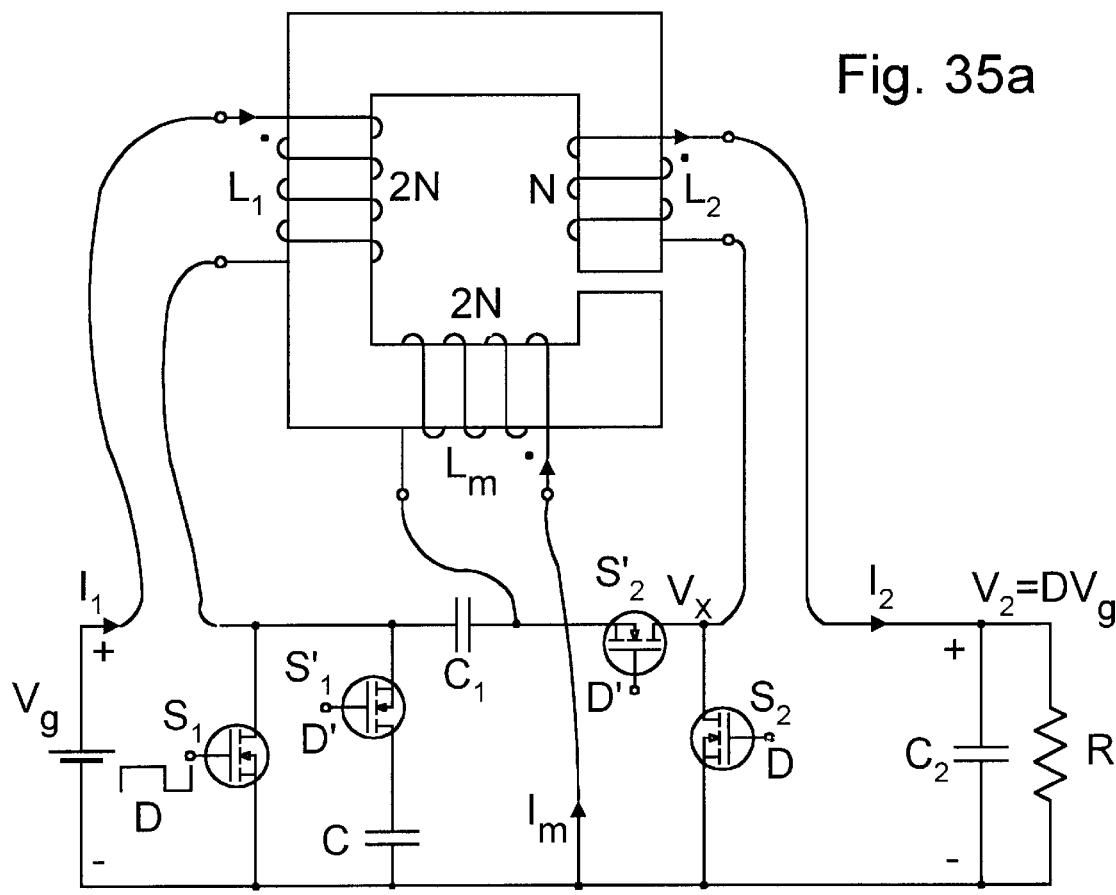
FIG. 35a illustrates another embodiment of the present invention which utilizes to reduce the output inductor ripple current. Note that the number of turns of the input and middle inductors are twice that of the number of turns of the output inductor.
Figure 35B:
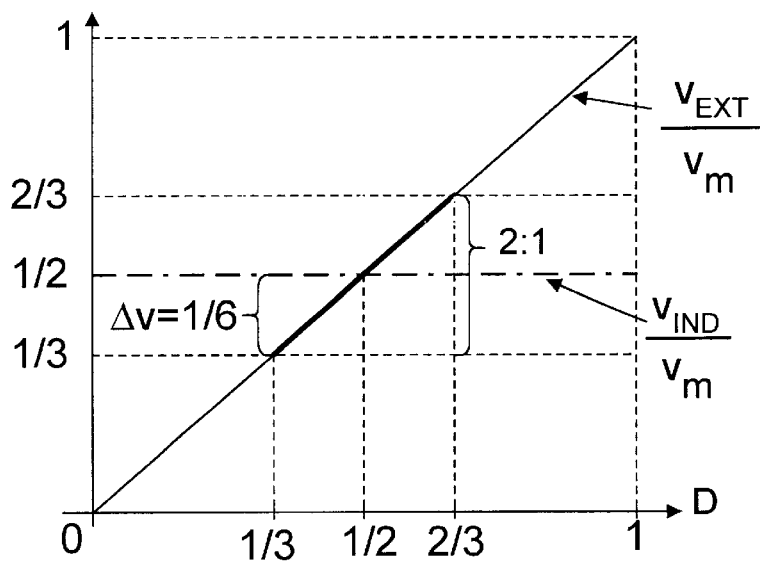
FIG. 35b is a graph of the operating range of the converter in FIG. 35a centered around the duty ratio D=½ with zero output ripple current at D=½.

Yet another embodiment of the present invention in shown in FIG. 35a in which the output inductor number of turns is adjusted relative to the middle inductor and input inductor number of turns so that zero ripple current is obtained at D=0.5 as seen in FIG. 35b for a 2:1 turns ratio of middle to output inductor. The $v_{EXT}=Dv_m$ is plotted as a linear function in FIG. 35b, while $v_{IND}=0.5\ v_m$ is a constant dotted line in FIG. 35b since 2:1 ratio of middle to output inductor is used. Their intersection at D=0.5 shows matching induced AC voltage $v_{INT}$ and applied AC voltage $v_{EXT}$, hence zero ripple. Clearly, since identical number of turns is not used as discussed before, zero DC flux feature is lost, but partial DC-bias cancellation is in effect. Nevertheless, this would still lead to a substantial reduction of the air-gap from that of the conventional designs in which DC-ampere-turns add, rather than subtract as in this case, and substantial reduction of the ripple currents in input and middle inductor would be obtained. The DC Transformer implementation would be as in FIG. 35a. As shown in FIG. 35b such an arrangement would place zero-ripple current in the output inductor close to the D=0.5 operating point. The main benefit of such an arrangement is that for a 2:1 voltage range, the maximum AC voltage mismatch on the output inductor would be at maximum ⅙ of the output DC voltage. In some applications, the built-in leakage inductance of the magnetic core may be sufficient to result in acceptable ripple currents at the ends of the operating range, from duty ratio D=⅓ to duty ratio D=⅔ or 2:1 conversion ratio.

Figure 36A:
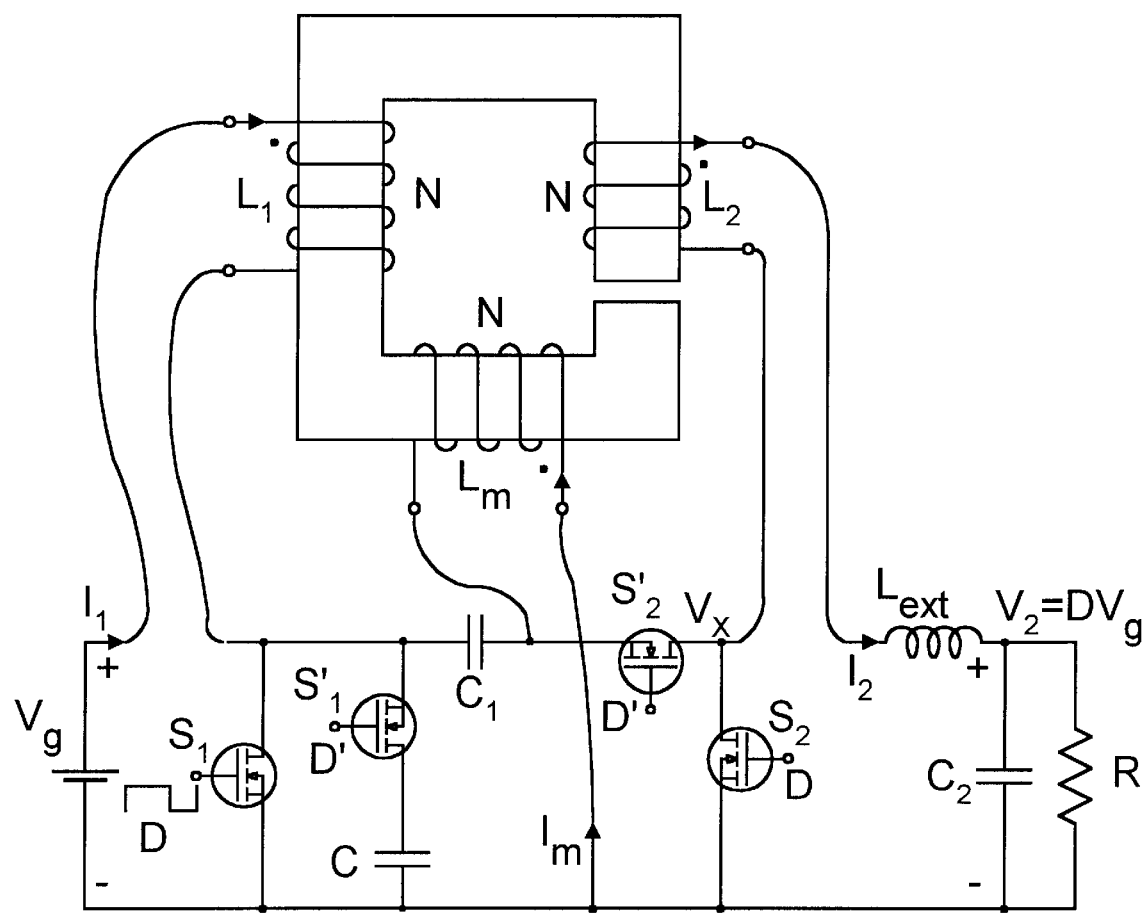
FIG. 36a illustrates another embodiment of the present invention which utilizes the small external inductor $L_{ext}$ to reduce the output inductor ripple current. Note the equal number of turns of the input, middle, and output inductor windings.
Figure 36B:
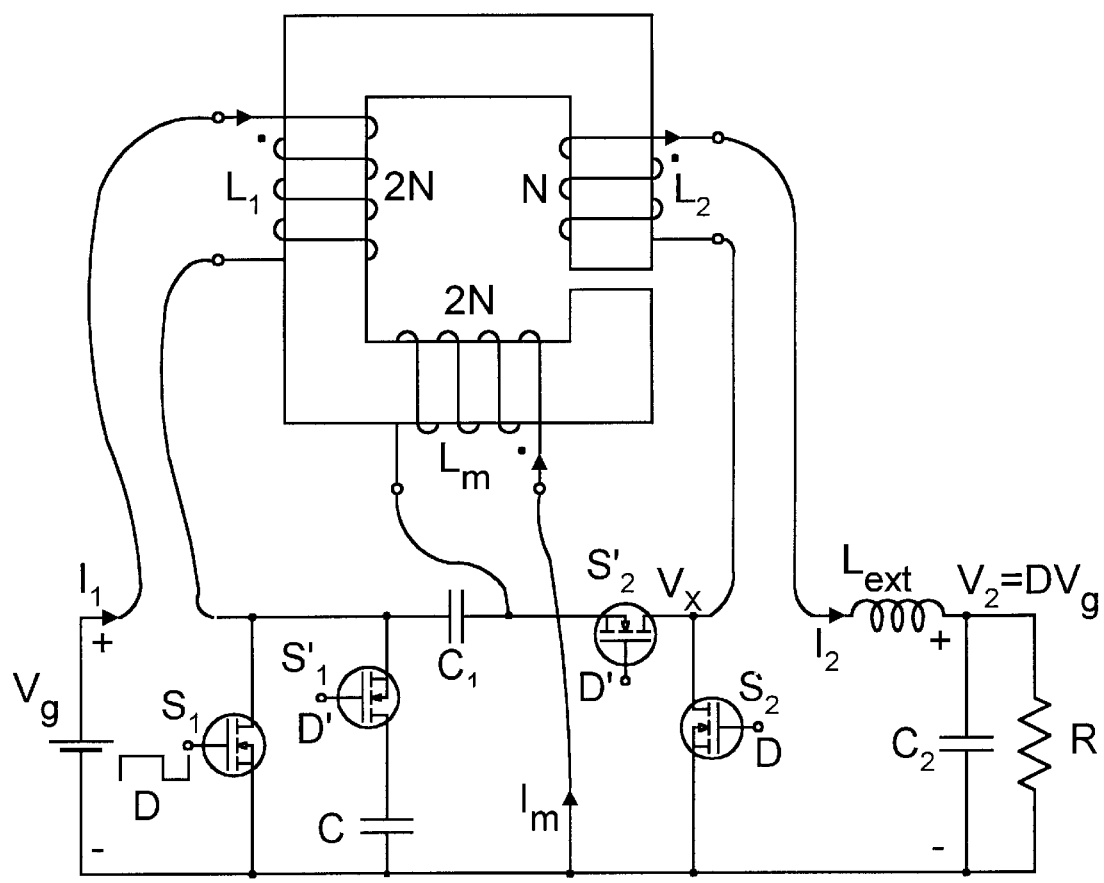
FIG. 36b illustrates another embodiment of the present invention which utilizes both the small external inductor $L_{ext}$ different number of turns to reduce the output inductor ripple current. Note that the number of turns of the input and middle inductors are twice that of the number of turns of the output inductor.

Another alternative to reduce the output inductor AC ripple current is to add an external inductor $L_{EXT}$ as shown in FIG. 36a, while the DC transformer is made with identical number of turns N. Yet another option in FIG. 36b combines both turns ratio adjustment of FIG. 35a and external inductor of FIG. 36a. In either case, the ripple currents can be reduced in half by addition of a small external inductor $L_{EXT}$ equal to the leakage inductance inherent to the DC Transformer magnetic core. Note that such inductor will have reduced AC volt-second requirements, since it will be subject to only 16% of the total AC flux of the middle inductor. In addition its inductance value needs to be only a fraction, such as 10% of the inductance of the output inductor. This would directly translate into a much smaller magnetic core and relatively negligible copper and core losses of such an external inductor. Another benefit of such implementation is that high design goals can be met with standard magnetic core sizes without resorting to special custom magnetics cores as described next.

A further embodiments of the present invention (shown in FIG. 37a and FIG. 37b) is especially suitable for applications in which the regulation of the output voltage over a wide range of the input voltage change, such as 2:1 or even 4:1 is needed and yet reduced ripple current at the output is also needed as well as efficiency improvement and further size reductions desired. The DC Transformer shown conceptually in FIG. 37a and in custom magnetic core of FIG. 37b has an additional leakage magnetic leg without windings and with a large air-gap in its magnetic flux path to divert some of the AC flux from the main flux path and reduce the AC voltage induced in output inductor winding to the same value as the AC voltage applied externally by converter to the same output inductor winding $v_{EXT}=Dv_m$ For example, if a chosen nominal operating duty ratio is D=0.7, we would design the leakage leg so that 30% of the main flux is bypassed into this leg. Then the induced voltage on the output inductor will be 70% of the AC voltage on the middle inductor $L_m$ which is exactly what is needed to match this induced voltage to the AC voltage applied externally to the same output inductor winding by the converter switching action and thus obtain zero ripple current in the output inductor. The leakage leg also substantially increases the total leakage inductance and thereby reduces the output ripple current when the duty ratio D is moved away from the nominal value and zero-ripple case.

Figure 37A:
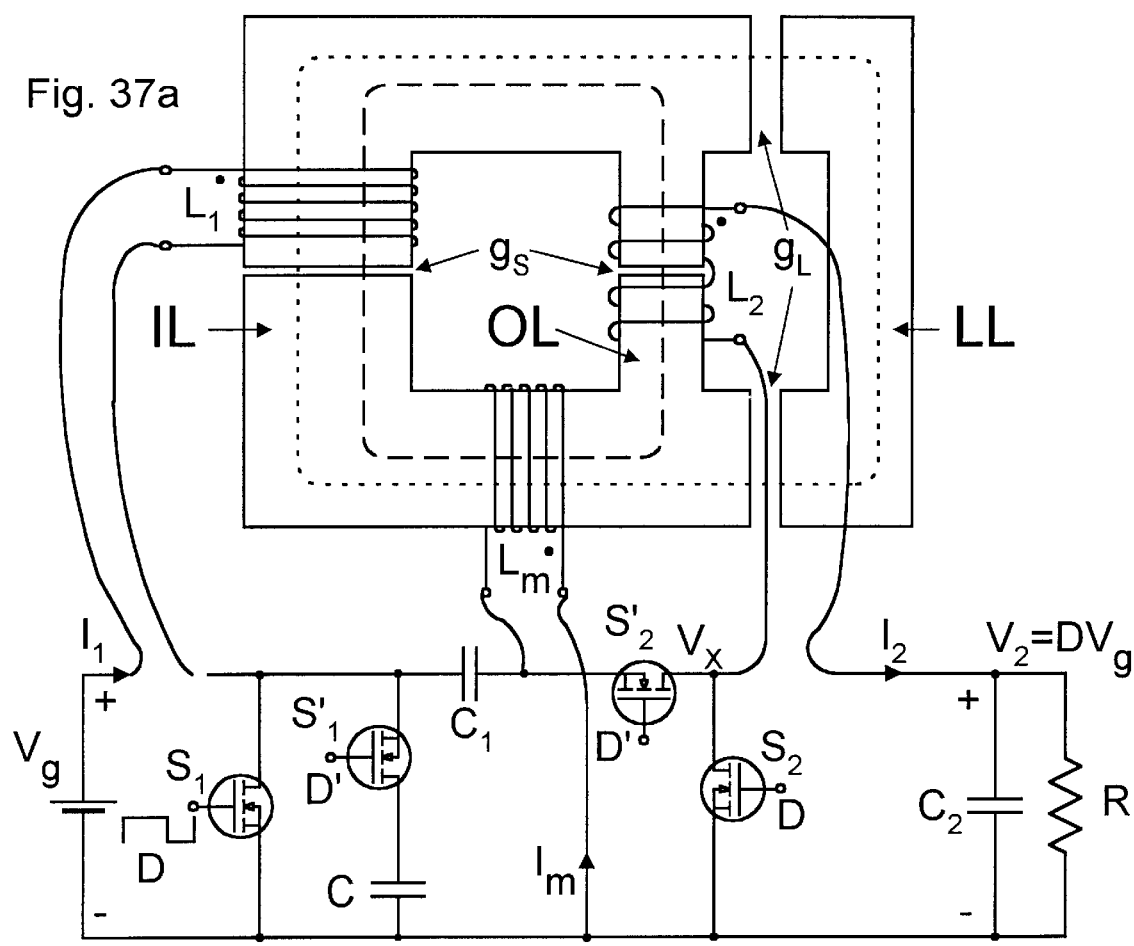
FIG. 37a is a circuit diagram of an embodiment of the present invention, in which the DC Transformer is built with an additional magnetic leakage leg LL.

The needed AC flux diversion from the main AC flux path can be easily accomplished by using a proportionally larger air-gap in the leakage path as illustrated in the conceptual custom DC Transformer core of FIG. 37a. Due to smaller AC flux in this leakage leg, it could also be made of a smaller cross-section, which would further increase the air-gap needed in the leakage path relative to the one in the main flux path. An alternative method to reduce the induced voltage in the output inductor winding to match the voltage imposed by the converter is to reduce the number of turns of the output inductor winding. This is particularly useful for higher output voltages, where the number of turns is large. Either method, implementing a leakage leg, using a reduced number of turns, or combination of both, causes some DC flux imbalance. Therefore, there will be no complete DC flux cancellation and some net DC-bias will be introduced. In practical implementation the leakage leg slightly increases the total volume of the DC Transformer core structure as shown in practical custom DC Transformer core of FIG. 37b in which the leakage leg for one practical design took approximately only 15% of the total magnetics volume.

Figure 38:
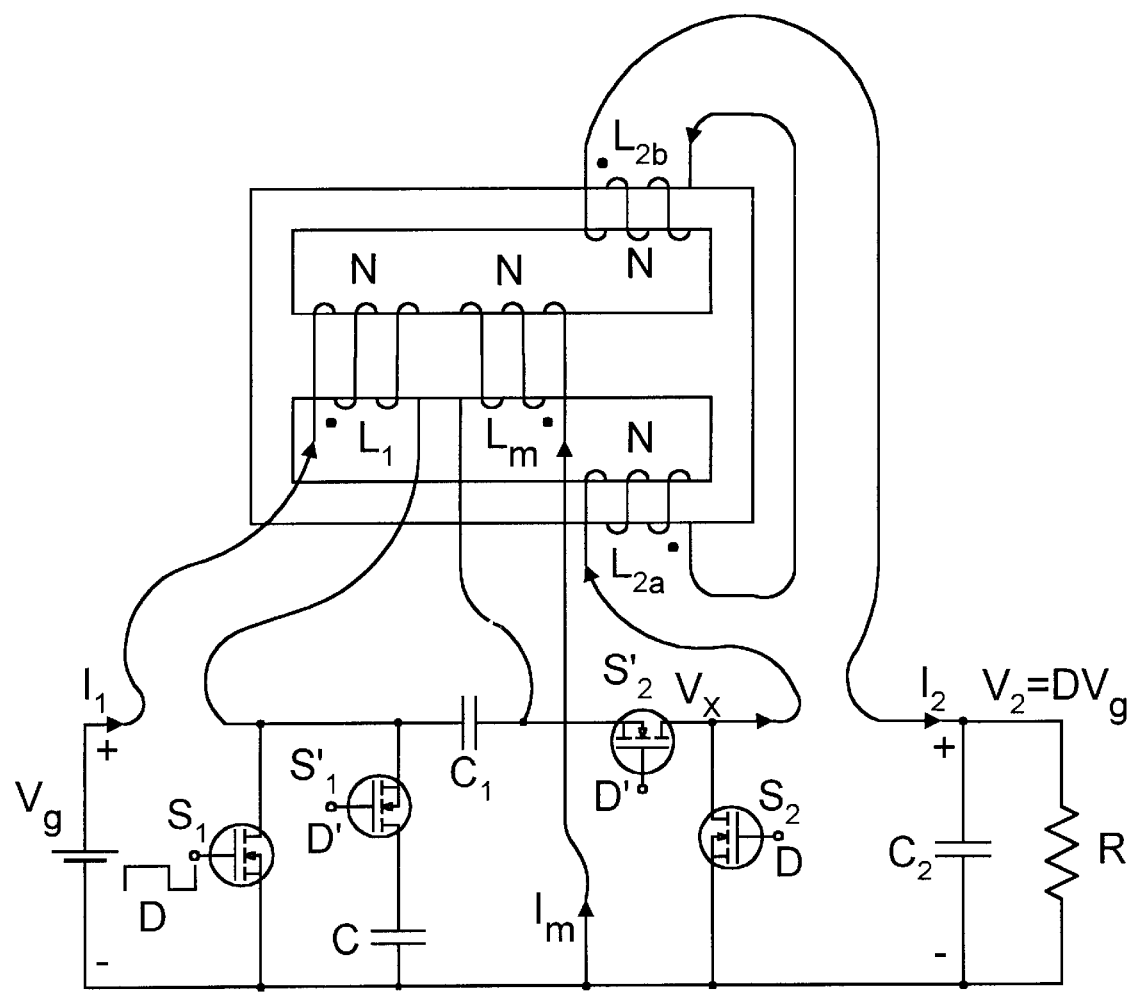
FIG. 38 is a circuit diagram of another embodiment of the present invention in which the output inductor $L_2$ is split into two identical windings $L_{2a}$ and $L_{2b}$ with N turns in series for use with a DC Transformer on an EE magnetic core with no air-gap.

Yet another embodiment of the present invention is shown in FIG. 38 in which the DC Transformer is built using the multiple-loop, EE magnetic core structure. As before, the input inductor and middle inductor are placed side-by-side on the same leg, that is the center leg of the EE magnetic core structure as seen in FIG. 38 and have equal number of turns N. The output inductor is split into two windings with the same number of turns N connected in series so that their AC voltages add. Then each of these output inductor windings is placed on a separate outer magnetic leg of the EE magnetic core, with dot-marked ends positioned to enable that the DC fluxes in both outer magnetic loops are zero. Thus, as before, a magnetic core without air-gap may be used. One of the main benefits of the EE magnetic core structure is that the leakage inductance is further increased and ripple currents further reduced in comparison with the equivalent single-loop, UU magnetic core structures. Another practical benefit is that the assembled EE magnetic core with windings tends to have a substantially lower profile than UU cores.

Other variations of the DC Transformer might be envisioned by those skilled in the art which would utilize the unique advantages of the present invention and its key features based on the recognition of the relationships (7) and (8). Those variations will be just alternative extensions based on the disclosure of the present invention.

ISOLATED EXTENSIONS

In the majority of practical applications galvanic isolation between the input DC source and the output DC load is often required either for safety reasons or from a system point of view. Once an galvanic isolated version of the converter is obtained, additional benefits accrue such as: the output DC voltage could be stepped-up or stepped-down with the transformer turns ratio, negative as well as positive DC output voltages can be provided, multiple outputs with different DC voltages and polarities can be easily obtained.

Figure 39A:
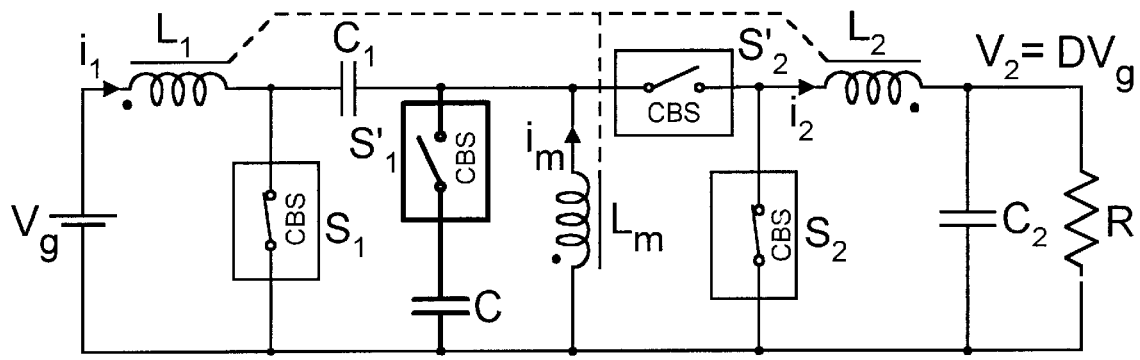
FIG. 39a illustrates another embodiment of the present invention and in FIG. 39b another embodiment is shown in which the middle inductor in FIG. 39a is replaced with a 1:1 turns ratio isolation transformer.

However, the existence of a non-isolated DC-to-DC converter does not guarantee at all the existence of a galvanic isolated counter-part. In fact, many non-isolated converters do not have a galvanic isolated extension. Some, which do, actually have a rather non-obvious extension, such as the forward converter, which is derived from the prior-art buck converter of FIG. 1a. Yet other converters, such as prior-art flyback converter, have isolated version, which are obtained simply by replacing the inductor of the non-isolated version with an isolation transformer. The present invention belongs to that category. One of the non-isolated versions of the present invention is shown in FIG. 39a.

Figure 39B:
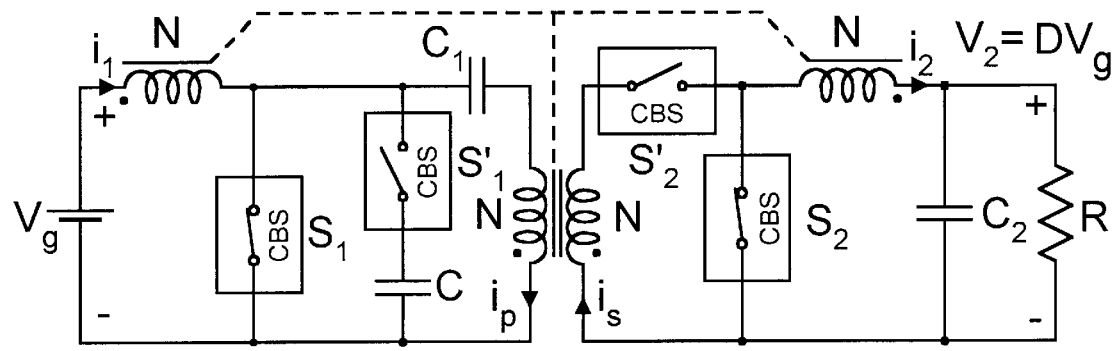

The corresponding isolated extension of FIG. 39b is obtained by simply substituting the original middle inductor with an isolation transformer with the same number of turns N for both primary and secondary winding while keeping the input and output inductor windings with the same number of turns N as well. Thus, all the properties of the non-isolated converter of FIG. 39a are carried over to the isolated counterpart of FIG. 39b.

Figure 40A:
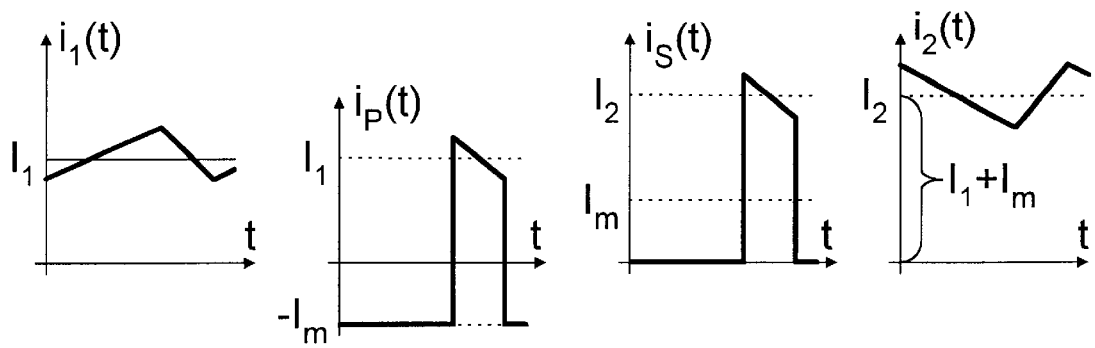
FIG. 40a illustrates the currents in the converter of FIG. 40b for the special case when $N_1=N_2$.
Figure 40B:
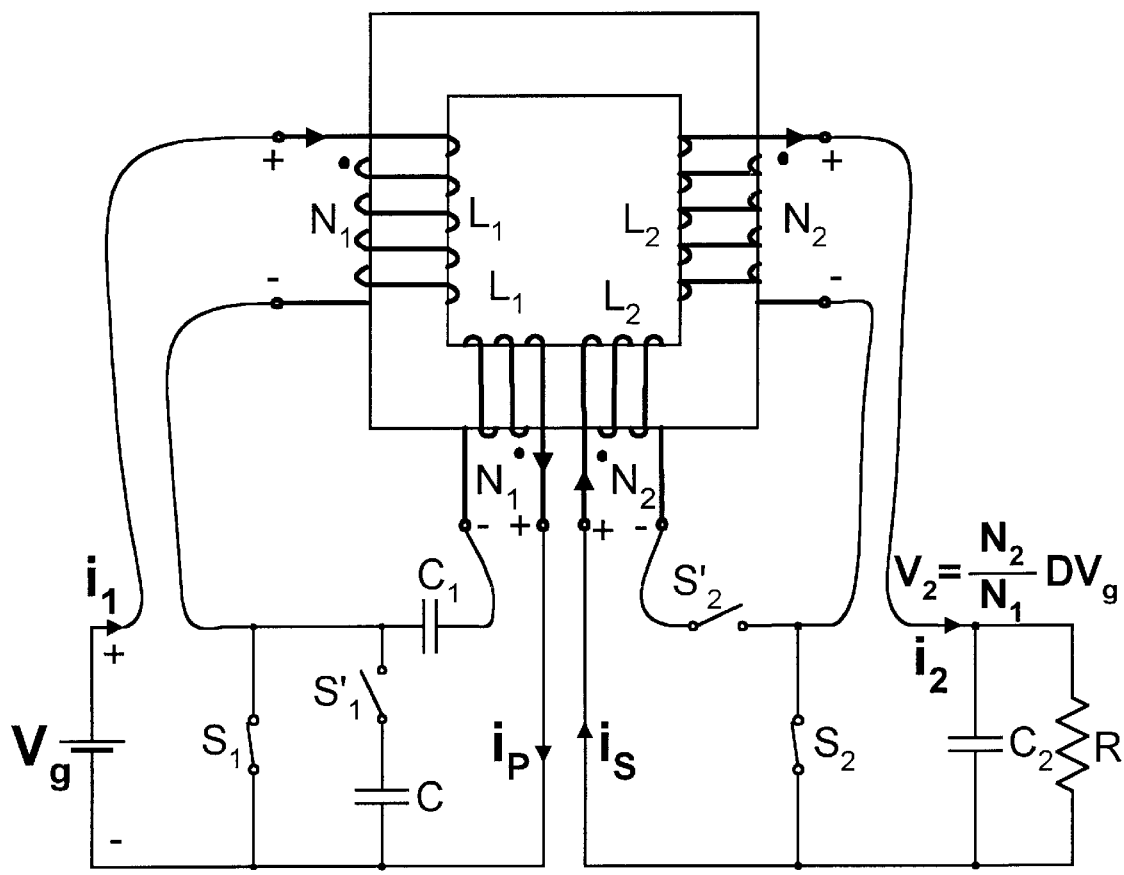
FIG. 40b illustrates the general case of an Isolated DC Transformer with $N_1:N_2$ turns ratio.

The next modification is to use the isolation transformer to provide additional DC voltage scaling by its secondary to primary turns ratio $N_2:N_1$ as shown in another embodiment of the present invention in FIG. 40b, which will change the output DC voltage to $$V_2 \times DV_g N_2/N_1 \tag{21}$$

While the non-isolated converter was capable only of a voltage step-down function, the isolated extension of FIG. 40b is also capable of step-up as well as step-up/step-down function. Also in many applications a very large step-down is required, such as when the rectified AC line is used as primary DC source, and low voltage outputs such as 5 V, 3.3 V and lower, as required. In such applications, additional voltage step-down through the transformer turns ratio is essential, as is also the galvanic isolation feature.

It is important to note that the isolated extension of FIG. 40b now also includes an Isolation DC Transformer without any air-gap, which is, as before, an integral part of the converter. In order to distinguish this magnetic structure from the DC Transformer in FIG. 27, which does not provide galvanic isolation, this new magnetic component is termed Isolated DC-to-DC Transfomer or simply Isolated DC Transformer since it does provide galvanic isolation. The total DC flux in the single loop magnetic core is zero, provided that, as shown in FIG. 40b, the input inductor number of turns $N_1$ is the same as number of turns of the primary winding $N_p$, and the output inductor number of turns $N_2$ is the same as the number of turns of the secondary winding $N_s$, so that:

$$N_p N_1 \text{ and } N_s = N_2 \tag{22}$$

Figure 41:
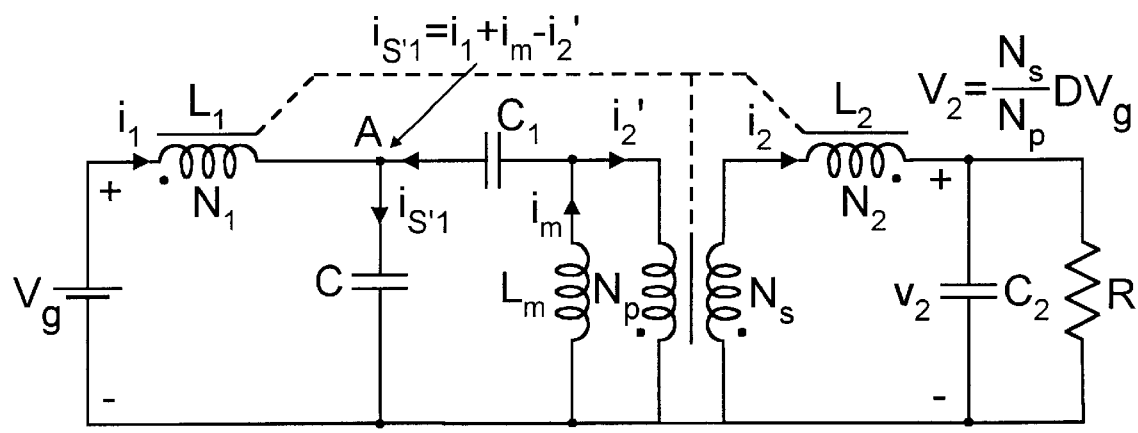
FIG. 41 illustrates an equivalent circuit model for the converter of FIG. 4b during the State-2 interval.

Let us now prove that (22) is indeed a necessary and sufficient condition for complete DC flux cancellation for any duty ratio D. During the State-1 times interval, the isolated converter reduces to the circuit model shown in FIG. 41, in which the isolation transformer is modeled with its magnetizing inductance $L_m$ and the ideal transformer with secondary to primary turns ratio $N_s:N_p$. The load current $i_2$ is reflected to the primary side by the turns ratio $N_s/N_p$ and becomes $i_2'$ given by $$i_2' = (N_s/N_p) i_2 \tag{23}$$

The summation of the current at node A results in $$i_{S1} \times i_1 + i_m - i_2' \tag{24}$$

since, as before, $I_{S'1} \times 0$, we get from (21) and (22)

$$I_1 + I_m = (N_s/N_p) I_2 \tag{25}$$

Let us now find the total DC ampere-turns. For the purpose of calculating its DC ampere-turns contribution, the isolation transformer can be represented by a magnetizing inductance $L_m$, with $N_p$ number of turns and with DC magnetizing current $L_m$, hence DC ampere-turns contribution of isolation transformer is $N_p I_m$. Since the dot-marked ends of the middle inductor and its replacement, the isolation transformer, were kept the same, the isolation transformer DC-ampere-turns add to the input inductor DC-ampere-turns, while DC-ampere-turns of the output inductor subtract to result by use of (23) in total DC-ampere-turns given by:

$$\Sigma NI = N_1 I_1 + N_P I_m - N_2 I_2 = (N_1 - N_p)I_1 + (N_S - N_2)I_2 \qquad (26)$$

Note that (26) is zero for any current $I_1$ and $I_2$ if, and only if, the following two equations are satisfied simultaneously:

$$N_1 - N_p 0 \text{ and } N_S - N_2 = 0 \qquad (27)$$

which is clearly the same as postulated by (22). Thus, the condition (22) or (27) is both necessary and sufficient for complete cancellation of the DC ampere-turns in an Isolated DC Transformer. Note also that for preservation of zero net DC-ampere-turns, it was not only necessary that the ratio of the output inductor to input inductor number of turns matches the ratio of secondary to primary number of turns of the isolation transformer, but, in fact, a much more restrictive condition is needed, that is equality of the isolation transformer primary winding number of turns and input inductor number of turns, and also equality of the isolation transformer secondary winding number of turns with output inductor number of turns. Due to the DC-ampere-turns cancellation condition from (26) and (27), the air-gap can either be eliminated completely or reduced by an order of magnitude in comparison with conventional solutions.

From another point of view, in the previous state-of-the-art converters employing Coupled-inductors such as Coupled-inductors Cuk converter, it was sufficient just to match the turns ratio of output to input inductor with the isolation transformer secondary to primary turns ratio, since the Coupled-inductors was only concerned with the AC voltage matching and not with DC ampere-turns cancellation. In the Isolated DC Transformer case, in addition to the matching of the AC voltages, an additional requirement is to have also DC-ampere-turns cancellation. For the latter to take place the absolute number of turns must be matched as per (22) and not just the turns ratio.

In addition, this result (22) is also desired for low ripple current in the input inductor. Note that the AC voltages on the input inductor and primary of the isolation transformer are identical. Since now, the same number of turns is used for input inductor and primary of the isolation transformer, the same volts/turn is preserved, thus leading to their direct 1:1 coupling. Hence due to perfect matching of the AC voltages, even a small leakage inductance results in near zero-ripple input inductor current and substantial reduction of the conducted EMI noise are achieved by slightly increasing the number of turns in the input inductor. The DC flux imbalance due to this increase is negligible. This holds over a wide range of operating duty ratio D. Of course, if one has assumed the special relationship (22) a priori, then (25) would directly prove that DC-ampere-turns cancellation holds. However, that would only prove that (22) is a sufficient condition, but will not reveal that the same condition (22) is also a necessary condition as well. The DC-ampere-turns cancellation is also displayed by the instantaneous ampere-turns waveforms in the Isolated DC Transformer of FIG. 40b.

This gives an alternative way to prove that the transformer has DC bias current $L_m$ without a need to revoke magnetizing inductance model of the transformer but to see that condition directly from the primary and secondary winding currents as displayed in FIG. 40a for the converter of FIG. 40b and special case $N_1 = N_2$. Primary winding has capacitor $C_1$ in series, which makes primary current AC only and prevents any DC bias to be generated though primary winding. The current in secondary winding, however, is a pulsed current switching between zero current level when complementary output switch $S'_2$ is OFF and load current $I_2$ when switch $S'_2$ is ON. The average of this pulse is equal to $(1-D)I_2$, which from (6) is also $I_m$. Thus, DC bias $I_m$ is generated entirely by the secondary side transformer winding.

Under condition (22) the isolation transformer in this case provides just the right DC-bias current $I_m$ for any operating duty ratio, that is for any input DC voltage $V_g$ and any DC load current $I_2$, so that zero DC ampere-turns are obtained in the single-loop magnetic core of the Isolated DC Transformer. Thus, the Isolated DC Transformer with a very restricted but well defined choice of number of turns (22) and positioning of the windings around a single-loop magnetic core, is at the root of the unprecedented performance of the present invention. The many variants of converter configurations provide the needed DC currents as well as necessary AC voltages to the windings so that current directions and voltage polarities are firmly defined and referenced to the dot-marked ends of respective windings, so that either the Isolated or Non-isolated DC Transformer could function as envisioned and offer the same described performance improvements.

Figure 42:
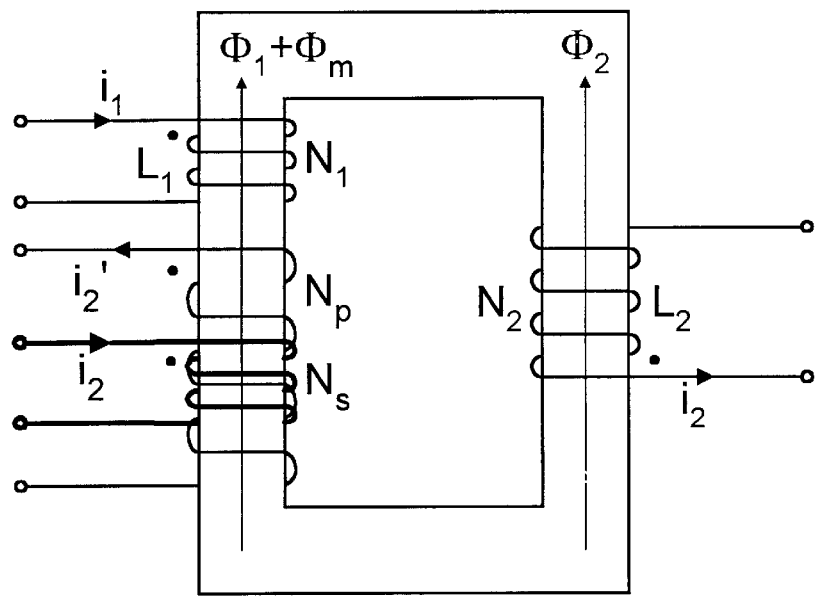
FIG. 42 illustrates the actual placement of the windings on the Isolated DC Transformer for the isolated converter of FIG. 40b.

As before for the non-isolated DC Transformer of FIG. 27, the Isolated DC Transformer was shown with the winding placements as in FIG. 40b only for better visualization of the Isolated DC Transformer winding connections, and not to indicate the actual winding placement. FIG. 42 shows such a relative placement. Note that as before, the input inductor and the isolation transformer are placed side-by-side (to promote some leakage between them), while the output inductor is placed on the opposite leg of the UU magnetic core structure to substantially increase the leakage between the transformer and output inductor. Finally, the primary and secondary windings of the isolation transformer are shown in FIG. 42 interleaved to minimize the leakage inductance between them, thus using the same techniques as for any other isolation transformer with tight coupling.

Figure 43A:
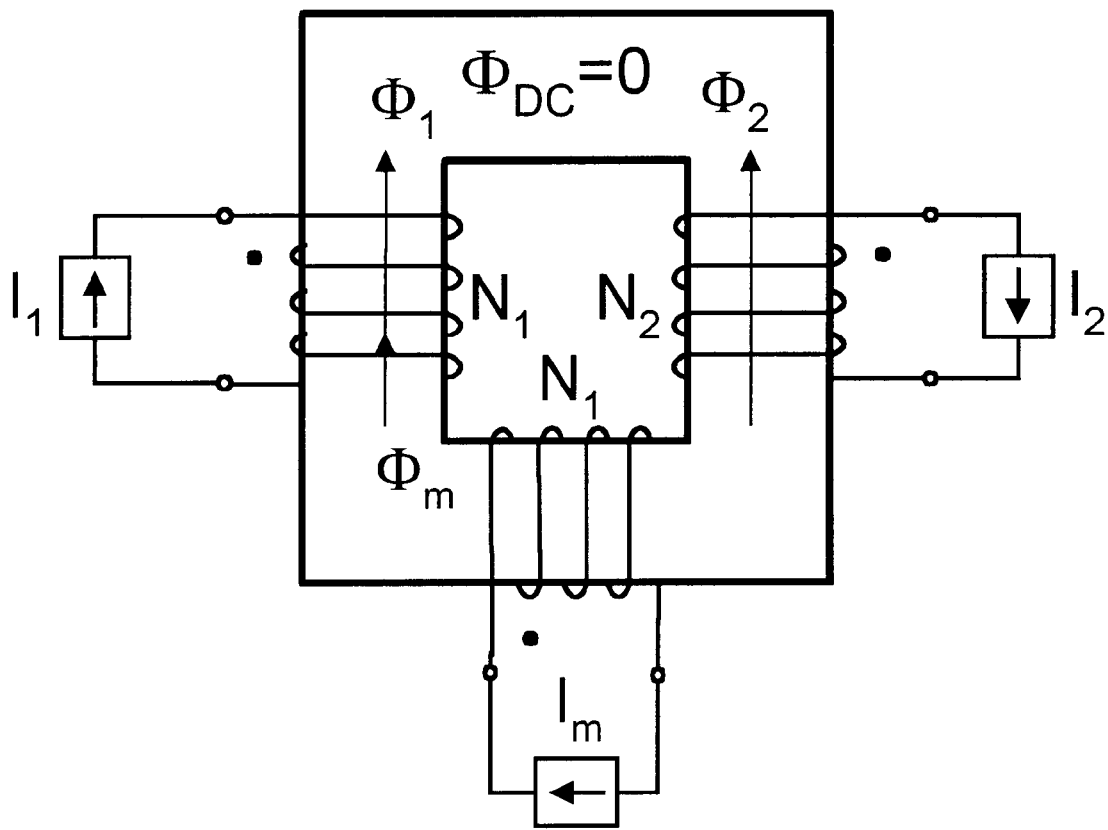
FIG. 43a illustrates a model of the Isolated DC Transformer of FIG. 40b with isolation transformer represented by its magnetizing inductance and DC-bias current $I_m$.
Figure 43B:
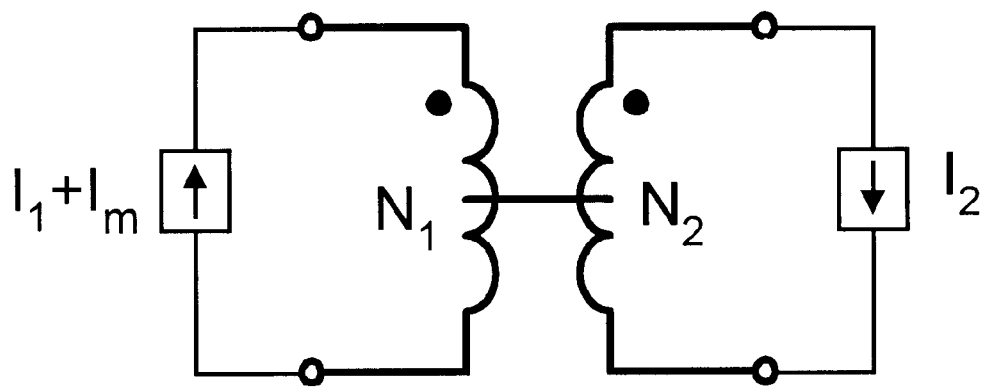

The Isolated DC Transformer as a new magnetics component has the same characteristics as the non-isolated counter-part of FIG. 30, with the exception that it brings added galvanic isolation and voltage scaling capability. Note that the isolation transformer is represented with its magnetizing inductance, which carries DC current $I_m$ flowing into dot-marked end and has $N_1$ turns as shown in FIG. 43a. Thus, the Isolated DC Transformer could be represent by a new symbol illustrated in FIG. 43b in which the magnetizing current $I_m$ and input inductor current $I_1$ are combined in a single input DC current source $I_1 + I_m$.

Alternative Isolated Converter Configurations

Just as we have converted the non-isolated converter of FIG. 39a into its counterpart in FIG. 39b, we can now replace the middle inductors of converters in FIGS. 32(a–l) with an isolation transformer in order to obtain their isolated counterparts. Note, however, that not all non-isolated converter variants will have their isolated counterparts. For example, FIG. 32d and FIG. 32i after such step would still not have the galvanic isolation, since the branch comprised of auxiliary capacitor C and the complementary input switch $S'_1$ is connected between one circuit node on the primary side and another circuit node on the secondary side. Thus, after exclusion of those converter configurations, still a large number of equivalents of the basic non-isolated converter of FIG. 11a and FIG. 11b is possible. Some of the isolated equivalents of the basic converter are shown in FIGS.

Figure 44A:
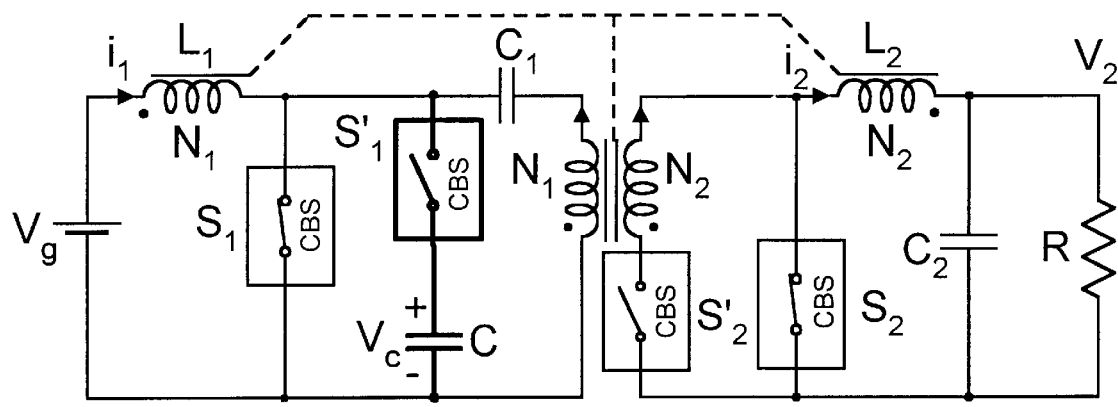
FIGS. 44(a–h) illustrate eight various isolated converter equivalents of present invention obtained from the non-isolated converters counterparts.
Figure 44B:
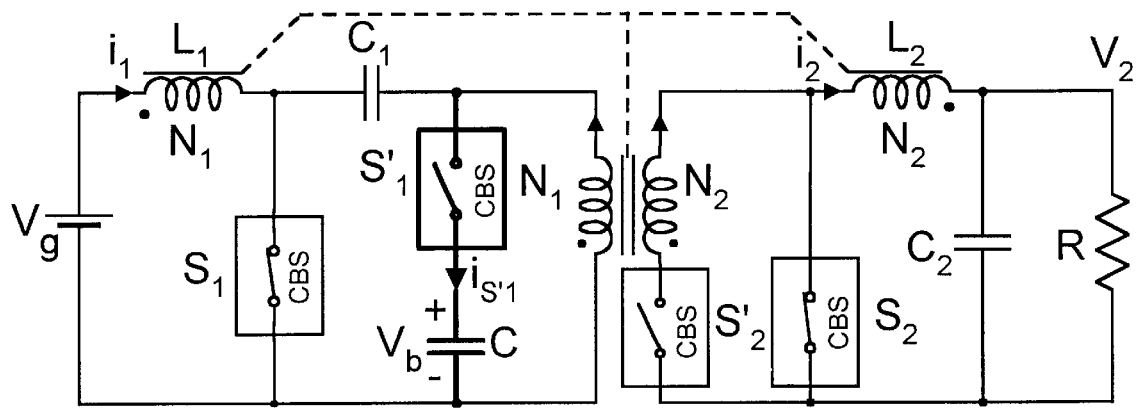
Figure 44C:
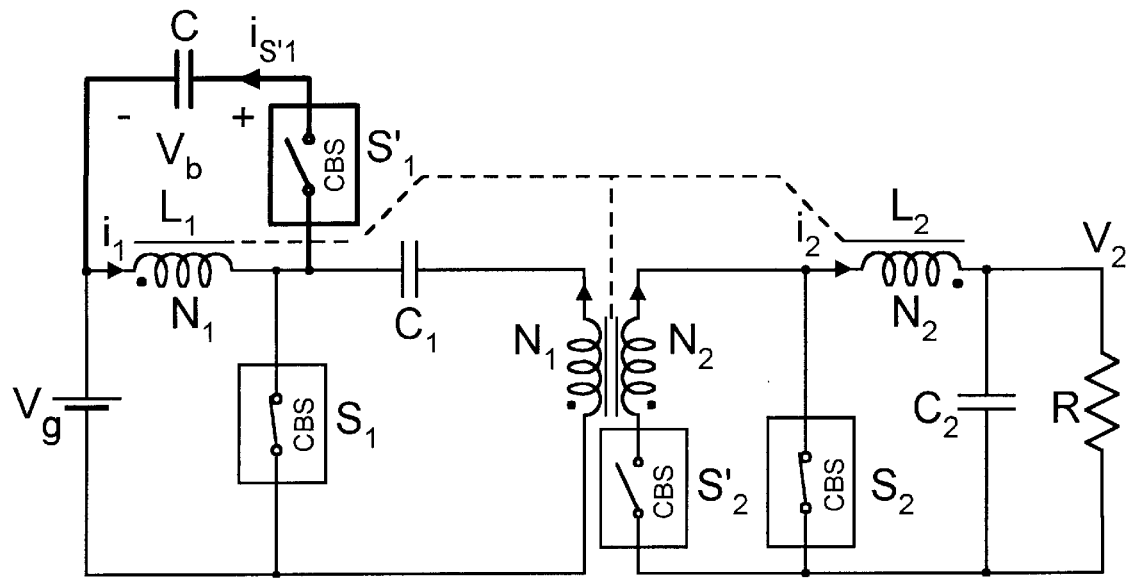
Figure 44D:
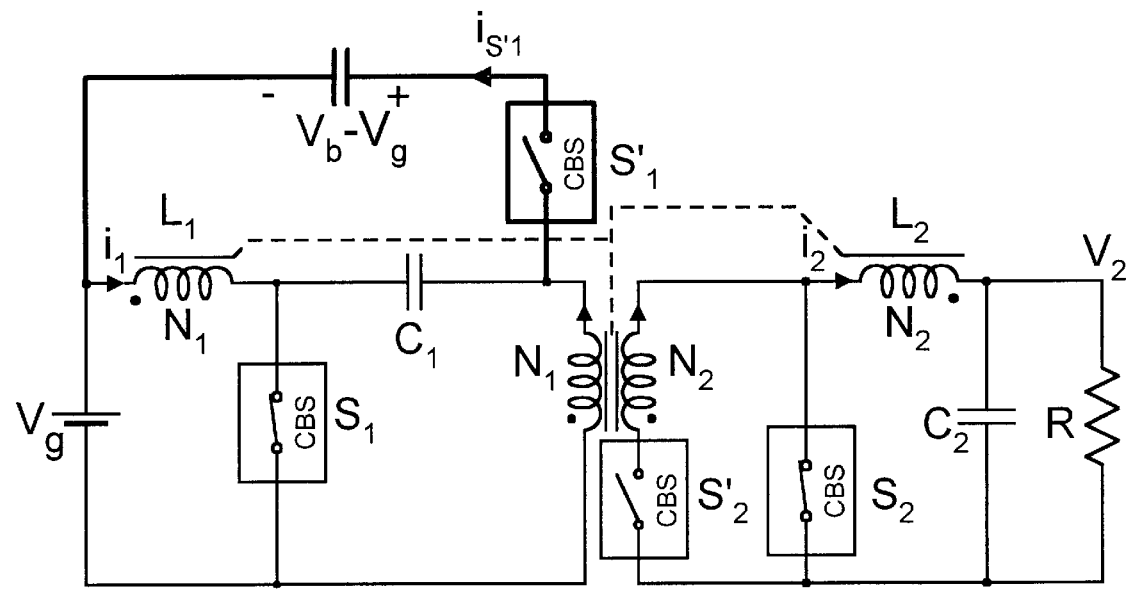

44(*a–h*). Note that in the converters of FIG. 44*g* and FIG. 44*h* the branch with auxiliary capacitor C and complementary input switch S'$_1$ is completely on the secondary side. Thus, the original benefit when this branch was on the primary side is lost: the energy stored in the transformer leakage inductance is not recovered but is lost resulting in reduced overall efficiency. Furthermore, this extra energy loss is exhibited as an un-damped or very lightly damped ringing of the drain-to-source voltage of the input MOSFET switch. This, in turn leads to high voltage spikes on this device and its higher voltage rating, as well as ranch increased radiated EMI noise.

Figure 44E:
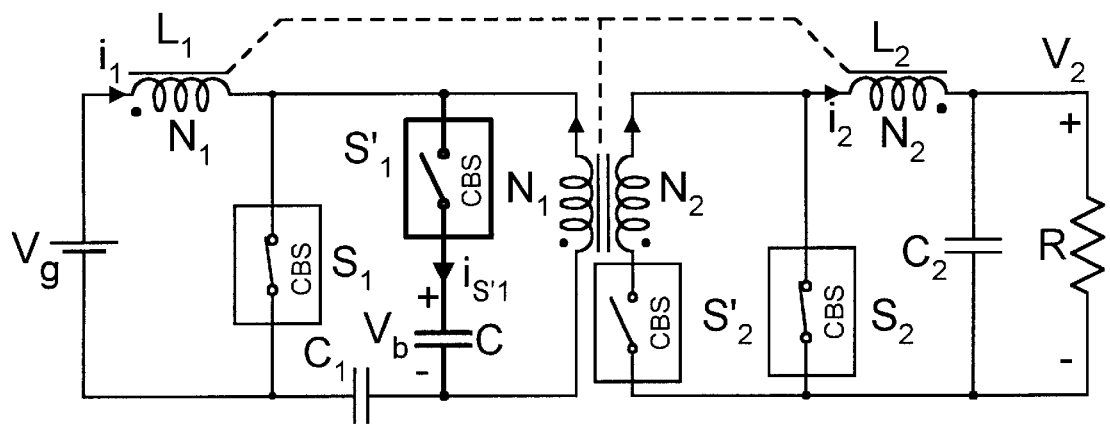
Figure 44F:
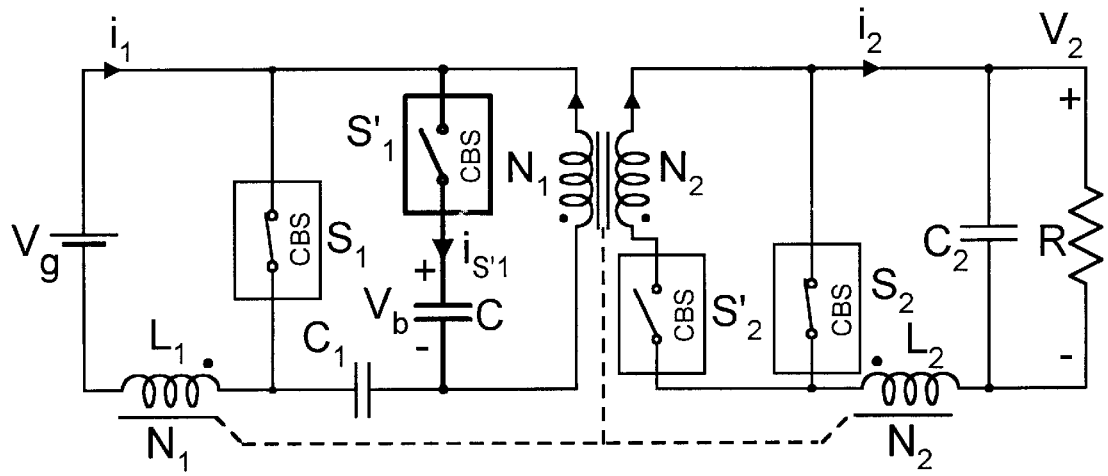
Figure 44G:
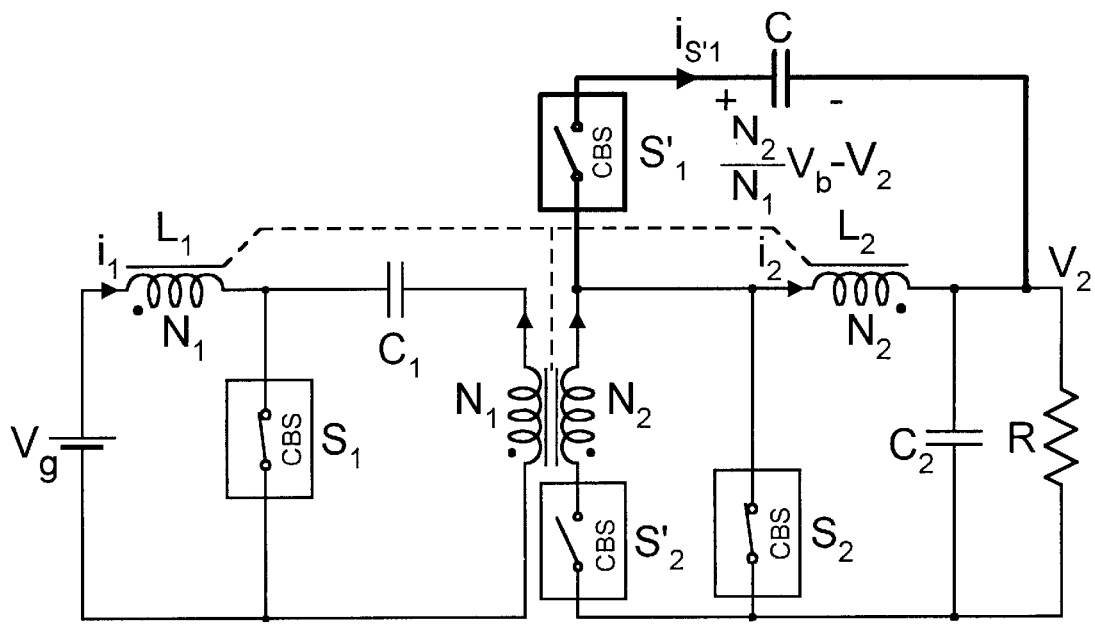
Figure 44H:
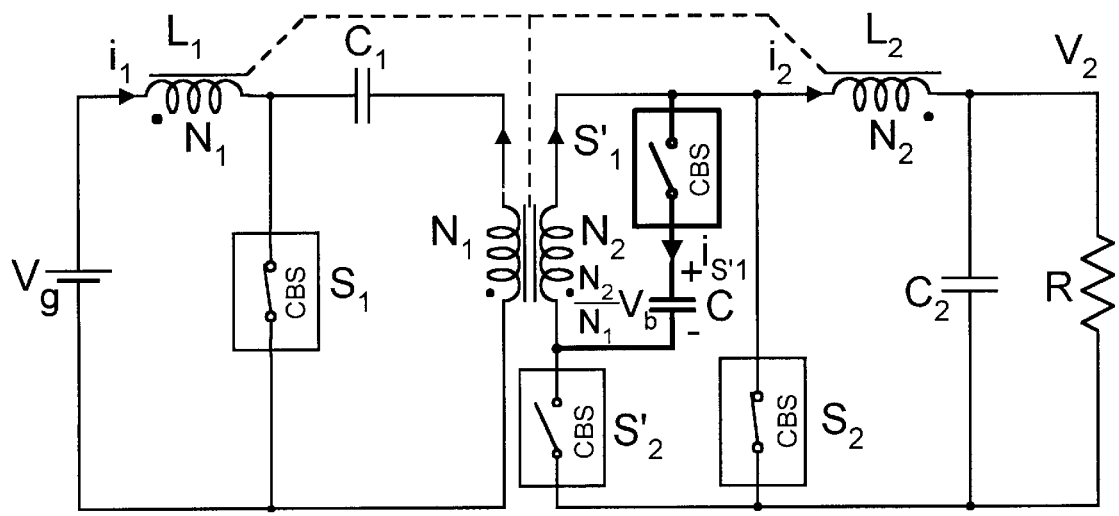
Figure 48:
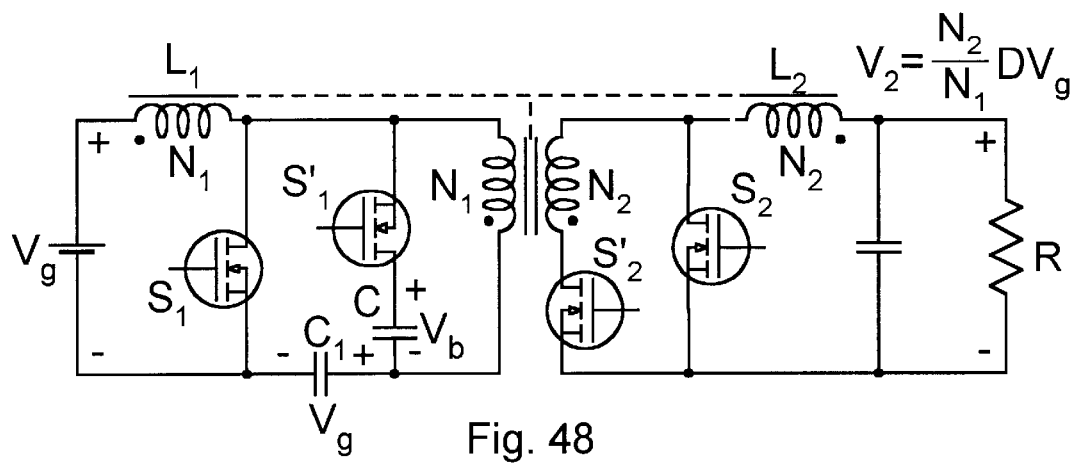
FIG. 48 illustrates another embodiment with all MOSFET implementations of the converter in FIG. 44e.

The absence of the common ground in the non-isolated configuration of FIG. 32*f* is resolved in its isolated counterpart of FIG. 44*e* in which the transformer primary is floating while source and load have separate grounds. This configuration has the added advantage that the primary side switches could be implemented with N-channel MOSFET devices in high-side configuration as shown in FIG. 48, while the auxiliary capacitor C has lower voltage rating $V_b$ as given by (14). The same advantages is retained in the isolated configuration of FIG. 44*f*, which is isolated version of its non-isolated counterpart in FIG. 32*k*. The isolated counterpart of converter in FIG. 32*g* is identical to the isolated converter in FIG. 44*a* except for the input capacitor $C_1$, which is now in the top leg. Clearly, both converters are obvious modifications of each other.

Figure 45:
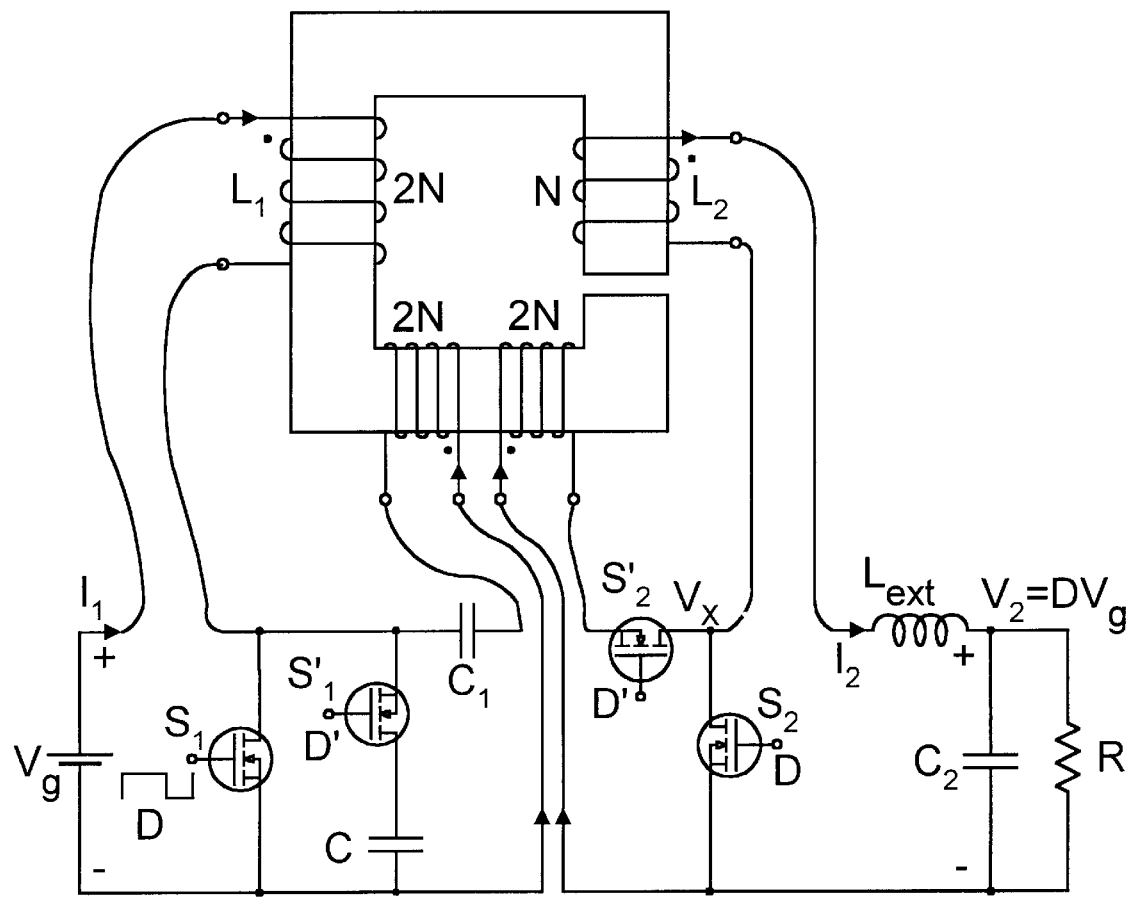
FIG. 45 illustrates the isolated version of the converter in FIG. 36b.
Figure 46:
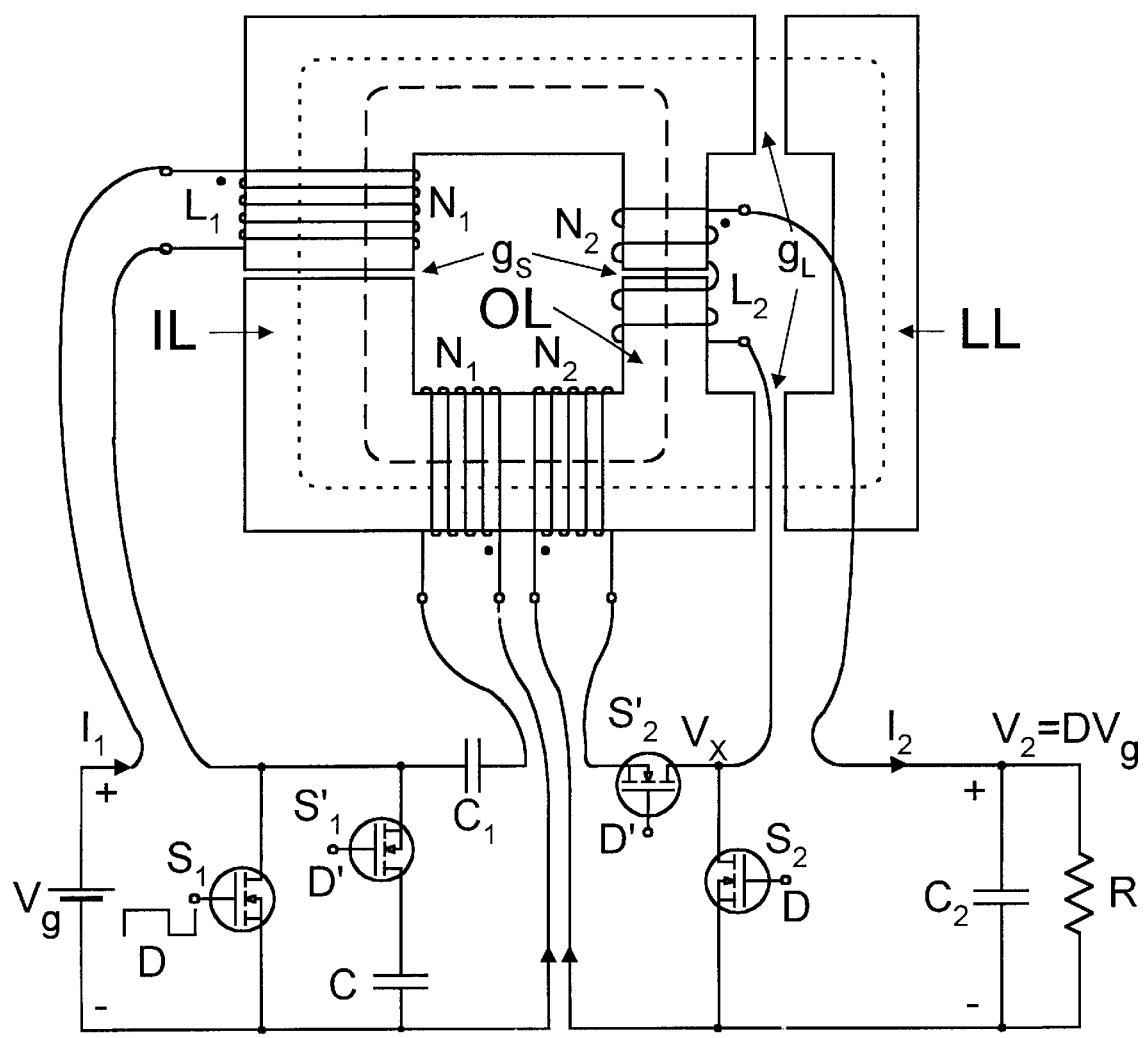
Figure 47:
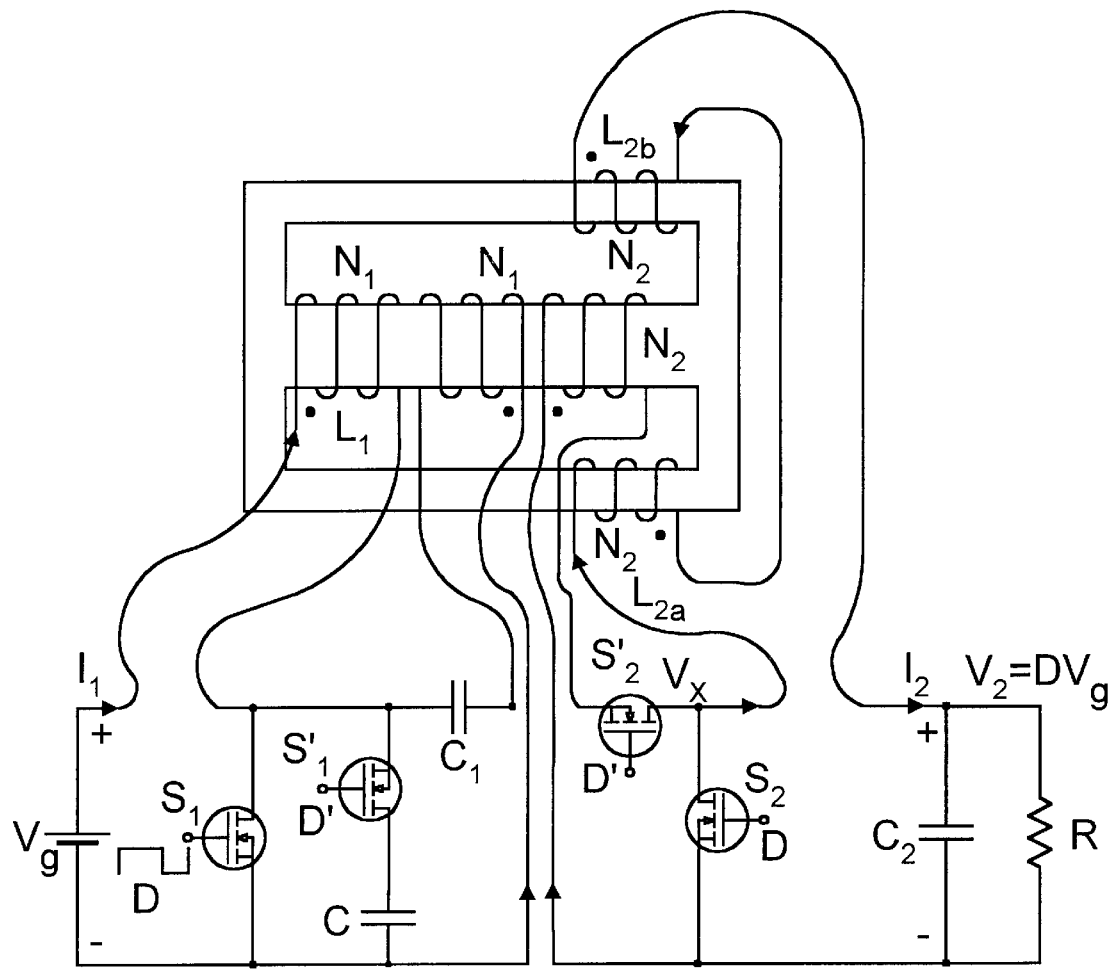
FIG. 47 illustrates the isolated version of the converter in FIG. 38.

Just as the non-isolated case had literally hundreds variants obtained using equivalent transformations, so there is equally large number of isolated converters obtained by simply replacing the middle inductor with an isolation transformer. Only a very few of those, will turn out not to have isolation as explained for the converters of FIG. 32*d* and FIG. 32*i*. The insertion of the isolation transformer did not change the fundamental properties of basic new non-isolated converter of FIG. 11*b*. Therefore, all magnetic realizations of the DC Transformer discussed at length relative to the non-isolated converter are equally applicable to the isolated counter-parts. For example, an external inductor can be added in series with output inductor as shown in FIG. 36*a*, to result in the same benefits in the isolated counter-part of FIG. 45. The isolated converter of FIG. 46 is implemented using the magnetic leakage leg in the same way as its non-isolated counter-part in FIG. 37*a*. Finally, the EE-like core structure with no air-gap is implemented in isolated converter of FIG. 47 in the same way as in the non-isolated counter-part in FIG. 38.

From the above discussions it is obvious that the insertion of the isolation transformer did not change the fundamental operation or the key features and performance characteristics of the converter. However, those variants in which the branch with complementary input switch and auxiliary capacitor is positioned between primary and secondary side, should be excluded. Nevertheless, there are several additional embodiments of the isolated extension of the present invention of FIG. 40*b*, which are either not available in the non-isolated configuration or have new interesting features. Shown in FIG. 48 is an embodiment of the isolated converter in which all four switches of FIG. 38*c* are replaced with N-channel semiconductor MOSFET switching devices. The primary side switches are so connected that a high-side driver IC circuit can be used, which is distinct practical advantage. Likewise, the secondary side MOSFET switching devices are both N-channel MOSFET's with a grounded emitter resulting in a practical direct drive for the secondary side MOSFET switching devices. Note also that the auxiliary capacitor C is at the same time in a position in which it has a low DC voltage rating. Note: The voltage on capacitor C is even lower if the branch consisting of switch S'$_1$ and capacitor C is connected in parallel with the input inductor $L_1$. However, in this solution the input current will contain the current flowing in this branch plus the input inductor current and thus, will no longer be ripple free.

Figure 49A:
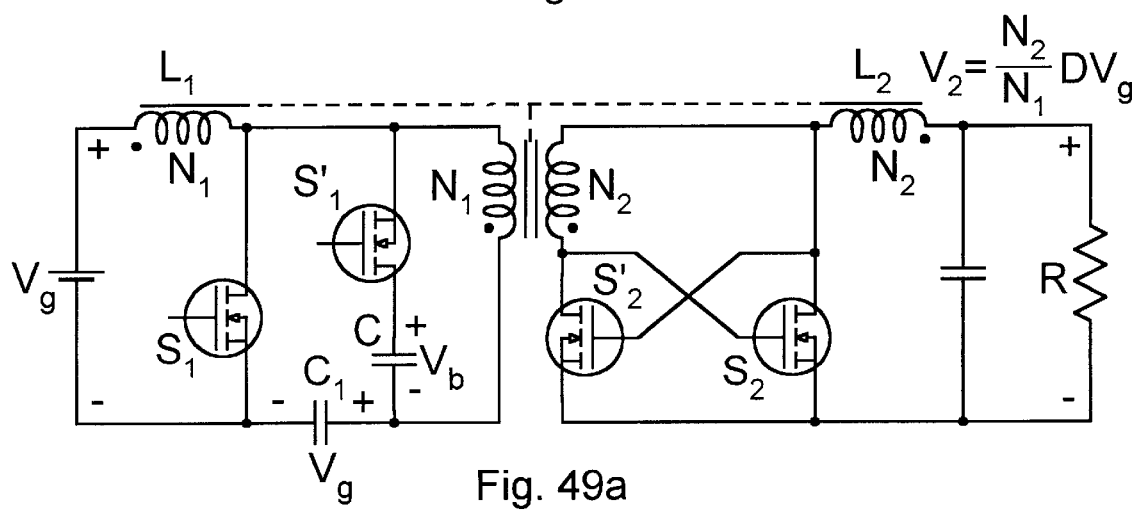
FIG. 49a illustrates a self-driven embodiment of the converter in FIG. 48

If the drive and control circuitry to modulate the duty ratio of the input switch is on the primary side, then the secondary side MOSFET switches present somewhat of a problem to drive: both corresponding drive signals must be transferred from the primary side to the secondary side and isolation in the drive control must be provided. Furthermore, once the drive signal is provided on the secondary side, drive power for the secondary side drive circuitry must also be provided, which results in a complex and costly solution. Thus, it is a distinct practical advantage if the secondary side switches can be "self-driven", that is that the existing switching converter circuitry can be used to provide the correct drives without any addition of control or power circuit components. One such "self-driven" configuration is provided with another embodiment of the present invention displayed in FIG. 49*a*. The secondary side of the transformer already provides a right drive waveform, provided the connection is made as in FIG. 49*a*; the gate of output MOSFET switch $S_2$ is connected to the drain of the complementary output MOSFET switch S'$_2$, while the gate of the complementary output MOSFET switch S'$_2$ is connected to the drain of the output MOSFET switch $S_2$. Thus, turning ON and OFF primary switching devices will automatically generate the correct drive waveform on the transformer secondary to drive the output MOSFET switching devices. Thus, the complex drive and control circuit is eliminated.

Figure 49B:
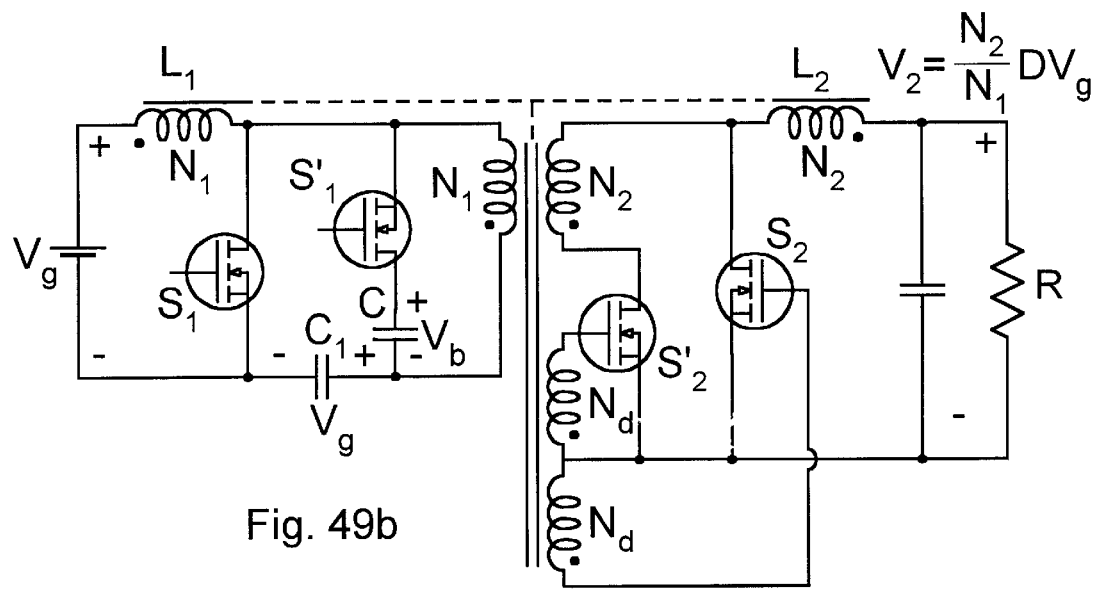
FIG. 49b illustrates a self-driven embodiment of the converter in FIG. 48 with additional drive windings $N_d$ on the isolation transformer.

Another "self-driven" embodiment of the present invention is shown in FIG. 49*b* in which additional drive windings are wound on the same magnetic core of the Isolated DC Transformer. Each drive winding number of turns $N_d$ and polarity of the windings is selected so as to provide the optimum, out-of-phase drive for the two output MOSFET switches. Once again, the complex drive and control circuitry is eliminated and circuit is significantly simplified. It should be noted, that despite such circuit simplification, most of the soft-switching benefits discussed in the next section are still available in this simpler drive implementation. Finally, in comparison with the "self-driven" configuration of FIG. 49*a*, the configuration of FIG. 49*b* is more flexible since the drive turns can be chosen to optimize the drive requirements.

Figure 50:
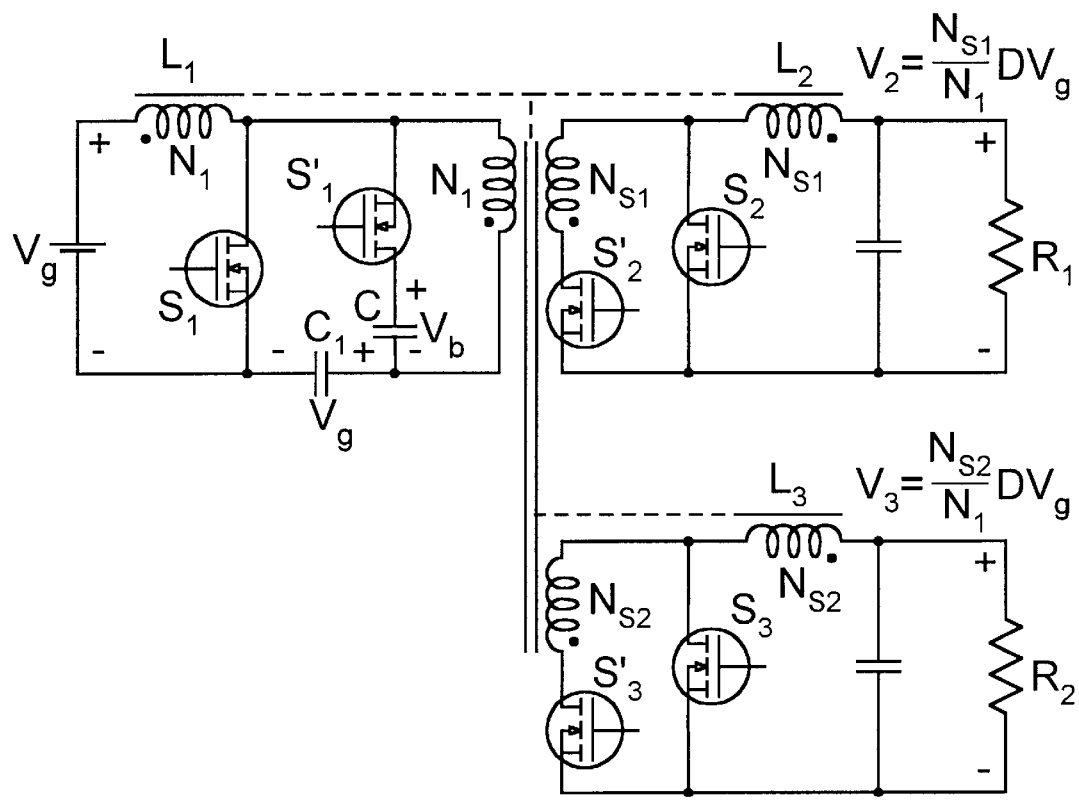
FIG. 50 illustrates a two-output embodiment of the converter in FIG. 48.
Figure 51:
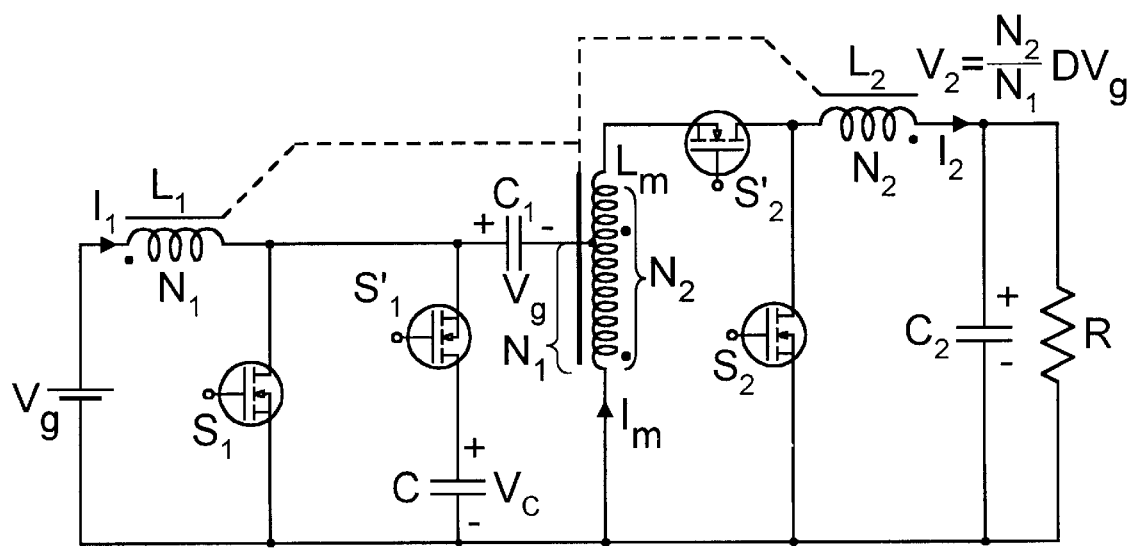
FIG. 51 illustrates another embodiment of the present invention using an autotransformer.

Once the isolation transformer is implemented, multiple outputs can be provided, and each separate output can be scaled by the appropriate transformer turns ratio, such as illustrated in FIG. 50. Note that, as long as the number of turns of the output inductor and the transformer secondary of the second output are the same, the net DC ampere-turns are again zero. Thus, once again, the magnetic core without any air-gap can be utilized for this multiple output converter of FIG. 50. Finally, since each output is isolated, by choosing appropriately the output ground for the second output, a negative polarity output voltage can be obtained as well. In some application where isolation is not required and a positive output voltage polarity is needed from a positive input voltage source, it is beneficial to use another embodiment in which an autotransformer replaces isolation transformer, such as shown in FIG. 51. As in any autotransformer connection, primary and secondary windings share some common number of turns, such as $N_1$ in FIG. 51. This configuration is more efficient than the fully isolated version. As shown in FIG. 51, only one winding with number of turns $N_2$ needs to be provided for the autotransformer, since primary winding is just using a tap at $N_1$ turns. In configuration shown in FIG. 51, $N_2 > N_1$ and turns ratio provides a voltage step-up. However, when $N_2 < N_1$ (secondary winding uses a tap on the primary winding), an additional voltage step-down is obtained. In addition the AC copper losses are reduced, since the single autotransformer winding has also lower RMS current. An additional voltage scaling of output DC voltage is obtained, just as in the isolation transformer case. Note that zero total DC ampere-turns are also preserved in the autotransformer extension of FIG. 51 under analogous condition to the isolating case: the output inductor must have the same number of turns $N_2$ as autotransformer secondary, while the input inductor must have the same number of turns $N_1$ s the primary of the autotransformer.

Figure 52:
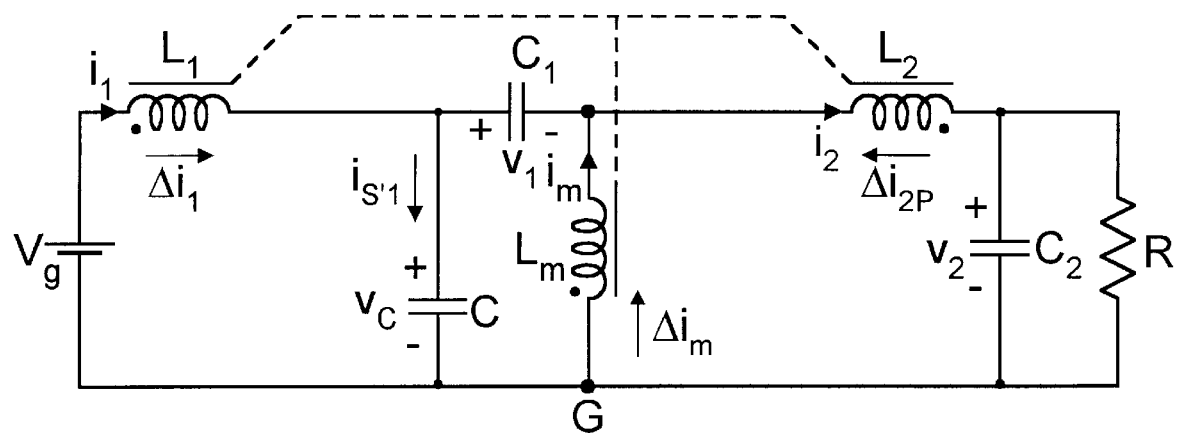
FIG. 52 shows that the current of complementary input switch is equal to the sum of the three inductor ripple currents which are all in phase with one another.

Lossless Switching Detailed Description
Fourth Fundamental Property of the Converter The novel lossless switching method is made possible by the unique shape of the input switch and complementary input switch currents and especially their values at the beginning and at the end of each of the two transition intervals. To establish those values, we will first determine the actual shape and characteristic of the complementary input switch current from the converter circuit during the State-2 interval shown in FIG. 52. Even though the converter circuit is shown with three inductors coupled, we will initially assume that the three inductors are not coupled, and then afterwards discuss the effect of coupling.

The relative polarities of the AC voltages on three inductors were established earlier in reference to the dot marked ends of the three inductors. The three ripple currents designated in FIG. 52 as $\Delta i_1$, $\Delta i_m$, and $\Delta i_{2P}$ are flowing into the dot-marked ends, hence, they are in phase simultaneously (increase during State-1 interval and decrease during State-2 interval). The sum $i_\Sigma$ of the three ripple currents at the node G (ground) in FIG. 52 yields:

$$i_\Sigma(t) = \Delta i_1(t) + \Delta i_m(t) + \Delta i_{2P}(t) \qquad (28)$$

where $\Delta i_{2P}(t) = -\Delta i_2(t)$, with $\Delta i_2(t)$ as defined earlier in (8) and (10). This sum $i_{93}$ (t) is displayed in FIG. 53a. The complementary input switch current $i_{s'1}$ is, however, equal to this current $i_\Sigma(t)$ only when this switch is closed during State-2 interval and is zero during State-1 intervals as displayed in FIG. 53b. The key characteristic of this waveform is that there is always a positive value $I_P$ at the transition from State-1 to State-2 and a negative value $I_N$ at the transition from State-2 to State-1, where their magnitudes are equal, that is, $I_P \times I_N$.

This waveform feature is maintained for any operating duty ratio D and any DC load current $I_2$ and even when all three inductor windings are coupled magnetically. The magnetic coupling potentially could change the phase of the ripple current on any of the three windings. In the earlier part on DC Transformer it was shown how the output ripple current could be adjusted to zero. Clearly, then, the output ripple current could, for example be made to change the phase to either in-phase or out-of-phase ripple depending on coupling adjustment. This raises at least the possibility that such out-of-phase ripple current could be so large in magnitude as to overcome the other two in-phase ripple currents and possibly even make the complementary input switch ripple current become out-of-phase to the one shown in FIG. 53b, that is with $I_P$ negative and $I_N$ positive. This is, however, not possible, due to the following fundamental property of the magnetically coupled circuit:

The magnetizing inductance ripple current of the coupled-inductor structure is identical to the sum of the three ripple currents of separate inductor windings for any magnetic coupling among the inductors windings. The different coupling only effects the phase relationship and magnitude of the individual ripple currents but not their sum, which remains invariant under any coupling.

Figure 53A:
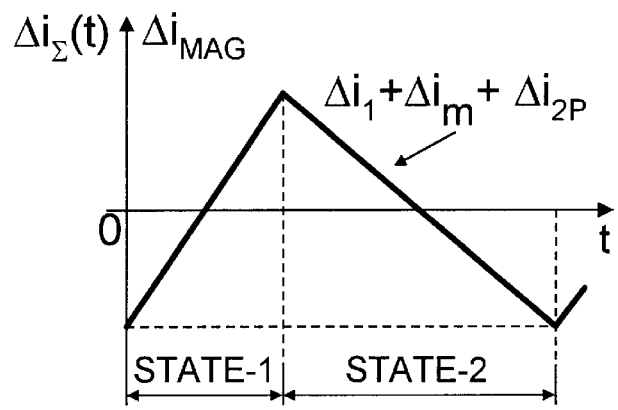
FIG. 53a illustrates the sum of the ripple currents of three coupled-inductor windings.
Figure 53B:
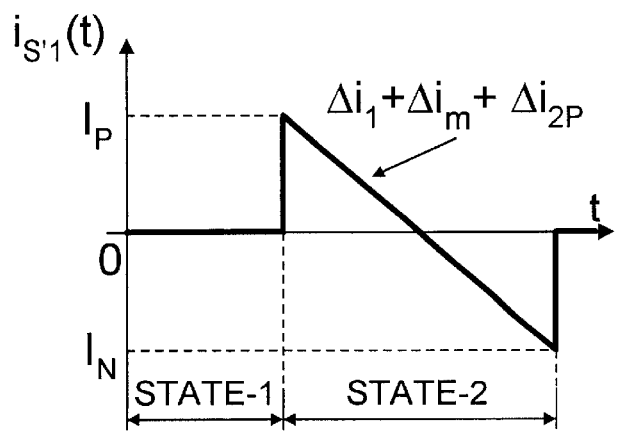
FIG. 53b shows that the current of complementary input switch is zero in State-1 interval and is equal to the sum of three coupled-inductor ripple currents in State-2 interval.

Thus, even if any one or two windings produce out-of-phase ripple currents, the third winding will have such in-phase ripple current, so that the total sum of all three ripple currents still stays the same and equal to the one displayed in FIG. 53a, while the complementary input switch current stays the same as one displayed in FIG. 53b. This is also the reason why the two current peaks of the waveform in FIG. 53b are so designated: $I_P$ stands for positive peak and $I_N$ stands for negative peak. Such invariant characteristic waveform of the complementary input switch current is essential for the lossless switching discussed below and is considered a fourth fundamental property of this novel converter.

Composite Current of Two Input Switches

Figure 54A:
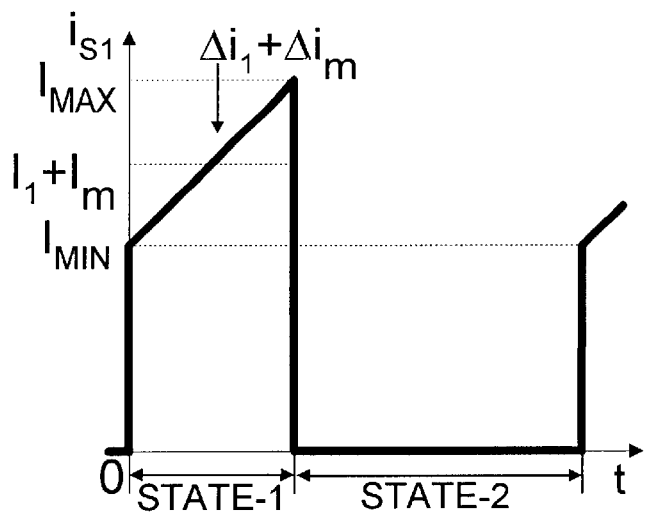
FIG. 54a illustrates timing diagram of the input switch current.

The directions of input switch current $i_{S1}$ and complementary input switch current $i_{S'1}$ are defined in the converter of FIG. 11b. From the converter model in FIG. 20a for State-1 interval, the input switch current $i_{S1}$ is equal to the sum of input inductor current $i_1$ and middle inductor current $i_m$. Thus, the input switch current displayed in FIG. 54a has the following salient features:

1. At the beginning of State-1 interval it has positive value designated $I_{min}$;
2. At the end of State-1 interval it has a higher positive value designated $I_{max}$.

Figure 54B:
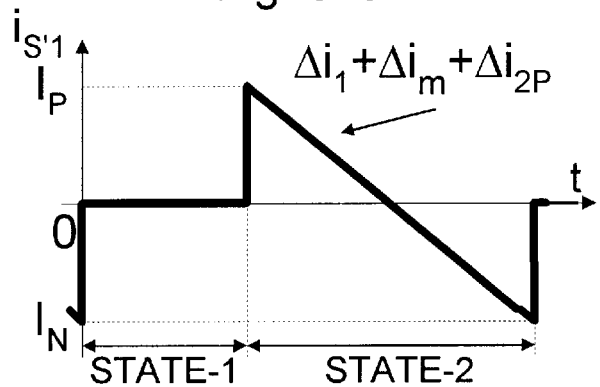
FIG. 54b illustrates the timing diagram of the complementary input switch current.

The current of the complementary input switch is displayed in FIG. 54b and has the following salient features:

1. At the beginning of State-2 interval it has a positive value designated $I_P$;
2. At the end of State-2 interval it has a negative value designated $I_N$.

For understanding of the lossless switching operation of the special significance is the sum of the input switch current and complementary input switch current, which is given a special name, the composite current, for easier future reference. The composite current $i_{CC} = i_{S1} + i_{S'1}$ is displayed in FIG. 54c and has the following salient features:

1. During transition between State-1 and State-2 it changes from $I_{max}$ to $I_P$;
2. During transition between State-2 and State-1 it changes from negative $I_N$ to positive $I_{min}$.

To highlight the above transition changes, the composite current is shown in thick lines during the transition changes. Therefore, the (1–2) transition will start with positive current $I_{max}$ and end transition with positive current $I_P$, while transition (2–1) will start with negative current $I_N$ and complete transition with positive current $I_{min}$.

Converter Circuit Models and Assumptions For Two Transition Intervals.

Figure 54C:
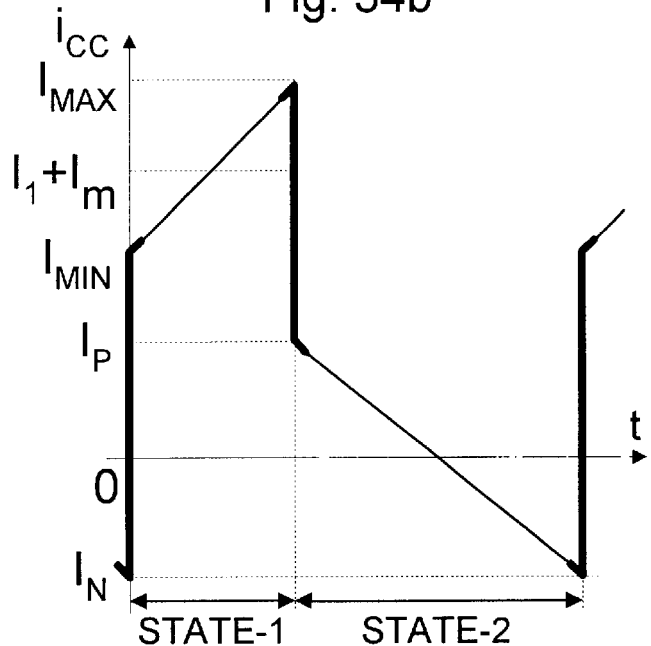
FIG. 54c is a timing diagram of the composite current comprising the sum of input switch current and complementary input switch current derived from diagrams in FIG. 54a and FIG. 54b.

To fully understand the switching operation of the converter and to improve upon hand-switching operation, circuit models are needed for the two transition intervals, (1–2) transition and (2–1) transition. These circuit models together with the composite current of FIG. 54c are used to fully describe the converter circuit behavior during both transitions. For the first order analysis, since the transition intervals are short in comparison to the State-1 and State-2 intervals, the following assumptions can be made:

1. MOSFET transistor controllable switches is modeled as ideal switch in parallel with a parasitic capacitance and parasitic body-diode;

2. All current rectifiers (diodes) are modeled as one-quadrant switches in parallel with their parasitic capacitances.
3. The inductance values of three inductors $L_1$, $L_2$, and $L_m$ are sufficiently large to keep instantaneous currents $i_1$, $i_2$, and $i_m$ constant during the transition intervals;
4. The capacitances C, $C_1$, and $C_2$ are sufficiently large to keep voltages across them constant throughout the switching cycle, and hence are also constant during the transition intervals and equal to their DC voltage values.

Operation Without Resonant Inductor and Stalling Condition

Figure 55A:
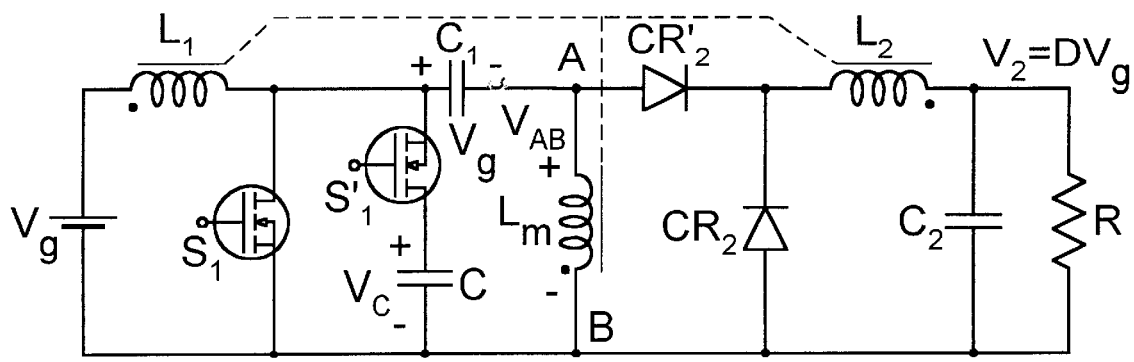
FIG. 55a illustrates a non-isolated converter of present invention with no resonant inductor and rectifier diodes used for both output switch and complementary output switch.
Figure 55B:
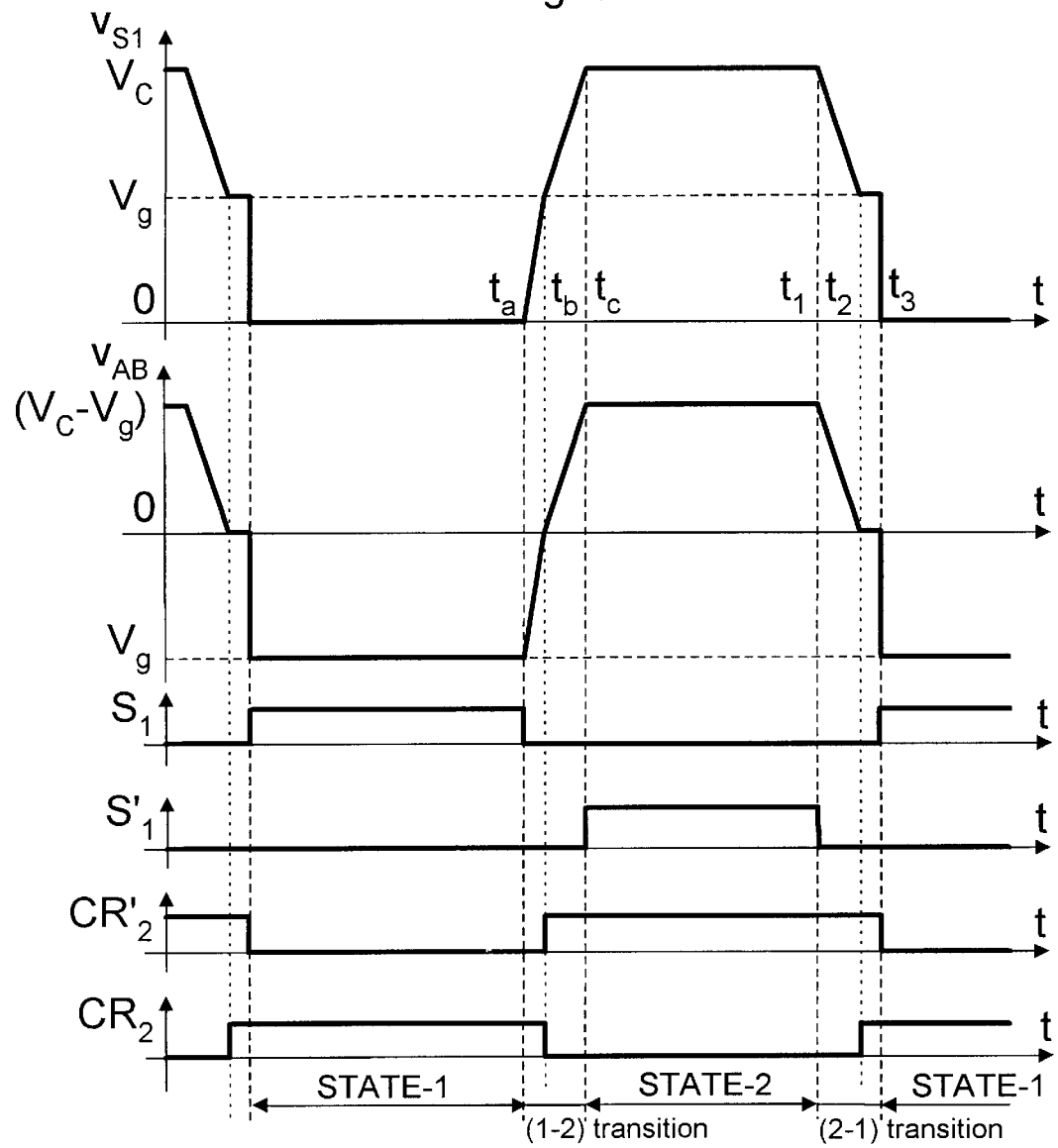

First the simplest implementation with the two current rectifiers (diodes) for output switch and complementary output switch and with no resonant inductor is analyzed such as converter in FIG. 55a. Specifically, the converter operation during the two transition intervals created by the dead-time between controllable MOSFET switches, which are both OFF during the two transitions as seen in FIG. 55b waveforms. The rectifier diodes operate surprisingly differently in the two transitions, as explained below.

The (1–2) transition starts at instant $t_a$ when the input switch $S_1$ turns OFF and is characterized by a smooth changeover at instant $t_b$ at which the two diodes practically simultaneously and automatically change over their previous state ($CR_2$ turns OFF and $CR'_2$ turns ON) apparently in the response to the converter circuit conditions. This, in turn, allows further charge of the input switch parasitic capacitance until input switch voltage reaches $V_C$ at instant $t_c$ and further discharge of the parasitic capacitance of the complementary input switch until zero voltage is reached and its parasitic body-diode is turned ON to complete the transition. Note that the middle inductor voltage waveform $V_{AB}$ in FIG. 56b is identical to the input switch voltage waveform, except its voltage levels are shifted by $V_g$, thus resulting in zero voltage at instant $t_b$.

A qualitatively different behavior takes place during the (2–1) transition. The (2–1) transition starts at instant $t_1$ when the complementary input switch $S'_1$ is turned OFF. The middle inductor voltage becomes zero at instant $t_2$. This time, however, the middle inductor voltage "stalls" at zero voltage level at instant $t_2$, thus keeping both diode rectifiers ON, as seen by the flat zero voltage level of the middle inductor in FIG. 55b. Correspondingly, the input switch stalls at the voltage $V_g$. Clearly, automatic switchover of the diodes conduction at the instant when the middle inductor voltage reaches zero is prevented as explained by the model in the next subsection. This stalling has no useful function and must be terminated by turning ON input switch at instant $t_3$. This will, in turn, impose reverse bias voltage $V_g$ of the input capacitance $C_1$ across the complementary rectifier $CR'_2$ and turn it OFF as seen in the waveforms of FIG. 55b. Clearly, the input switch is turned ON with voltage $V_g$ across it, which would result in considerable hard-switching losses, especially for higher input voltages. Furthermore, the input switch is also preferably turned ON at instant $t_2$, so that the "stall" interval could be eliminated.

Smooth (1–2) Transition and Its Modeling

The following fundamental relationship between voltages on input switch and complementary input switch holds true not only during the State-1 and State-2 intervals, but also during the (1–2) and (2–1) transition intervals:

$$V_{S1}(t)+V_{S'1}(t)=V_C \quad (29)$$

During (1–2) transition interval, the lossless switching objective is to reduce the voltage on complementary input switch $V_{S'1}$ from $V_C$ level to zero. From (29), the voltage on input switch will at the same time be increased from zero to $V_C$ voltage level.

Figure 56A:
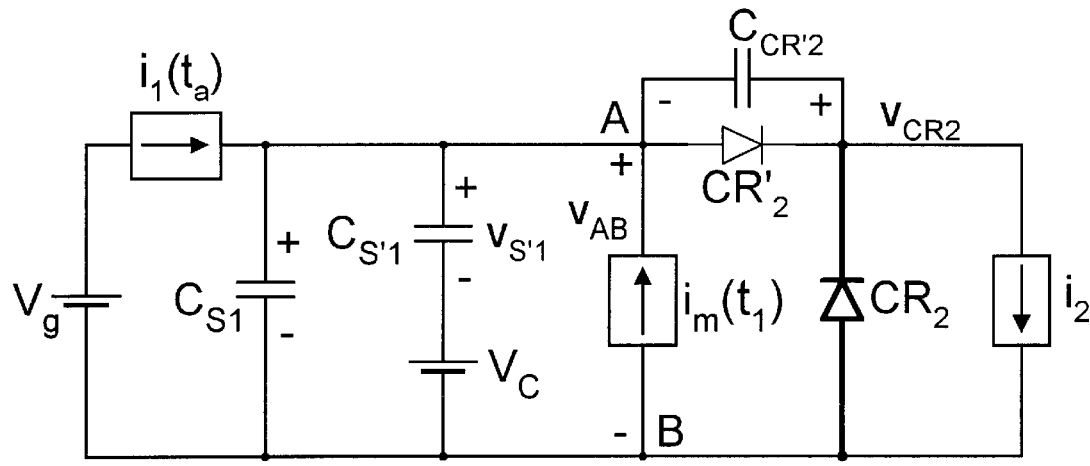
FIG. 56a shows an equivalent circuit model for the converter in FIG. 55a during the first subinterval of the (1-2) transition interval.
Figure 56B:
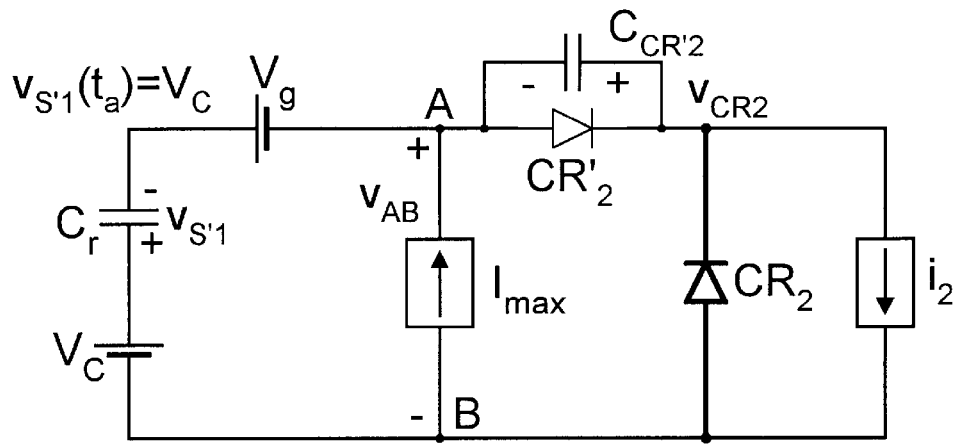

With above modeling assumptions, all three inductors of FIG. 55a are replaced with the constant current sources with values $i_1$, $i_m$, and $i_2$ as in model of FIG. 56a and all three capacitors are replaced with constant voltage sources with corresponding DC voltages obtained from the steady state results (5). The next step is to combine the DC current sources of input inductor and middle inductor into one equal to $I_{max}$ as seen in FIG. 56b. The input switch and complementary input switch, which are both turned OFF during (1–2) transition, are represented by their parasitic capacitances $C_{S1}$ and $C_{S'1}$, respectively. The parasitic capacitances of the input switch and complementary input switch are working effectively in parallel at all times (one is discharging, while the other is charging). Therefore, they can be replaced by an equivalent capacitance $C_T$, which is given by:

$$C_r=C_{S1}+C_{S'1} \quad (30)$$

Figure 56C:
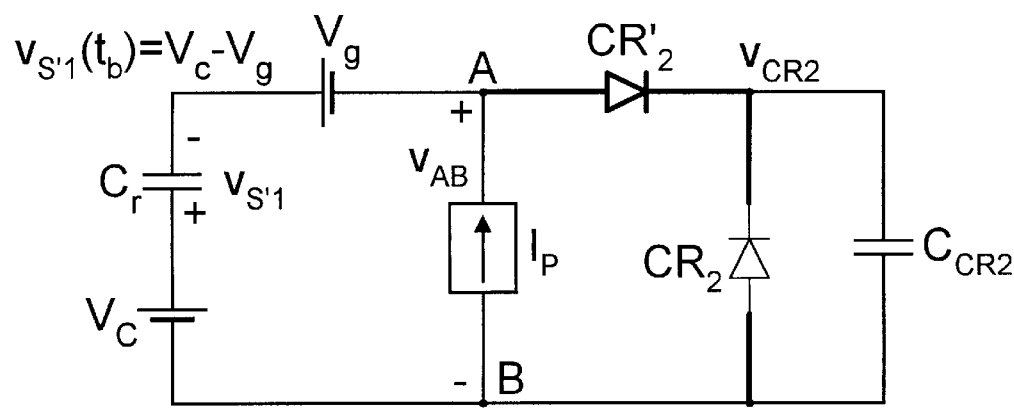
FIG. 56c shows equivalent circuit model for the second subinterval of the (1-2) transition interval.

The (1–2) transition starts when the input switch is turned OFF at instant $t_a$, which results in the equivalent circuit model of FIG. 56b. Note that the diode complementary output switch $CR'_2$ is OFF and is thus shown in thin lines, while the diode output switch $CR_2$ is ON and is thus shown in thick lines. As seen from the simplified model in FIG. 57a with DC sources shorted, the parasitic capacitance of the complementary input switch and the parasitic capacitance of the complementary output switch discharge at the same rate given by $I_{max}/(C_r+C_{CR'2})$ as displayed in FIG. 57c until the voltage on the complementary output switch reaches zero at instant $t_2$ and this $CR'_2$ switch is turned ON with zero switching losses. From the composite current at (1–2) transition of FIG. 54c, the current source at this transition has the same direction, except its magnitude is changed from $I_{max}$ to $I_P$ to result in the equivalent circuit model to FIG. 56c. Note how the current source $I_P$ is of such direction to turn OFF the output current rectifier $CR_2$ and charge its parasitic capacitance. The simplified version of this equivalent circuit with DC sources shorted as shown in FIG. 57b clearly shows how this current source continues to charge the parasitic capacitance of the output diode rectifier at a rate given by $I_P/(C_r+C_{CR2})$, until the final OFF voltage $V_C-V_g$ is reached. The complementary input switch, however, discharges at this slower rate (and input switch capacitance charges at the same slower rate as shown by dotted lines in FIG. 57c) until reaches zero voltage at which time the parasitic body diode of complementary input switch $S'_1$ turns ON with zero switching losses. As a result, (1–2) transition is completed with both complementary input switch and complementary output switch turning ON at zero voltage with zero switching losses due to lossless exchange of the charge between the three parasitic capacitances. This is, however, not the case for (2–1) transition, which cannot be completed losslessly in this simplest form as shown next.

Stalled (2–1) Transition and Its Modeling

First the simplified model of the (2–1) transition is developed as in FIG. 58a. From FIG. 54c, the composite current is negative and equal to $I_N$ at the beginning of (2–1) transition, so it is modeled as DC current source $I_N$ as in FIG. 58a. Note how this current source already has the right direction so that it can start to discharge the parasitic capacitance of the input switch. With the complementary output switch $CR'_2$ turned ON, this current source also discharges the parasitic capacitance of output switch at the same rate given by $I_N/(C_r+C_{CR2})$. Since the input switch blocking voltage is $V_C$ the parasitic capacitance of the input switch starts the discharge from initial voltage $V_C$. From equivalent circuit model in FIG. 58a the fundamental relationship among instantaneous voltages $v_{S1}$ of the input switch and $v_{CR2}$ of the output switch during the transition interval is:

$$v_{S1} = v_{CR2} + V_g \tag{31}$$

Thus, when the input switch parasitic capacitance starts discharging at instant $t_1$ from the initial value $V_C$, from (31) the output switch parasitic capacitance starts simultaneously discharging from lower initial voltage level ($V_C - V_g$) as seen on the waveforms of FIG. 58d. Since both capacitors discharge linearly at the same rate of $I_N/(C_r + C_{S2})$, the output switch capacitance will discharge to zero voltage level at instant $t_2$, and the output rectifier switch is turned ON. At that instant, the parasitic capacitance of input switch is also discharged to lower voltage level $V_g$ resulting in the middle inductor voltage $v_{AB}$ equal to zero, which will stay at zero and keep the output rectifier diode ON and in "stalling" condition. Note that this time there is, unlike in (1–2) transition, no mechanism to automatically turn OFF the complementary output rectifier, since the current source direction in model of FIG. 58b is in opposite direction of one needed to turn OFF that diode. Once again, from the composite current of FIG. 54c at (2–1) transition, the composite current changes from negative $I_N$ to positive current $I_{min}$ once the output switch is turned ON. The positive current direction as seen in FIG. 58b is such that it tends to charge parasitic capacitance of complementary output switch so that its anode terminal would be positive, which, in turn, would keep that diode ON. Clearly, an impasse is reached, and in order to break this stalling condition, an external control action is needed. This is provided by turning ON input switch at time $t_3$, which as in FIG. 58c puts a negative voltage source $V_g$ across the complementary output switch to turn it OFF and complete this transition in hard-switching way. Apparently, the desirable objective is to find a way to completely discharge the parasitic capacitance of the input switch to zero voltage in a lossless way as shown in next two sections.

Non-isolated Converter with Resonant Inductor and Soft-switching

Figure 59A:
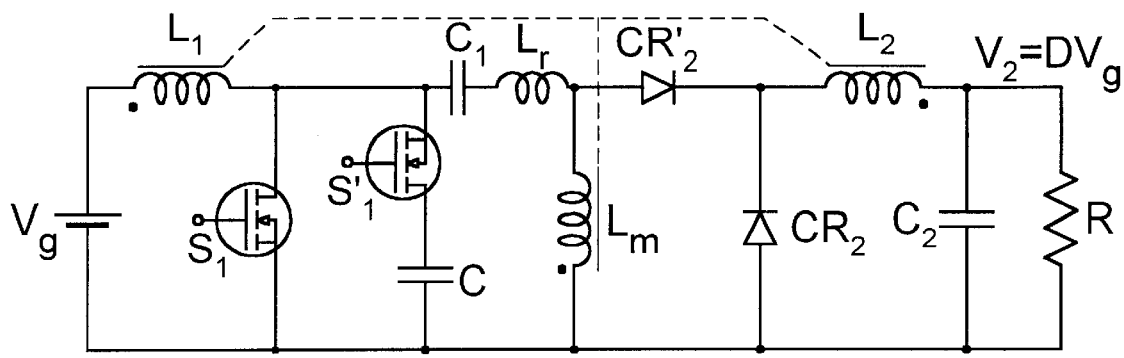
FIG. 59a shows an embodiment of the present invention with resonant inductor $L_r$.
Figure 59B:
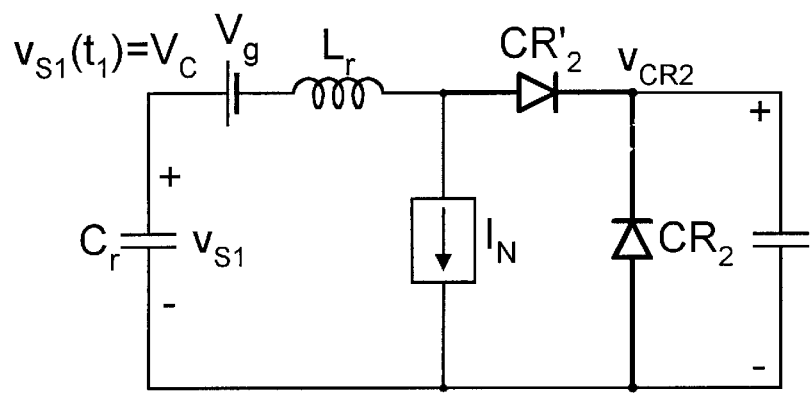
FIG. 59b shows a circuit model of the converter in FIG. 59a for a resonant subinterval of the (2-1) transition interval.

The first step toward reducing the hard-switching voltage is to introduce an external resonant inductor $L_r$ in series with input capacitor as in FIG. 59a. While this will keep (1–2) transition lossless, it will also have a major effect on (2–1) transition as described next. In fact, the first linear discharge interval will remain the same as without resonant inductor as seen in FIG. 60c. Although the equivalent circuit model in FIG. 60a has an additional resonant inductor compared to the model of FIG. 58a, the current source $I_N$ is dominating the discharge and at instant $t_2$ turns ON the output switch to result in the model of FIG. 59b. This, in turn, results in the simplified model of FIG. 59c, in which resonant inductor $L_r$ and resonant capacitor $C_r$ form a series resonant circuit, whereas the resonant frequency $\omega_r$ is given by:

$$\omega_r \times 1/\sqrt{L_r C_r} \tag{32}$$

Note the role of the DC voltage source $V_g$ within the resonant circuit. If there are any losses in the resonant circuit (either resistance of the inductor or ESR of the resonant capacitor or both), the oscillations will after a large number of cycles cease and the voltage on the resonant capacitor will settle at DC voltage level $V_g$, which is exactly the voltage level at which the discharge of parasitic capacitance of the input switch was stalled in the previous case without resonant inductor. The actual total resistance of this series resonant circuit is in practice very small and practically negligible. Thus, the resonant discharge of the input switch parasitic capacitance will result in undamped oscillations as illustrated by dotted lines in FIG. 60c displaying sinusoidal voltage oscillations centered at the DC voltage level $V_g$. From FIG. 60c it is clear that resonant voltage oscillation can reduce the hard switching voltage below $V_g$ level. The first quarter cycle of the resonant oscillations brings the voltage down by amount $V_r$, where $V_r$ is the magnitude of the sinusoidal voltage oscillations. Clearly it is desirable that $V_r$ is as large as $V_g$ to fully discharge parasitic capacitance of input switch.

Figure 59C:
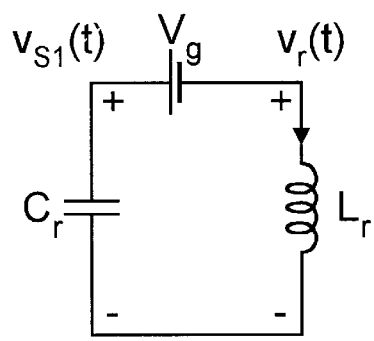
FIG. 59c shows the simplified model of circuit in FIG. 59b.

To solve for this magnitude, the resonant circuit of FIG. 59c is subject to two initial condition at the onset of oscillations at times $t_2$:

$$V_r(t_2) \times 0 \tag{33}$$

$$i_r(t_2) \times I_N \tag{34}$$

where $v_r(t)$ is the voltage across the resonant inductor $L_r$ as shown in FIG. 59c.

The solution of the series resonant circuit, which is a second order system, in general has two fundamental component, the sinusoidal voltage component and cosinusoidal voltage component in addition to the DC level $V_g$ and is thus given by:

$$v_{S1}(t) = V_g - V_r \sin\omega_r t + v_1(t_2)\cos\omega_r t \tag{35}$$

in which because of (33), the third cosinusoidal term disappears and (35) simplifies to:

$$v_{S1}(t) = V_g - V_r \sin\omega_r t \tag{36}$$

where amplitude $V_r$ of the sinusoidal oscillations is given by:

$$V_r = R_0 I_N \tag{37}$$

and where $R_0$ is characteristic impedance of the resonant circuit given by:

$$R_0 = \sqrt{L_r/C_r} \tag{38}$$

Clearly, as shown in FIG. 60c the input switch is best turned ON at instant $t_{min}$ when the voltage across it has reached the first minimum. Otherwise, if the turn ON is delayed until, for example, oscillations reach the first maximum, the hard switching voltage is increased to $V_g + V_r$ instead of decreased to $V_{g-Vr}$. Thus, the minimum hard-switching voltage $V_h$ attainable using the resonance is:

$$V_h = V_g - V_r \tag{39}$$

Evaluation of Efficacy of Resonant Discharge

The typical high voltage practical example given below and also used later for comparison with lossless switching and in experimental example is:

$$V_C = 575 \text{ V } V_g = 400 \text{ V } L_r = 27 \text{ }\mu\text{H } C_r = 237 \text{ pF } I_N = 0.285 \text{ A} \tag{40}$$

From above formulas one can calculate for this numerical example:

$$\omega_r = 12.45 \text{ MHz } R_0 = 339\Omega V_r = 95 \text{ V } V_h = 305 \text{ V} \tag{41}$$

In above example, the input switch voltage can thus only be reduced by $V_r = 95$ V below $V_g$ to result in hard-switching voltage of $V_h$=305 V. There are three parameters, however, which could be changed to increase the resonant voltage amplitude $V_r$.

First, the amplitude of sinusoidal resonant voltage can be increased in proportion to the ripple-current peak $I_N$. For example, if the ripple-current peak $I_N$ is increased four (4) times, the voltage reduction of $V_r$=380 V could be obtained to result in only $V_h$=20 V. Unfortunately, this would also result in sixteen (16!) times increase of conduction losses due to this large AC ripple current, which in practice may diminish most of the savings obtained by decrease of switching losses due to this soft-switching.

Second, the amplitude of the sinusoidal resonant voltage could also be increased proportionaly by increase of the characteristic impedance $R_0$. However, this may even more offsett reduction of switching losses due to much increased resonant inductance required. For example, to match the above fourfold increase of resonant voltage to $V_r$=380 V, fourfold increase in the characteristic impedance $R_0$ would be required, and from (38) the resonant inductance would have to be increased sixteen (16) times resulting in additional losses due to high resonant inductance. In addition, a large external resonant inductor will increase the converter size and also cause additional losses, which will again reduce the savings obtained by this method.

Third, from (38), the characteristic impedance $R_0$ can also be increased by decreasing the resonant capacitance. This, however, is already at the minimum value given in above example for specific high voltage switching MOSFET device and cannot be further reduced. To the contrary, as discussed later, external capacitor is often added across the input switch to increase resonant capacitance in order to make the (1–2) transition longer, so that fast switching devices will not interfere with that transition. This, however, will have just the opposite effect on (2–1) transition by reducing characteristic impedance and thereby reducing amplitude of sinusoidal oscillations.

Limitation of Single Resonant Voltage Component

The root of the diminished efficacy of the resonant discharge can be traced to the general expression (35), which indicated the presence of the two resonant voltage components.

However, the cosinusoidal component disappeared, since at the time $t_2$ when the resonant discharge was initiated, the parasitic capacitor voltage was already reduced to $V_g$ level, resulting in zero initial voltage on the resonant capacitance $C_1$. However, if we did not wait until output rectifier switch is turned ON at instant $t_2$, but have instead turned the output switch ON before that instance, the cosinusoidal voltage component of the resonant discharge will be restored and more effective resonant discharge made possible.

Isolated Converter with Lossless Switching

Figure 61A:
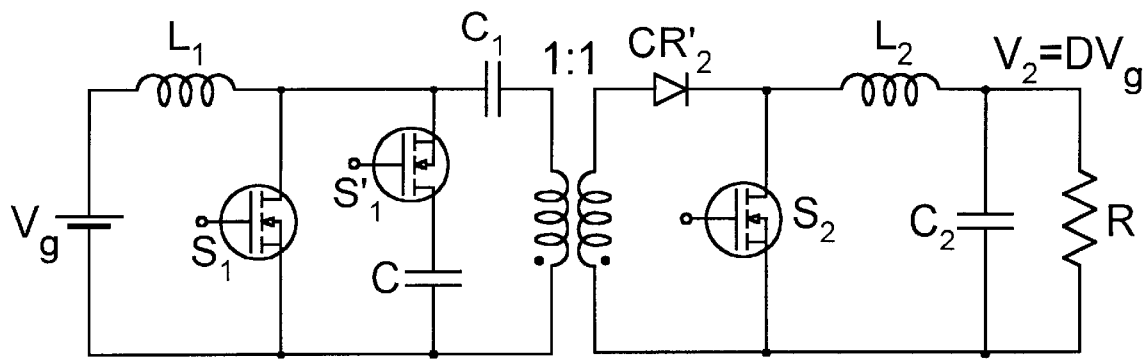
FIG. 61a shows an embodiment of the present invention with isolation transformer and FIG. 61b shows lossless switching sequence and timing control (thick lines) and its comparison with another embodiment with soft-switching control (dotted lines).
Figure 61B:
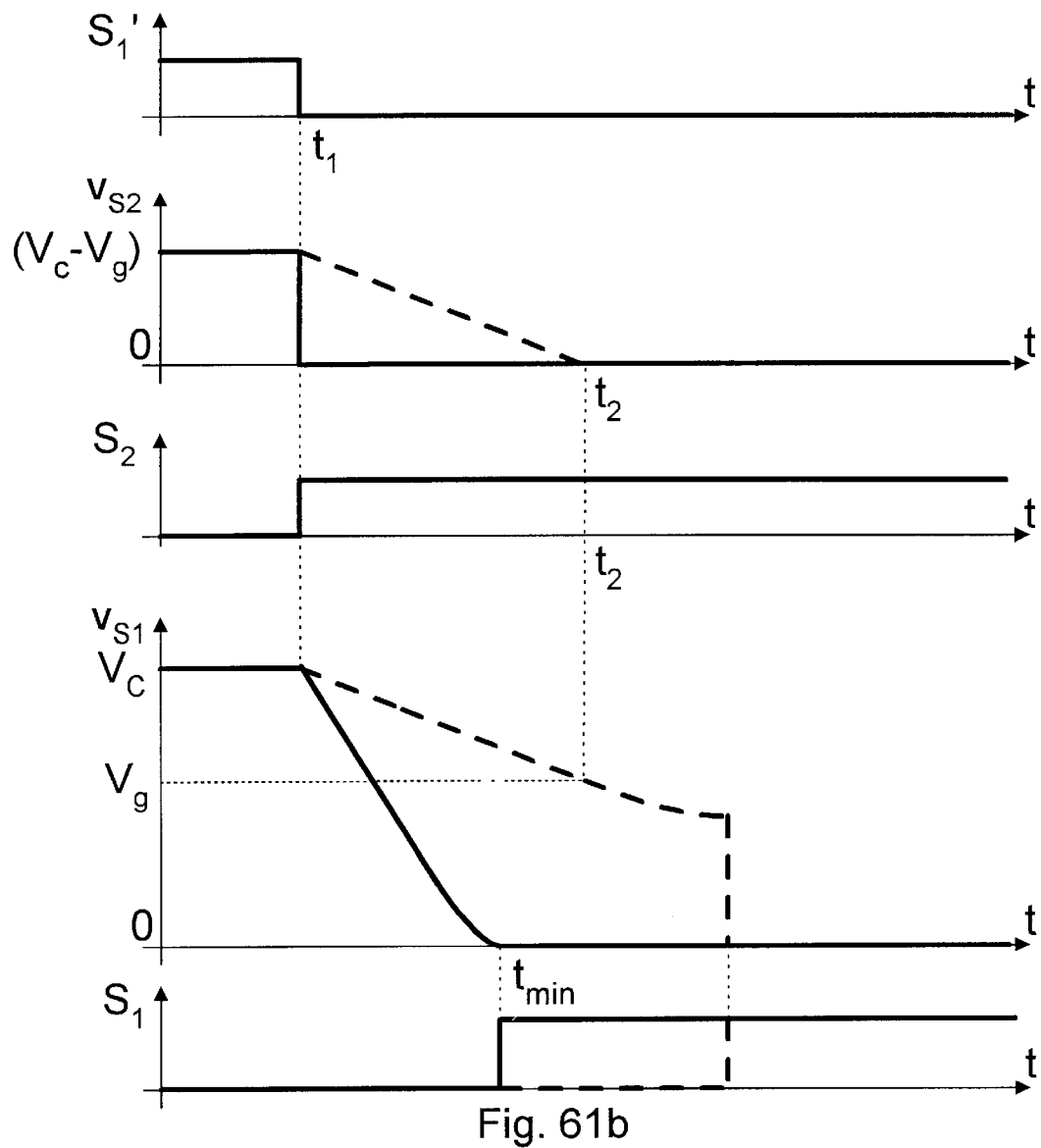

The non-isolated converter of FIG. 59a is modified to include 1:1 isolation transformer as in FIG. 61a. Note that the total leakage inductance of the isolation transformer reflected to the primary side in this isolated converter plays the role of the resonant inductor. Thus, the resonant inductor $L_r$ will model the leakage inductance L of the isolation transformer and all previous equations containing $L_r$ apply equally well to the isolated converter with leakage inductance. Another distinction is introduction of the controllable MOSFET for the output switch $S_2$, which can now be turned ON as desired even before time $t_2$. In fact, shown on FIG. 61b is the special case when this output switch is turned ON at the same instant $t_1$ when the complementary input switch is turned OFF to result in the characteristic waveforms shown in thick lines in FIG. 61b. The previous numerical example case was shown for reference purposes also in FIG. 61b with dotted lines. Note how just the change of the control drive to the output MOSFET switch resulted for the same case in a complete reduction of the input switch voltage to zero at $t_{min}$ hence in a complete lossless switching transition for the input switch, which was not attainable before under same converter circuit conditions.

Of course one can immediately argue that this has come at the heavy price, since the output switch now instead of turning at zero voltage as before (see dotted line case), is turned ON at substantial hard-switching voltage. In fact, the hard-switching voltage $V_{hh}$ for high-voltage output switch $S_2$ is now given by:

$$V_{hh}=V_C-V_g \qquad (42)$$

For example for duty ratio D=0.5, $V_C$=2 $V_g$ and the same hard switching voltage is obtained as before for non-isolated converter without resonant inductor, that is $V_{hh}$=$V_g$. This is, however, not the case for the most important practical applications: the isolated converter operated in medium to large step-down mode as shown next.

Primary Side vs. Secondary Side Hard-switching

In most practical applications, such as off-line switching power supplies, the AC input voltage is first rectified, resulting in DC voltage of 300 V at nominal AC line voltage and as high as 400 V DC voltage for the high AC line conditions. Since the nominal operating point of the converter is typically around D=0.5, only 2:1 step-down is effectively achieved through the duty ratio control of the converter. Thus, most of the voltage step-down is achieved by use of an isolation transformer with high step-down n:1 turns ratio such as, for example, n=27 for this 300 V input DC voltage in order to reduce it to 5 V or lower output DC voltages. Thus, 1:1 turns ratio transformer to FIG. 61a is replaced with n:1 step-down isolation transformer as in FIG. 62a. Note that the lossless switching performance of the (2–1) transition stays the same as in the previous case of a 1:1 isolation transformer, except for the hard-switching voltage on output switch $S_2$, which is now changed to:

$$V_{h1}=(V_C-V_g)/n \qquad (43)$$

where $V_{h1}$ is the hard-switching voltage at which the low voltage output switch on the secondary side is turned ON. For example, for $V_C-V_g$=400 V and n=27 V, $V_{h1}$=16.7 V.

In this high step-down practical design example of maximum 400 V DC input voltage, the input switch should have, for example, high voltage blocking rating of 800 V. On the other hand, for 5 V output DC voltage, the output switch voltage blocking rating need to be only 30 V. There is, however, a fundamental difference in switching performance characteristics between the high voltage switching device and low voltage switching devices. Even though high-voltage switching MOSFET devices have significantly lower parasitic capacitance compared to the low voltage switching MOSFET devices, the hard-switching losses of the low voltage devices are practically negligible in comparison to the hard-switching losses of the high voltage switching devices since losses are proportional to the square of the hard-switching voltage as per (4). The following example using practical devices data, best illustrates the point:

$$S_1 \text{STU10NB80S'}_1\text{STP4NB80FP}; V_{BV}\text{=800 V}, C_T\text{=237 pF}, V_{hh}\text{=} \\ \text{400 V}, P_{S1}\text{=13.3 W} \qquad (44)$$

$$S_2\text{STV160NF03 L}; V_{BV}\text{=30 V } C_{S2}\text{=2950 pF } V_{h1}\text{=16.7 V } P_{S2}\text{=} \\ \text{0.082 W} \qquad (45)$$

where $P_{S1}$ and $P_{S2}$ are hard-switching losses of the input high voltage switch and output low voltage switch, respectively, calculated from (4) and based on the switching frequency of 200 kHz and for a nominal 100 W converter. Despite the fact that low voltage output switch has over twelve (12) times larger parasitic capacitance than the input switch, its hard-switching losses are negligible representing only 0.6% of input device losses.

Figure 62A:
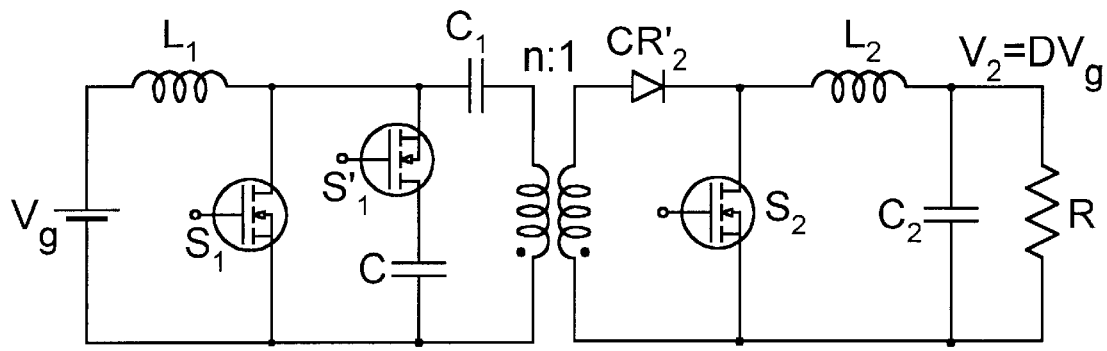
Figure 62B:
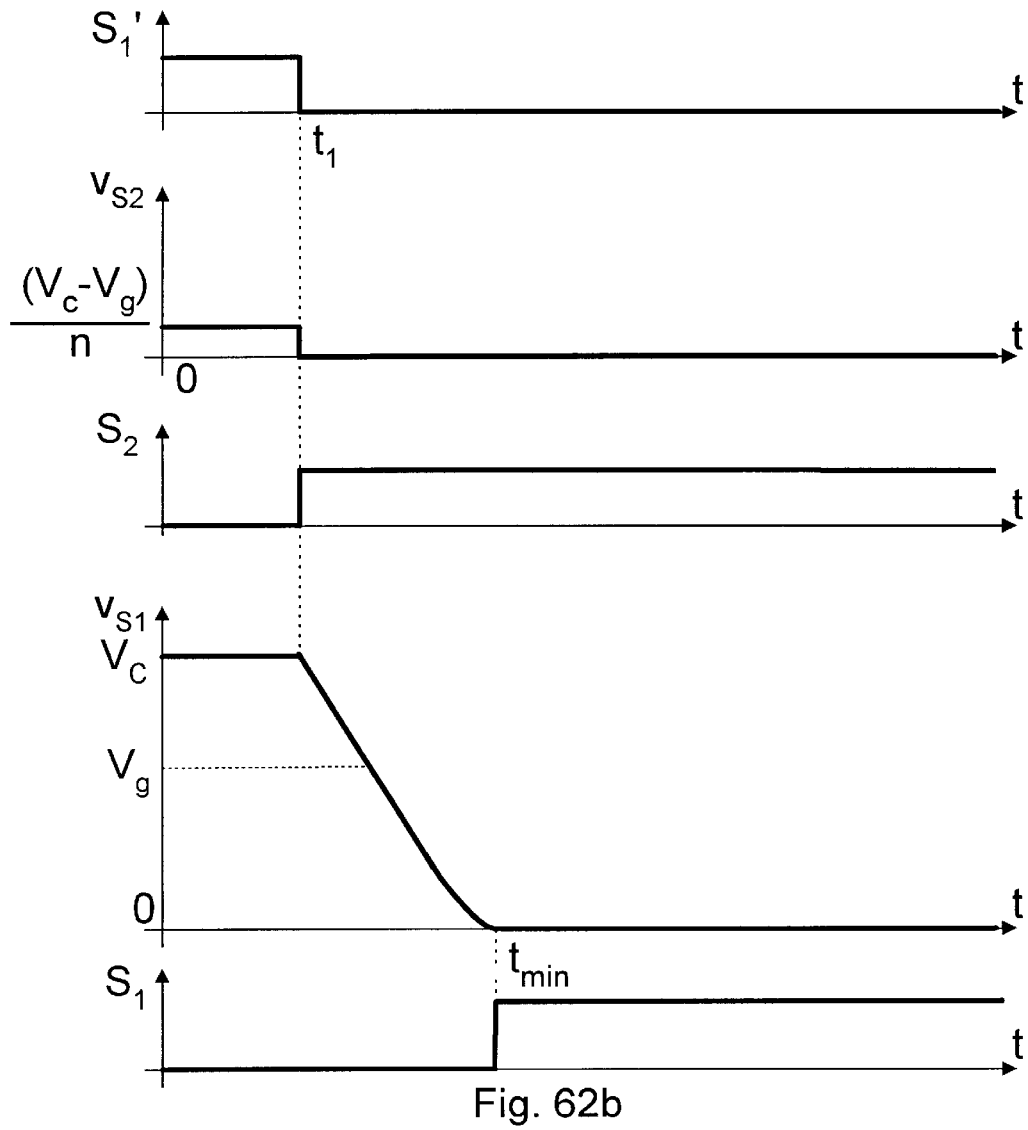

This comparison reveals that primary-side, high voltage switching devices contribute by far the most switching losses compared to the secondary-side, low voltage switching devices. This gives the primary motivation for the new type of lossless switching first introduced in the isolated 1:1 extension of the present invention of FIG. 61a, and fully justified in the high-step-down isolated converter FIG. 62a. The role of the controllable MOSFET output switch in converter of FIG. 62a is to move any hard-switching from the primary-side high voltage switching devices to the secondary-side, low voltage switching devices. This is accomplished by using the extra degree of freedom in control brought about by the output switch which is now implemented as controllable MOSFET switch as shown in FIG. 62a and FIG. 62b.

As another practical matter, the parasitic capacitance of the output switch when reflected on the input side through transformer turns ratio becomes $C_{S2P}$ given by:

$$C_{S2P} = C_{S2}/n^2 \qquad (46)$$

This capacitance is, therefore, in many practical cases of isolated converters negligible compared to the resonant capacitance $C_T$, that is:

$$C_{S2P} \ll C_T \qquad (47)$$

in the above practical example, the reflected capacitance is approximately 3 pF, which is indeed negligible to the 237 pF resonant capacitance. As a result, the parasitic capacitances of the secondary side low voltage switches will not affect resonant frequency. Note that this assumption (47) is satisfied in most practical cases of interest with relatively large step-down turns ratio of the isolation transformer. The case when (47) is not fulfilled is also analyzed with a significantly more complex model and shown that it can lead to complete lossless switching although requiring larger current $I_N$ to overcome the effect of the large capacitance of the output switch.

LOSSLESS SWITCHING ALTERNATIVES

Figure 63A:
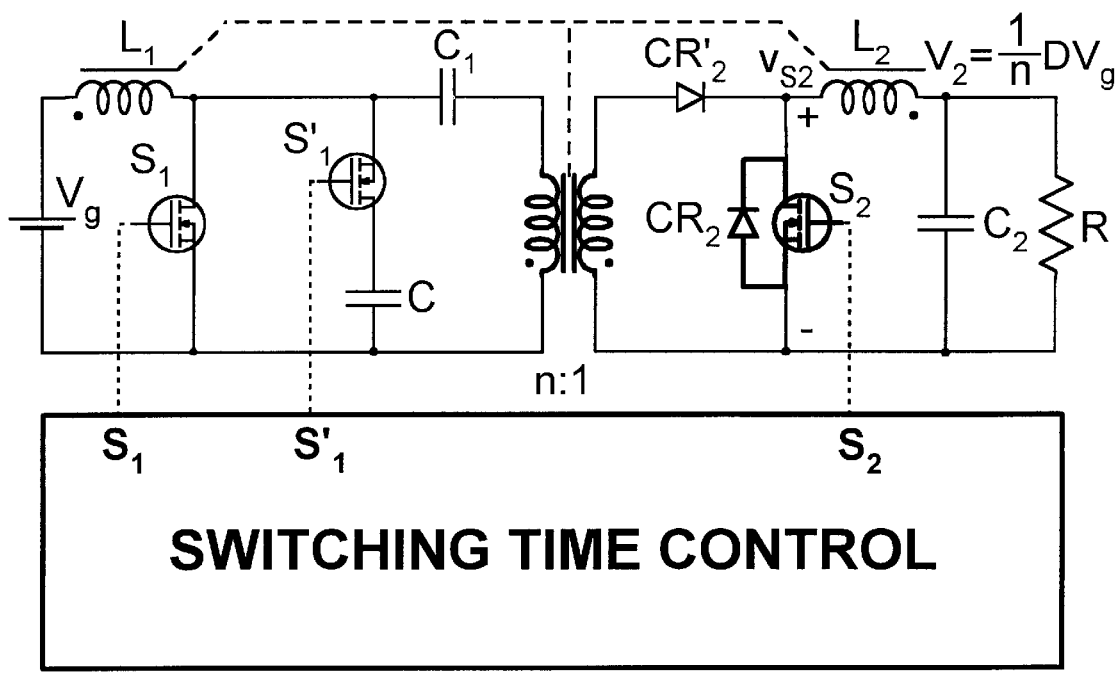
FIG. 63a shows the present invention with rectifier diode for complementary output switch and three CBS switches.

Shown in FIG. 62a is just one of many lossless switching alternatives. The new converter and switching time control structure having many lossless switching alternatives is shown in FIG. 63a in one of its simplest implementations with 3 (three) MOSFET switches and a diode. The switching sequence and time control for the switches for the difficult to achieve (2–1) lossless switching transition (transition from State-1 to State-1) is highlighted in FIG. 63b in thick lines to emphasize the timing pattern during the enlarged (2–1) transition interval, which is, typically, only on the order of 100 ns in comparison with the total switching period $T_S$=5000 ns, for 200 kHz switching frequency.

Figure 63B:
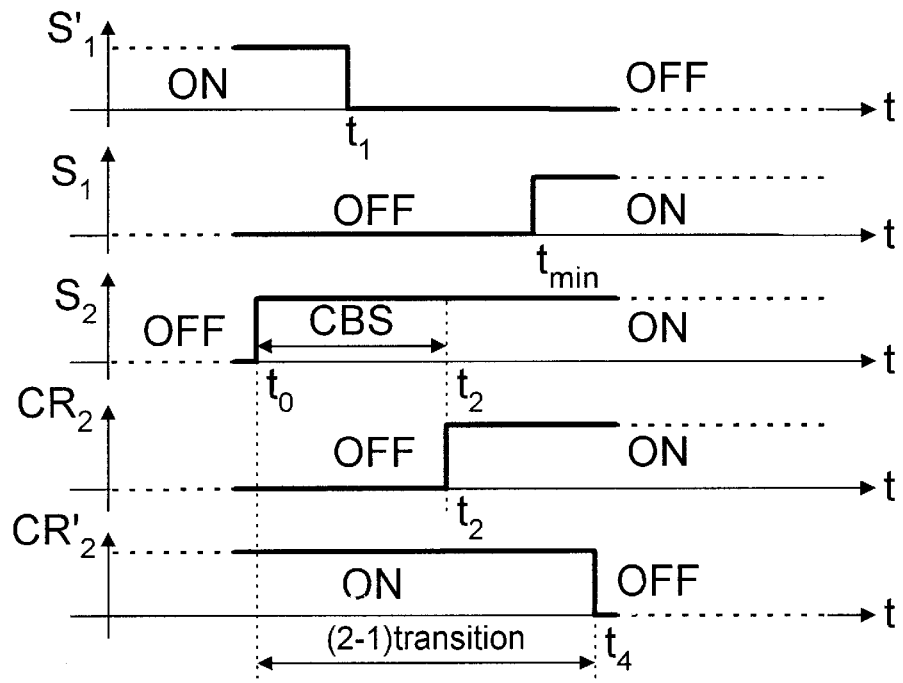

MOSFET switches are used for input switch $S_1$ and complementary switch $S'_1$ with the switching sequence and timing for (2–1) transition as shown in FIG. 63b providing some "dead-time" interval during which both switches are OFF. The complementary output switch is shown implemented by a diode $CR'_2$ to emphasize the fact that for this switch no special switching time control is needed for proper lossless switching operation. Thus, turning ON and OFF of this diode switch will be dictated by the converter circuit states: positive voltage across the diode terminals will turn it ON, and negative voltage or zero current through the diode switch will turn it OFF. As seen in FIG. 63b this $CR'_2$ diode turns OFF at instant $t_4$ after the input switch is turned ON. Thus, if instead of diode, the MOSFET transistor is used for the complementary output switch, the MOSFET will be used solely as synchronous rectifier to bypass its own parasitic body-diode during its conduction interval with the same switching time as for $CR'_2$ diode in FIG. 63b. Instant $t_4$ will, therefore, signify the latest instant at which such MOSFET complementary output switch must be turned OFF.

Figure 3A:
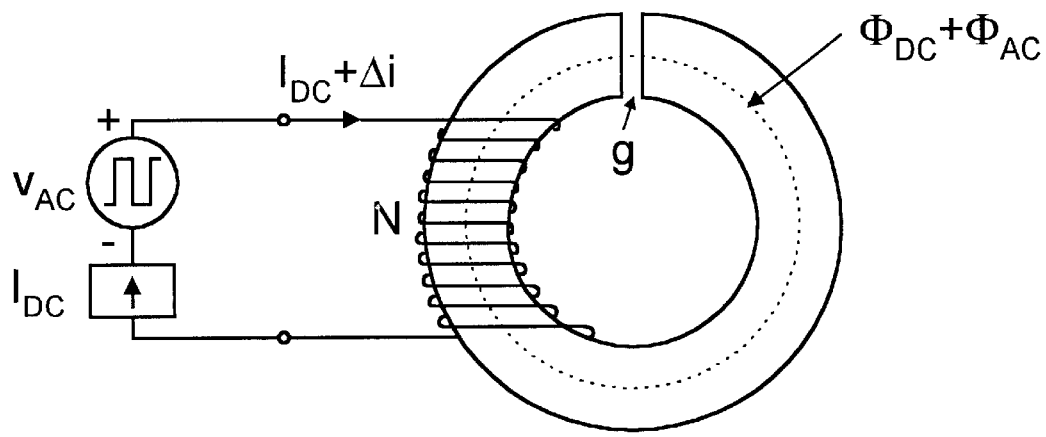
FIG. 3a illustrates that an inductor with a DC-bias current must have an air-gap in the magnetic flux path in order to prevent saturation of the ferromagnetic core material and FIG. 3b shows the large reduction of the un-gapped core inductance L to the inductance $L_g$ with the air-gap g.
Figure 3B:
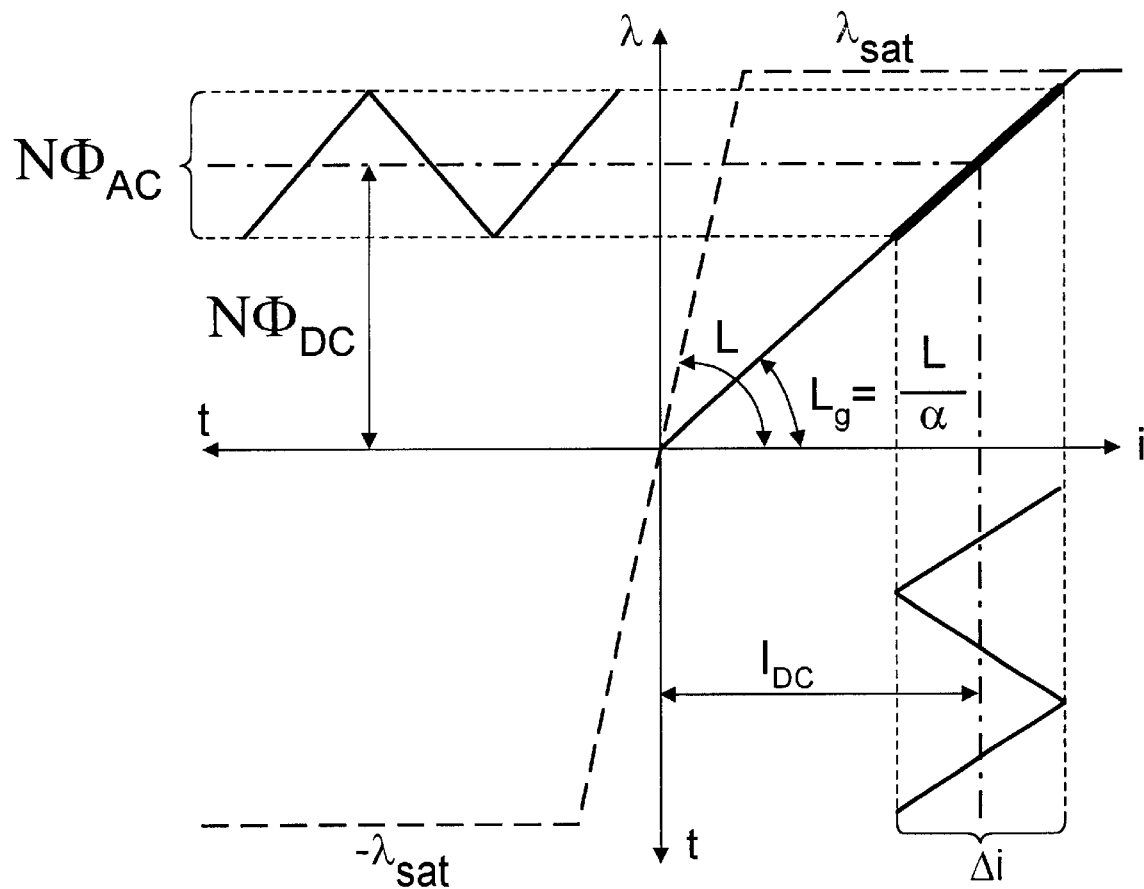
Figure 5A:
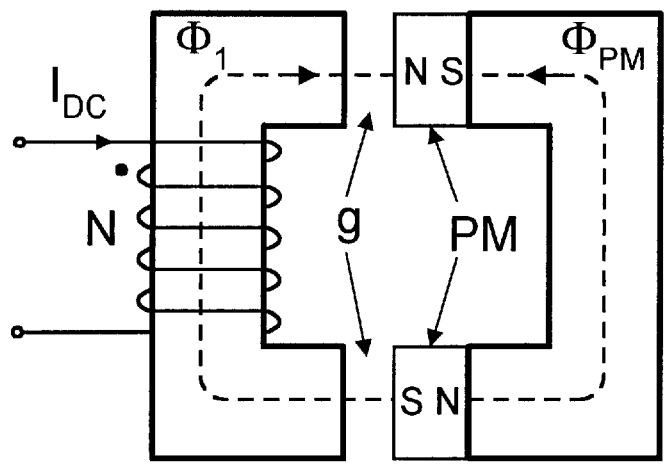
FIG. 5a shows an inductor implemented on a special magnetic core structure which, in addition to the air-gap and ferromagnetic material, has also a small permanent magnet inserted in its flux path in order to provide a fixed reverse bias.
Figure 5B:
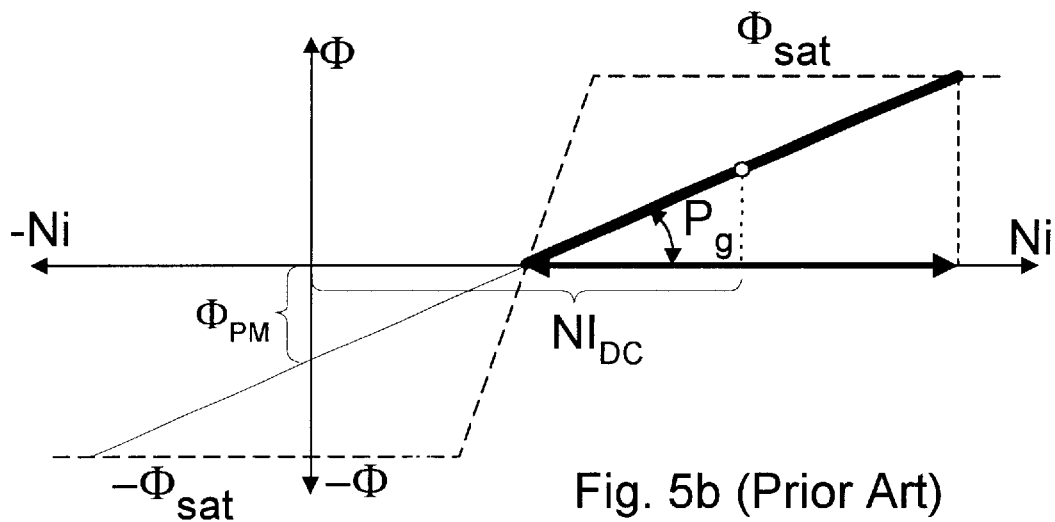
FIG. 5b illustrates the effect of the permanent magnet reverse bias on a positive DC-bias due to high DC current in the winding.
Figure 5C:
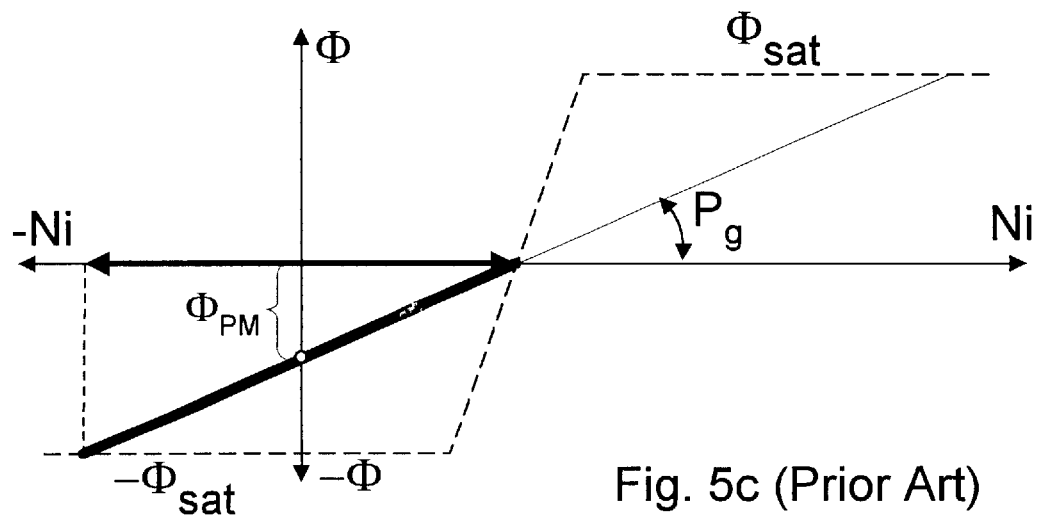
FIG. 5c demonstrates that the flux excursions are constrained to the negative pat of the flux saturation characteristic for small or zero DC current in the inductor winding.
Figure 6A:
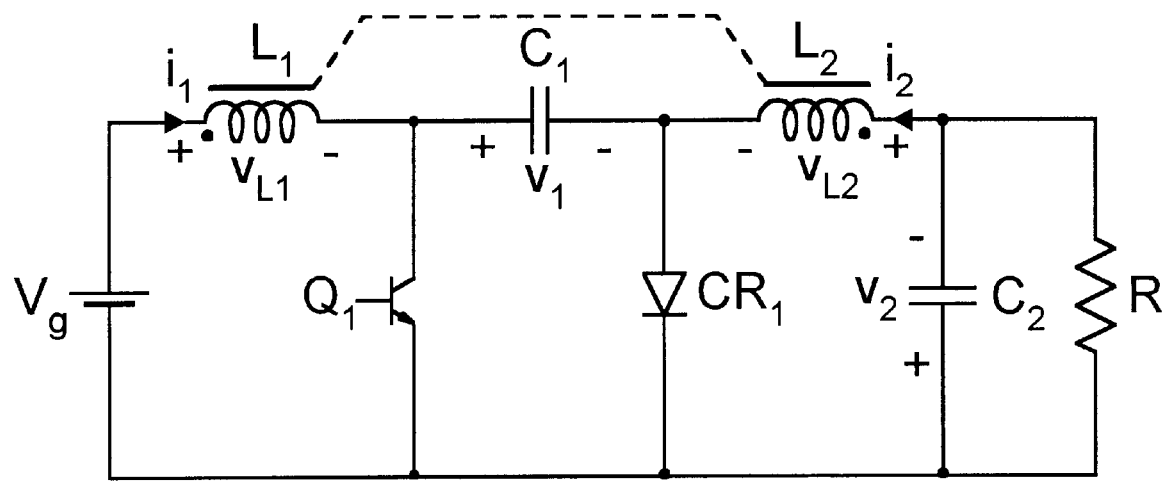
FIG. 6a is the prior-art Coupled-inductor Cuk converter and FIG. 6b displays the identical AC voltage waveforms on the two inductors prior to the coupling (for two different duty ratios $D_1$ and $D_2$), as a condition for their integration onto a common magnetic core.
Figure 6B:
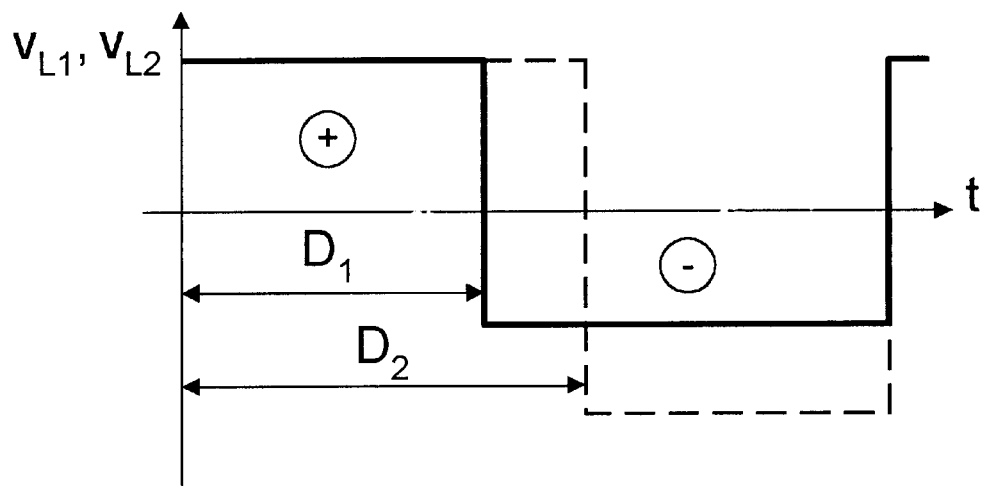
Figure 7A:
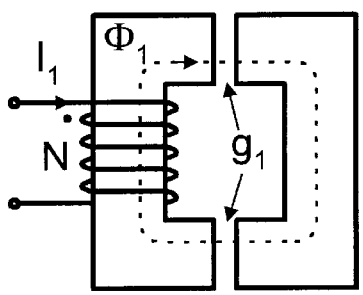
FIG. 7a and FIG. 7b show that each inductor in FIG. 6a, when used separately, must have appropriate air-gap and FIG. 7d and FIG. 7e reflect the inductance value degradation of each inductor due to their respective air-gaps.
Figure 7D:
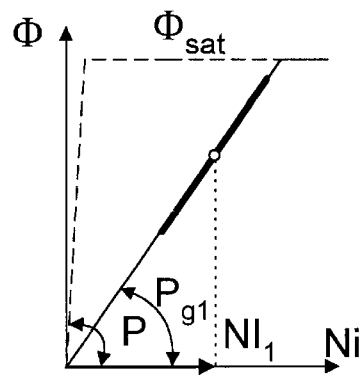
FIG. 7c demonstrates that the coupled-inductor implementation must have an air-gap, which is the sum of the two air-gaps of the original separate inductors of FIG. 7a and FIG. 7b
FIG. 7f shows combined flux vs. ampere-turns characteristic, which has an even higher inductance value degradation due to the increased air-gap.
Figure 7B:
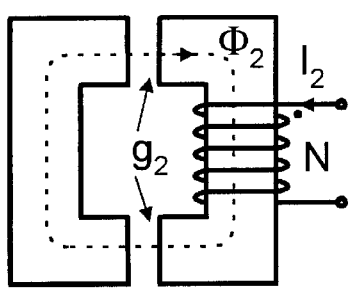
Figure 7E:
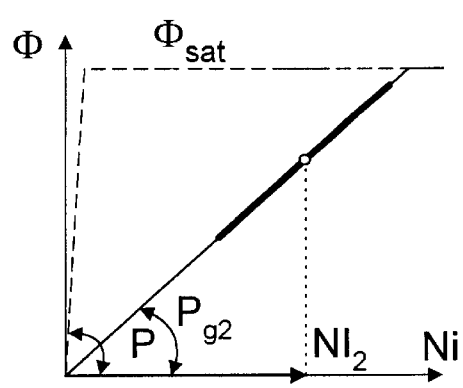
Figure 7C:
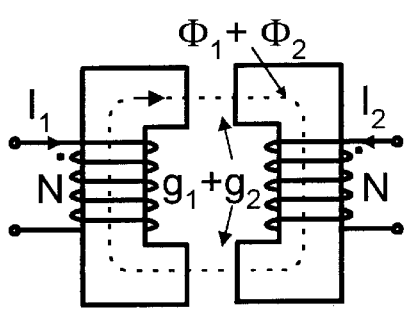
Figure 7F:
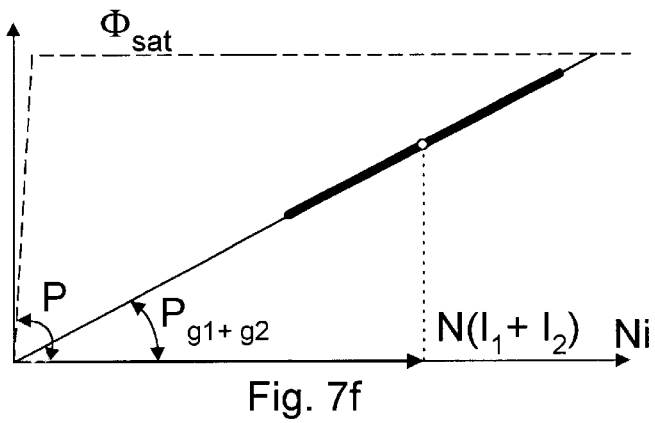
Figure 8A:
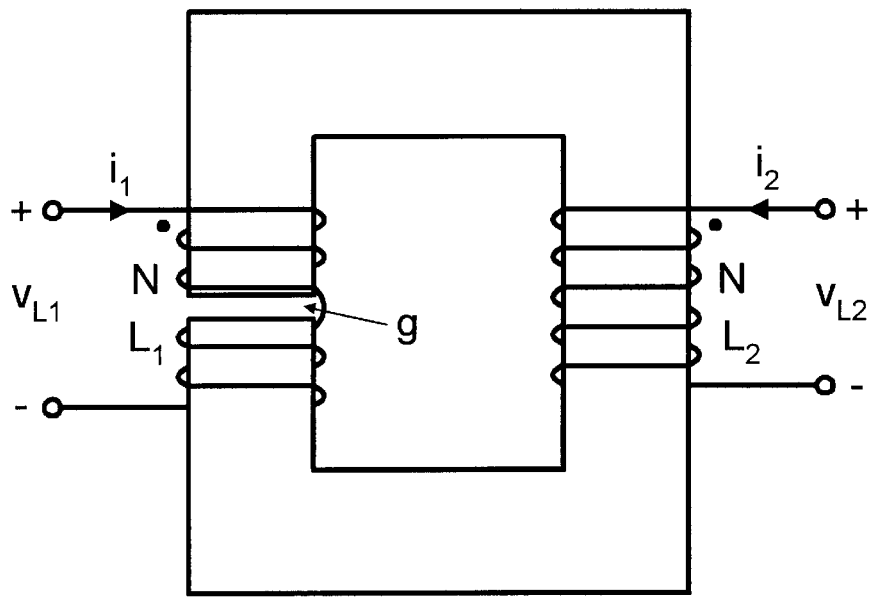
FIG. 8a shows a coupled-inductor implementation with the air-gap concentrated on the side with the input inductor winding, which leads to the circuit model of FIG. 8b with leakage inductance concentrated entirely on the output inductor winding side, thus demonstrating the zero-ripple current in the optical inductor winding.
Figure 8B:
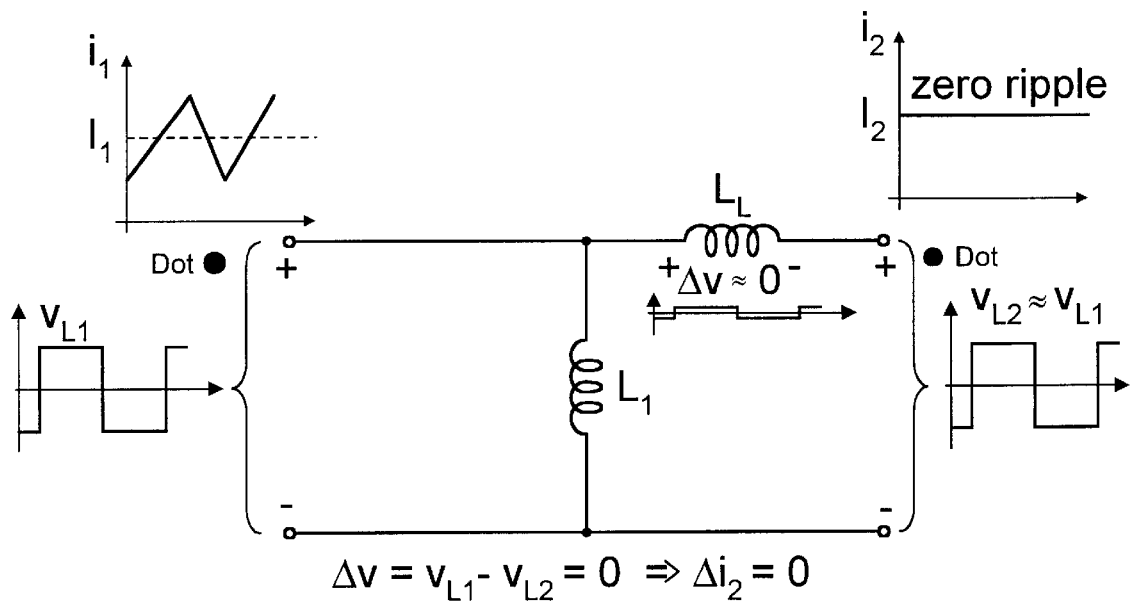
Figure 9A:
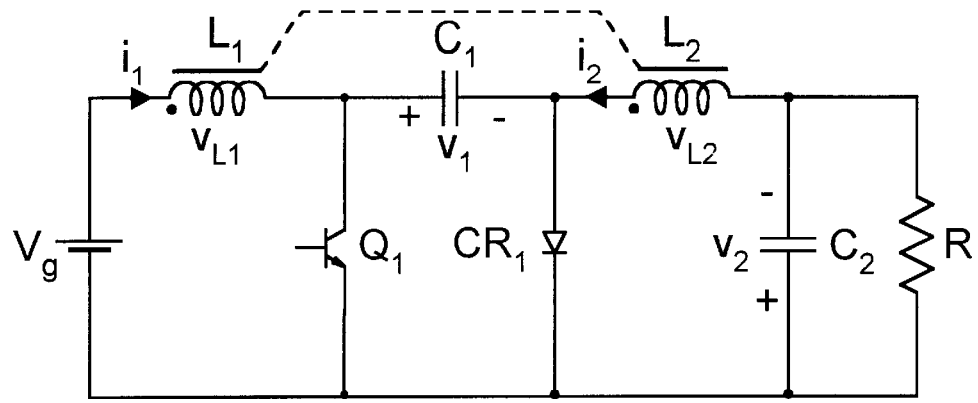
FIG. 9a shows a coupled-inductor magnetics connected with the output inductor winding polarity opposite to the one of FIG. 6a to cause DC-ampere-turns subtraction and FIG. 9b shows that a large voltage mismatch of connection in FIG. 9a leads to a huge ripple currents on both input and output inductors.
Figure 9B:
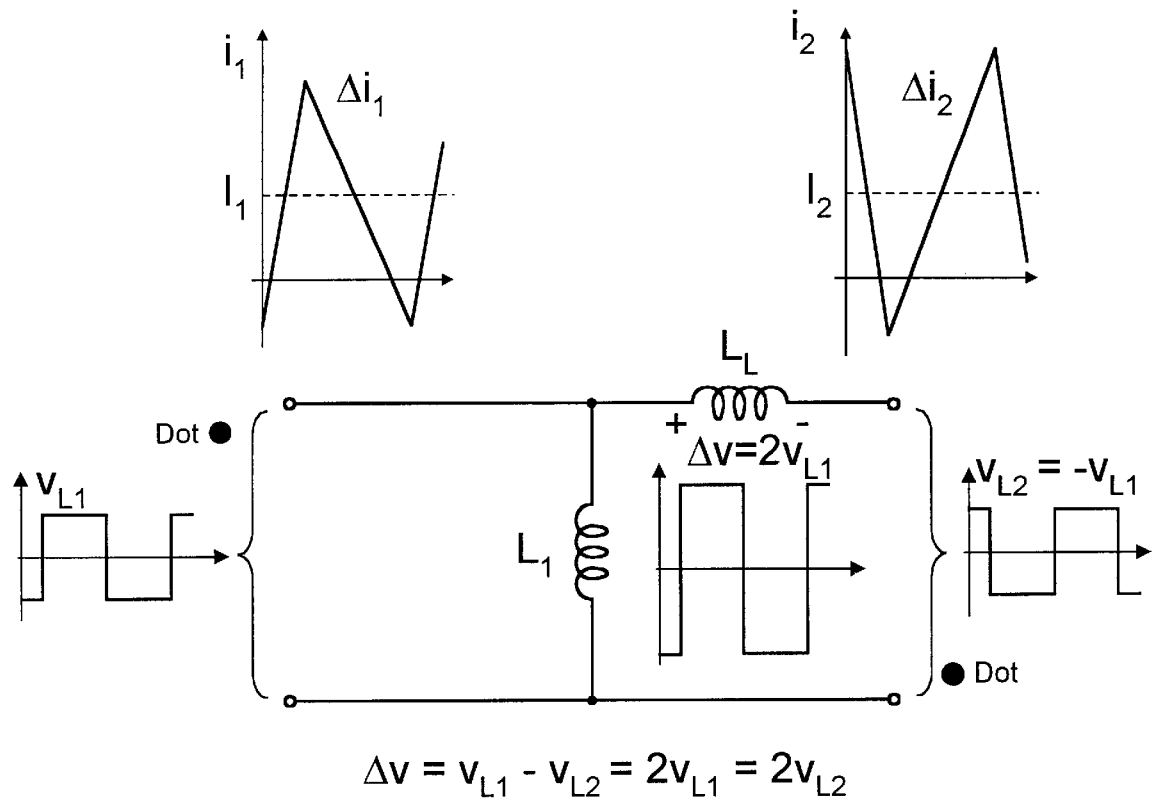
Figure 10A:
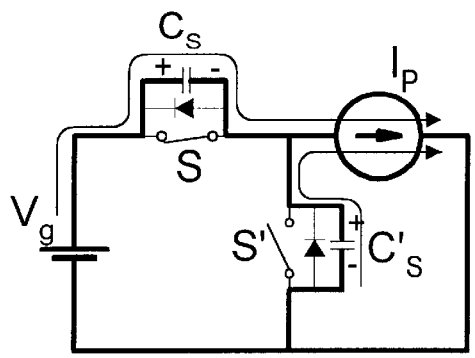
Figure 10C:
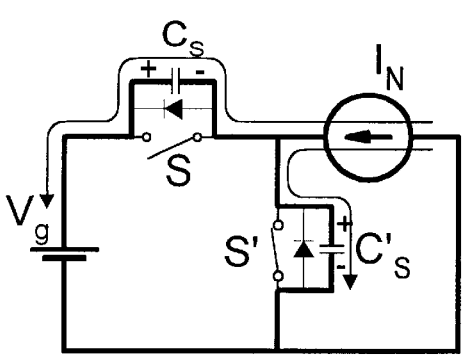
Figure 10B:
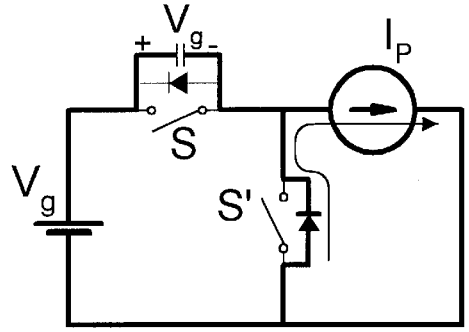
Figure 10D:
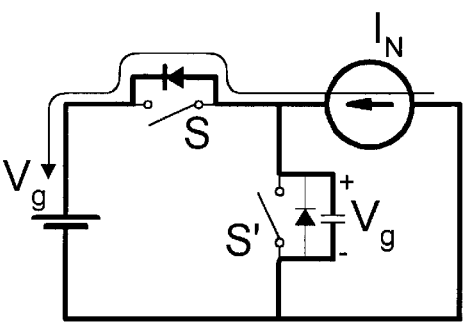
Figure 10E:
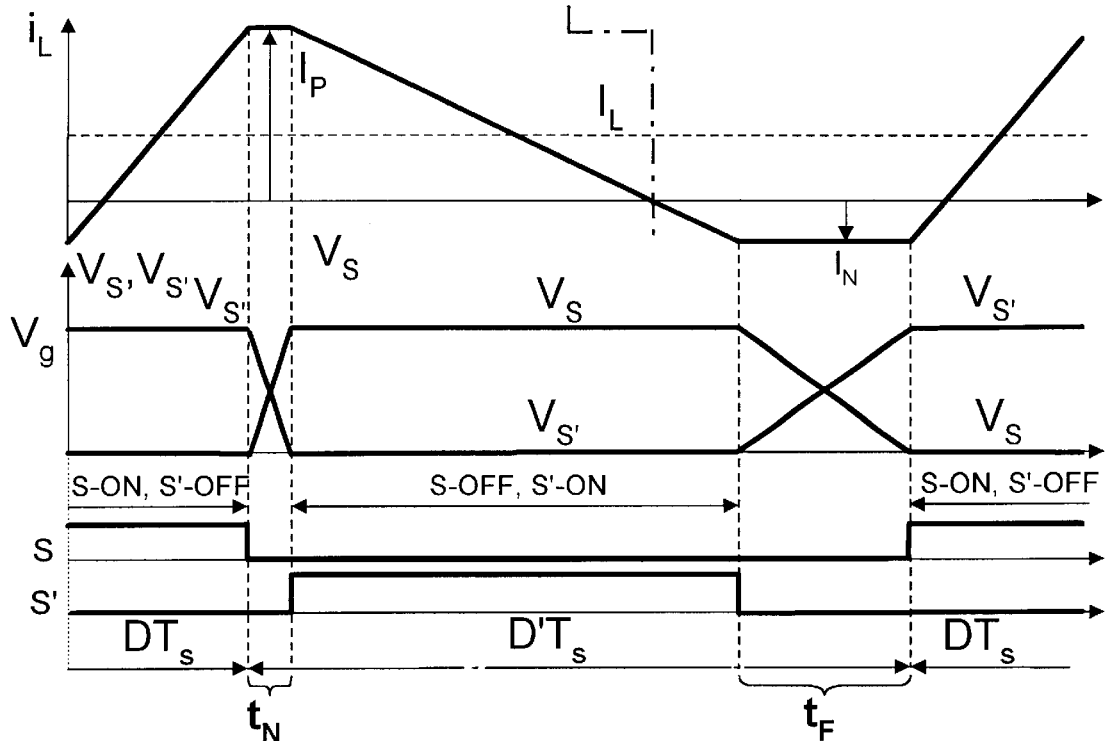

Finally, the output switch is shown in thick lines in FIG. 63a as consisting of a MOSFET switch controlled by its switching time control signal $S_2$ in parallel with its parasitic body-diode designated $CR_2$. Although the body-diode is an integral part of every MOSFET, it is separately highlighted here as diode $CR_2$, since the timing of the switching of this diode as displayed in waveform $CR_2$ of FIG. 3b was shown to be particularly important for the understanding of the novel lossless switching mechanism. If the diode $CR_2$ were used alone for the output switch it would be turned ON by the converter operation at instant $t_2$ as seen by the waveform for diode $CR_2$ in FIG. 63b. It is the turning-ON of the controllable output switch $S_2$ before or at the latest at this instant $t_2$, which will result in a number of novel lossless switching methods.

When used as synchronous rectifiers, the MOSFET transistors are turned ON and OFF at the same instants at which their internal body-diodes would have been turned ON and OFF in response to the converter circuit conditions. Thus, it appears that nothing could be gained by turning the MOSFET switch ON at times other than those dictated by its own body-diode. This conventional wisdom has limited the use of the MOSFETs on secondary side of prior-art soft-switching converters to only their use as synchronous rectifiers. While such implementation does help to lower conduction losses of the body-diodes of the MOSFET switches, this does absolutely nothing toward reduction of switching losses. Thus, a very specific switching sequence and time control of the MOSFETs relative to their body-diode switching is needed to bring about novel lossless switching operation.

What has not been recognized in the prior-art switching converters is that turning ON of the MOSFET (CBS) output switch by independent switching drive control before its body-diode turns ON is crucial for effective and heretofore unachievable lossless switching performance. In a clearly distinct departure from all previous soft-switching methods, the output MOSFET switch $S_2$ of FIG. 63a is deliberately turned-ON prematurely at instant $t_{107}$ before its body-diode would turn-ON at instant $t_2$ and in some cases as in FIG. 63b even before the complementary input switch $S'_1$ is turned-OFF at instant $t_1$. This results in extremely effective resonant discharge of the input switch parasitic capacitance during the (2–1) transition, which is not attainable by prior-art soft-switching methods.

In the converter with two diode rectifiers as employed in soft-switching method such as in FIG. 59a, there is only one particular instant $t_2$ at which the diode rectifier $CR_2$ is turned-ON. To the contrary, with the MOSFET as an output switch $S_2$ as in FIG. 63a, there is a wide range of time between instant $t_0$ and instant $t_2$ (designated as CBS in FIG. 63b) within which the MOSFET output switch $S_2$ can be turned-ON resulting in lossless switching performance and much improved efficiency.

The lossless switching benefits are available not only for MOSFET switch implementation but for any other switch realization, which at minimum have CBS switch characteristic for the three switches. Thus, for example, in addition to shown realization with MOSFET transistors, those skilled in the art could easily find implementations with other controllable active semiconductor or other switching devices, which are made to operate as CBS switches, such as, for example, bipolar transistors with anti-parallel diodes, GTO (Gate Turn-OFF) device, IGBT (Insulated Gate Bipolar Transistor) transistor, SCRs (thyristors), or other controllable CBS switching devices.

Now, that the spectrum of available alternatives for the switching sequence and timing control of output CBS switch are introduced, several special cases of interest are discussed in detail, and the analytical equations derived to guide in designing lossless switching in each case.

Modeling of Lossless Switching Alternatives for (2–1) Transition

Figure 64A:
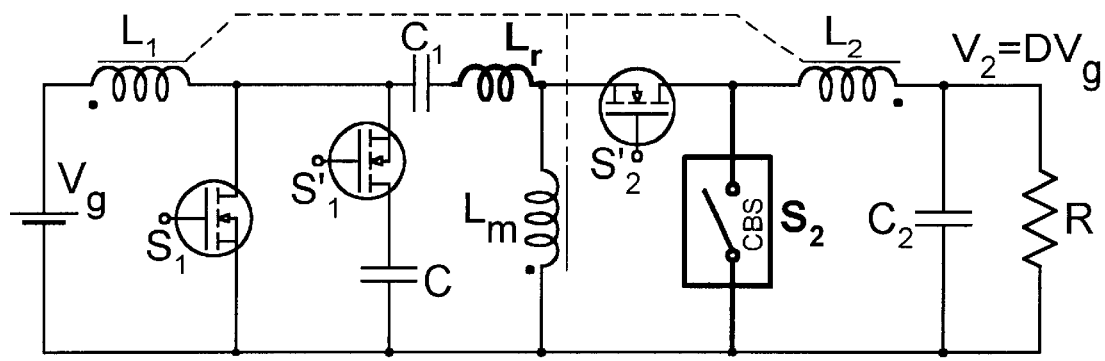
FIG. 64a illustrates the converter with the additional resonant inductor $L_r$.

To simplify the presentation and analysis, the alternative lossless switching methods are presented on non-isolated converter version of FIG. 64a with added resonant inductor. Clealry, any of the discussed alternatives can then be easily applied to their isolated step-down counterparts as already discussed for one isolated alternative displayed in FIG. 62a. Any parameters used for quantitative assessment bellow would refer to corresponding isolated converter quantities reflected to the primary side, through the turns ratio transformer, such as parasitic capacitance of output switch given by (46).

Figure 64B:
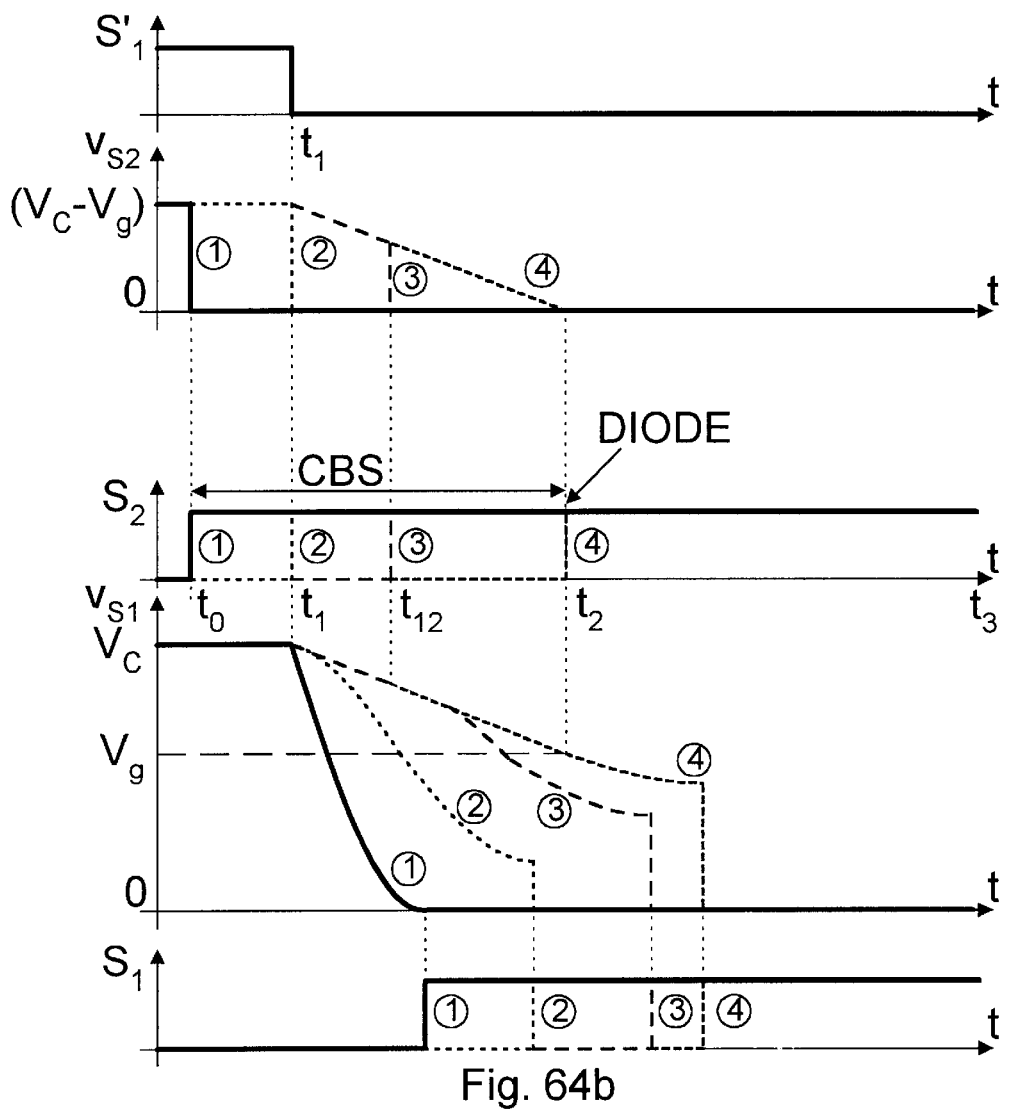

A number of qualitatively and quantitatively different alternatives are obtained, such as Cases 1–4 shown in the overall diagram of FIG. 64b. As before, these cases differ in the time when the output switch is turned ON, ranging from instant $t_0$ until instant $t_2$. Another rather surprising fact is the emergence of a qualitatively new case (Case 1), which did not even exist in circuit without resonant inductor: the output switch is turned ON at time $t_0$ even before the complementary output switch is turned OFF at time $t_1$ as displayed in FIG. 64b as waveform 1 in thick lines. Note how the voltage across the input switch rapidly decays to zero voltage at which time the input switch is turned ON.

Equivalent Circuit Models for Transition Subintervals

The complete transition interval is broken down into four distinct and consecutive transition subintervals designated as follows:

1. Boost subinterval during which the resonant inductor current is boosted from its initial value $I_N$ to $(I_N+I_{r1})$;
2. Linear subinterval during which input switch capacitance is discharged at a constant rate, hence linear voltage decay;
3. Resonant subinterval during which the voltage of the input switch continues to fall down due to a resonant discharge of its parasitic capacitance;
4. Current-reversal subinterval during which the input capacitor current $i_{C1}$ is reversing its direction, changing from current $i_1$ to current $-i_m$ flowing in the opposite direction.

Note that depending on the particular switching time patterns, one or more of the above subintervals such as boost or linear subinterval may not be present. Thus, the equivalent circuit models, the characteristic salient waveforms and the analytical quantitative models are developed for all subintervals, so that through their use the best mode of operation can be chosen and optimally designed for the given application. The equivalent circuit models and corresponding design equations are then developed separately for the boost, linear, resonant, and finally for current-reversal subintervals in that order.

Figure 65A:
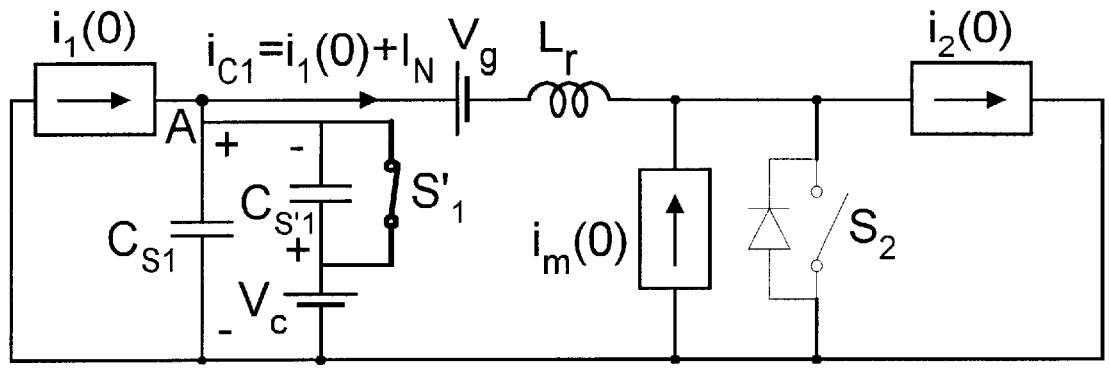
FIGS. 65(a–d) show the progression of circuit models describing the resonant subinterval.
Figure 65B:
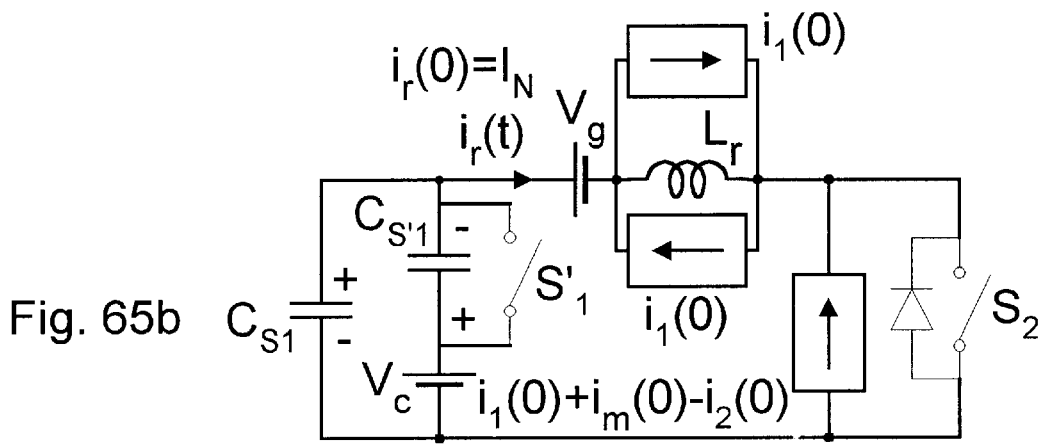
Figure 65C:
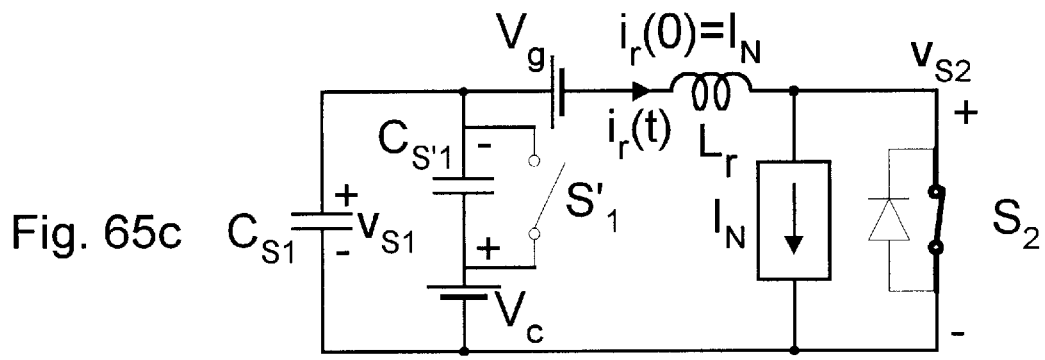
Figure 65D:
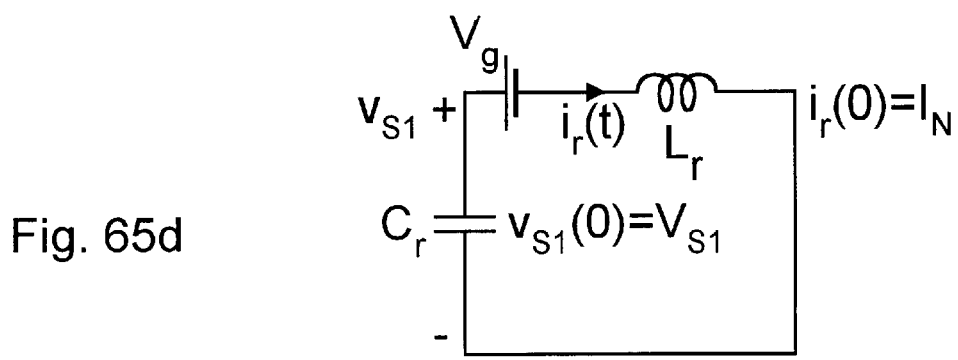

The first step is to model the three large inductors $L_1$, $L_m$, and $L_2$ in the converter of FIG. 64a as the constant current sources with current values $i_1(0)$, $i_m(0)$, and $i_2(0)$ at the end of the State-2 interval as shown in FIG. 64a displaying the instant just before the complementary input switch is turned OFF. Note that the input capacitor current is at that instant equal to $$i_{C1}(t)=i_1(0)+i_r(t) \qquad (48)$$

where $$i_r(0)\times I_N \qquad (49)$$

and where $i_1(0)$ is the value of the input inductor current at the beginning of the (2–1) transition. Note that only $i_r(t)$ current component is present in the input switches during the linear and/or resonant subintervals and that current $i_1(0)$ is eliminated. At the instant right after complementary input switch opened ($t=0+$), the net current flowing out of the node A in FIG. 65a is $I_N$, since the $i_1(0)$ current contributions from the input inductor and from $i_{C1}$ cancel each other. Another way to observe the same effect is to move the input current source $i_1(0)$ by equivalent circuit transformations to effectively appear in parallel across the resonant inductor $I_r$ as seen in the circuit model of FIG. 65b (the current source $i_1(0)$ whose direction is pointing from right to left). The capacitor current from (48) can also be shown as a constant current source $i_1(0)$ in parallel with the same resonant inductor but this time pointing from left to right while the resonant inductor current is reduced to $i_r(t)$. The two opposite current sources with the same value $i_r(0)$ cancel each other, hence only $i_r(t)$ current component is present during the linear and/or resonant discharge interval. With the output switch open, as in FIG. 65b, the input switch parasitic capacitance $C_{S1}$ is being discharged with the constant linear discharge rate $I_N/C_r$, until such time that the output switch is turned ON as shown in the model of FIG. 65c at which instant the resonant discharge is initiated. This model is further simplified to that of FIG. 65d, in which the parasitic capacitances of the input switch and complementary input switch are replaced with the resonant capacitor $C_r$ and the model is reduced to a simple series resonant $l_r$, $C_r$ circuit without damping and DC source $V_g$. This resonant circuit oscillations in voltage and current can then be fully described with the help of the characteristic resistance $R_0$ as defined by (38), resonant frequency $\omega_r$ as defined by (32) and initial conditions present at the start of resonant oscillations: current in the resonant inductor $i_r(0)$ and the voltage on input switch $v_{S1}(0)$ at instant t=0. Note that $v_{S1}(0)$ is the voltage on the input switch $v_{S1}$ present at the time when the output switch was turned-ON and the resonant transition subinterval initiated. For example, in the special case, when the output switch is turned ON at the instant the complementary input switch is turned OFF (Case 2 in FIG. 64b) this initial condition is $V_{S1}=V_C$. In that case, one directly goes from switch states as in FIG. 65a to those in FIG. 65c so that the linear subinterval of FIG. 65b is skipped. However, if the switch states include the switching time control such that intermediate subinterval of FIG. 65b is included (the output switch is turned ON some time after the complementary input switch is turned OFF), the Cases 3 in FIG. 64b is obtained resulting in both linear subinterval followed by a resonant subinterval. These two cases as well as the other two characteristic cases (Case 1 and Case 4 of FIG. 64*b*) involving resonant discharge are fully explained and modeled separately, qualitatively and quantitatively in the next section.

Boost Subinterval

Figure 66A:
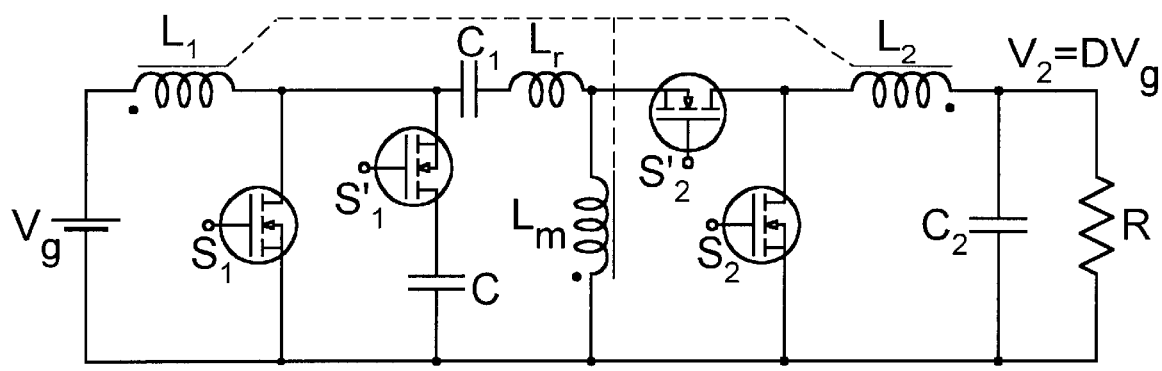
FIG. 66a illustrates the converter for Case 1 of FIG. 64b with CBS output switch and resonant inductor.
Figure 67A:
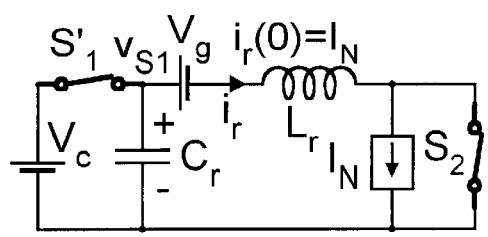
FIG. 67a illustrates an equivalent circuit model of converter of FIG. 66a for the boost subinterval during (2-1) transition.

The converter of FIG. 66*a* and the Case 1 are now analyzed in details. Note that (2–1) transition starts by first turning ON the output switch and not as in all other cases by turning OFF the complementary input switch. Thus, the (2–1) transition is broken down into two subintervals:

1. The boost subinterval between instant $t_0$ and $t_1$, which is modeled by equivalent circuit in FIG. 67*a*.
2. The resonant subinterval between instants $t_1$ and instant $t_{min}$ when input switch is turned ON at minimum voltage, which is modeled by equivalent circuit in FIG. 67*b*.

In the boost subinterval, the DC voltage source $(V_{C-V2})$ is impressed across the resonant inductor, resulting in a linear increase of the resonant current, which at instant $t_1$ is boosted to the peak value $I_{r1}$ equal to $$I_{r1}=(t_1-t_0)(V_C-V_g)/L_r \tag{50}$$

At the same time, the peak negative AC ripple current $I_N$ of the complementary input switch acts as a constant current source boosting the total current in the resonant inductor to $(I_N+I_{r1})$ at the end of boost subinterval.

Resonant Subinterval

When the complementary input switch is turned OFF, the resonant subinterval is initiated. Note that the series resonant circuit consists of the resonant capacitance $C_r$ in series with resonant inductor $L_r$ and with a small, and here considered negligible resistance, which will lead to the model with un-damped oscillations. This resonant circuit also has two initial conditions; initial voltage $V_C$ on resonant capacitance $C_r$ and initial resonant inductor current equal to $(I_{r1}+I_N)$. The solution for such a resonant discharge current $i_r$ can be found and broken down into three fundamental components so that:

$$i_r=i_{r1}+i_{r2}+i_{r3} \tag{51}$$

where $$i_{r1}=I_{r1}\cos(\omega_r t) \tag{52}$$

$$i_{r2}=I_{r2}\sin(\omega_r t) \tag{53}$$

$$i_{r3}=I_{r3}\cos(\omega_r t) \tag{54}$$

and $$I_{r2}=(V_C-V_g)/R_0 \tag{55}$$

$$I_{r3}=I_N \tag{56}$$

Figure 67B:
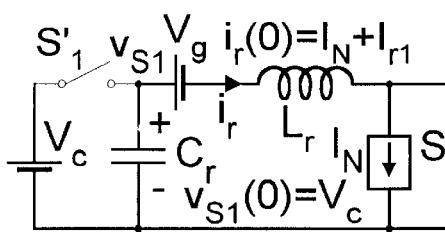
FIG. 67b shows the equivalent circuit model of converter in FIG. 66a for the resonant subinterval during (2-1) transition.
Figure 67C:
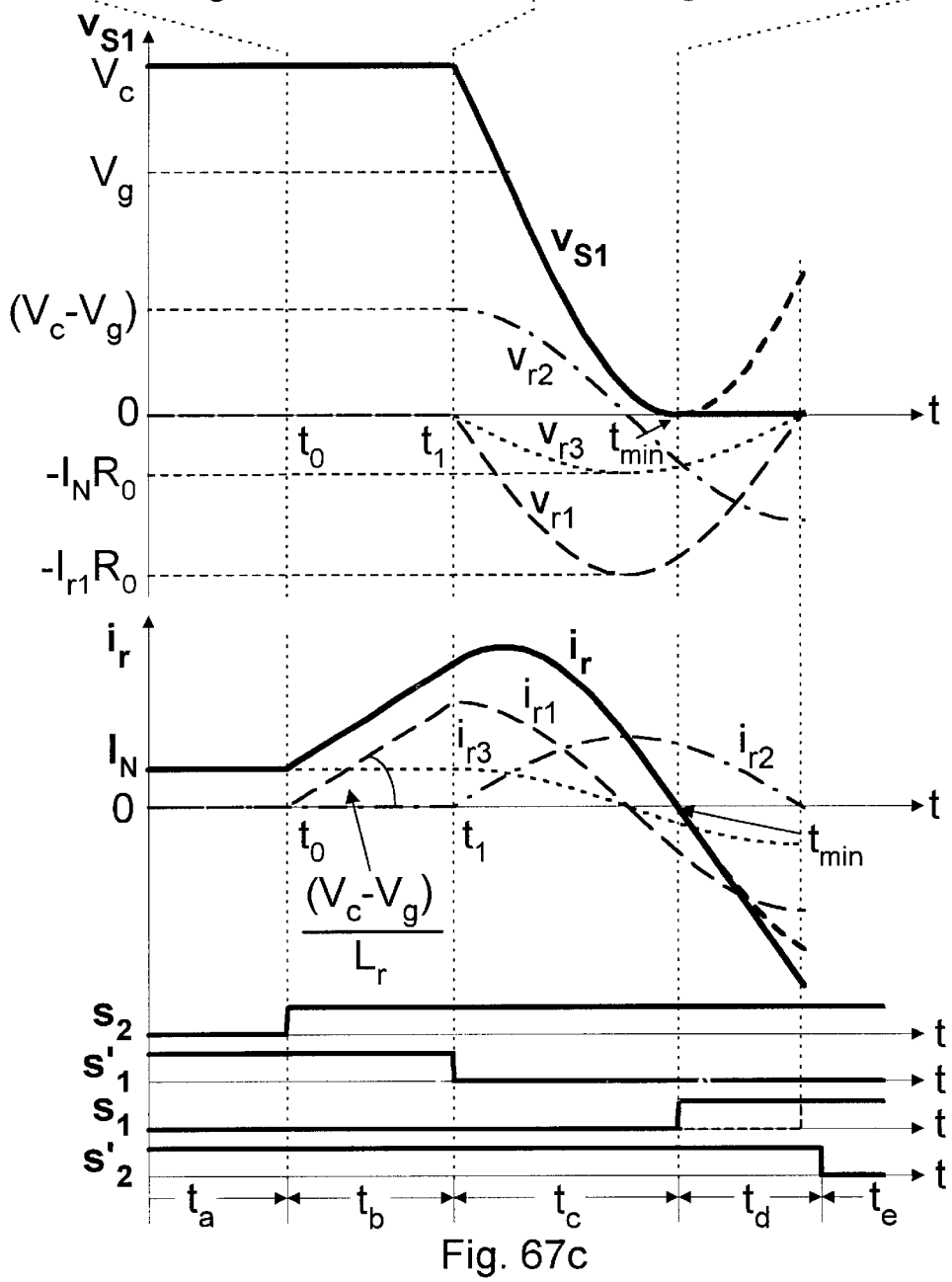
FIG. 67c shows on one timing diagram the three resonant voltage components and resultant voltage of the input switch, and on another timing diagram the three resonant current components and the resultant total resonant current, and special switching sequence and time control during (2-1) transition.

All three resonant current components are drawn with different thin dotted lines in FIG. 67*c*, while the resultant total resonant current ($i_r$) is drawn with the thick lines. Each of the three resonant current components results in corresponding resonant voltage component across the resonant inductor, which is time derivative of each respective resonant current component multiplied with $L_T$ such that $$v_{r1}=-V_r\sin(\omega rt)=-R_0 I_{r1}\sin(\omega_r t) \tag{57}$$

$$v_{r2}=V_{r2}\cos(\omega_r t)=R_0 I_{r2}\cos(\omega_r t)=(V_C-V_g)\cos(\omega_r t) \tag{58}$$

$$v_{r3}=-V_{r3}\sin(\omega_r t)=-R_0 I_{r3}\sin(\omega_r t) \tag{59}$$

The three resonant voltage components are drawn with the thin dotted lines in FIG. 67*c*. Note the presence of the second resonant voltage component $v_{r2}$, which appears due to the presence of the initial voltage $(V_C-V_g)$ on resonant inductor. Hence the resonant circuit starts to oscillate at time when input complementary switch is turned OFF with initial resonant current of $(I_N+I_{r1})$ and initial voltage on resonant inductor of $(V_C-I_g)$, which corresponds to voltage $V_C$ on the input switch.

From the equivalent circuit model in FIG. 67*b*, the instantaneous voltage $v_{S1}(t)$ of the input switch during the resonant subinterval is given by:

$$v_{S1}(t)=V_g+v_{r1}+v_{r2}+V_{r3} \tag{60}$$

and shown in thick lines in FIG. 67*c*. Note from FIG. 67*c* how all three resonant inductor voltage components work in the same direction, that is toward reduction of the voltage $v_{S1}$ on input switch, which decreases monotonically. For example, if the resonant voltage components $v_{r1}$ and $v_{r3}$ had positive signs in (57) and (59) respectively, these components would work initially toward increasing instead of decreasing the voltage $v_{S1}$. Likewise, negative sign in resonant voltage component $v_{r2}$, would have also increased the input switch voltage $v_{s1}$, instead of decreasing it as per (58). We now can even find closed form analytical expression for the total voltage $v_r(t)$ by summing the sine components and cosine components given by (57), (58), and (59), into one co-sine resultant waveform $v_r(t)$ given by $$v_r(t)=v_{r1}+v_{r2}+v_{r3}=V_r\cos(\omega_r t+\phi) \tag{61}$$

where $$V_r^2=(V_C-V_g)^2+(I_N+I_{r1})^2 R_C^2 \tag{62}$$

and $$\phi=\tan^{-1}(I_N+I_{r1})R_O/(V_C-V_g) \tag{63}$$

Thus, the voltage on input switch during the resonant discharge subinterval shown in FIG. 67*c* in thick lines, is finally represented by $$v_{S1}(t)=V_g+V_r\cos(\omega_r t+\phi) \tag{64}$$

A simple criteria is now available to gauge the effectiveness of the novel lossless switching:

Lossless switching $V_r>V_g$ (65)

Hard-switching $V_h=V_g-V_r$ (66)

Thus, when magnitude of the total resonant voltage $V_r$ is equal or greater than input DC voltage $V_g$, the complete reduction to zero voltage is obtained. Otherwise, the difference $V_h$ given by (66) is the remaining minimum hard-switching voltage $V_h$ at which input switch should be turned ON.

The presence of the three resonant voltage discharge components and their simultaneous contribution toward fast resonant discharge of the voltage on input switch is the main reason why this lossless switching mechanism is much more effective than prior-art soft-switching methods, in which, at best, only one out of three possible resonant discharge components is present, and even then only the least effective $v_{r3}$ component is present. However, before comparing the relative effectiveness of the three resonant components the remaining current-reversal subinterval is modeled since it immediately follows the resonant subinterval and is common to all resonant discharge cases.

Current-reversal Subinterval

Turning ON the input switch at the time $t_2$ when the voltage across the input switch is at $V_g$ level would normally in case without resonant inductor complete the (2–1) transition. As seen from the circuit model in FIG. 68a for $L_r=0$, the DC voltage across input capacitor will reverse-bias the body-diode of the complementary output switch and will turn if OFF. This, in turn, will, if the complementary output switch MOSFET is turned OFF, cause the input capacitor current to change abruptly from current $i_1$ charging input capacitor to current of opposite direction and magnitude $i_m$ discharging the same capacitor (charge balance requirement on input capacitor). However, in the presence of an inductor, such as resonant inductor $L_r$ in the circuit model of FIG. 68a, such an abrupt change of the input capacitor current is prevented and the current-reversal subinterval $t_d$ is modeled with equivalent circuit of FIG. 68a. Note also that at beginning of this subinterval (the instant $_{min}$) the resonant inductor current $i_r$ was reduced to zero as seen in FIG. 67c, thus reducing the input capacitor current as per (38) to only input inductor current component $i_{Cf}(t_{min})=i_1(0)$. The input capacitor DC voltage $V_g$ is then impressed across the resonant inductor $L_r$, leading to the linear decrease of the input capacitor current as in FIG. 68c at a rate of $V_g/L_r$ until instant $t_4$ at which $i_{Cf}=1-i_m$ and current through complementary output switch $S'_2$ is zero, turning effectively that switch OFF. Thus, the length of this current-reversal interval $t_d$ can be obtained from:

$$t_d=[i_1(0)+i_m(0)]L_r/V_g \cdot I_2L_r/V_g \quad (67)$$

with approximation valid for small ripple currents and where $I_2=I_1+I_m$ is the approximate magnitude of the total current change in this subinterval. From (67), the length of this subinterval is heavily dependent on the DC load current $I_2$ and DC input voltage $V_g$, and is the longest for the highest DC load current and lowest input DC voltage. Thus, the active complementary output switch must be turned OFF before the expiration of the shortest of the time $t_d$ given by (67), that is before instant $t_4$ in FIG 68c when its body-diode will turn-OFF. The absence of the abrupt current change in the input capacitor and the gradual change during $t_d$ subinterval is actually very beneficial for reduction of conducted and radiated EMI noise. For previous high voltage example values: $V_g=400$ V, $L_r=27$ $\mu$H, $I_2=0.74$ A (output DC load current $I_2$ reflected to the primary side with n=27 turns ratio), the current reversal subinterval is $t_d=50$ ns.

Oscillations in State-1 Interval

Figure 68C:
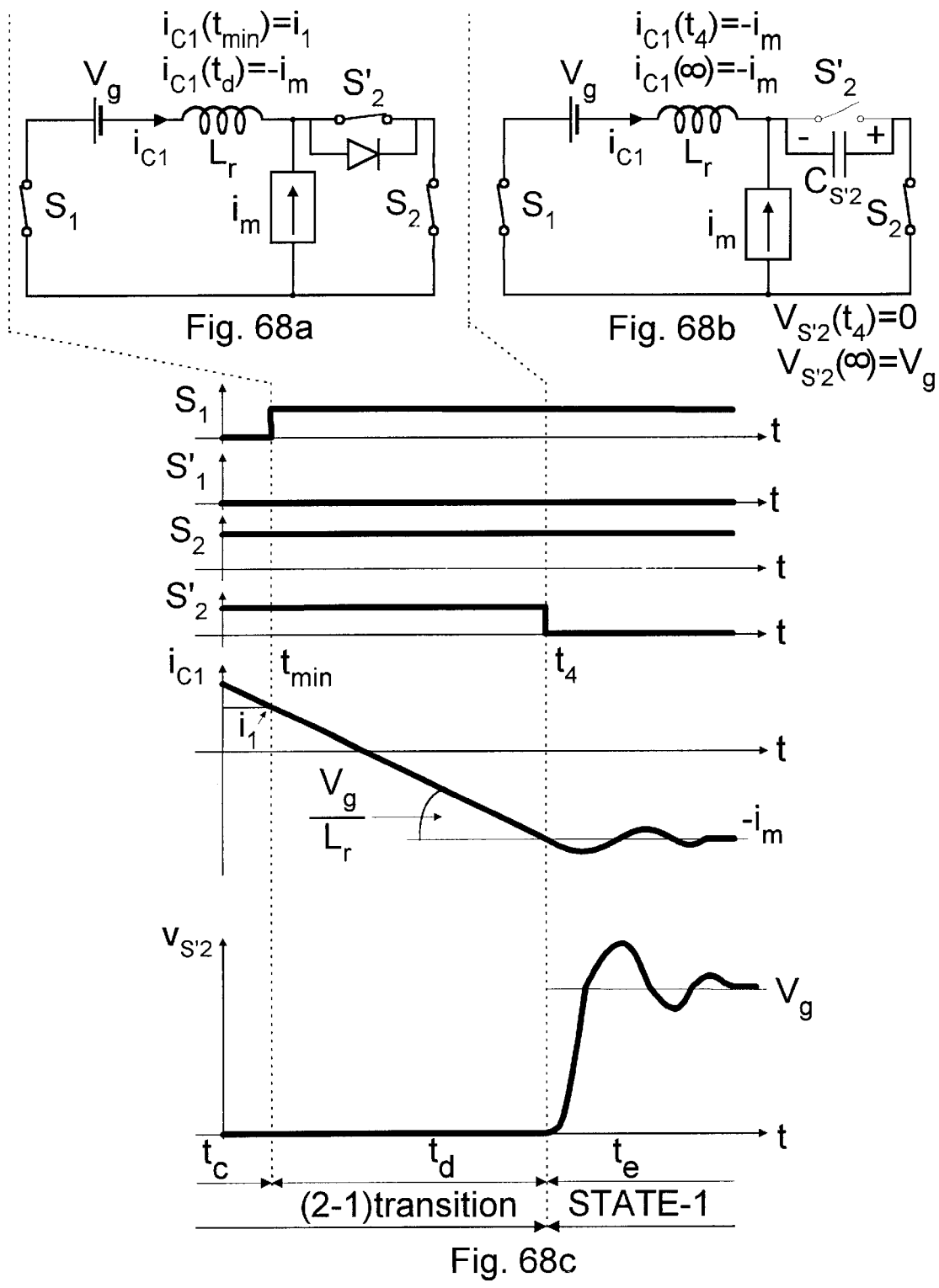
FIG. 68c illustrates the characteristic waveforms during current-reversal subinterval and the beginning of State-1 interval.

After the complementary input switch is turned OFF at the end of $t_d$ subinterval, the 2–1 transition is completed and results in reversal of the switch states from that at the beginning of this transition as seen in the model of FIG. 68b in which the input and output switches are ON, while the complementary input switch and complementary output switch are OFF. Nevertheless, the very act of turning OFF of the complementary output switch has introduced its parasitic capacitance $C_{S'2}$ in series with resonant inductor. This forms effectively another resonant circuit through which this capacitance $C_{S'2}$ is charged from its initial zero voltage value to its final voltage $V_g$ resulting in an oscillation as shown in FIG. 68c having potentially 2 $V_g$ peak value. Once this oscillation dies out due to the damping and losses, the final steady-state is reached. The oscillations clearly increase the blocking voltage requirement of the respective switches. If the inherent parasitic resistances associated with the oscillating elements do not sufficiently damp the oscillation, an external R-C snubber network can be used to dampen this oscillation.

Comparison of the Effectiveness of the Three Resonant Components

Clearly, the relative contribution of each resonant voltage component in reduction of the total voltage $v_{S1}$ depends on the corresponding magnitudes of the respective sin voltage and cosine voltage components given by (57), (58), and (59). Here is the practical example of an isolated converter with 27:1 step-down turns ratio designed for a 400 V to 5 V, 20 A output operating at 250 kHz switching frequency. When the secondary side is reflected to the primary, the following values were obtained for the equivalent non-isolated converter:

$$V_C=575 \text{ V } V_g=400 \text{ V } t_b=121 \text{ ns } t_c=162 \text{ ns } L_r=27 \mu H \, C_r=237pF \quad (68)$$

and the following values calculated from the formulas:

$$I_{r1}=0.78 \text{ A } I_{r2}=0.52 \text{ A } I_{r3-IN}=0.285 \text{ A } R_0=339\Omega$$
$$\omega_r=12.45 \text{ MHz} \quad (69)$$

The three component resonant voltages and resultant combined resonant voltage are:

$$V_{r1}=265 \text{ V } V_{r2}=175 \text{ V } V_{r3}=95 \text{ V } V_r=400 \text{ V} \quad (70)$$

Since $V_r=V_g=400$ V, zero voltage switching is achieved on input switch as per (65), and as seen in the thick lines in FIG. 67c (for $V_g=0.6$ $V_C$). From this typical example the first resonant component is clearly the most effective in reducing the input switch voltage, the second resonant component less so, and the third resonant component is the least effective.

This order of effectiveness of the three resonant components is in fact generally true for all practical examples of interest for the following reason. The third resonant voltage component with magnitude $v_{r3}=R_0I_N$, depends on $I_N$ and is very small for small $I_N$. The second resonant voltage component with magnitude $V_{r2}=V_C-V_g$, however, does not depend on $I_N$. Yet for D=0.5, $V_{r2}=V_g$ so that this component alone can reduce input switch voltage to zero. This component, however, becomes progressively less effective when the operation duty ratio D becomes lower than D=0.5, since $V_{r2}$ becomes only a fraction of input voltage $V_g$. This is where the first resonant voltage component with its magnitude $V_{r1}=I_{r1}R_0$ comes to rescue. Even at low duty ratios this component is effective in reducing the input switch voltage to zero. This only requires proportionally longer boost interval (by effectively turning ON output switch $S_2$ earlier) to increase the first resonant current component $I_{r1}$ as needed. This does not increase any other losses, since the boost interval is quite short on the order of 150 nsec.

Note that the third and least effective resonant component $v_{r3}$ is the only component present in prior-art soft-switching methods. The additional two resonant voltage components, $v_{r1}$ and $v_{r2}$ which are much more effective, are uniquely present in the novel lossless switching methods of the present invention.

The above sine and cosine resonant current and resonant voltage components as well as the resultant sums are plotted to scale in FIG. 67c according to the above practical example to provide insight into typical relative scaling of various resonant components. Furthermore, the scaling of various resonant voltage waveforms in FIG 64b (waveforms 1 to 4) are also drawn for the above practical example, but for different instants of turning ON of output switch $S_2$ and corresponding turning ON of input switch $S_1$ at the minimum voltage across input switch. This example and its modifications are used later in experimental section to verify the predicted lossless switching waveforms. Each of the four different cases displayed in FIG. 64b are now discussed separately.

Case 1 - Three Resonant Components and CBS Output Switch

Figure 66B:
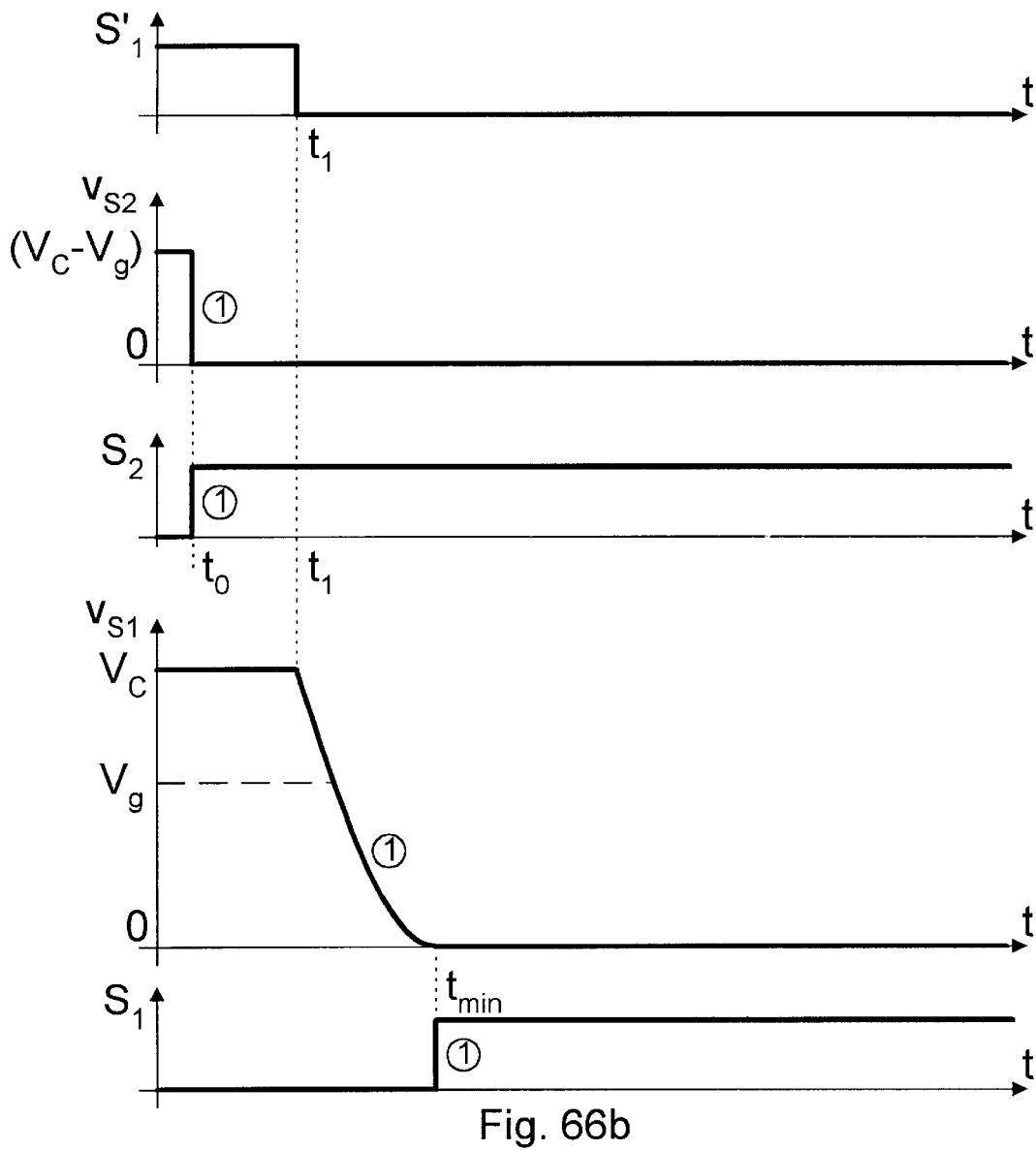
FIG. 66b shows relevant waveforms for the converter of FIG. 66a, when output switch is turned ON before the complementary input switch is turned OFF resulting in boost subinterval.

As shown in FIG. 66b, voltage on input switch is reduced to zero through resonant discharge. Note that the first resonant voltage "boost" component $v_{r1}$ (FIG. 67c) is responsible for most of the voltage discharge, since even if the other two components were eliminated, 265 V voltage reduction would have been achieved and $V_h$=135 V obtained. Thus, an 18 times reduction of maximum hard-switching losses for $V_C$=575 V would be obtained. Note also that the first resonant component $V_{r1}$ can be easily increased. By increasing the "boost" interval (FIG. 67c) by just 50% from $t_b$=121 ns to $t_b$=183 ns, the first resonant boost component along would become $V_{r1}$=400 V and zero voltage switching obtained even without any contribution of the remaining two other resonant components. Furthermore, this comes at virtually no other penalty, since boost interval is short compared to the total switching period. Thus despite intentionally increasing $I_{r1}$ current by substantially increasing boost interval, this has negligible effect on conduction losses, the RMS current, and efficiency. In this example, boost interval is indeed small compared to whole switching period: 121 ns in comparison with switching period of 4,000 ns or 3%. This is, for example, not the case with the third resonant voltage component $v_{r3}$. By increasing the complementary input switch peak current $I_N$ the RMS currents in the whole converter are also substantially increased, thereby offsetting significant portion of the loss reduction. Clearly, this case is therefore very effective for the high input DC voltages, in which large resonant voltage discharge is needed such as 575 V as in this example, and is very difficult to achieve by any other resonant component.

Case 2 - Two Resonant Components and CBS Output Switch

Figure 69A:
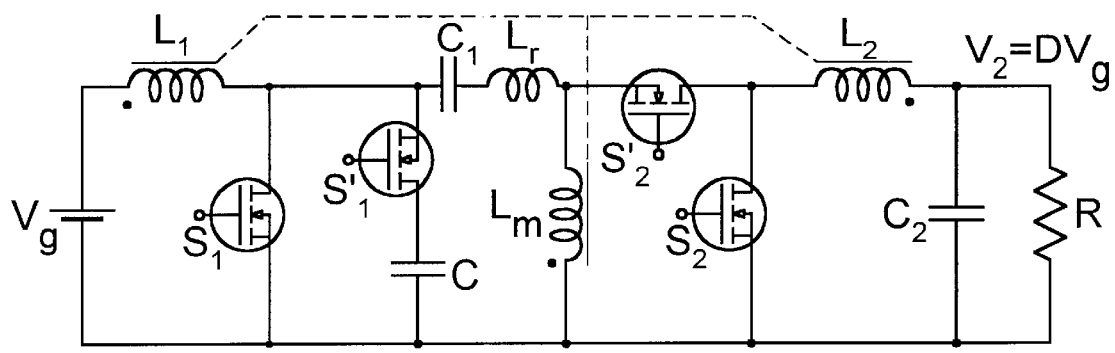
FIG. 69a illustrates the converter for Case 2 of FIG. 64b with CBS output switch and resonant inductor.
Figure 69B:
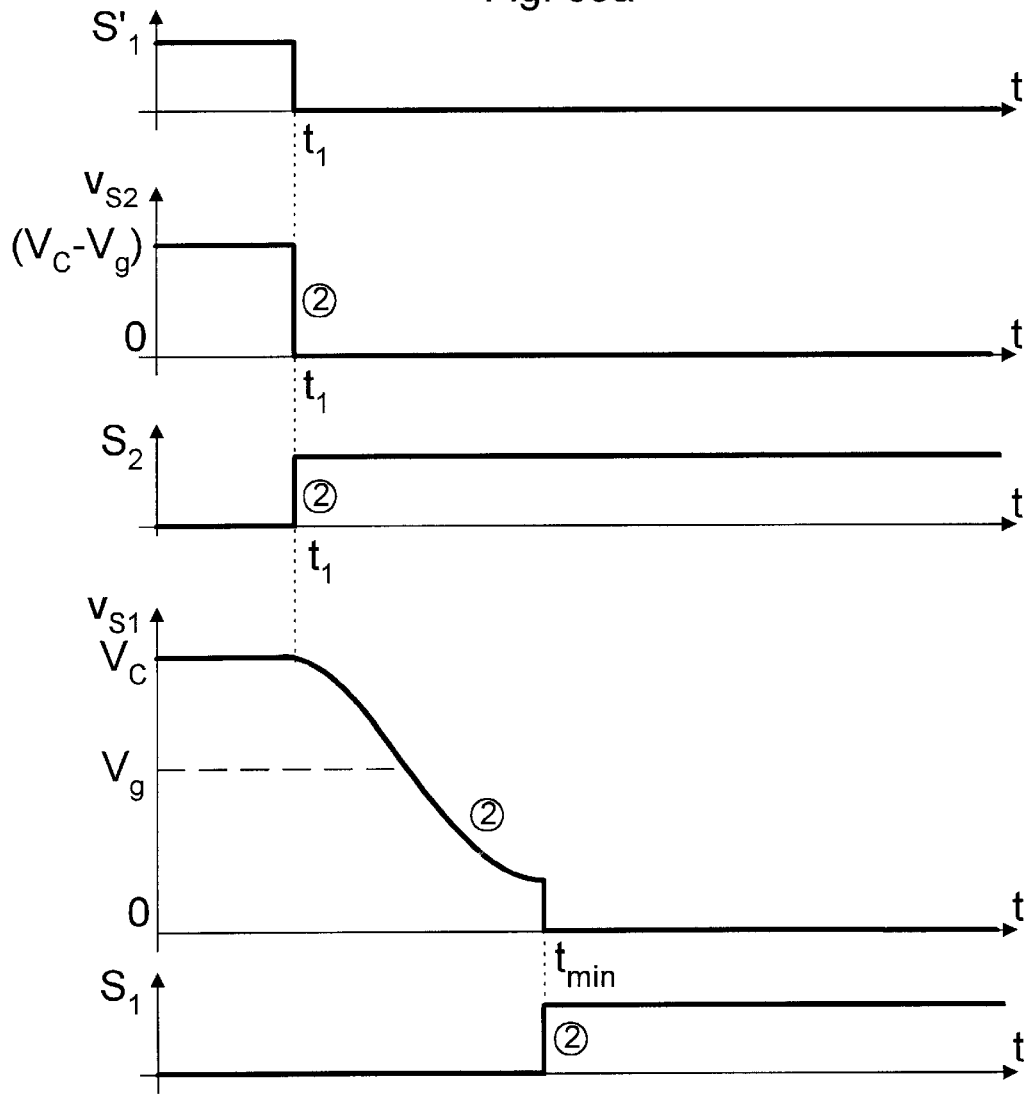
FIG. 69b illustrates the characteristic waveforms for the Case 2 when the output switch $S_2$ is turned ON simultaneously with the turn-OFF of the complementary input switch $S'_1$.

In this case the boost interval is reduced to zero, and thus, the first resonant voltage component $v_{r1}$ is eliminated. This happens when the output switch is turned ON at exactly the same instant $t_1$ when complementary input switch is turned OFF as shown in FIG. 69b, resulting in only two remaining resonant voltage components:

$$v_{S1}(t)=V_g+v_{r2}+v_{r3} \quad (71)$$

Figure 70A:
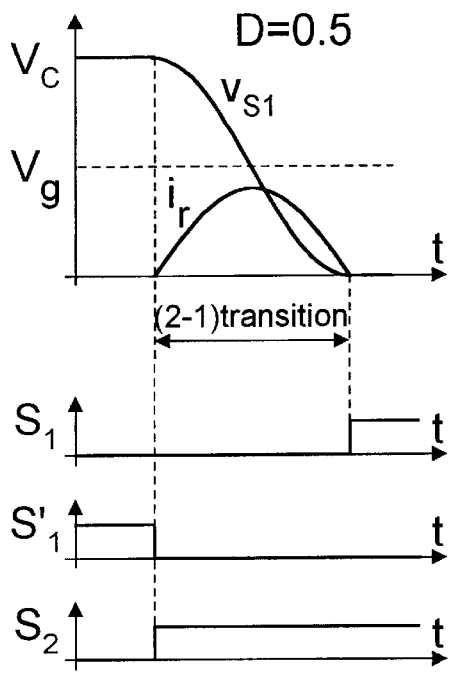
FIG. 70a shows the complete discharge of the parasitic capacitance of input switch at D=0.5 and turn-ON of input switch at zero voltage.
Figure 70B:
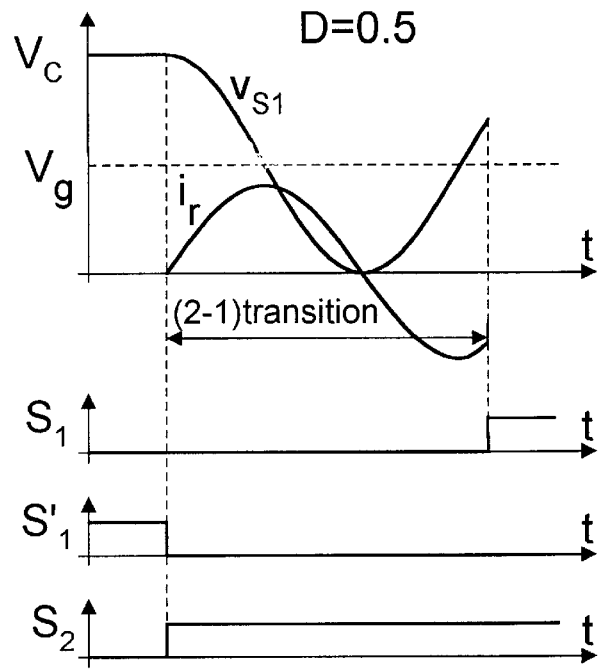
FIG. 70b shows that the delay in turn-ON of input switch past minimum voltage on that switch can lead to substantial hard-switching losses.

Resultant maximum resonant voltage is from formula (62) equal to $V_r$=199 V. Thus, from (66) the remaining hard-switching voltage is $V_h$=201 V obtained at instant $_{min}$. Note how the resonant component $v_{r2}$ in this case dominates $v_{r3}$ component, whose only effect was to bring the input switch voltage further down from 225 V to 201 V, for a net additional decrease of only 24 V or less than 10% reduction of hard-switching voltage $V_h$. Note, that effectiveness of the second resonant voltage component depends on the "voltage overhead" ($V_C-V_g$), which, in turn, depends on the duty ratio D. To clearly expose this dependence, let us assume that the third resonant voltage component $V_{r3}$ has a negligible effect, which is the case when $$I_N R_0<<(V_C-V_g) \quad (72)$$

so that only the component $v_{r2}$ in (71) remains. In that case, the voltage on input switch $S_1$ can at best be reduced by the value $|V_C-V_g|$ below $V_g$. Thus for a duty ratio D=0.5, $V_C$=2 $V_g$, and $V_C-V_g=V_g$ and the resonant discharge can reduce the capacitor voltage of the input switch all the way down to zero volts for a complete lossless switching as seen in FIG. 70a. Note the importance of "catching" these resonant oscillations at just the right moment by turning ON input switch $S_1$ when the minimum voltage on $S_1$ is obtained. If that moment was missed and turn-On was delayed as illustrated by waveform in FIG 70b, the oscillations in the voltage could bring the voltage $v_{S1}$ almost back to the initial value $V_C$ since ultra low parasitic resistances provide the very little damping. Clearly, turn-ON at such a voltage would result in almost no reduction of losses compared to the hard-switching case. Thus, in this resonant inductance case, the correct timing of the drive for input switch $S_1$ is critical for the full benefit to take place.

Figure 70C:
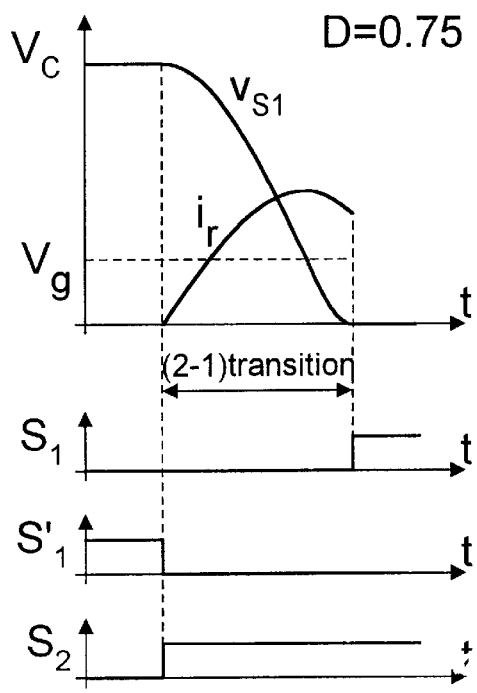
Figure 70D:
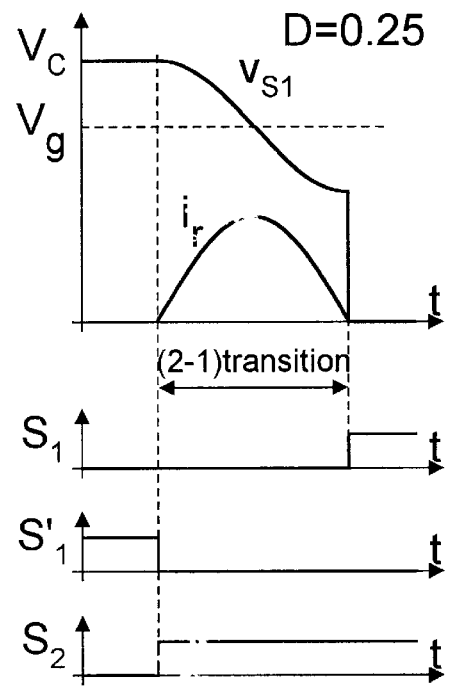
FIG. 70d illustrates the strong dependence of the effectiveness of resonant discharge on the duty ratio: at D=0.25, the large hard-switching voltage remains.

For duty ratios higher than D=0.5, the method is equally effective, since the resonant transition is always guaranteed to bring the voltage down to zero level as seen in FIG. 70c for D=0.75. In this case, $V_C-V_g$=3 $V_g$, and only a portion of resonant voltage reduction available is needed to bring input switch voltage to zero. However, for duty ratios lower than D=0.5 the lossless switching is progressively less efficient. For example for D=0.25 (FIG. 70d), since $V_C$=1.33 $V_g$, $V_C-V_g$=0.33 $V_g$, resulting in the lowest hard-switching level of 0.66 $V_g$ at which point input switch $S_1$ must be turned ON, and hard-switching losses associated with that must be accepted. Hence the lossless switching would result in 4 times reduction of switching losses for duty ratio D=0.25.

Figure 2A:
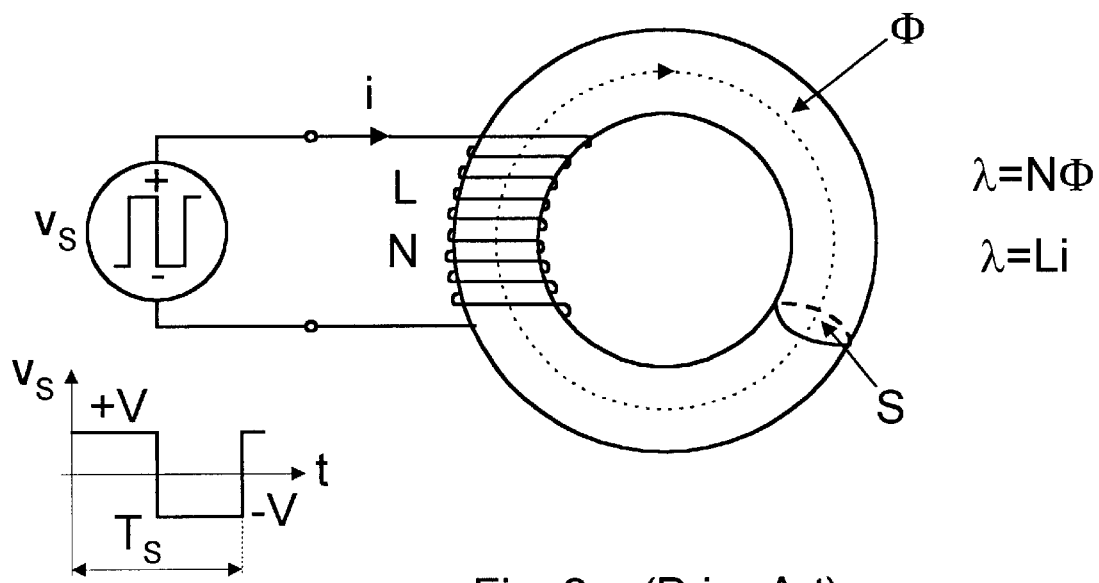
Figure 2B:
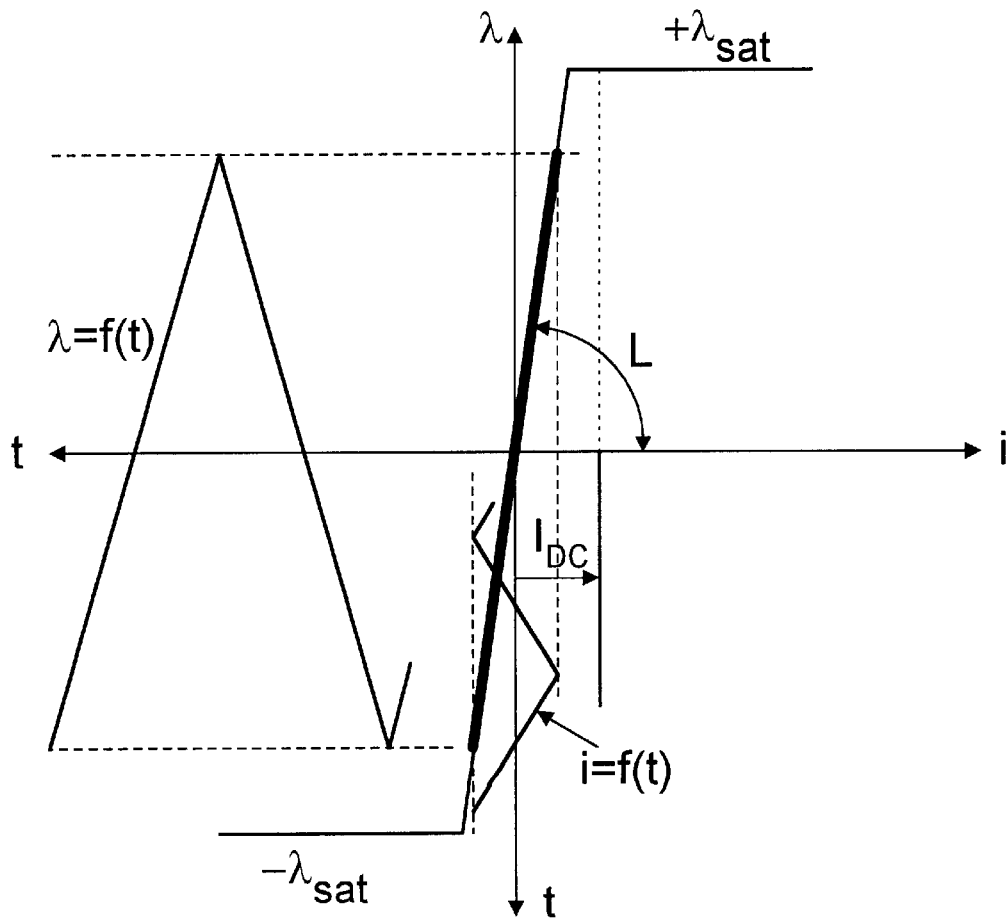

Of course, to make the full comparison of losses, one has to take into account extra losses of the resonant inductor as well as the additional space for it. However, this is only true for the non-isolated extension of FIG. 69a and its derivatives. In the isolated converter of FIG. 62a and its derivatives, a resonant inductor $L_r$ is already built-in as a leakage inductance of the isolation transformer structure itself, which plays the same role as this external resonant inductor. Note that the 2–1) transition is independent of the DC load current since $v_{r2}$ component depends on voltage difference ($V_C-V_g$) and not on DC load current. Similarly, the $v_{r1}$ and $v_{r3}$ components depend on the boost current component $I_{r1}$ and AC ripple component $I_N$, thus are also independent of the DC load current. Therefore, the resonant subinterval of the (2–1) transition will have the same duration for either the full DC load current or for no load current, which is definite advantage over the prior-art soft-switching methods dependent on DC load current such as one in FIG. 2e.

The second resonant voltage term $v_{r2}$ is particularly very effective in the case of high input voltage. Note that this "cosine" component of total resonant voltage reduction depends neither on the characteristic resistance $R_0$ nor on complementary input switch AC ripple current $I_N$ but is only function of the voltage overhead ($V_C-V_g$). As seen in FIG. 70a for duty ratio D=0.5, the complete discharge to zero voltage level is guaranteed for any input voltage $V_g$. For example, this input voltage could be 1000 V, 2000 V, etc. and reduction to zero voltage would be obtained irrespective of $R_0$ value, hence for any resonant/leakage inductance and any resonant capacitance $C_r$ of the switches, and for any complementary input switch AC ripple current $I_N$ including zero-ripple current. All what is needed to activate this second resonant voltage component $v_{r2}$, is to use the active CBS switch for output switch and proper switching time control: instead of letting the output switch body-diode be turned ON in response to converter circuit state, this active switch is deliberately turned ON much earlier. For greatest effect, this output switch is turned ON at the same instant $t_1$ at which the complementary input switch is turned OFF. Note that this second resonant voltage component $v_{r2}$, which is so effective for high input DC voltages, is also missing from the prior-art soft-switching methods.

Just the opposite is the case for the third resonant voltage component $v_{r3}$, which becomes increasingly ineffective as the input DC voltage is increased, as discussed below for Case 4. This third component is the only resonant component present in prior-art soft-switching methods, which explains their ineffectiveness at medium to high input DC voltages.

Case 3 - Two Resonant Components with Linear Subinterval

Figure 71A:
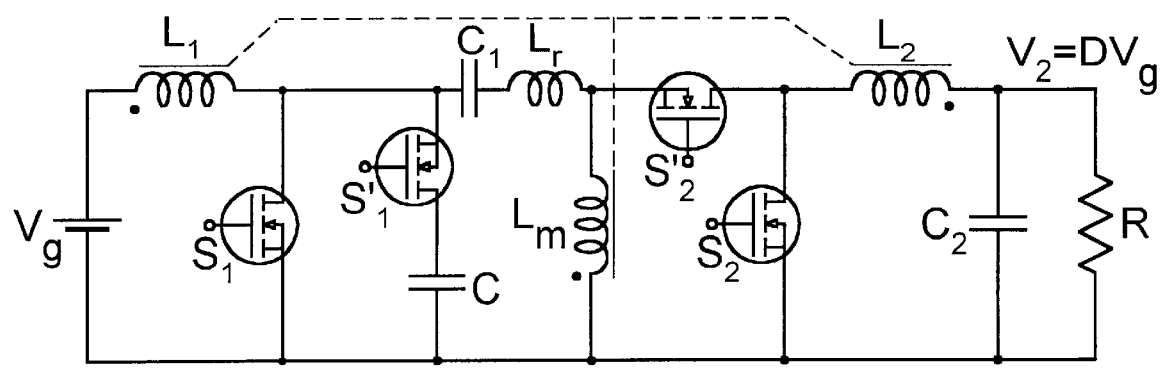
FIG. 71a illustrates the converter for Case 3 of FIG. 64b with CBS output switch and resonant inductor.
Figure 71B:
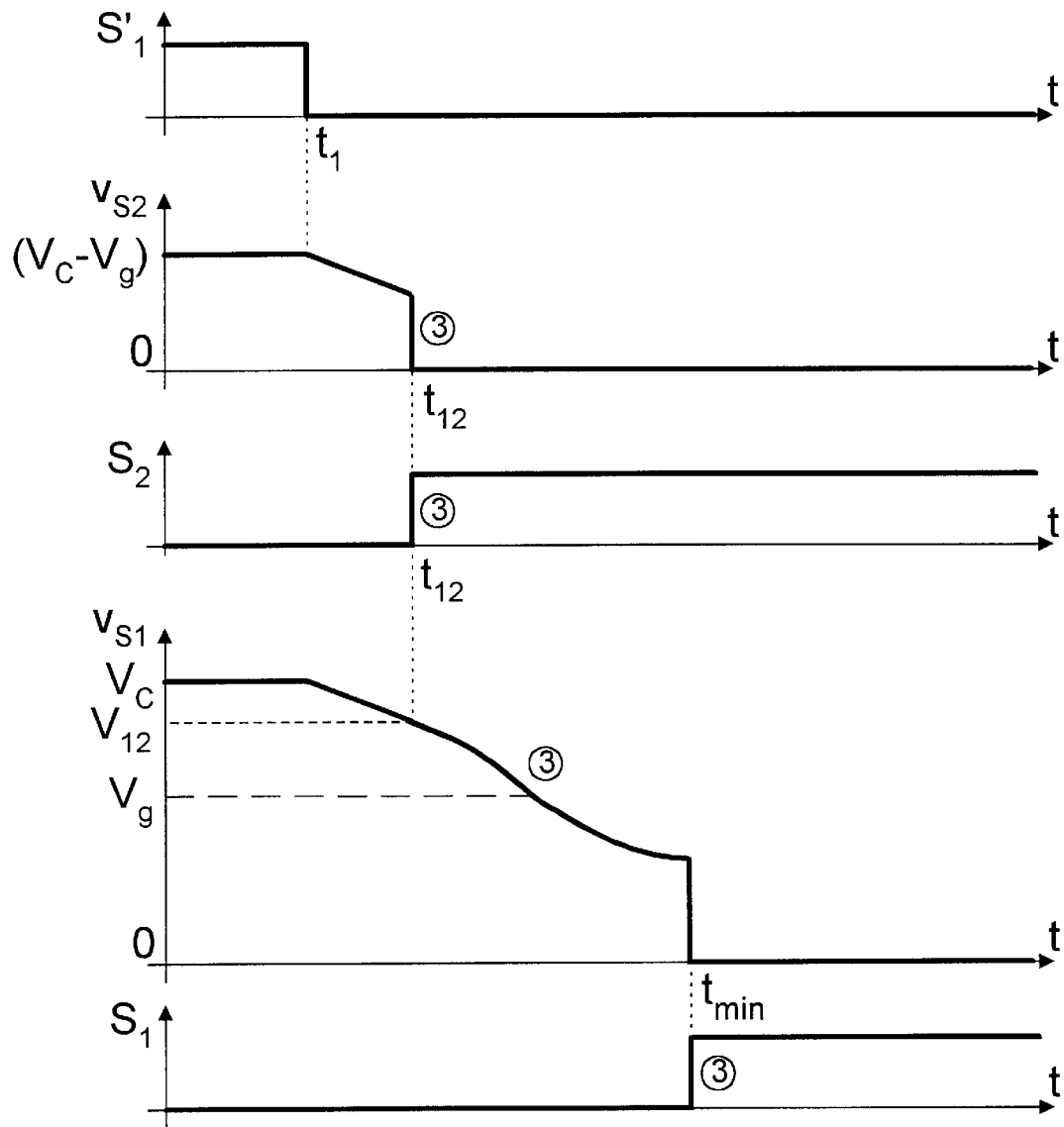
FIG. 71b illustrates the characteristic waveforms of the Case 3 when output switch $S_2$ is turned ON after turn-OFF of complementary input switch but before body-diode of output switch is turned-ON resulting in linear subinterval unit $V_{12}$ voltage, followed by a resonant subinterval.

If the turn-ON of output switch $S_2$ is delayed further to instant $t_{12}$ (FIG. 71b) after complementary input switch was already turned OFF at instant $t_1$, an additional linear discharge interval is obtained during which both input and output switch voltages are linearly discharged. The resonant discharge then starts at instant $t_{12}$ when the output switch is deliberately turned ON. Still, only two resonant voltage discharge components exist as in (71). However, maximum value of the second component is now substantially smaller since in (62) the voltage $V_C$ is replaced by a reduced voltage $V_{12}$ present on input switch at instant $t_{12}$. For example, for $V_{12}$=495 V, the second component reduces to $V_{r2}$=95 V, instead of previous 174 V. Now both remaining resonant components have equal influence so that resultant voltage is $V_r$=134 V, and the remaining hard-switching voltage is $V_h$=266 V. This case is most suitable for medium input DC voltages and for D>0.5. Note how the longer linear subinterval makes the second resonant voltage component less and less effective until it is completely eliminated when linear subinterval extends to instant $t_2$ to result in Case 4.

Case 4 - One Resonant Component Only and CBS/Diode Output Switch

If the output switch is not deliberately turned ON prematurely as in previous cases, but is left to turn ON naturally when the voltage across it reaches zero as shown earlier in FIG. 60c (hence simple diode rectifiers are sufficient for output switch and complementary output switch as was shown in FIG. 59a), only the third resonant voltage component remains so that $$v_{S1}(t) = V_g + v_{r3} \tag{73}$$

This resonant voltage component is least effective in reducing input switch voltage through resonant discharge. In above example, the input switch voltage can only be reduced by $V_{r3}$=95 V below $V_g$ to result in hard-switching voltage of $V_h$=305 V. Increasing the complementary input switch AC ripple current $I_N$ and/or characteristic impedance $R_0$ may increase the effectiveness of this component as discussed earlier but at a proportionally increased overall loss and reduction of efficiency.

Special Cases

Controllable Output Switch Used Only in Boost and Resonant Subintervals

Figure 72A:
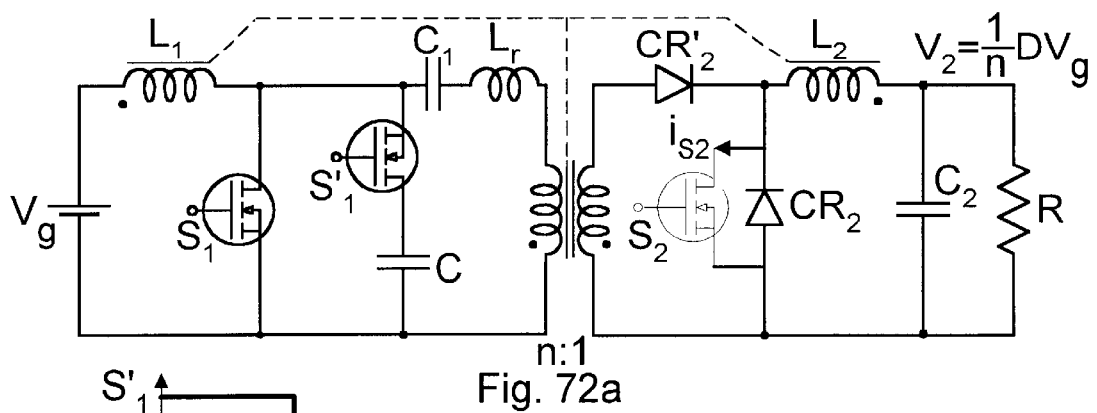
FIG. 72a illustrates an isolated converter with output switch comprising a low power MOSFET $S_2$ and high power external current rectifier $CR_2$ (diode).
Figure 72B:
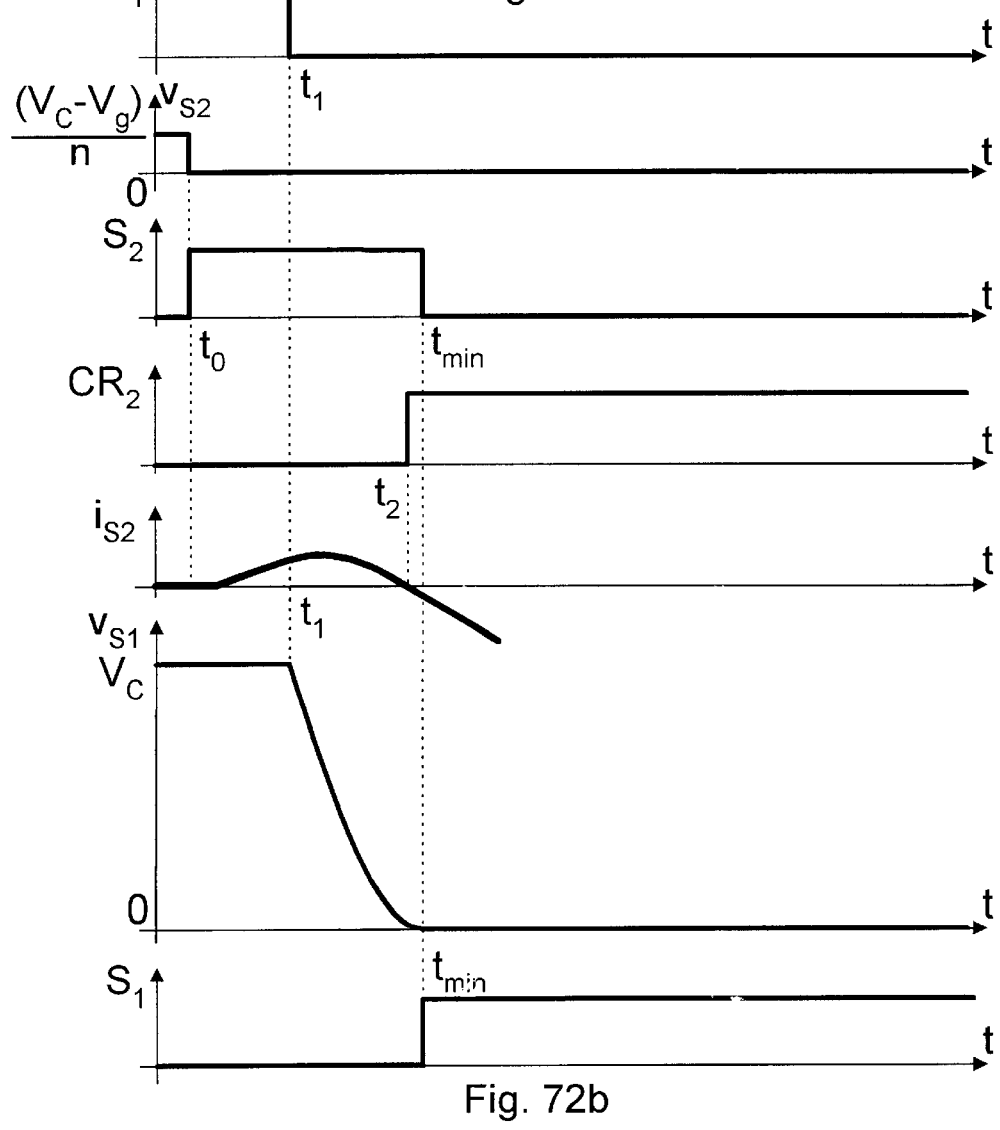
FIG. 72b shows the output MOSFET switch $S_2$ is used during the resonant transition subinterval to eliminate the switching losses and is OFF afterwards when the external diode takes over conduction.

The following example is intended to illustrate how combinations of the above lossless switching methods can be used beneficially in some practical applications. In the telecommunications AC line to 48 V output voltage rectifiers, especially at high current and power levels, the output rectifier diodes may actually be preferred over the MOSFET switches due to lower conduction losses and lower cost. On the other hand, in the case of single-phase utility AC voltage, the rectified AC line results in 400 V input DC voltage, which, in turn leads to relatively significant switching losses generated by the high voltage rated switching devices on the primary side. The circuit configuration of FIG. 72a and the particular switching time control drive of the auxiliary MOSFET output switch $S_2$ in FIG. 72b, leads to both low switching losses and low conduction losses of the output diode rectifiers. Note that the output switch is implemented with the power diode rated for full power and with an "auxiliary" low power, low current MOSFET switch in parallel. The "auxiliary" MOSFET switch (shown in thin lines in FIG. 72a), is then used only to conduct current during the boost and resonant subintervals, while the power diode is taking over the conduction when turned ON naturally by the converter circuit at instant $t_2$ as seen by the current waveform $i_{S2}$ in FIG. 72b. Shortly thereafter at time $t_{min}$ the input switch is turned ON at zero voltage and simultaneously the output "auxiliary MOSFET is turned OFF. From that instant onward, output diode rectifier $CR_2$ takes over the conduction of the DC load current.

Any of the previous methods with resonant inductor can be implemented. For high input DC voltages as in telecommunications rectifiers, the above case with a boost subinterval followed by a resonant discharge (same as Case 1 of FIG. 64b) might be the most effective in eliminating the otherwise dominant switching losses of the input switch during the (2–1) transition. This example also clearly points out the non-critical drive timing of the complementary output switch, which in this case as well as in previous cases could be just a passive diode rectifier switch and not active controlled MOSFET switch.

Effect of the Large Capacitance of the Output Switch

The above cases were all based on the assumption (47) that the output switch capacitance reflected to the primary side as defined in (46) is negligible compared to resonant capacitance $C_r$ of the input switches. This is indeed the case for the high transformer step-down turns ratio. In the previous example with $V_g$=400 V, the output switch capacitance $C_{S2}$=2950 pF becomes $C_{S2p}$=4 pF when reflected to the primary side. This, in turn, is indeed negligible when compared to resonant capacitance $C_r$=237 pF of the actual input switches.

However, when the isolation transformer step-down turns ratio is not large and approaches 1, such scaling is not any more applicable. In fact for 1:1 turns ratio, the output switch voltage blocking requirements are similar to the input switch resulting in comparable parasitic capacitances so that reflected capacitance $C_{S2p} \approx C_r$, so that (47) is not satisfied. The net result is that the output switch capacitance does alter the waveforms across both input and output switch. This effect is now examined for the previous Case 4 of FIG. 59a and FIG. 60c with only one resonant current component $i_{r3}$ present. In that case, the converter circuit operation forces the diode rectifier to turn ON and only the drive timing of input switch and complementary input switch matter.

Figure 73A:
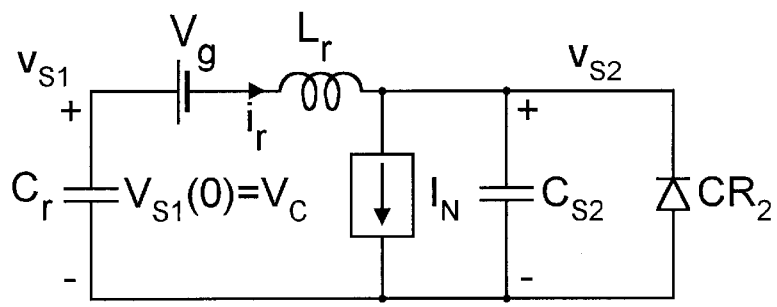
FIG. 73a illustrates the equivalent circuit model of the converter in FIG. 59a with parasitic capacitance $C_{S2}$ of the output switch included.
Figure 73B:
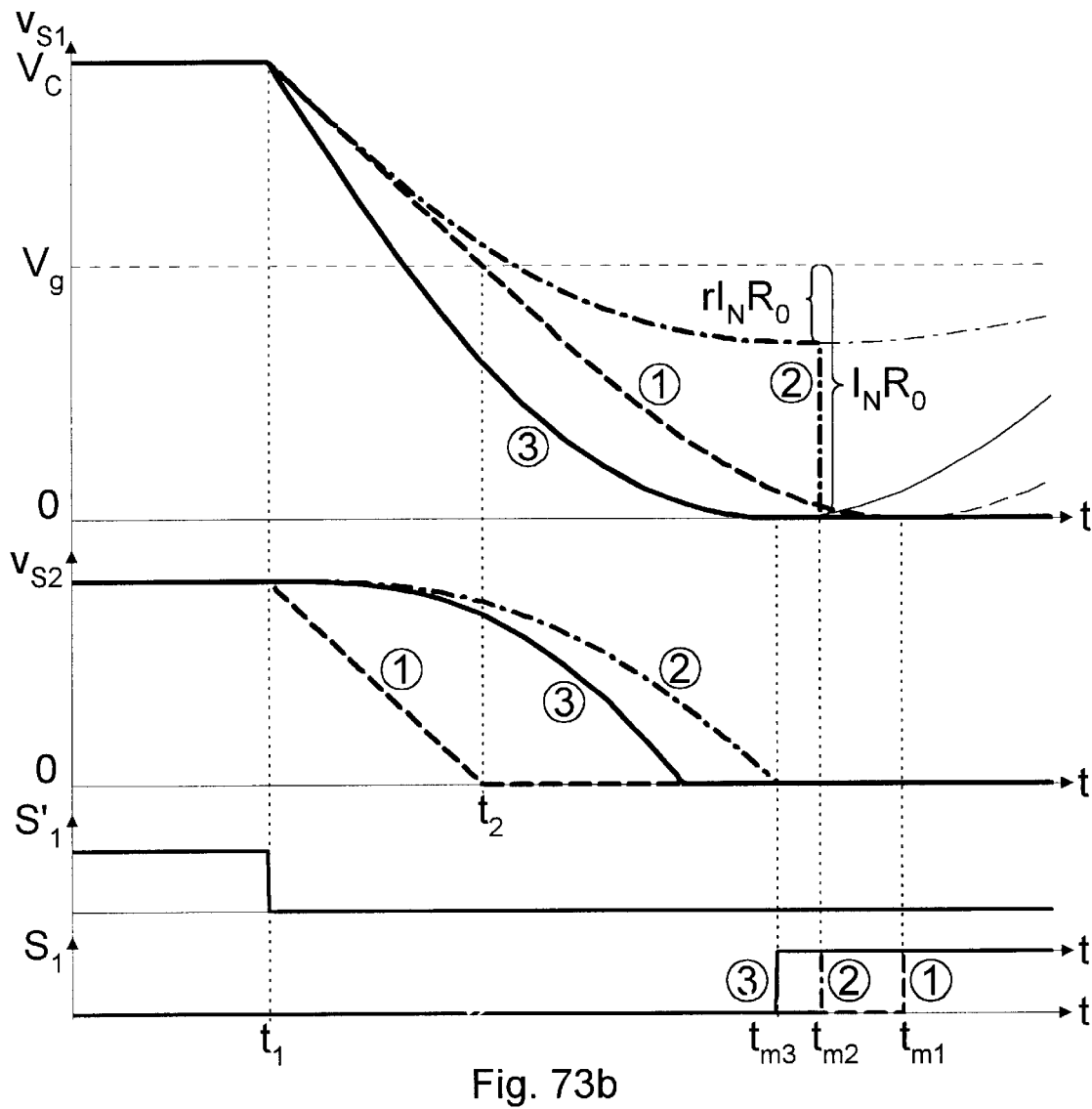
FIG. 73b illustrates characteristic waveforms for three cases: 1) $\alpha=0$; $\beta=0.8$; $\delta=1$, 2) $\alpha=1$; $\beta=0.8$; $\delta=1$, 3) $\alpha=1$; $\beta=8$; $\delta=1.64$.

The equivalent circuit for this case is shown in FIG. 73a. Waveforms plotted with dotted lines in FIG. 73b and marked with number 1 correspond to case when $C_{S2}$ is negligible in comparison to $C_r$. In that case, both input switch and output switch parasitic capacitances discharge linearly until the output switch voltage is reduced to zero at $t_2$, and the output switch diode turns ON. Then, the resonant discharge starts and brings the input switch voltage further down to zero at $t_{m1}$ for a total resonant discharge of 40 V since in this example $V_g$=40 V. The large capacitance $C_{S2}$, however, prolongs the discharge as seen in dotted-line waveforms marked with number 2 in FIG. 73b causing reduced resonant voltage discharge across the input switch to hard-switching voltage given by $V_g - rI_N R_0$, where reduction ratio r is obtained from (77). From the model in FIG 73a the large capacitance $C_{S2}$ demands additional current, which in turn must be compensated by complementary input switch ripple current increase to a new value $I_{NN}$ in order to reduce input switch voltage to zero. In that case, the reduction to zero voltage on input switch is restored and the waveforms designated by thick lines and marked with number 3 in FIG 73b are obtained.

The only resonant voltage component present in this case, $v_r=-V_r \sin \omega_r t$, is reduced by a factor r, which is dependent on dimensionless factors α and β, where $$V_r = rV_r = rI_N R_0 \quad (74)$$

$$\alpha = C_{S2}/C_r \quad (75)$$

$$\beta = (V_C - V_g)/(I_N R_0) \quad (76)$$

$$r = f_1(\alpha, \beta) \quad (77)$$

Figure 74A:
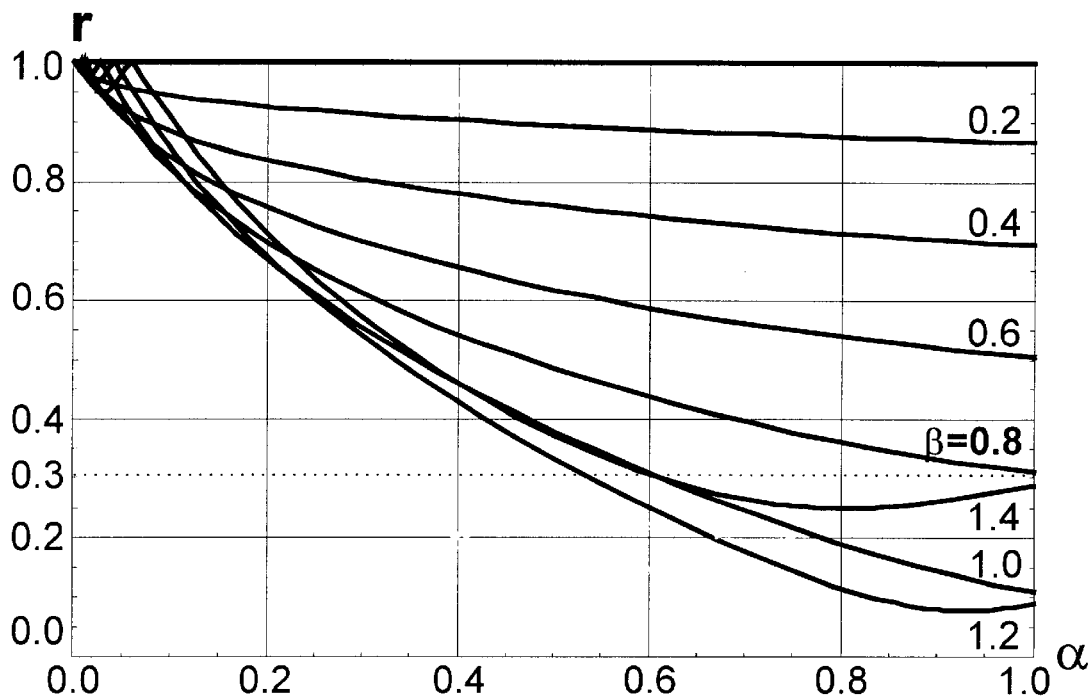
FIG. 74a shows the reduction factor r as a function of capacitor ratio $\alpha$ for various values of parameter $\beta$.

Functional dependence $f_1(\alpha, \beta)$ is displayed in the graphs of FIG. 74a and is useful in assessing lossless switching degradation due to large output switch capacitance. However, for design purposes, important factor is the current amplification factor δ defined as $$\delta = I_{NN}/I_N = f_2(\alpha, \beta) \quad (78)$$

where $I_{NN}$ is a new peak of complementary input switch ripple current needed to achieve zero voltage switching. Input switch voltage $v_{S1}$ for this case is displayed in thick lines marked with number 3 in waveforms of FIG. 73b.

Figure 74B:
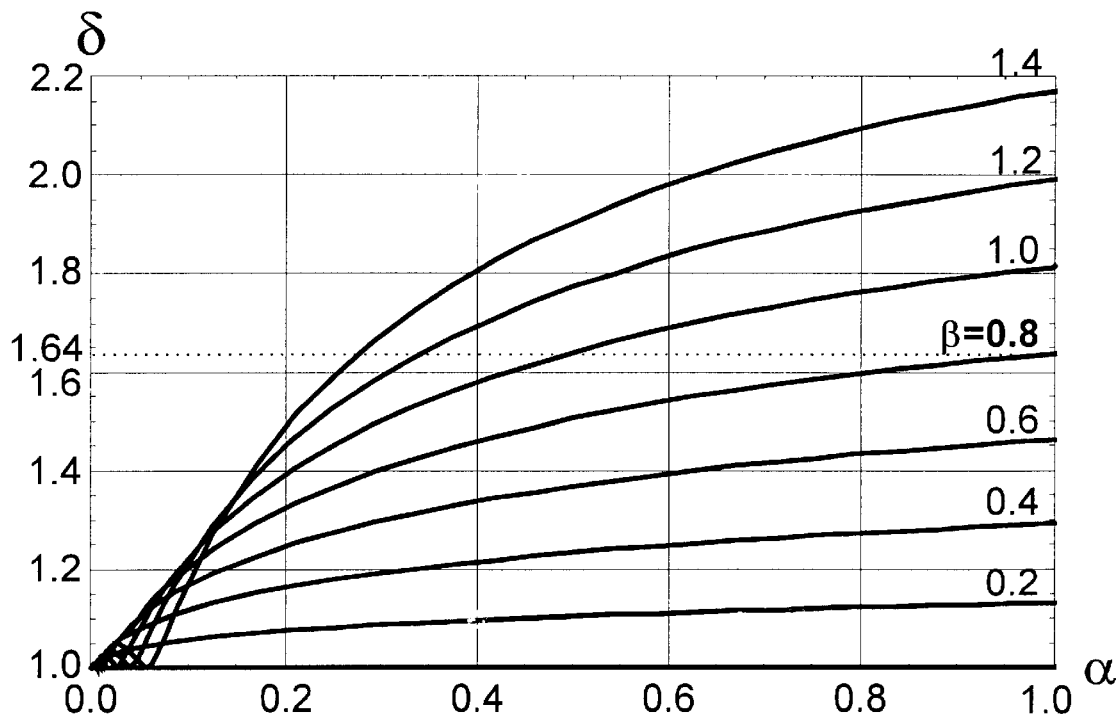
FIG. 74b shows the current increase factor $\delta$ as a function of $\alpha$ and $\beta$.

The above lossless switching method is illustrated with the aid of two graphs of FIG. 74a and FIG. 74 b based on the analytical model obtained from the circuit in FIG. 73a, and for the following numerical example:

$$V_C=72 \text{ V}; V_g=40 \text{ V}; R_0=40\Omega; I_N=1 \text{ A}; L_r=0.75 \text{ }\mu\text{H};$$
$$C_{S2} = C_r = 0.47 \text{ nf} \quad (79)$$

Thus, from (75) and (76), it is calculated that α=1 and β=0.8. Hence from the graph on FIG. 74a, the reduction ratio r=0.31 is obtained as displayed by waveform 2 in FIG. 73b. The current amplification factor δ can be obtained from the graphs in FIG. 74b, which for α=1 and β=0.8, leads to δ=1.64 and $I_{NN}$=1.64 A. Hence a 64% increase of the complementary input switch ripple current is needed to compensate such a large capacitance of the output switch.

Note that the outstanding feature of the previous case with negligible $C_{S2}$ is still preserved: both input switch and output switch are turned ON at zero voltage during this (2–1) transition despite the large parasitic capacitance $C_{S2}$. The analytical model is, of course, more complicated, and the obtained time domain waveforms more complex. In fact, the later analysis of (1–2) transition reveals that complementary input switch and complementary output switch (diode rectifier) are also turned ON at zero voltage during that transition. Hence, all four-semiconductor switches are turned ON at zero voltage in this special case even when large output switch parasitic capacitance is considered. Thus, zero voltage switching is preserved by proper increase of the complementary input switch peak ripple current to $I_{NN}$, or corresponding increase of $R_0$.

Non-isolated DC-to-DC Converter with Resonant Inductor

The non-isolated converter with resonant inductor $L_r$ of FIG. 55a is chosen in which the output switch can be implemented as either MOSFET switch or a diode switch.

Case 1 - CBS or Diode Output Switch

Figures 75A, 75B:
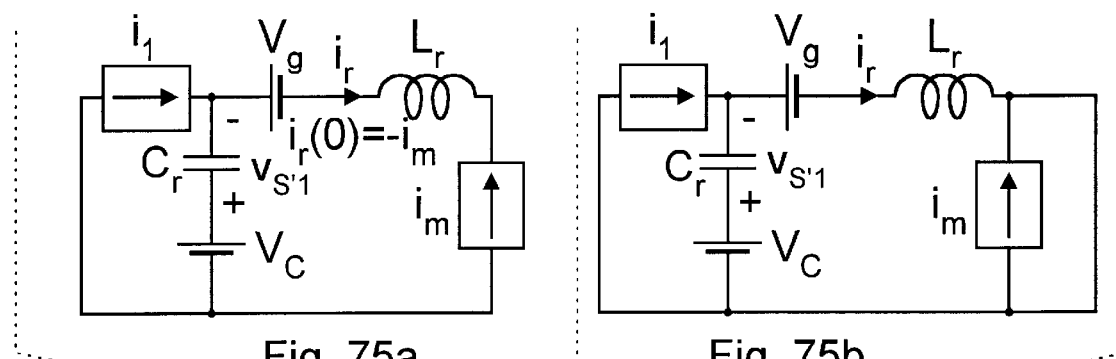
Figure 75C:
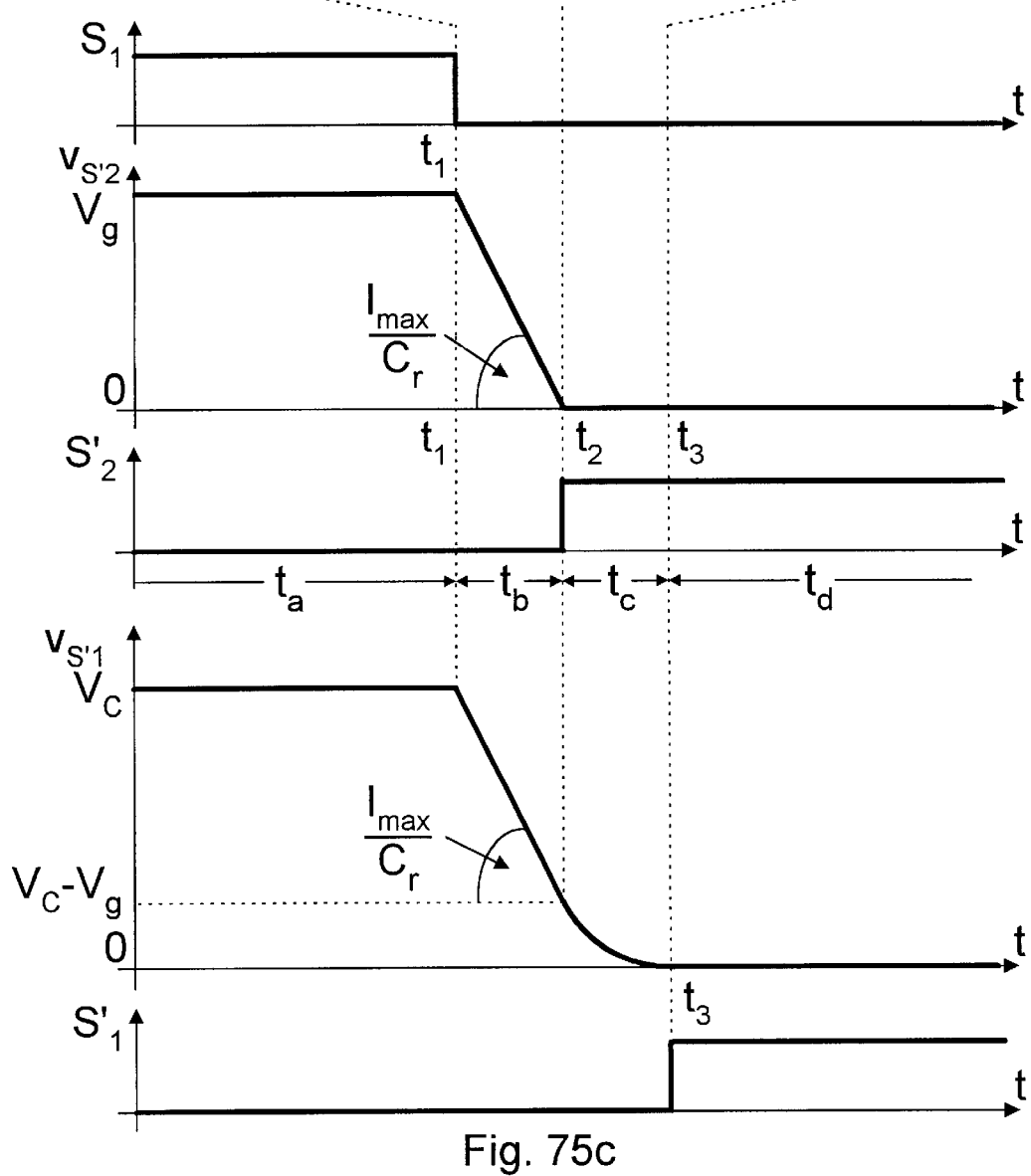
FIG. 75c illustrates the characteristic waveforms during the above two subintervals.

The output switch $S_2$ is closed during entire transition interval. The transition is initiated by turning OFF the input switch to result in the equivalent circuit for the first subinterval as in FIG. 75a. Thus, the difference of the current $i_1-i_r$ discharges parasitic capacitance $C_{S'2}$ of the complementary output switch. The initial value $i_r(0)=-i_m$, thus initially no current is flowing in the capacitance $C_{S'S}$. However, as the voltage on input switch rises, so does the voltage $v_r$ on resonant inductor resulting in decrease of resonant current $i_r$. This, in turn, results in net discharge current in the parasitic capacitance of complementary output switch. As seen in the waveform of FIG. 75c, this parasitic capacitance eventually discharges to zero at $t_2$ enabling the output rectifier switch to turn ON, or in case of a CBS output switch, turning that switch ON when its body-diode turns ON. This leads to the equivalent circuit of FIG. 75b. Thus, the current $i_1-i_r$ continues to further discharge the parasitic capacitance of the complementary input switch all the way to zero at $t_3$ at which instant this switch is turned ON at zero voltage. Note that the output switch was closed throughout both intervals and did not effect the transient operation in any way. Thus, output switch could be implemented either as diode or CBS switch, and identical waveforms will result.

Figure 82:
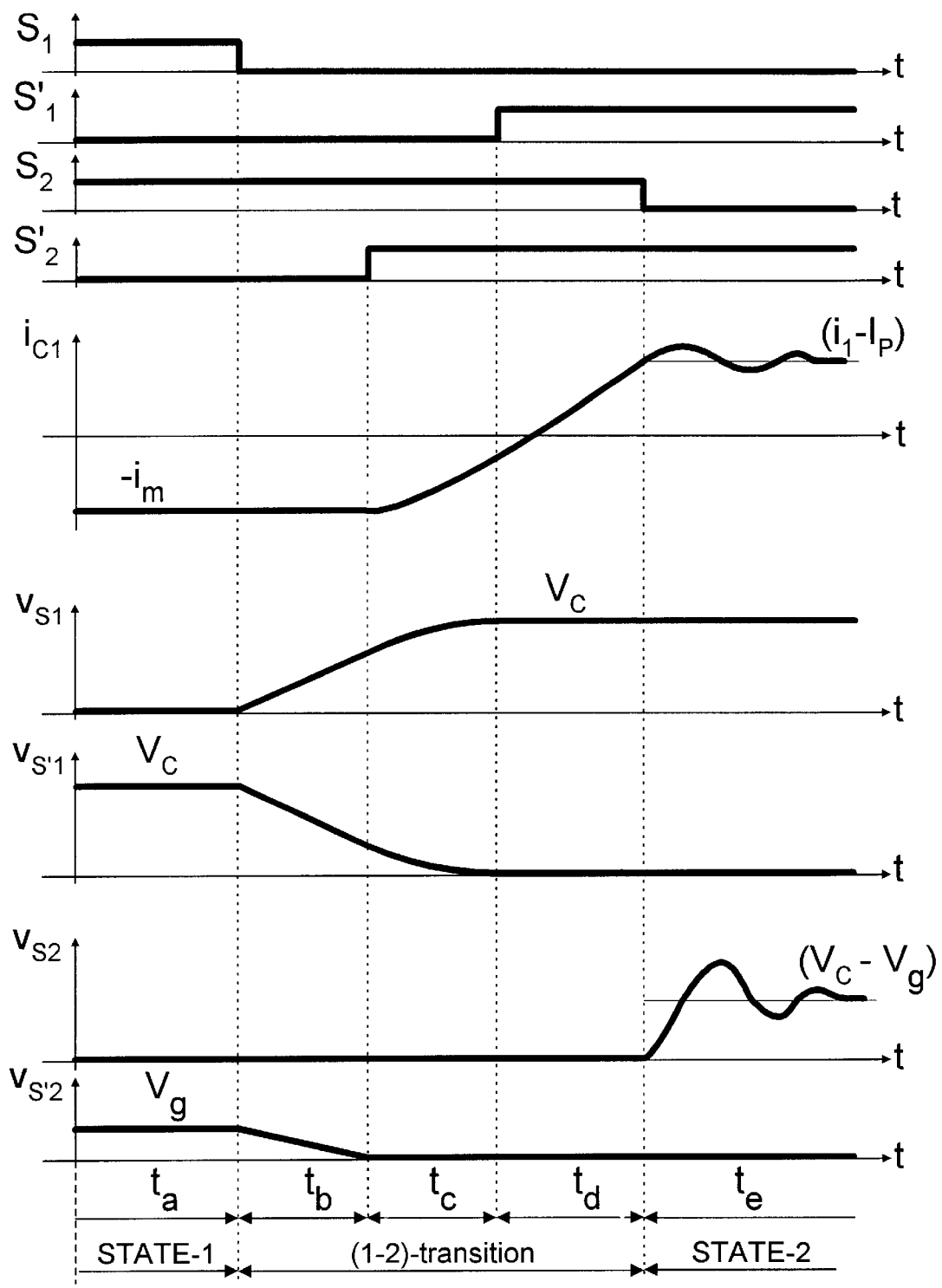
FIG. 82 shows the graph of the characteristic switching time control waveforms, respective switch voltages, and the input capacitor current during the (1-2) transition described by five converter circuits states of FIGS. 81(a–e).
Figure 83A:
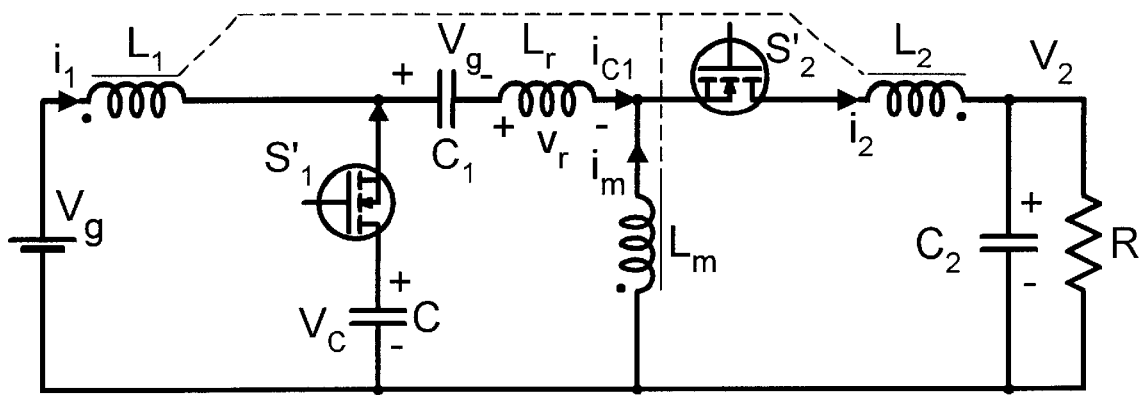
FIGS. 83(a–e) illustrate the five converter circuits states of the converter in FIG. 66a with resonant inductor relevant to the (2-1) transition of Case 1 of FIG. 66b.
Figure 83B:
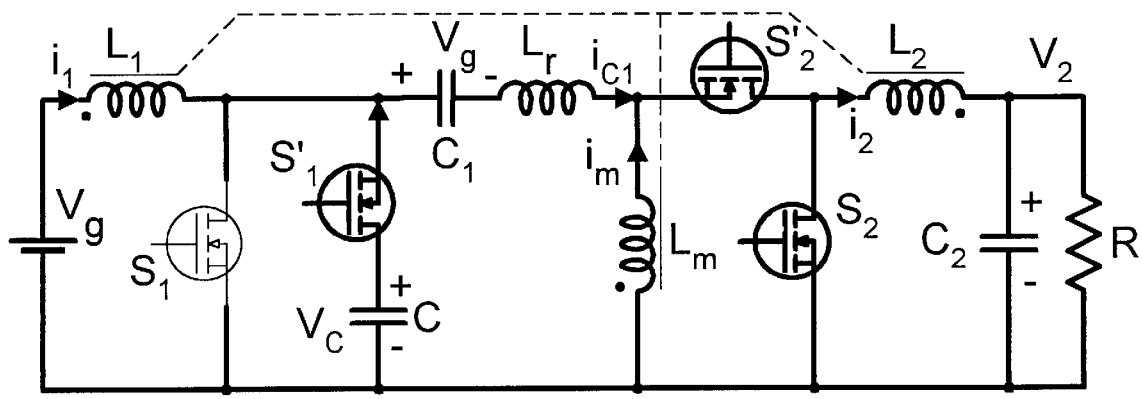
Figure 83C:
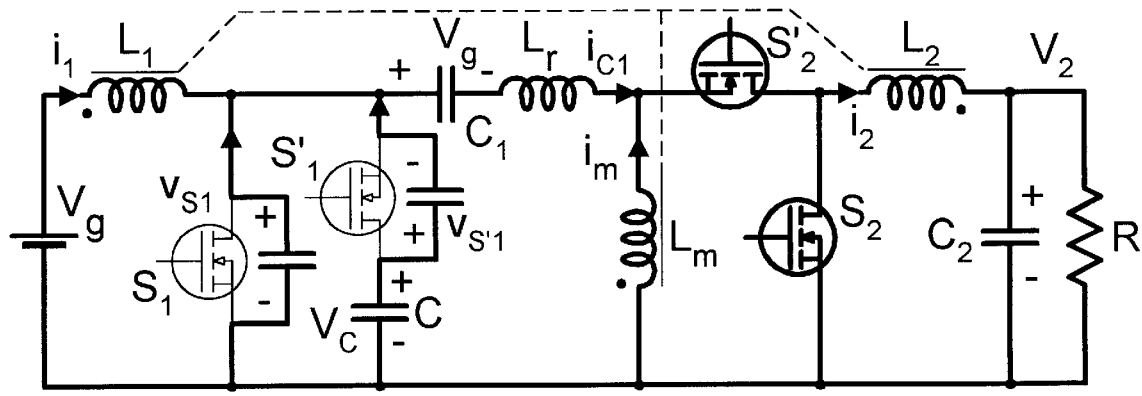
Figure 83D:
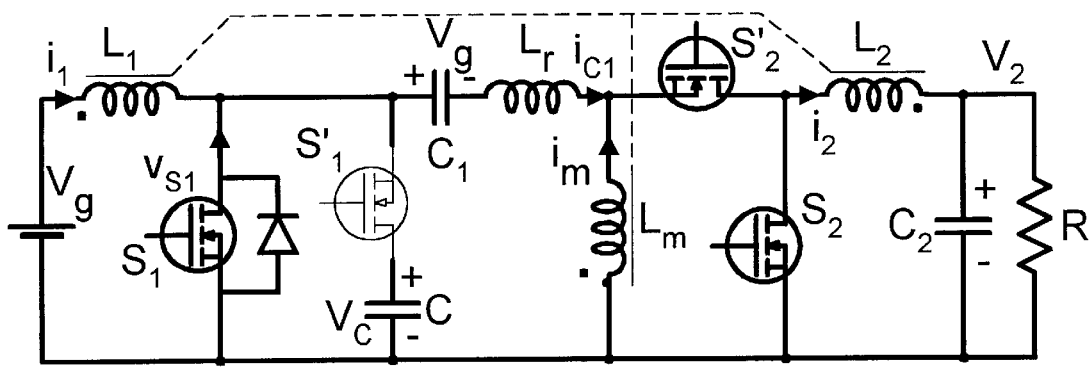
Figure 83E:
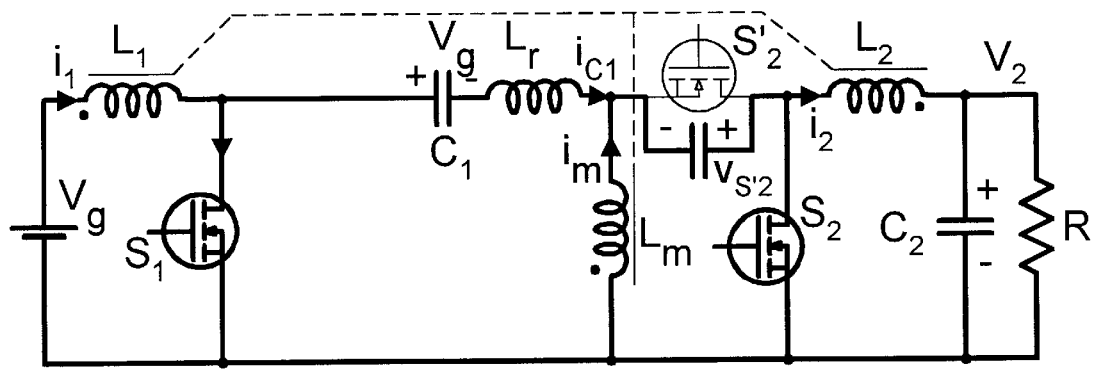

The two subintervals $t_b$ and $t_c$ in FIG. 75c are, as before, followed by a current-reversal subinterval $t_d$ as seen in input capacitor current waveform shown in detailed description with reference to FIG. 82. However, unlike in previous cases, the current-reversal is taking place throughout both subintervals $t_c$ and $t_d$ as seen in FIG. 82. Finally, same oscillations as before in the steady-state interval $t_c$ of FIG. 82 are observed.

Switching Time vs. Transition Interval

Figure 76A:
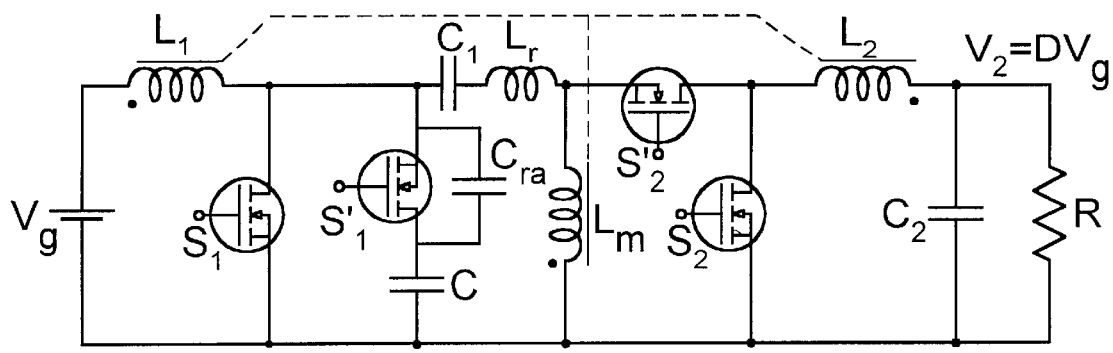
FIG. 76a illustrates how the additional resonant capacitor $C_{ra}$ increases transition interval as shown by waveforms of FIG. 76b in thick lines and eliminates the losses caused by short transition interval (dotted lines on FIG. 76b) and fast switching times of semiconductor switches.
Figure 76B:
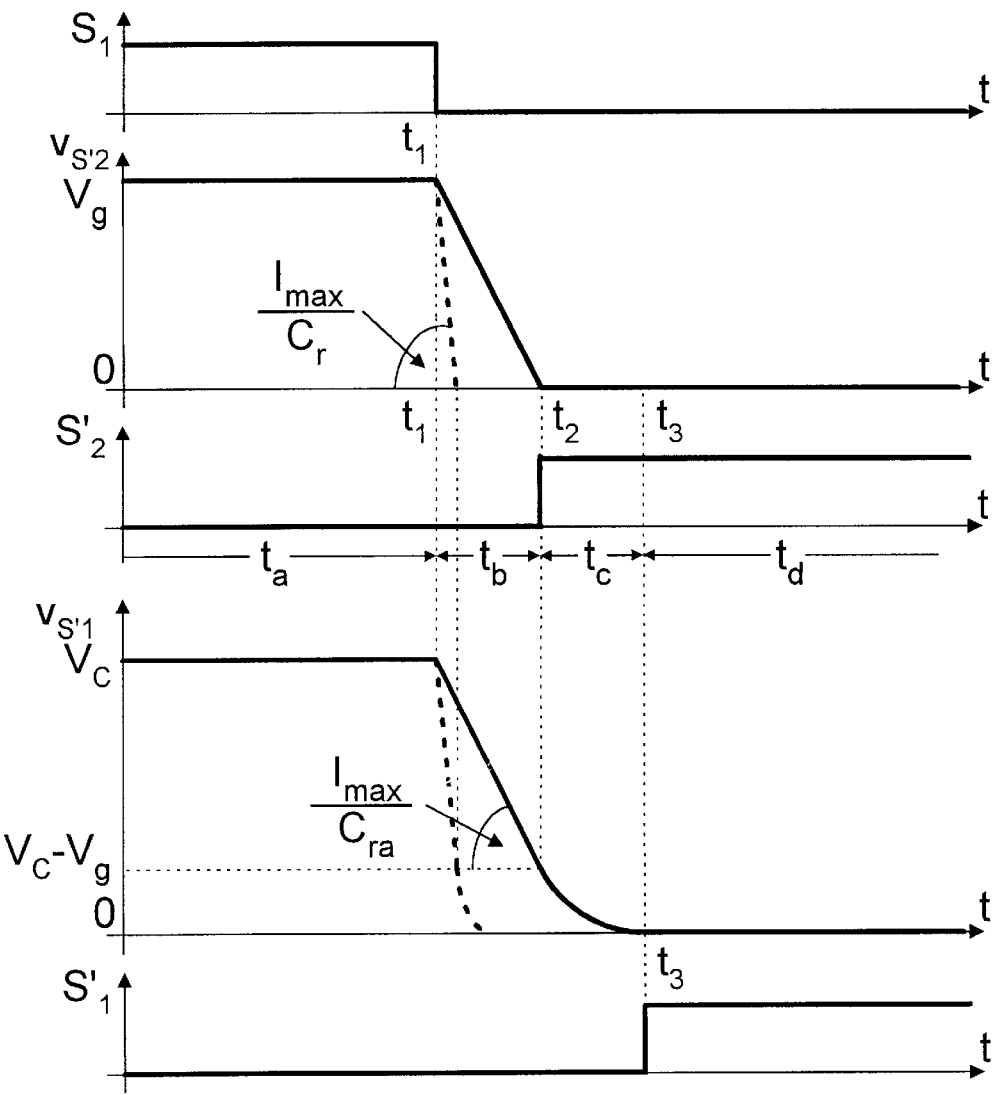

In all cases considered so far, all switches were used with their built-in small parasitic capacitance and no external additional capacitors were placed in parallel with the switches. In some applications, it is actually desirable to put an additional resonant capacitor $C_{ra}$ in parallel with either the input switch or complementary input switch as shown in FIG. 76a. Without such added external capacitor, the (1–2) transition interval may be very short as shown by the waveforms of FIG. 76b in dotted lines due to the large slope $I_{max}/C_r$ created by either a large output DC load current or a very small inherent parasitic capacitance of the switch or both. This is the direct consequence of the fact that the (1–2) transition is dependent upon the DC load current. In that case, the transition interval becomes comparable to the turn-OFF speed capability of the input switch $S_1$. This, in turn, will cause the partially turned OFF input switch to generate some switching losses during the (1–2) transition. The added resonant capacitor $C_{ra}$ eliminates these losses by slowing down the (1–2) transition as seen by the waveforms in thick lines in FIG. 76b while the decay slope is substantially decreased to $I_{max}/C_{r3}$, where $C_{ra}$ is typically several times larger than $C_r$. This gives sufficient time for input switch to turn OFF and eliminates losses. The slowing down of the rate of voltage decay has the additional positive effect of reducing the conducted and radiated EMI noise.

DETAILED LOSSLESS SWITCHING OPERATION

The above analysis provided an overview of the variety of novel lossless switching possibilities and gave both qualitative as well as quantitative assessment of their relative merits by analyzing separately first difficult to achieve (2–1) transition, followed by the analysis of (1–2) transition. Thus, the detailed description of the circuit operation and of the salient waveforms of both (1–2) and (2–1) transitions are carried below separately.

For each lossless switching case, the circuit state of the converter at particular interval is presented and the converter circuit models correlated to respective intervals and characteristic waveforms during those intervals. Thus, very first converter circuit model will show the converter at the beginning of the transition, while last converter circuit model always shows the circuit after the transition has been completed. For these circuits only (since they are circuit models for State-1 and State-2 intervals), to distinguish them easier from converter circuit models during transition intervals, only those switches which are ON are displayed and then drawn with thick lines, while turned OFF switches are omitted entirely. On the other hand, for the converter circuit models during the transition intervals, which could have several subintervals characterized by a distinct converter circuit for each subinterval, the following convention is adopted: the switches which are ON during particular subinterval are drawn in thick lines, while the switches which are OFF are drawn in thin lines. Furthermore, the symbol for MOSFET switch is retained in those models to signify the control action on particular switch (thick lines for turned ON, thin lines for turned OFF switch). In addition, in some cases, the body-diode of the MOSFET switch for example, can be turned ON by the circuit operation even if the respective active switch is NOT given signal by switching time control to turn ON. Thus, in these cases, as well as when the turn-ON of the body-diode is important for better understanding of the converter operation, the body-diode is also shown explicitly in thick lines.

LOSSLESS SWITCHING USING CBS OUTPUT SWITCH

The detailed description of lossless switching is further broken down into three sub-categories:

1. Non-isolated converter without resonant inductor;
2. Non-isolated converter with resonant inductor;
3. Isolated DC-to-DC converter.

Non-Isolated Converter without Resonant Inductor

The current of the complementary input switch is negative at the end of the State-2 interval as provided earlier in FIG. 53b. Thus neither the large output inductor ripple current is needed, nor even the addition of any resonant element, such as resonant inductor as in many prior-art soft-switching schemes. In fact, as shown below, the unique switching configuration of the present invention, along with the recognition of the key relationship (7) and its consequence in the time domain waveforms of FIG. 53b, makes for a unique possibility of practical lossless switching with much reduced switching losses just by use of the proper drive sequence and timing of the four switches in FIG 55a.

Figure 77A:
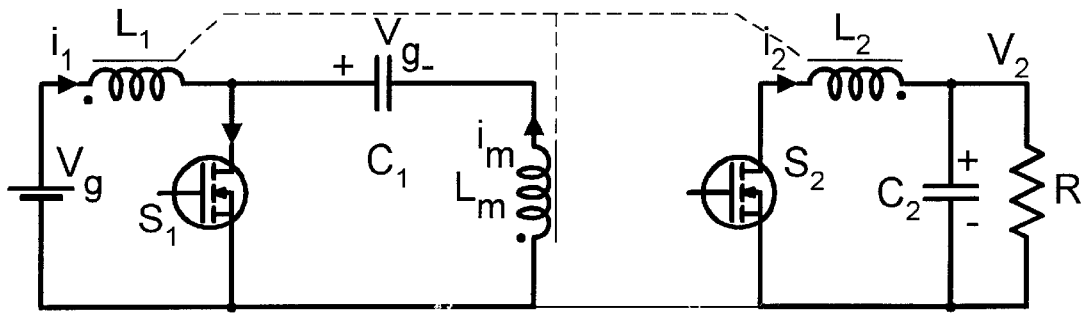
FIGS. 77(a–d) illustrate four circuits states of the converter in FIG. 33e relevant to the (2-1) transition.
Figure 77B:
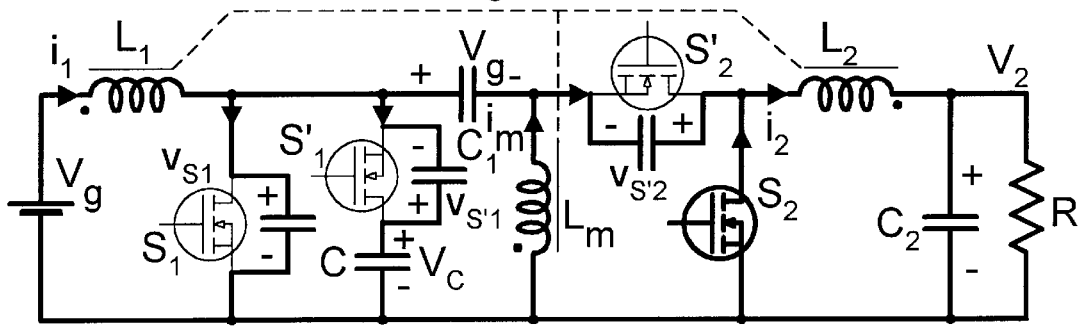

First we will look at the (1–2) transition of the circuit of FIG. 77a.

The (1–2) Transition

Figure 77C:
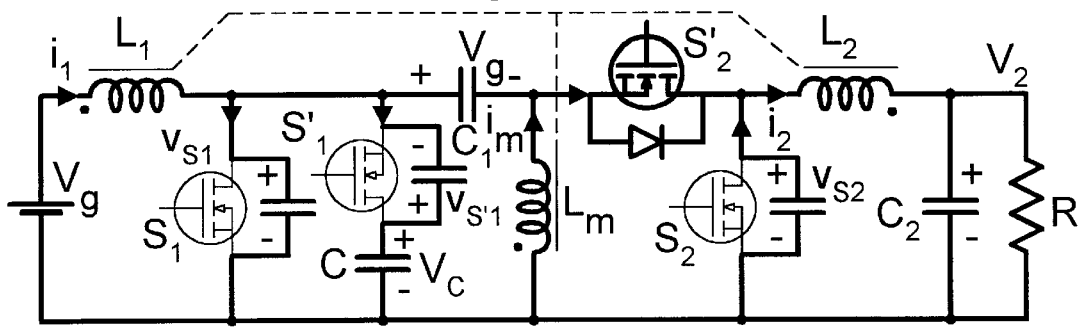
Figure 77D:
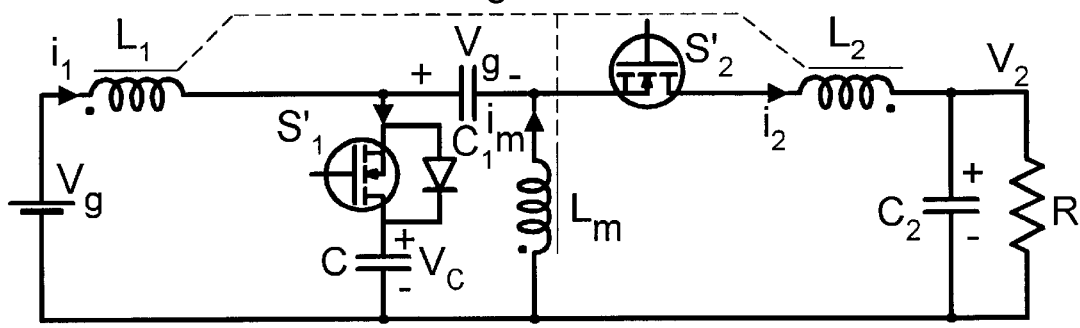
Figures 78A, 78B:
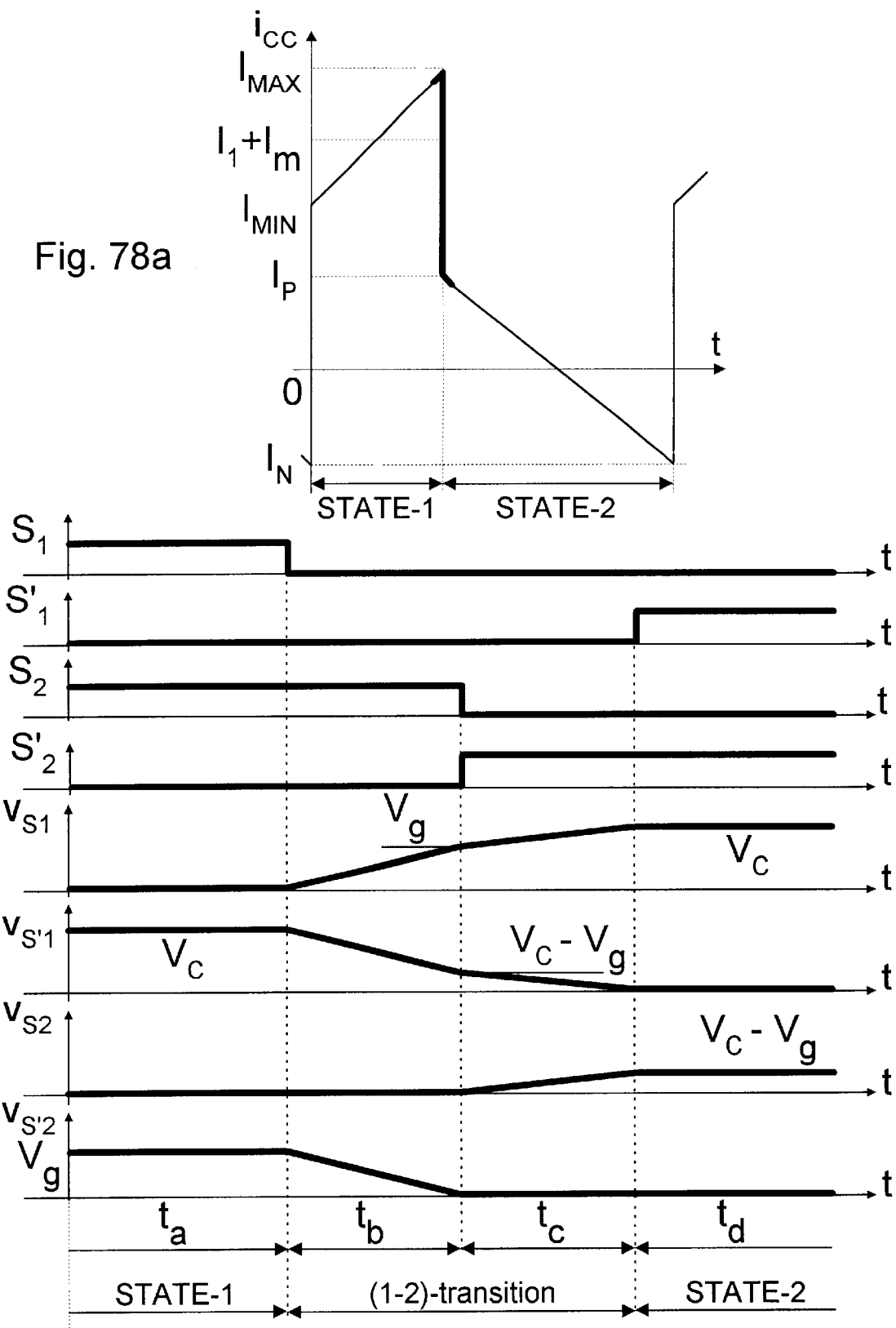
FIG. 78a sows the graph of the inductors' currents relation relevant to the (1-2) transition and FIG. 78b shows the graph of characteristic switching time control waveforms and respective switch voltages relevant to the (1-2) transition modeled by four converter circuits states of FIGS. 77(a–d).

From FIG. 78a transition, composite current changes from $I_{max}$ to $I_P$. This transition is represented by the four equivalent circuits shown in FIGS. 77 a, b, c, and d, and corresponding time intervals $t_a$, $t_b$, $t_c$, $t_d$ shown in FIG. 78b.

Interval $t_a$

FIG. 77a and $t_a$ interval in FIG. 78b corresponds to the State-1 time interval before the first transition starts. $S_1$ and $S_2$ switches are both ON and $S'_1$ and $S'_2$ are OFF. This interval ends and the (1–2) transition is initiated when $S_1$ is turned OFF, which results in the circuit of FIG. 77b.

Interval $t_b$

During the interval $t_b$, the current $I_{max}$ is charging the parasitic capacitance of $S_1$ (which initially was fully discharged as switch $S_1$ was ON moments before) and discharging parasitic capacitor across $S'_1$ and $S'_2$ switches. Since this current contains DC component $1_I+I_m$, this results in relatively fast charge and discharge of these parasitic capacitors, hence in fast voltage rise on parasitic capacitor of input switch $S_1$. Given the above, these three capacitors are AC-wise connected in parallel. This interval is concluded when the voltage across switch $S'_2$, $V_{S'2}$ drops to zero and the body-diode of $S'_2$ starts to conduct Hence, switch $S'_2$ is naturally turned ON at zero voltage by its parasitic diode. Since the diode conduction at low voltage is rather inefficient due to high voltage drop across the diode, this is also the ideal time to turn ON switch $S'_2$ (or equivalently to turn ON the original $S'_2$ MOSFET). Due to low ON resistance of the MOSFET and corresponding low voltage drop across it, the current through the diode is by-passed through the MOSFET device thus minimizing the conduction losses of the output rectification. As $S'_2$ is turned ON, switch $S_2$ is simultaneously turned OFF. which results in the circuit model of FIG. 77c valid for interval $t_c$ in FIG. 78b. Note that if the turning OFF of switch $S_2$ was delayed, an intermediate level would follow with all the voltages clamped at the present value, $V_g$ and $V_C-V_g$ for switches $S_1$ and $S'_1$ respectively. Clearly this interval is unproductive and unnecessary since it only delays the completion of the (1–2) transition interval and should therefore be avoided by proper drive timing as in FIG. 78b.

Interval $t_c$

The interval $t_c$ in FIG. 78b is then characterized by the equivalent circuit of FIG. 77c during which three switches $S_1$, $S'_1$ and $S_2$ are OFF and only switch $S'_2$ is ON, by-passing its body-diode (body-diode also shown in FIG. 77c in bold to signify the fact that this diode started conduction first and triggered the turn-ON of $S'_2$). Note that due to the fundamental relation (7), where $I_1+I_m=I_2$, the current $i_1+i_m-i_2$ now consists only of respective AC ripple components $I_p=\Delta i_1+\Delta i_m-\Delta i_2$ resulting in reduced slopes of voltage rise on switch $S_1$ compared to previous interval $t_b$. This total AC ripple current starts to charge the capacitance across $S_2$ while at the same time it continues to charge the capacitance across $S_1$ and discharge the capacitance across $S'_1$, albeit at a much slower rate than in the previous $t_b$ interval. The end of this interval has arrived when voltage on switch $S'_1$ reaches zero and the body-diode of that switch starts to conduct as shown in FIG. 77d, which shows the converter circuit at the beginning of interval $t_d$. This has the effect of clamping the voltage on switch $S_1$ at the $V_C$ level. At this point switch $S'_1$ can be turned ON at zero voltage hence with zero switching losses bypassing the internal body-diode to reduce the conduction losses.

Interval $t_d$

The circuit in FIG. 77d signifies that the (1–2) transition has been completed and that now the switches $S'_1$ and $S'_2$ are simultaneously ON, as compared to the beginning state in FIG. 77a during which the switches $S_1$ and $S_2$ were simultaneously ON. In summary, during this (1–2) transition, all switches are turned ON at zero voltage and lossless switching of the (1–2) transition is achieved, hence without switching losses.

The (2–1) Transition

Figure 79A:
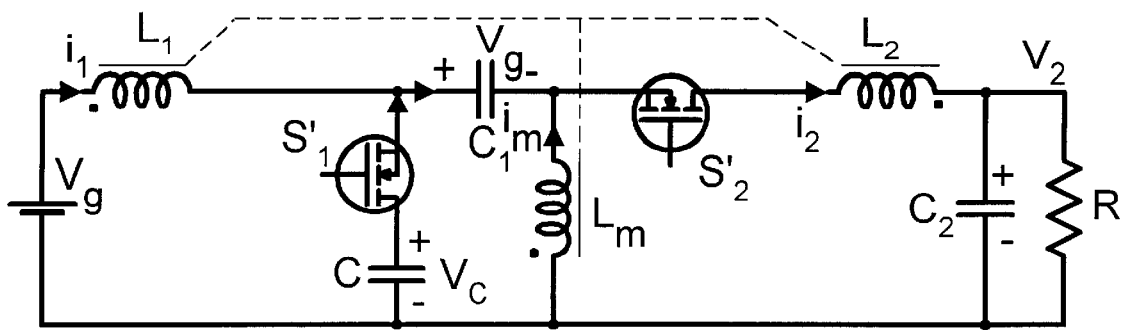
FIGS. 79(a–d) illustrate four converter circuits states of the converter in FIG. 33e relevant to the (2-1) transition.
Figures 80A, 80B:
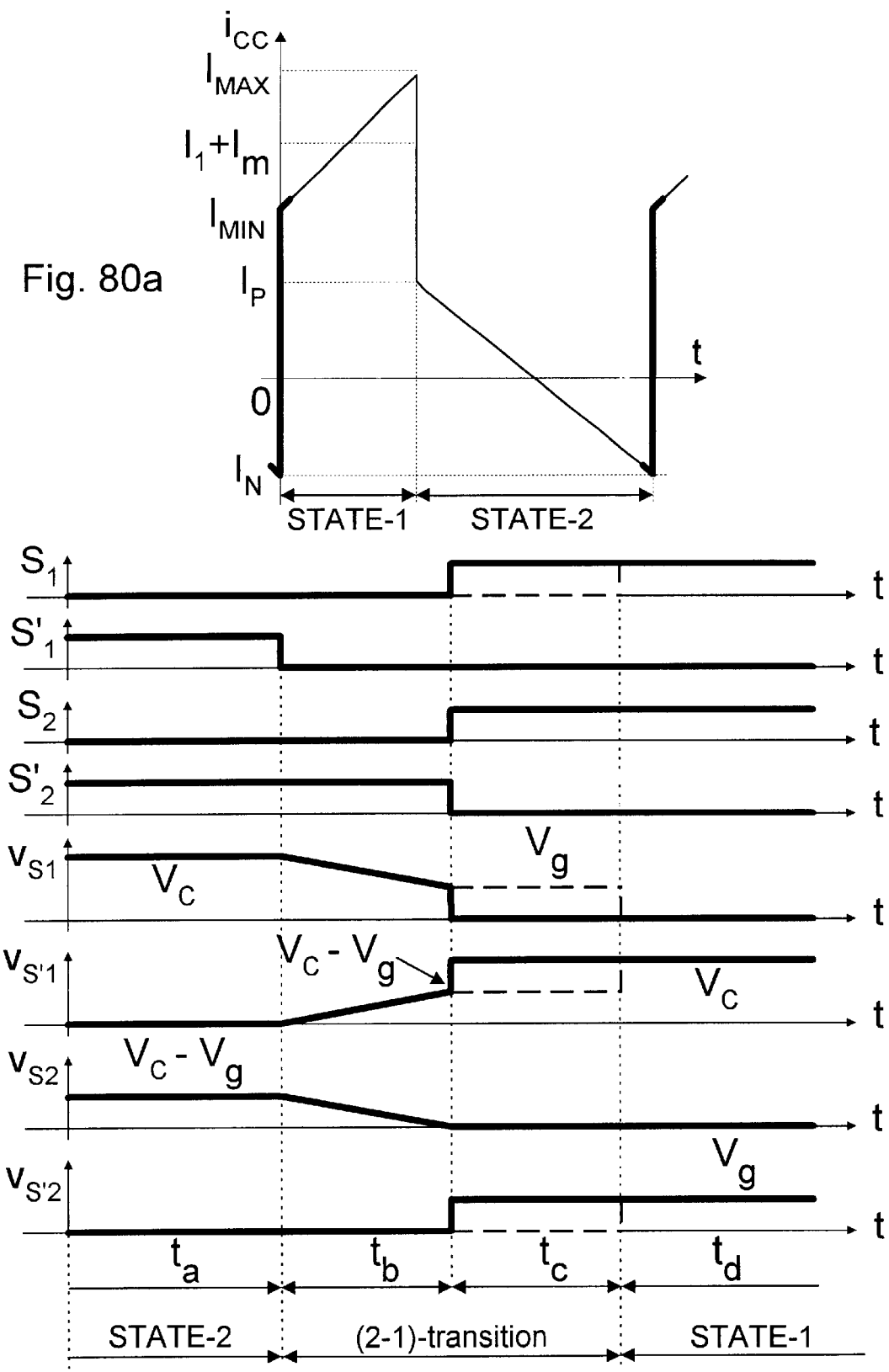
FIG. 80a illustrates a graph of the inductors' currents relation relevant to the (2-1) transition and FIG. 80b illustrates a graph of characteristic switching time control waveforms and respective switch voltages relevant to the (2-1) transition modeled by four converter circuits states of FIGS. 79(a–d).

Composite current of FIG. 80a changes from negative $I_N$ value to positive $I_{min}$ value. The (2–1) transition is represented by circuits in FIGS. 79a, b, c, d, and their respective intervals $t_a$, $t_b$, $t_c$, $t_d$ shown in FIG. 80b.

Interval $t_a$

FIG. 80a and $t_a$ interval in FIG. 80b corresponds to the State-2 time interval just before (2–1) transition starts. The switches $S'_1$ and $S'_2$ are both ON and $S_1$ and $S_2$ are OFF. This interval ends and the (2–1) transition is initiated when switch $S'_1$ is turned OFF, which results in the circuit of FIG. 79b representing the interval $t_b$.

Interval $t_b$

Figure 79B:
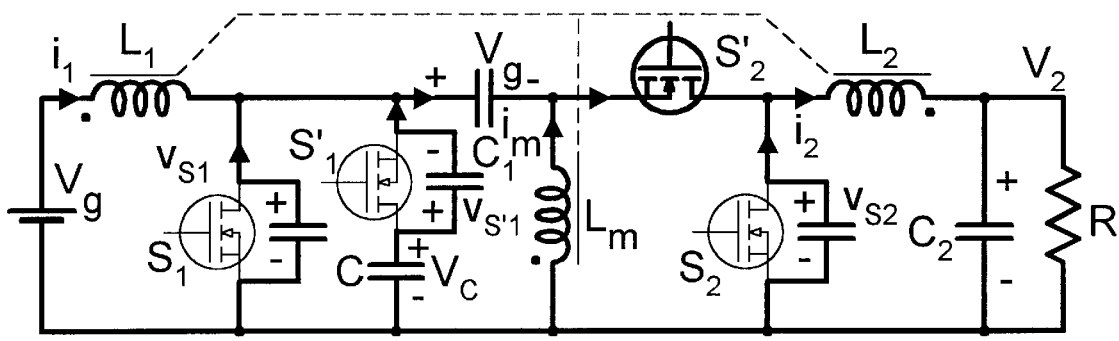

During this interval $t_b$ as represented by the circuit in FIG. 79b, the current $I_N$ is charging the parasitic capacitor across $S'_1$ and is discussing the parasitic capacitors across $S_1$ and $S_2$. This results in a relatively slow charge and discharge of these parasitic capacitors, hence in a relatively slow voltage rise on parasitic capacitor of complementary input switch $S'_1$. Given the above assumptions, these three capacitors are AC-wise connected in parallel. This interval is concluded when the voltage $v_{S2}$ across the Switch $S_2$ drops to zero and the body-diode of $S_2$ starts to conduct. Hence, switch $S_2$ is turned ON at zero voltage by its parasitic body-diode, so the body-diode is by-passed through the MOSFET device thus minimizing the conduction losses of the output rectification.

Interval $t_c$

Figure 79C:
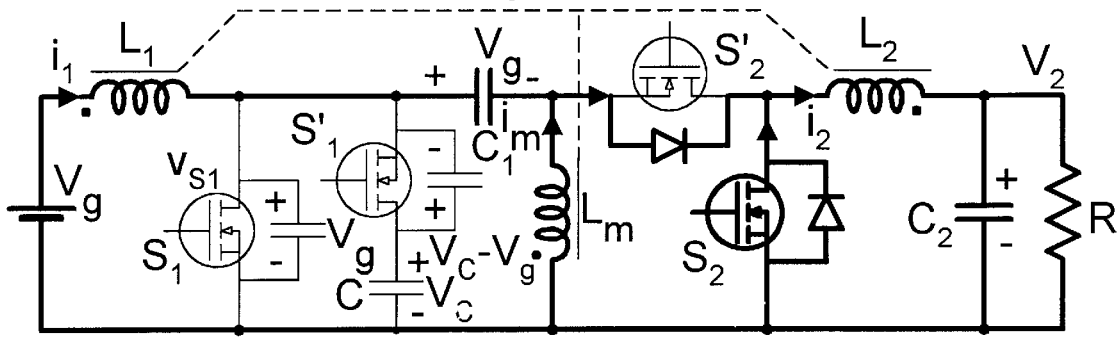

As switch $S_2$ is turned ON, switch $S'_2$ is simultaneously turned OFF, which results in the circuit model of FIG. 79c valid for interval $t_c$ in FIG. 80b. Note that now if the turning ON of $S_1$ switch was delayed as shown by dotted lines in FIG. 80b, all voltages would be clamped at the present value, that is $V_g$ across switch $S_1$ and $V_C-V_g$ across switch $S'_1$, while switch $S'_2$ will stay at zero voltage level. The remaining part of the transition interval cannot be completed in a lossless switching manner. Thus, switch $S_1$ must be turned ON "hard" at reduced voltage and its parasitic capacitor discharged abruptly. This third interval $t_c$ should ideally be eliminated, since it only delays the completion of the transition interval without having any useful function. The thick lines in FIG. 80b illustrate the case when the switch $S_1$ is turned ON exactly at the end of $t_b$ interval and thus interval $t_c$ is completely eliminated.

Interval $t_d$

Figure 79D:
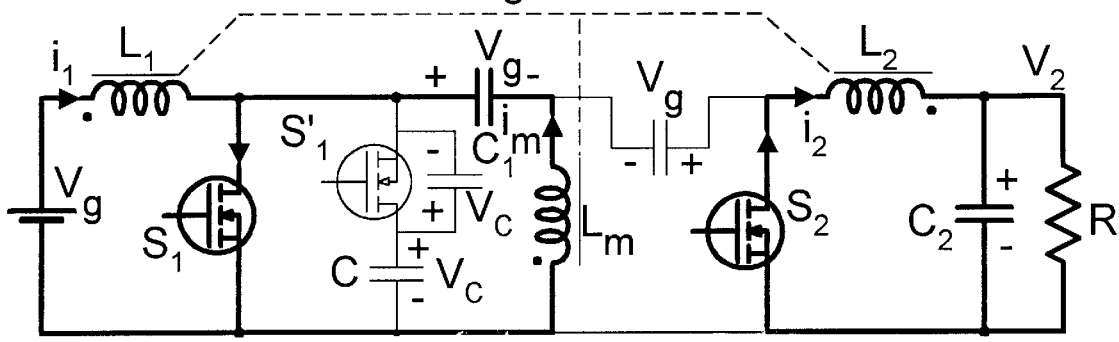

The losses associated with the hard turn-ON of switch $S_1$ are mainly composed of the reverse recovery losses in the parasitic body-diode of switch $S'_2$ and the $(CV^2)/2$ losses of the parasitic capacitors across switches $S_1$, $S'_1$ and $S'_2$ whose effective voltage is $V_g$. FIG. 79d hence shows the final stage after completion of (2–1) transition in which switches $S_1$ and $S_2$ are turned ON. FIG. 79d also shows the final voltage of the parasitic capacitor of switch $S'_1$ and $V_C$ and the final voltage of parasitic capacitor of switch $S'_2$ to be $V_g$, which are their starting values for the next (1–2) transition.

It is now interesting to see how effective this type of lossless switching is. It is clear that the (1–2) transition results in lossless switching, while the (2–1) transition results in reduced switching losses since the parasitic capacitor of switch $S_1$ cannot discharge below the input voltage $V_g$. A very simple analysis reveals that this switching loss reduction is very effective, especially for operation at higher duty ratios such as for example for D=0.8 when $V_C=V_g/(1-D)=5$ $V_g$. The parasitic capacitor across switch $S_1$ is discharged from a high voltage $V_C=5$ $V_g$ down to the $V_g$ level, hence, only the fraction of the energy stored on the switches $S_1$, $S'_1$, and $S'_2$ is lost as given by the voltage ratio squared. In this case this translates into a 25 times energy loss reduction or 96% saving of the energy which would have been lost if switch $S_1$ was turned ON with full voltage of $V_C=5$ $V_g$ on it. Clearly for many practical applications such a result is more than adequate. Note that at lower duty ratios such as D=0.6, still a 6.25 times reduction of losses is achieved or 84% of the full hard-switching losses were recovered. As the operating point is moved to lower duty ratio such as D=0.25 for example, the hard-switching interval $t_C$ starts even at a higher percentage, that is at 75% of the total blocking voltage $V_C=V_g/(1-D)=1.33$ $V_g$ hence 44% of the full hard-switching losses of that transition are recovered. Thus, the resonant inductor is needed in order to further reduce switching losses.

Non-isolated Converter with Resonant Inductor

Here we can combine one case of the (1–2) transition discussed earlier in FIGS. 76a, b, c with each of the four different cases of the resonant discharge for the (2–1) transition (Cases 1, 2, 3, 4) as reference with waveforms 1, 2, 3, 4 in FIG. 64b to obtain a four distinct lossless switching cases.

The (1–2) Transition (Cases 1, 2, 3, 4)

Figure 81A:
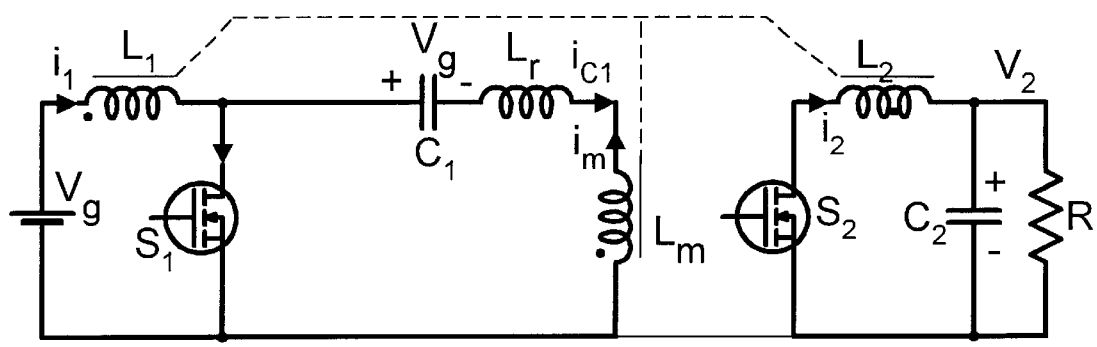
FIGS. 81(a–e) illustrate the five converter circuits states of the converter in FIG. 66a with resonant inductor relevant to the (1-2) transition.

The (1–2) transition is represented by 5 characteristic circuits of FIGS. 81a, b, c, d, e, and corresponding waveforms of FIG. 82.

Interval $t_a$

This corresponds to end of State-1 interval before the transition starts. $S_1$ and $S_2$ are ON and $S'_1$ and $S'_2$ are OFF as in FIG. 73a. This interval ends and the (1–2) transition is initiated when $S_1$ is turned OFF.

Interval $t_b$

Figure 81B:
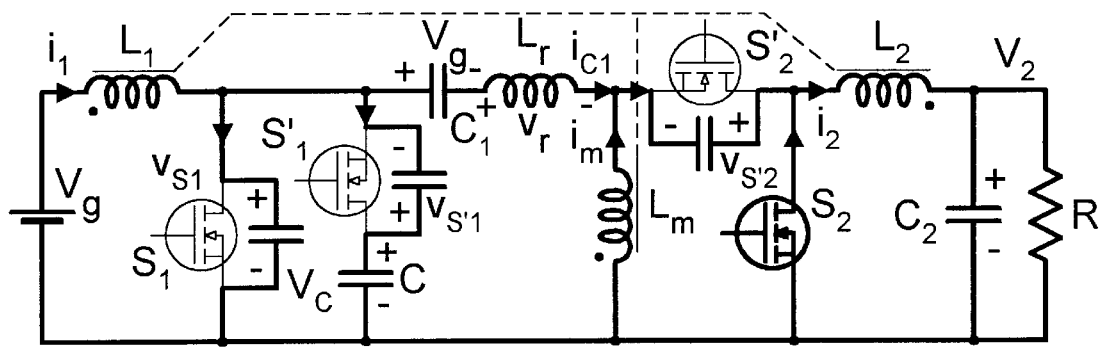

The sum of currents $i_1$ and $-i_{C1}$ ($i_{C1}$ is the input capacitor current with positive direction as in FIG. 81b) is charging the capacitor across $S_1$ and discharging capacitor across $S'_1$. The initial value of the current $i_{C1}$ is $-i_m$, thus initially no current is flowing toward $S'_2$ as shown in $i_{C1}$ waveform of FIG. 82. As the voltage $v_{S1}$ increases, the voltage $v_r$ on resonant inductor starts to increase, which causes $i_{C1}$ to decrease in magnitude. As a result the current in switch $S'_2$ can no longer be zero and the capacitance of that switch is also being discharged from its initial value $V_g$. This interval ends when this capacitance is completely discharged and the body-diode of $S'_2$ starts to conduct. At this time switch $S'_2$ is turned ON at zero voltage (hence without switching losses).

Interval $t_c$

Figure 81C:
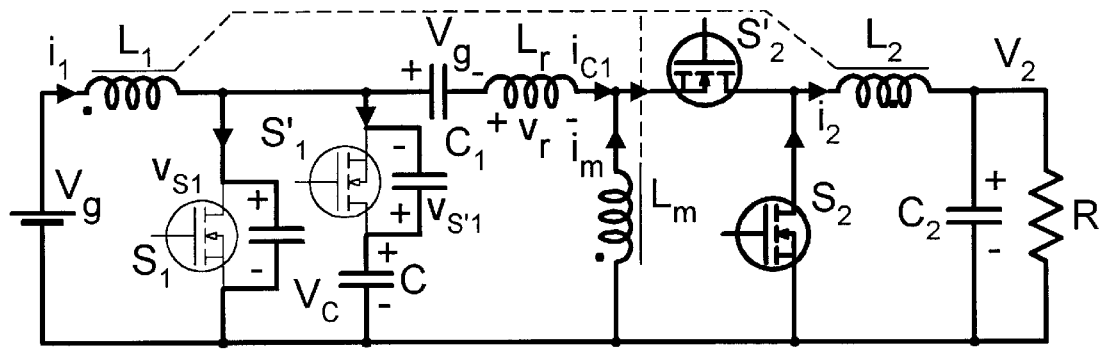

The currents $i_1$ and $-i_r$ continue to charge the capacitance of $S_1$ and discharge the capacitance of $S'_1$ as in FIG. 81c. The voltage $v_r$ builds up further, which further decreases the magnitude of $i_r$. This interval is concluded when voltage on switch $S'_1$ reaches zero and the body-diode of $S'_1$ starts to conduct. Now $S'_1$ can also be turned ON without switching losses.

Interval $t_d$

Figure 81D:
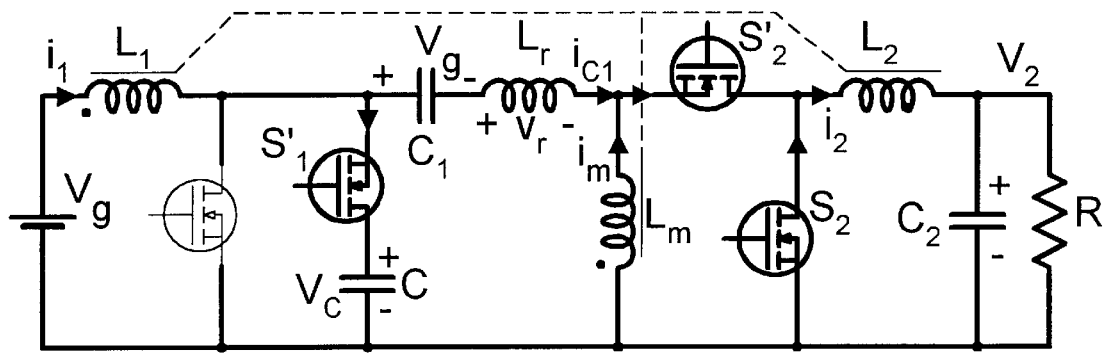

The voltage $v_r$ is now given by $V_C-V_g$ and thus the magnitude of $i_r$ continues to decrease linearly as in FIG. 81d. At some point during this or the last two subintervals it has become negative (initially it was $i_m$). When $i_{C1}$ reaches the value of $i_1-I_p$ the current of output switch $S_2$ becomes zero. The controllable switch $S_2$ has to be turned OFF at this point.

Interval $t_e$

Figure 81E:
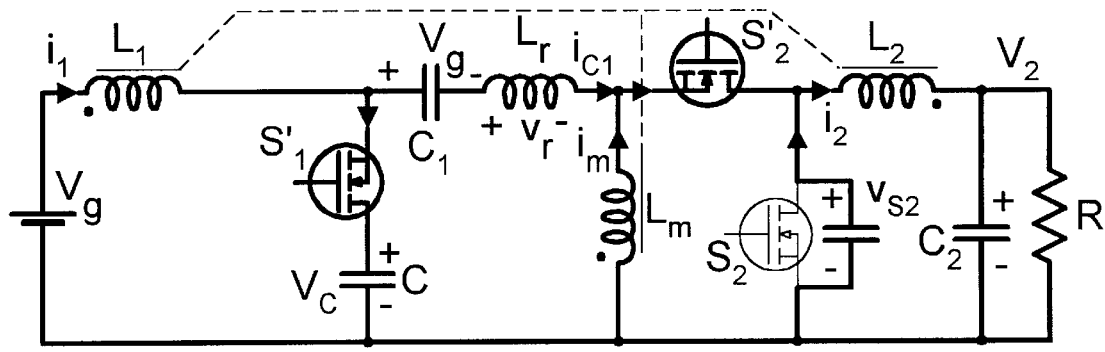

The current of the output switch $S_2$, which now becomes negative charges capacitance of switch $S_2$ as per FIG. 81e. The initial value of $i_{C1}$ in this interval is also the final value after the (1–2) transition has been completed. Thus, in order to charge the capacitance of $S_2$ to its final value ($V_C-V_g$) the current $i_{C1}$ has to undershoot somewhat. This in turn causes the voltage on $S_2$ to overshoot. The result is an oscillation between $L_r$ and $C_{S2}$ which if not damped would continue. If the inherent parasitic resistance of elements in resonant loop does not sufficiently damp the oscillation, an additional R-C damping network is needed, which also damps a similar oscillations after completion of D= to D transition. The oscillation dies out at the end of $t_e$ interval.

The (2–1) Transition Case 1)

Figure 84:
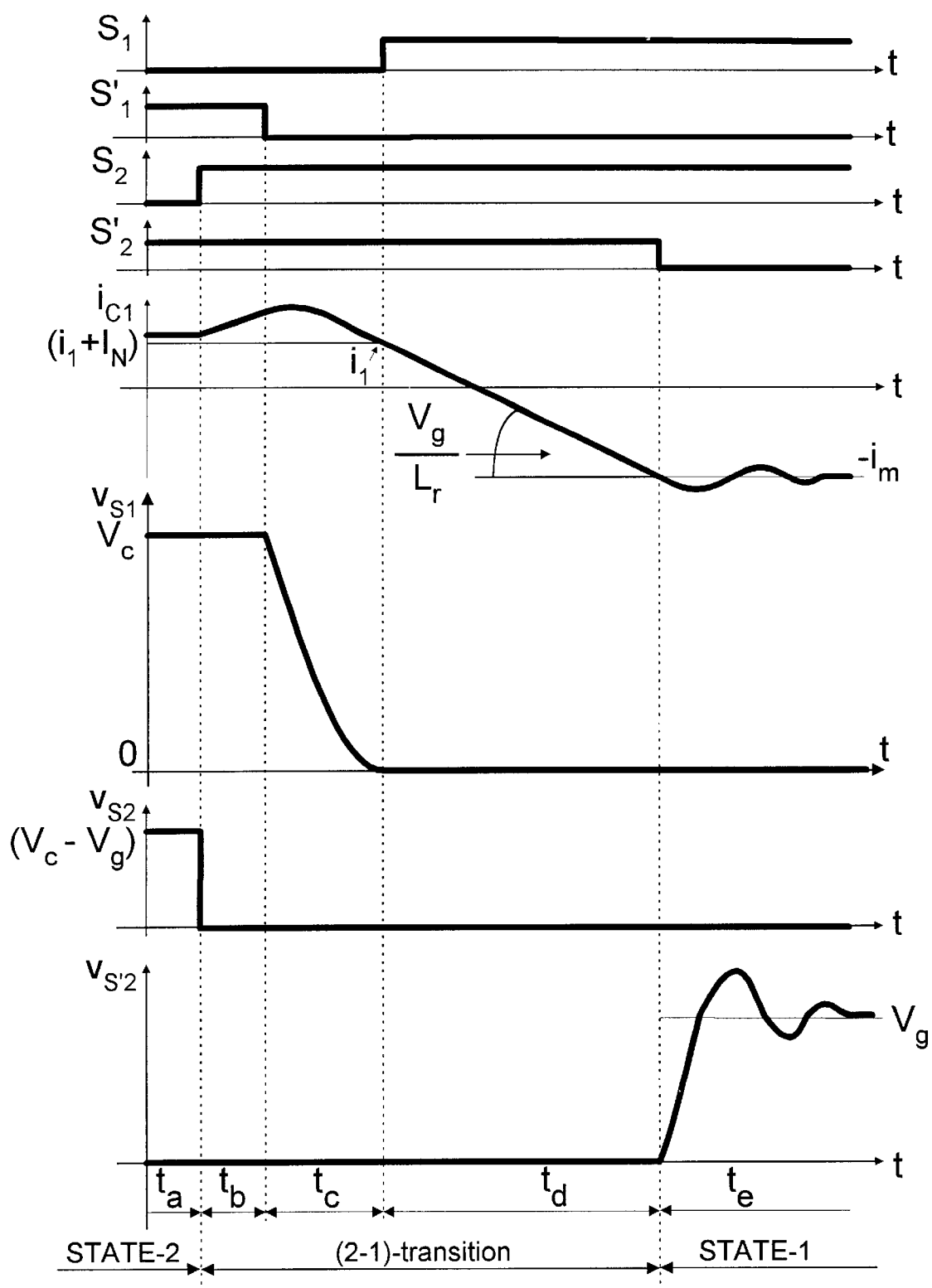
FIG. 84 illustrates the graph of the characteristic switching time control waveforms, respective switch voltages, and the input capacitor current during the (2-1) transition described by five converter circuits states of FIGS. 83(a–e).
Figure 85A:
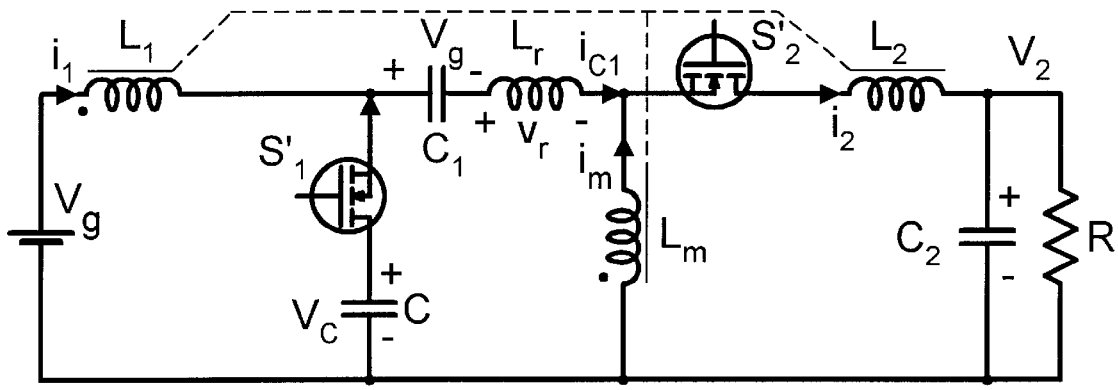
FIGS. 85(a–d) illustrate the four converter circuits states of the converter in FIG. 69a relevant to the (2-1) transition of Case 2 in FIG. 69b.
Figure 85B:
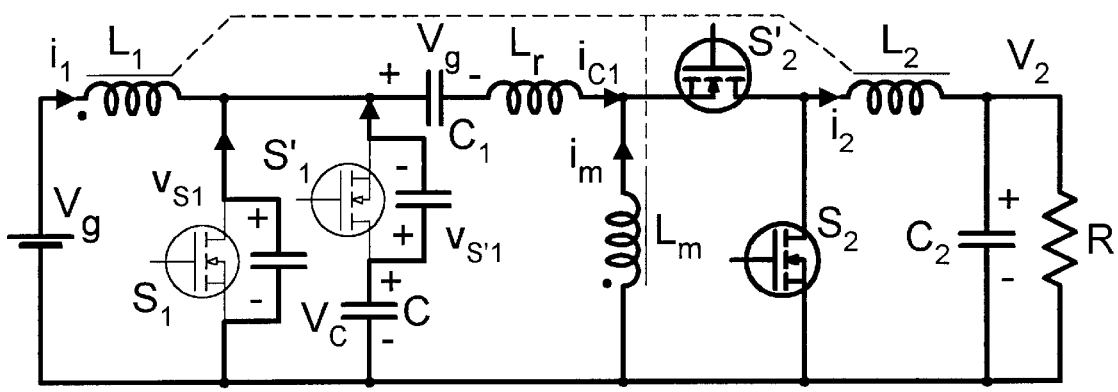
Figure 85C:
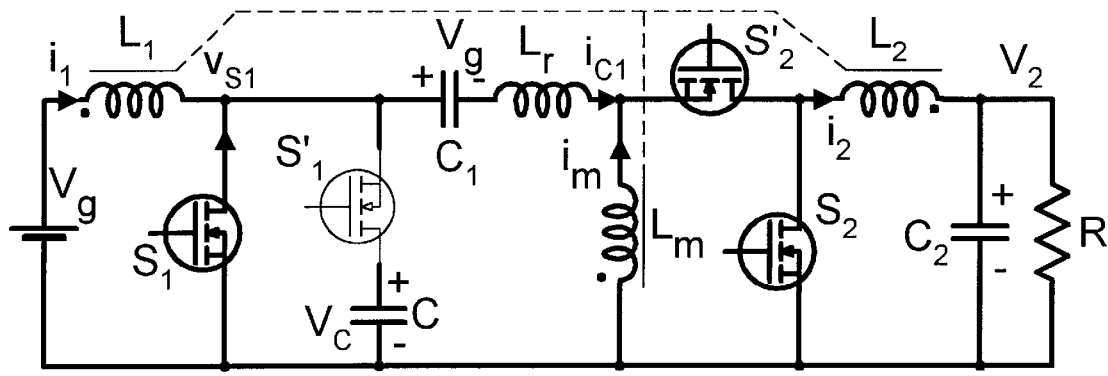
Figure 85D:
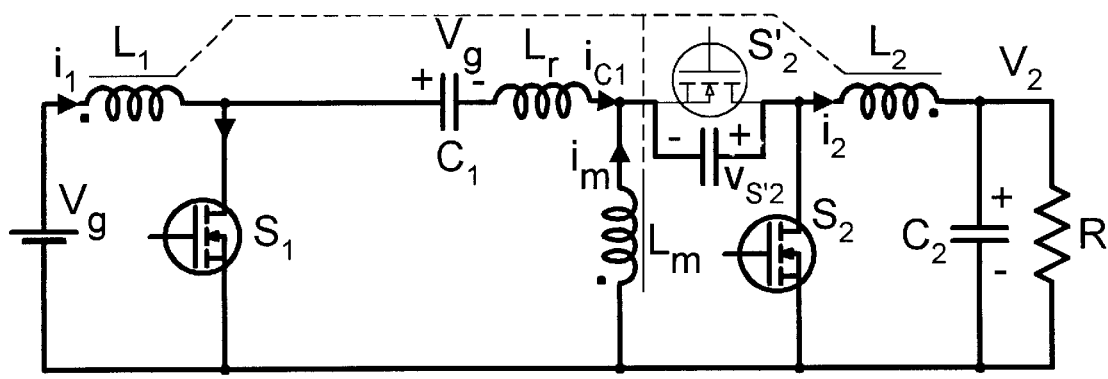

This corresponds to Case 1 illustrated earlier in waveforms of FIG. 64b. This case is represented by the five equivalent circuits of FIGS. 83(a–e) and the corresponding waveforms in the five subintervals as shown in FIG. 84.

Interval $t_a$

This represents the state of the converter before the transition starts. $S_1$ and $S_2$ are OFF and $S'_1$ and $S'_2$ are ON. This interval ends and the transition is initiated when $S_2$ is turned ON.

Interval $t_b$

This immediately applies to the voltage $(V_C-V_g)$ across the resonant inductor $L_r$, which rapidly increases the current $i_r$ and stores extra energy in $L_r$. The length of this interval controls the amount of this stored energy. Turning OFF of S'$_i$ switch concludes this interval.

Interval $t_c$

Turning OFF of switch S'$_1$ also starts the resonant discharge of the capacitor $C_{S1}$ with resonant current comprising three components each contributing to the reduction of the voltage $v_{S1}$ on input switch $S_1$. When this voltage $v_{S1}$ drops to minimum, $S_1$ switch must be turned ON, which concludes this interval. At this instant, the resonant current is reduced to zero, and the input capacitor current $i_{C1}$ is equal to current $i_1$, as seen in $i_{C1}$ current waveform of FIG. 84. Very often complete discharge and turn ON at zero voltage will be obtained. In some cases, when the operating duty ratio is low and the input voltage very high, zero voltage may not be obtained, but substantial reduction of switching losses will occur. In fact, the experiments have shown that switching at remaining hard-switching voltage of $V_h=V_C/4$ results in higher efficiency due to reduction in circulating resonant current, which is necessary to achieve lower $v_{S1}$.

Interval $t_d$

This current-reversal subinterval starts with input capacitor current $i_{C1}=i_1$, when input switch $S_1$ is turned ON. The input capacitor current reduces linearly at a constant rate equal to $V_g/L_r$, as seen in $i_{C1}$ waveform in FIG. 84. At certain moment during this interval, it becomes zero, then reverses the direction afterwards and reaches the steady-state current level $-i_m$. When that happens, the current of the body-diode of complementary output switch S'$_2$ becomes zero, hence body-diode turns OFF and switch S'$_2$ must be turned OFF. This completes (2–1) transition.

Interval $t_e$

During this interval, the parasitic capacitance $C_{S'2}$ of the switch S'2 is being charged in a resonant fashion from its initial zero value (S'$_2$ switch was just turned OFF moment before) to its final voltage value $V_g$. Thus, resonant circuit comprising resonant inductor $L_r$ and parasitic capacitor $C_{S'2}$ induces voltage oscillations on S'$_2$ switch as shown in FIG. 84. These oscillations can be damped and ringing suppressed by use of the R-C snubber network as used to suppress similar oscillation occurring after (1–2) transition.

The (2–1) Transition (Case 2)

Figure 86:
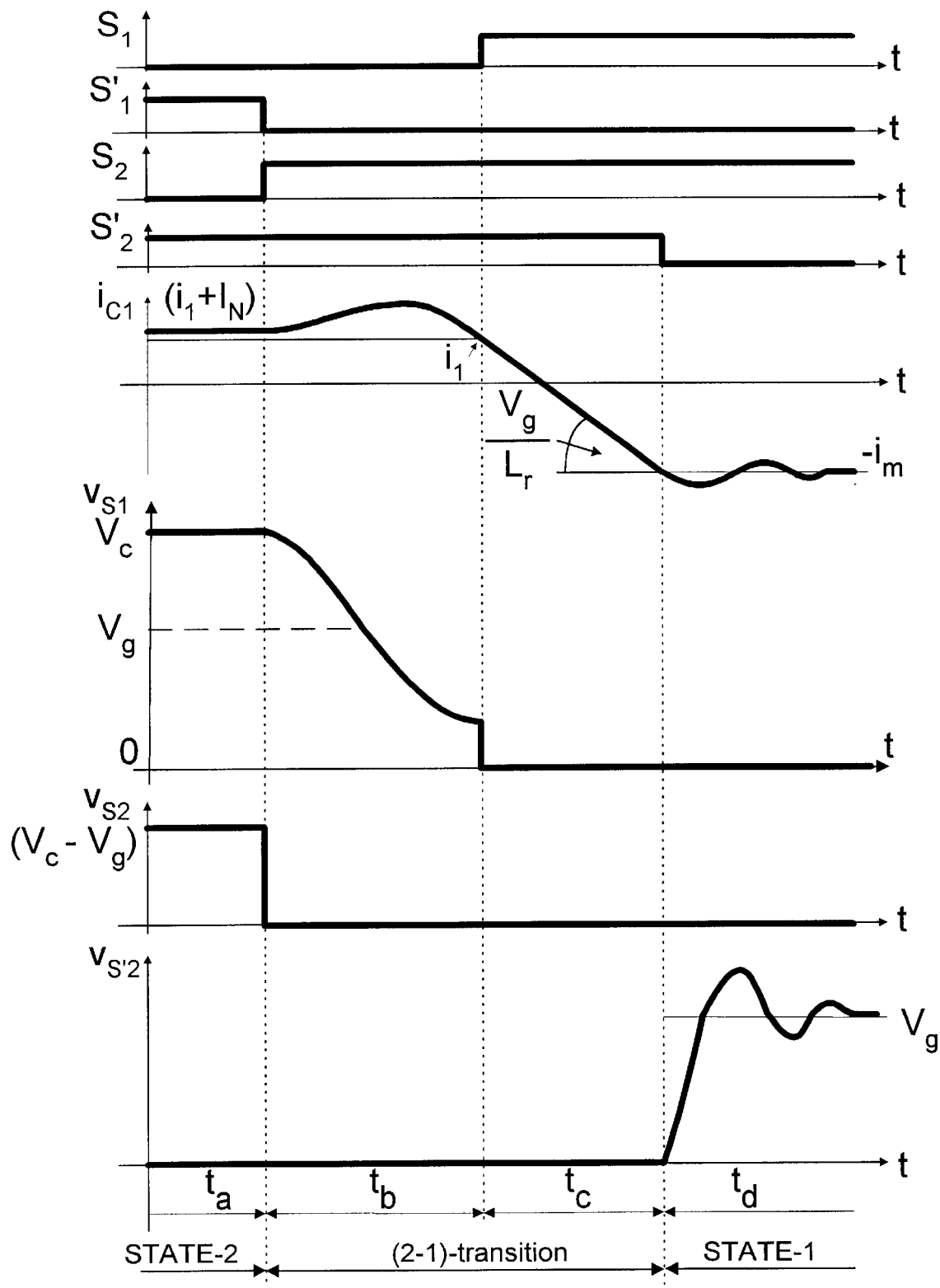
FIG. 86 illustrates the graph of the characteristic switching time control waveforms, respective switch voltages, and the input capacitor current during the (2-1) transition described by four converter circuits states of FIGS. 85(a–d).

This corresponds to Case 2 of FIG. 64b. This case is represented by the four equivalent circuits of FIGS. 85(a–d) and the corresponding waveforms in the four subintervals shown in FIG. 86.

Interval $t_a$

This represents the state of the converter before the transition starts. $S_1$ and $S_2$ are OFF and S'$_1$ and S'$_2$ are ON. This interval ends and transition is initiated when S'$_1$ is turned OFF and simultaneously $S_2$ turned ON.

Interval $t_b$

By turning ON switch $S_2$ prematurely (before its body-diode would turn-ON), the resonant discharge is started. However, this time only two resonant current components remain, since the boost component present in Case 1 is eliminated because the boost time is reduced to zero. Nevertheless, just one of the two remaining resonant current components with magnitude equal to $(V_C-V_g)/R_0$ is capable alone to reduce the input switch voltage completely to zero at duty ratio of D=0.5, regardless of the magnitude of input voltage $V_g$.

Interval $t_c$

Same as for interval $t_d$ for Case 1

Interval $t_d$

Same as for interval $t_e$ for Case 1.

The (2–1) Transition (Case 3)

This corresponds to Case 3 of FIG. 64b. This case is represented by the five equivalent circuits of FIGS. 87(a–e) and the corresponding waveforms in the five subintervals shown in FIG. 88.

Interval $t_a$

This represents the State-2 interval just before the transition starts $S_1$ and $S_2$ are OFF and S'$_1$ and S'$_2$ are ON. This interval ends and the (2–1) transition is initiated when S'$_1$ is turned OFF.

Interval $t_b$

Figure 87A:
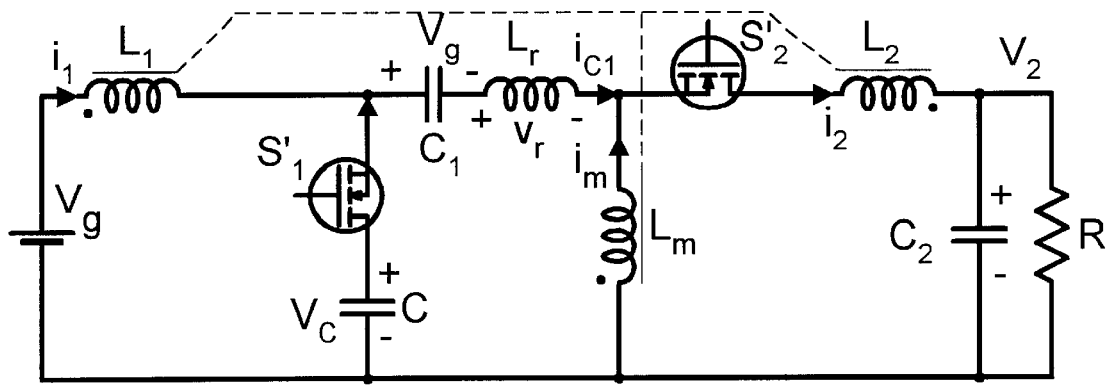
FIGS. 87(a–e) illustrate the five converter circuits states of the converter in FIG. 71a relevant to the (2-1) transition of Case 3 of FIG. 71b.
Figure 87B:
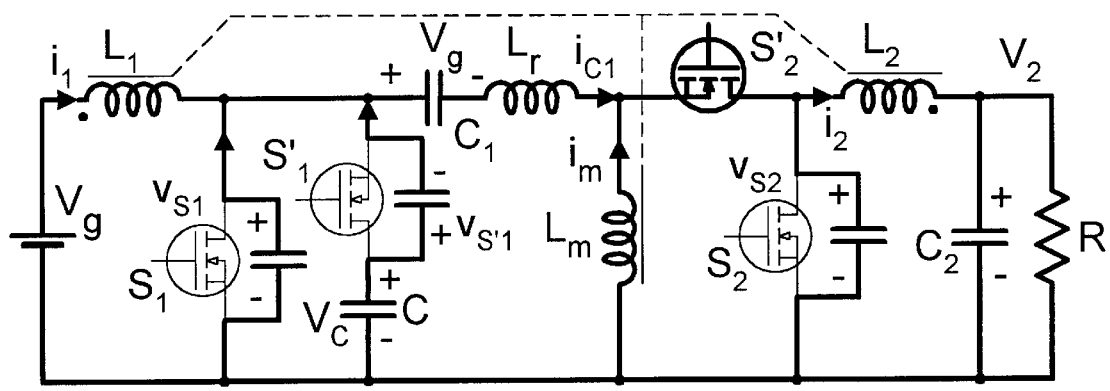
Figure 87C:
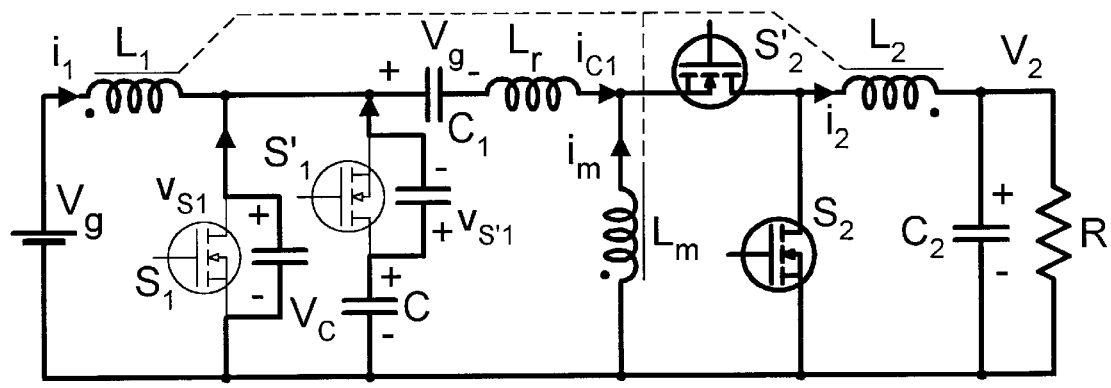
Figure 87D:
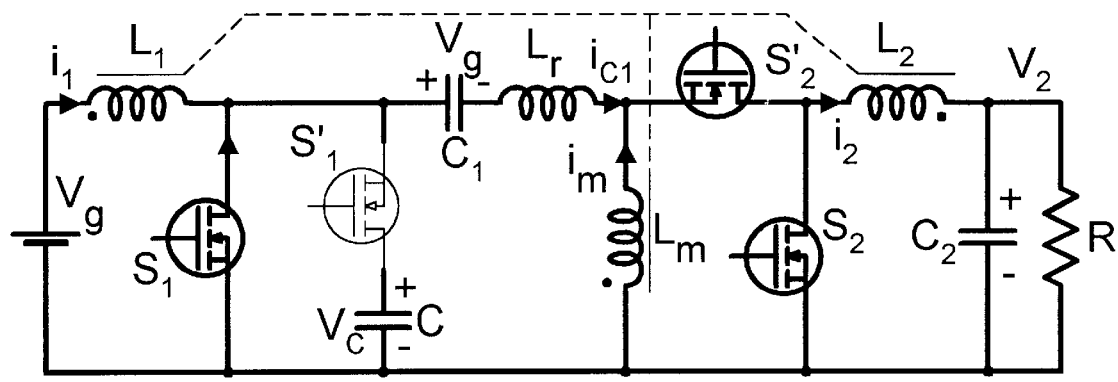
Figure 87E:
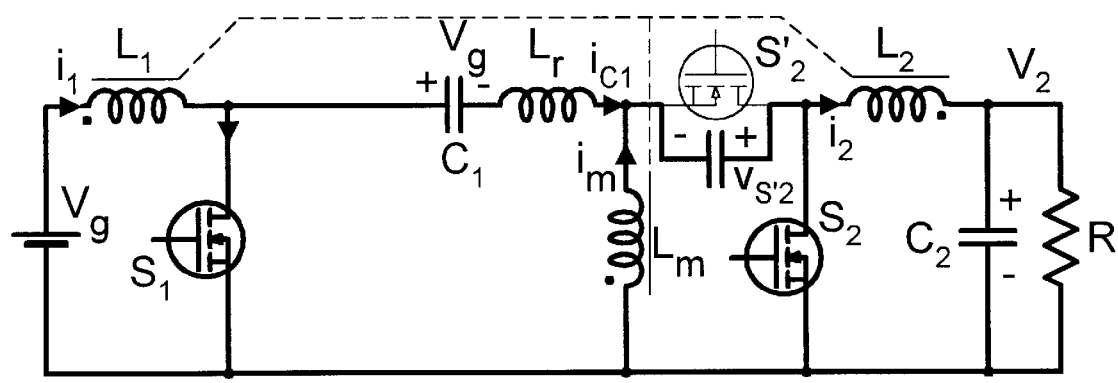
Figure 88:
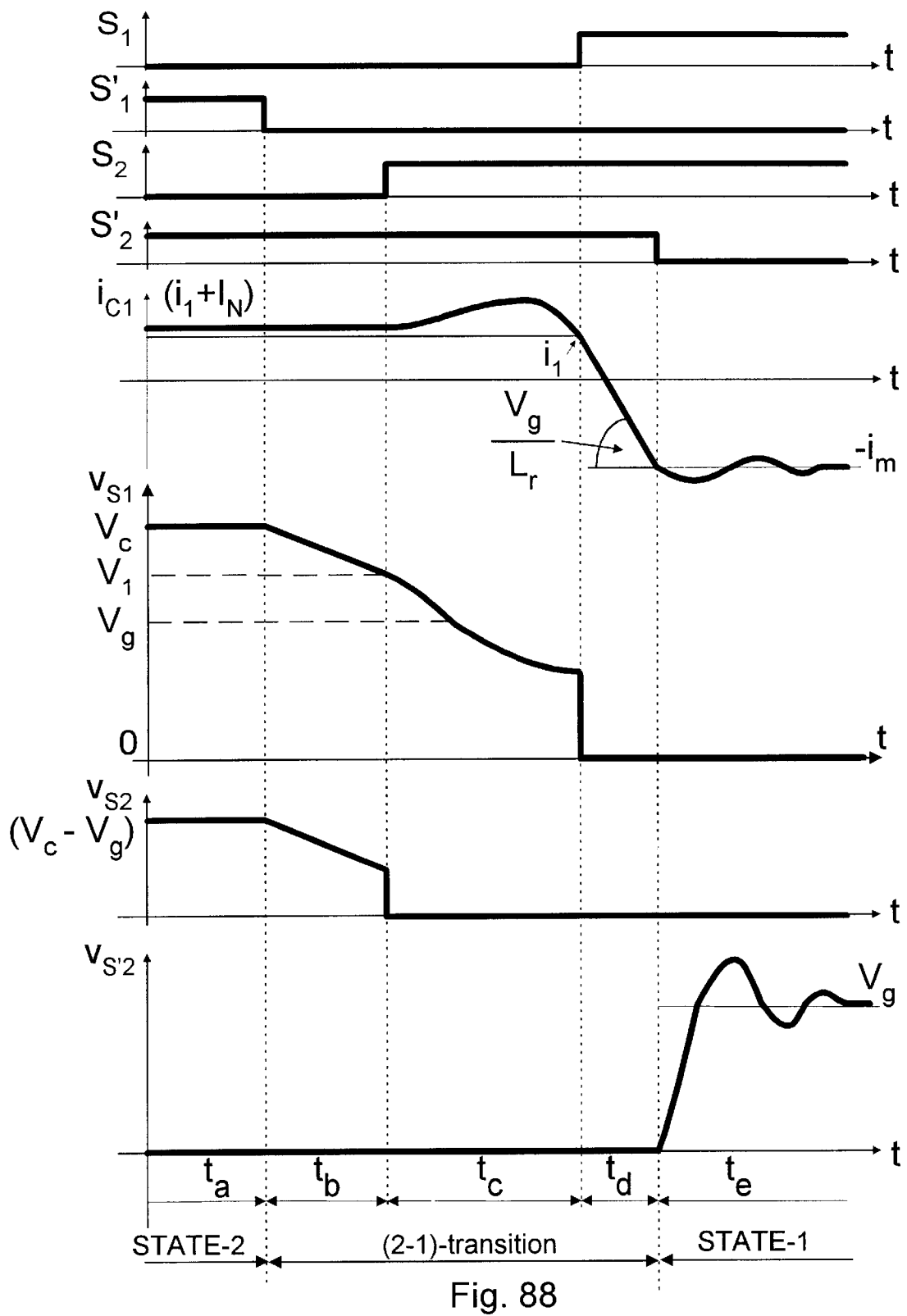
FIG. 88 illustrates the graph of the characteristic switching time control waveforms, respective switch voltages, and the input capacitor current during the (2-1) transition described by five converter circuits states of FIGS. 87(a–e).

From circuit model in FIG. 87b, the capacitance $C_{S1}$ of the input switch $S_1$ is discharging at the constant rate given by $I_N/C_r$. Output switch $S_2$ is turned ON before its voltage reaches zero to complete this linear discharge interval with input switch voltage reduced to $V_{S1}$.

Interval $t_c$

Turning ON $S_2$ starts the resonant subinterval and discharge of the parasitic capacitance of the input switch, also with the two resonant current components, as in above Case 2, but with one of them with reduced magnitude equal to $(V_{S1}-V_g)/R_0$ resulting in less effective resonant discharge than before. When the voltage on the input switch $S_1$ arrives to its lowest value, input switch $S_1$ must be turned ON, which concludes this interval. The minimum value of $S_1$ voltage depends on the timing of switch $S_2$, that is, the length of the previous interval $t_b$. The shorter the interval $t_b$ the lower the minimum value because the resonance process starts with a higher initial voltage value. The minimum value of the voltage on switch $S_1$ can be made zero by appropriate timing of $S_2$. However, the experiments have shown that minimum values of approximately $V_C/4$ result in higher efficiency. The ½CV² losses are reduced by a factor of 16 over the hard-switching case. A further reduction, however, causes increases losses due to a larger circulating current necessary to achieve a lower voltage on $S_1$.

Interval $t_{d3}$

Same as for subinterval $t_d$ of Case 1.

Interval $t_e$

Same as for subinterval $t_e$ of Case 1.

The (2–1) Transition (Case 4)

This corresponds to Case 4 of FIG. 64b. This case is represented by the five equivalent circuits of FIGS. 89(a–e) and the corresponding waveforms in the five subintervals shown in FIG. 90.

Interval $t_a$

This represents interval before the transition starts. $S_1$ and $S_2$ are OFF and S'$_1$ and S'$_2$ are ON. The interval ends and this transition is initiated when S'$_1$ is turned OFF.

Interval $t_b$

Figure 89A:
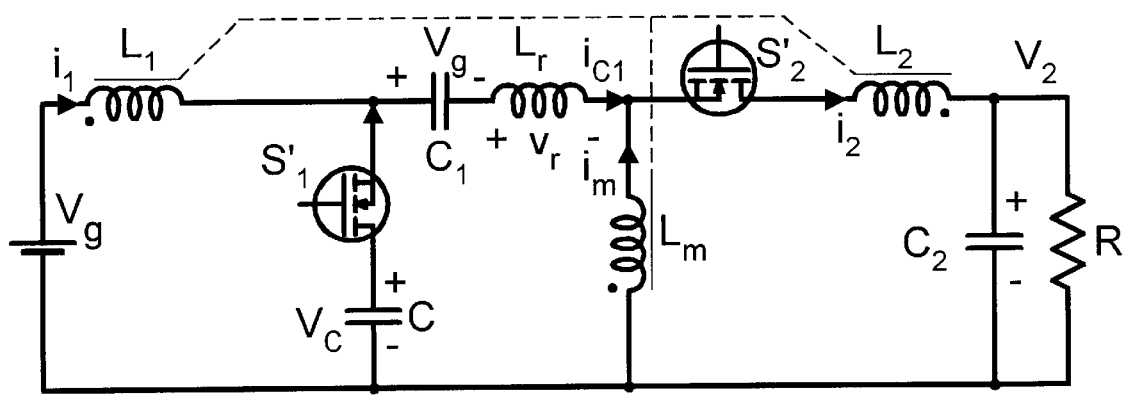
FIGS. 89(a–e) illustrate the five converter circuits states of the converter in FIG. 71a relevant to the (2-1) transition of Case 4 of FIG. 60c.
Figure 89B:
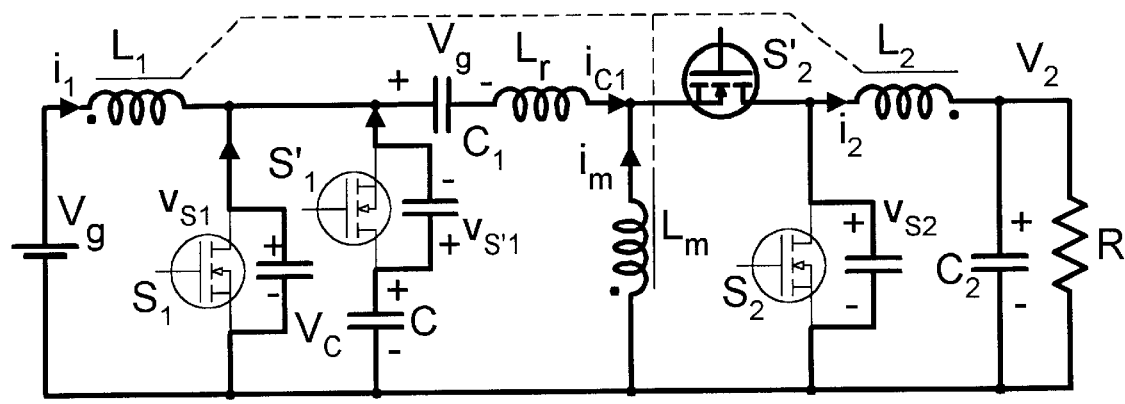

The switches $S_1$, S'$_1$ and $S_2$ are OFF, and S'$_2$ is ON as in circuit of FIG. 89b. The parasitic capacitances of the input switch $S_1$ and output switch $S_2$ are discharging at the same constant rate $I_N/C_r$. This linear discharge subinterval is completed when the voltage across output switch $S_2$ reaches zero and the voltage on input switch $S_1$ reduces to $V_g$. This turns ON the body-diode of the output switch $S_2$ as shown in FIG. 89c, at which instant the output MOSFET switch $S_2$ is turned ON to bypass its body-diode and reduce conduction losses.

Interval $t_c$

Figure 89C:
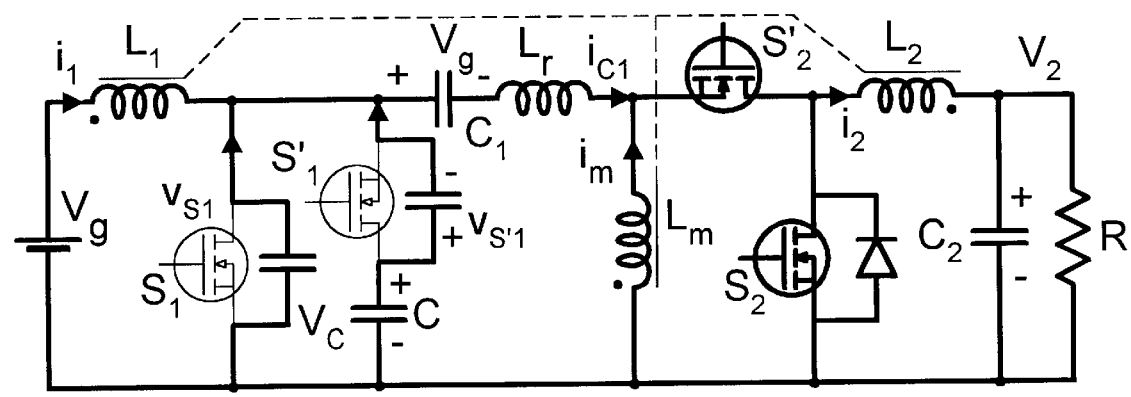
Figure 89D:
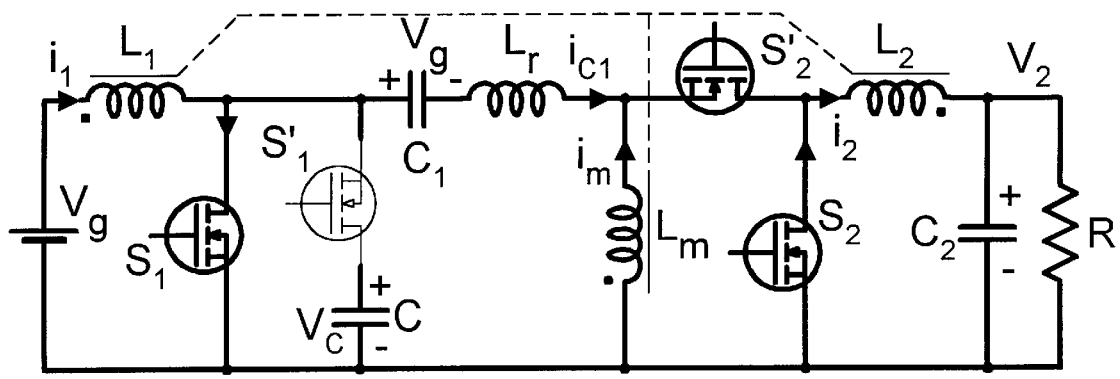
Figure 89E:
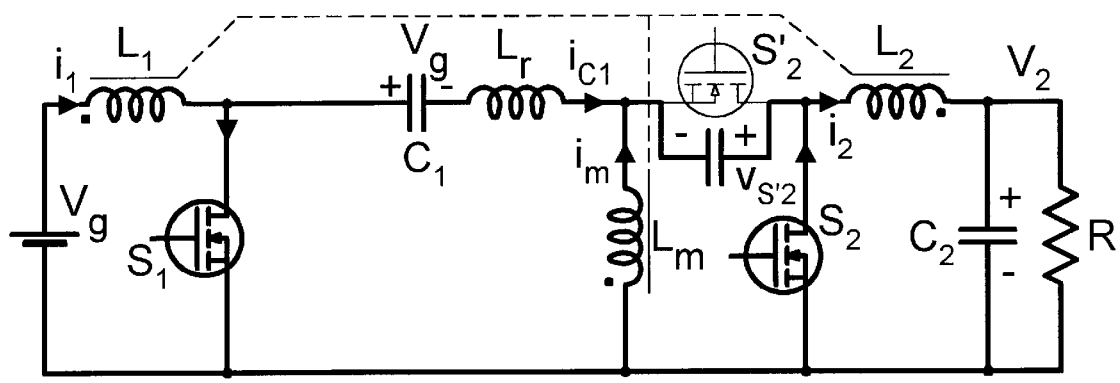
Figure 90:
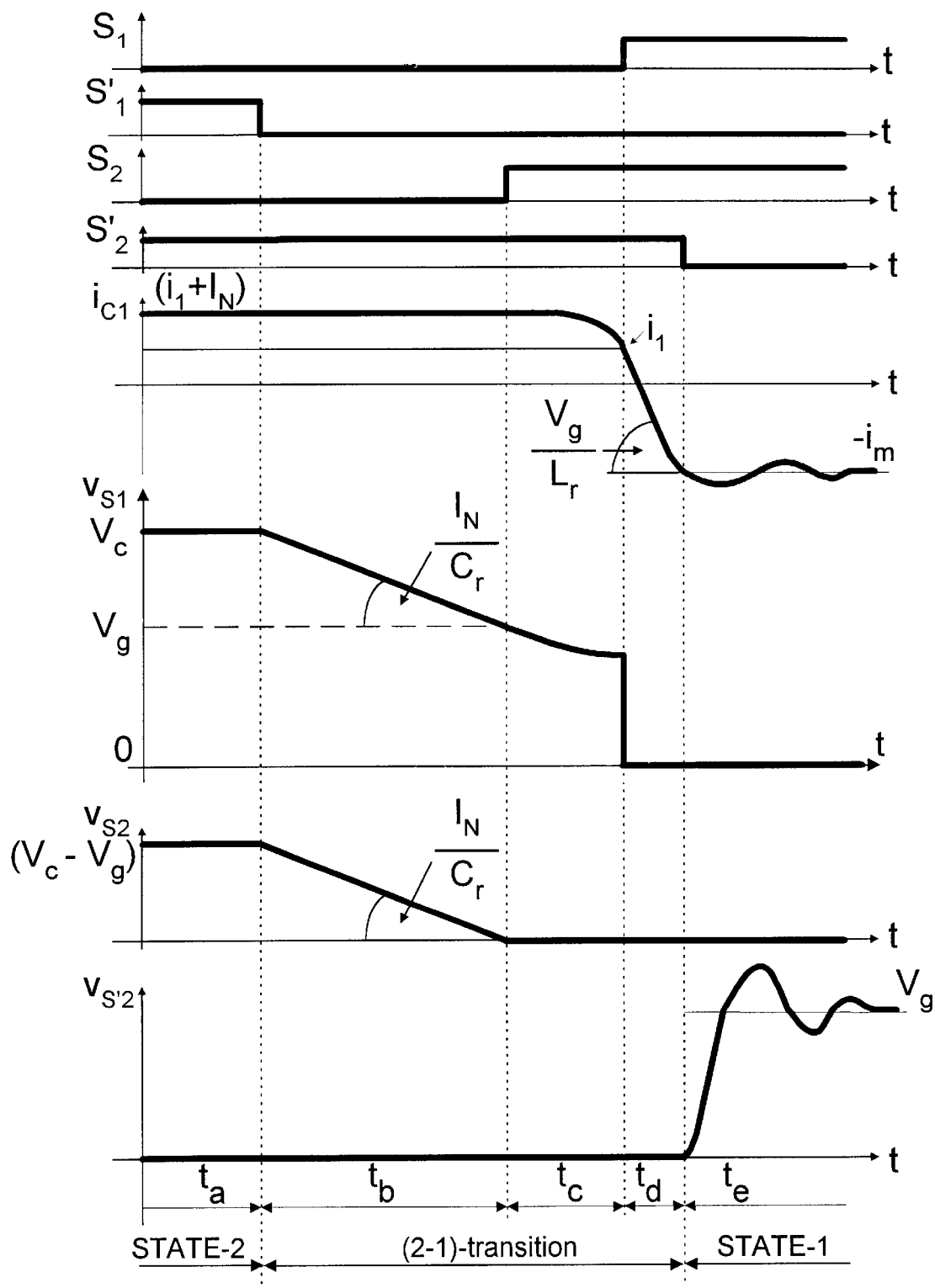
FIG. 90 illustrates the graph of the characteristic switching time control waveforms, respective switch voltages, and the input capacitor current during the (2-1) transition for the converter in FIG. 71a described by five converter circuits states of FIGS. 89(a–e).

The resonant discharge subinterval starts with turning ON of output switch $S_2$ as in circuit of FIG. 89c (body-diode turn-ON is sufficient to start resonance). In this case, only one resonant current discharge component remains, since the second resonant current component present in Case 3 above is eliminated. As also seen in same waveform, the reduction of the voltage on input switch $S_1$ below $V_g$ level is minimal, since this component is least effective in reducing the voltage. To increase its effectiveness will require increase of $I_N$ and/or characteristic impedance $R_0$, since $V_{r3}=R_0 I_N$, both of which may diminish some of the loss reduction brought by lossless switching.

Interval $t_d$

Same as for subinterval $t_d$ of Case 1.

Interval $t_e$

Same as for subinterval $t_e$ of Case 1.

Note that in the above case, exactly the same waveforms and identical behavior would have been obtained if instead of the controllable MOSFET switches, the output switch and complementary output switch were implemented as simple diode current rectifiers.

Isolated DC-to-DC Converter

In the isolated DC-to-DC converter the role of the resonant inductor is played by the leakage inductance $L_r$ of the isolation transformer as shown in FIG. 62a. Except for scaling the voltages as explained in reference to FIG. 62b the detailed lossless switching operation follows the same cases as outlined above for the non-isolated converter with resonant inductor.

EXPERIMENTAL VERIFICATION

A number of experiments were conducted to verify the performance of two classes of the converters brought by their basic embodiments as follows:

1. DC Transformer switching converter of FIG. 27 with no galvanic isolation;
2. Isolated DC Transformer switching converter of FIG. 40b with galvanic isolation.

DC Transformer Switching Converter

Several experiments were conducted to verify the following key features of the DC Transformer switching converter of FIG. 27:

1. High DC overload capability;
2. Soft switching performance without resonant inductor using only timing control;
3. Zero ripple current in output inductor.

The prototype of the DC Transformer switching converter of FIG. 27 was built for a nominal 50 W, 10 V output. The input voltage was in the range of 13 V to 20 V depending on the type of the test employed. The switching frequency used was fixed at 200 kHz. The following component values were used for the breadboard prototype:

$S_1$ and $S'_1$ were IRF3710 (100 V/28mΩ); $S_2$ and $S'_2$ were SUP70N06–14 (60 V/14 mΩ) C=2×4.4 μF/100 V; $C_1$=5× 10 μF/50 V; $C_2$=220 μF/25 V;

DC Transformer had a volume of 0.83 in³.

Overload Current Test

Figure 91A:
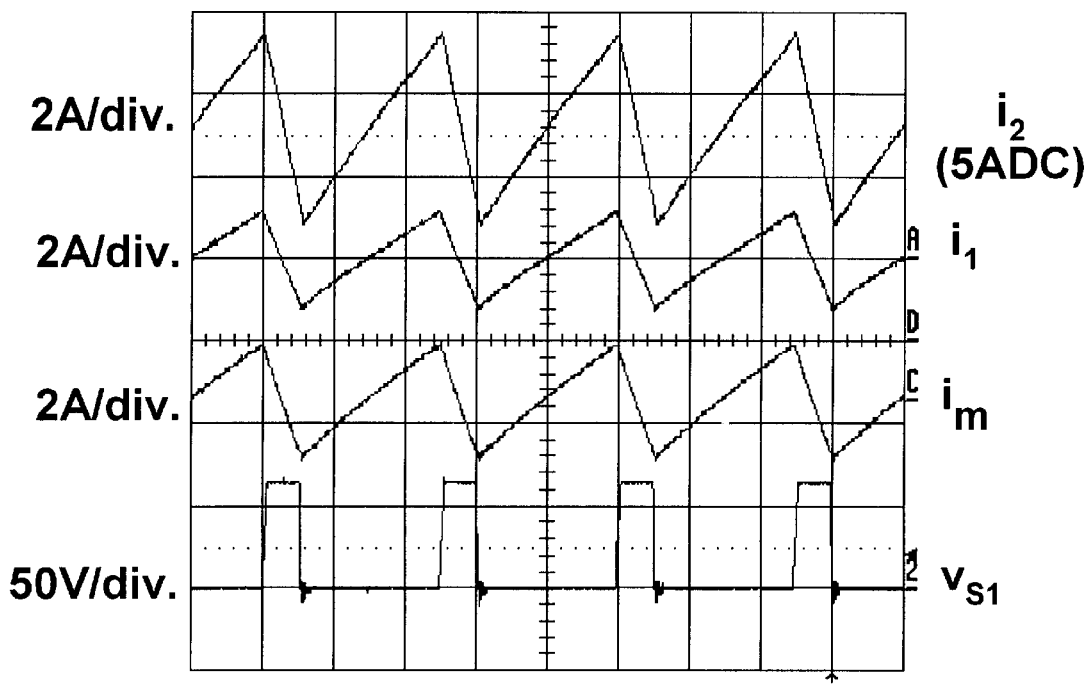
FIG. 91a shows oscilloscope traces of the three inductor current waveforms measured on the prototype of a 50 W, 20 V to 10 V converter with a DC Transformer without any air-gap and at 5 A nominal load current.

For these tests the simpler soft switching method was employed, with only proper drive timing of the switches and no additional resonant inductor, hence for the overload current testing $L_r$=0. In order to test the large overload capability, first the DC Transformer was built with no air-gap in either leg of the UU-like magnetic core structure. The converter was adjusted to operate at a nominal duty ratio of D=0.8 and an output current of 5 A at 10 V, hence the input voltage of approximately 13 V. The ripple currents of the three inductors under these nominal conditions are shown in FIG. 91a with 2μs/div time scale. Note that the output inductor current ripple due to still present AC voltage mismatch is 5 A peak-to-peak, while $i_1$ and $i_m$ are 2 A and 3 A peak-to-peak respectively.

The efficiency was measured to be 95.45% under these nominal conditions and 5 A load current. Note that the breadboard prototype design was built for the purpose of testing the overload current capability and not to optimize efficiency since the state-of-the-art components, such as lowest ON-resistance devices were not used.

Figure 91B:
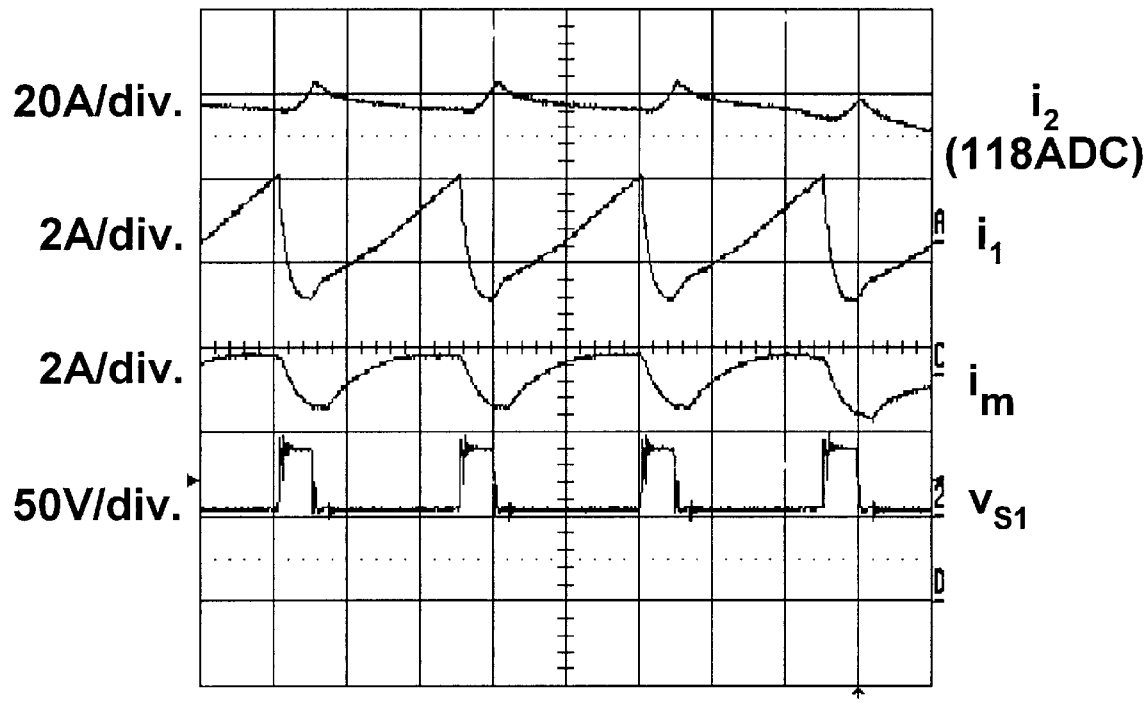
FIG. 91b shows oscilloscope traces of the three inductor currents under the same condition as in FIG. 91a except output is subjected to a large pulsed overload of 118 A load current for 2 ms at 1 Hz repetition rate.

The prototype design was then subjected to a large pulse overload current using pulse frequency of 1 Hz and pulse duration (overload duration) of 2 ms to test the overload current capability. As seen in FIG. 91b (2 μs/div time scale), the overload capability of 118 A was verified for an effective overload of approximately 2,300% (Two Thousand Three Hundred Percent). Note that only a slight saturation of the output inductor current was recorded (increase of $i_2$ ripple current), while the other two inductors currents $i_1$ and $i_m$ changed only slightly. To put the magnitude of this overload in perspective, let us compare this design with another one in which DC Transformer is not used, but two separate magnetic cores were used: one for combining input inductor and middle inductor into a single core of FIG. 29a, and another separate magnetic core with corresponding air gap as in FIG. 29c for the output inductor with its DC bias. The two separate magnetic cores would each have to support 5 times 120 A or 600 ampere-turns in order to avoid saturation. Thus, to avoid saturation each core must have a total air-gap of 120 mils of 3 cm (!), based on the 2 mil per 10 DC ampere-turns air-gap criteria, which would lead to DC flux density of 0.25 (tesla). At such an air-gap, ferromagnetic material might as well be completely left out since it contributes practically nothing to raise the inductance level beyond that of an air-core coil. As a result, the AC ripple currents in all windings would be huge and impractical. Yet the DC Transformer of the present invention was capable of supporting all that 2,300% output DC current overload with no air-gap whatsoever and with all ripple currents still at the same level as with the nominal 5 A load current.

Soft-switching Test

Figure 92A:
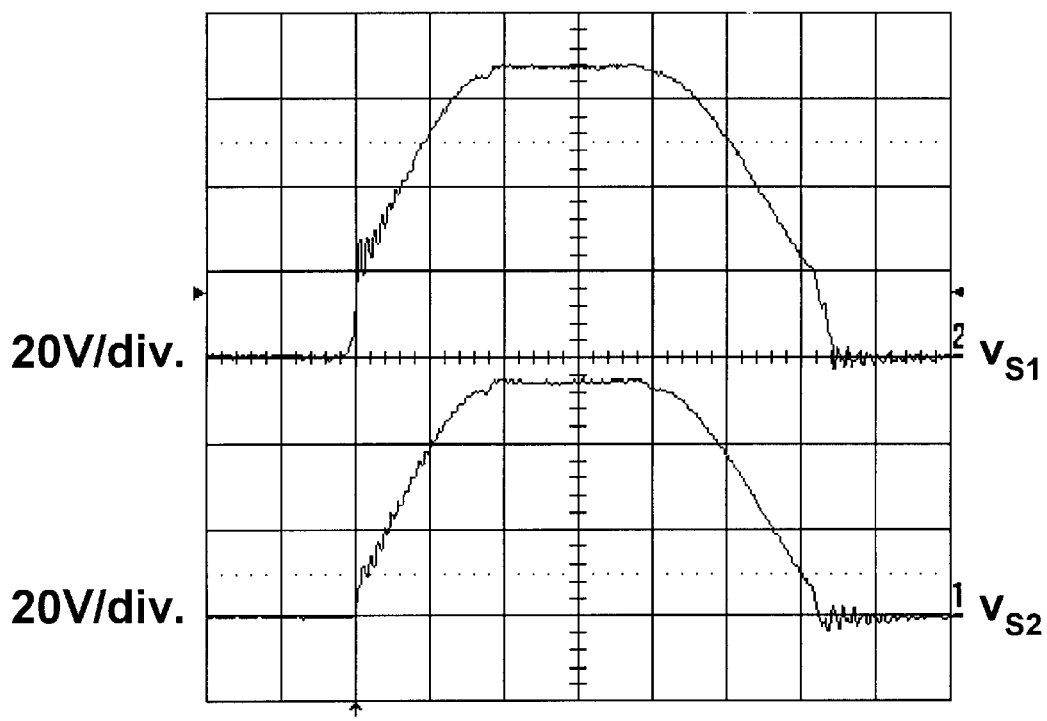
FIG. 92a shows oscilloscope traces of the measured $V_{DS}$ waveforms on the $S_1$ and $S_2$ switches with DC Transformer without air-gap.
Figure 92B:
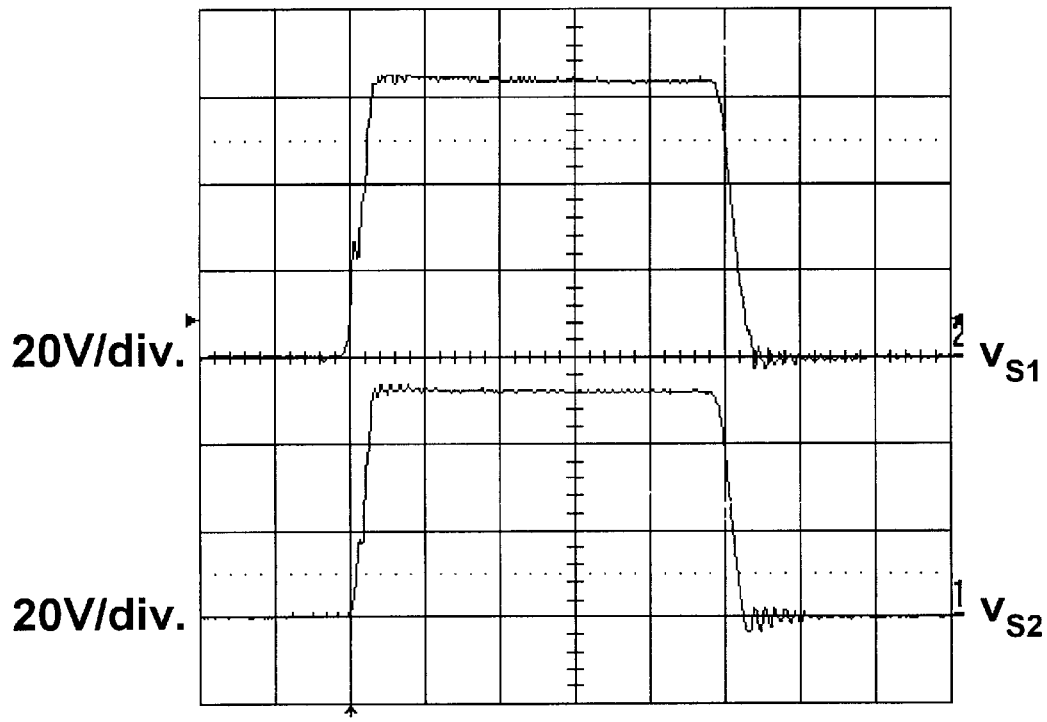
FIG. 92b shows oscilloscope traces of the measured $V_{DS}$ waveforms on the $S_1$ and $S_2$ switches with a 6 mil air-gap on the DC Transformer leg with output inductor.

FIG. 92a displays the soft switching performance and the voltages of switches $S_1$ and $S_2$ obtained with the DC Transformer core without air-gap. FIG. 92b shows the same waveforms under the same conditions, except that the DC Transformer was changed to include 6 mil air-gap. Note the considerable faster transitions in the latter case, due to the reduced magnetizing inductance of the DC Transformer, which in turn, led to proportionally increased AC ripple currents and faster transition. If the converter were adjusted to have zero ripple current in the output inductor, by increasing the air-gap, even faster transitions would be obtained. Thus, the operation at or near zero ripple current of the output inductor is beneficial since it leads to faster soft switching transitions, hence allows well defined edges and higher duty ratio even at very high switching frequencies.

Output Inductor Zero Ripple Current Test

Figure 93A:
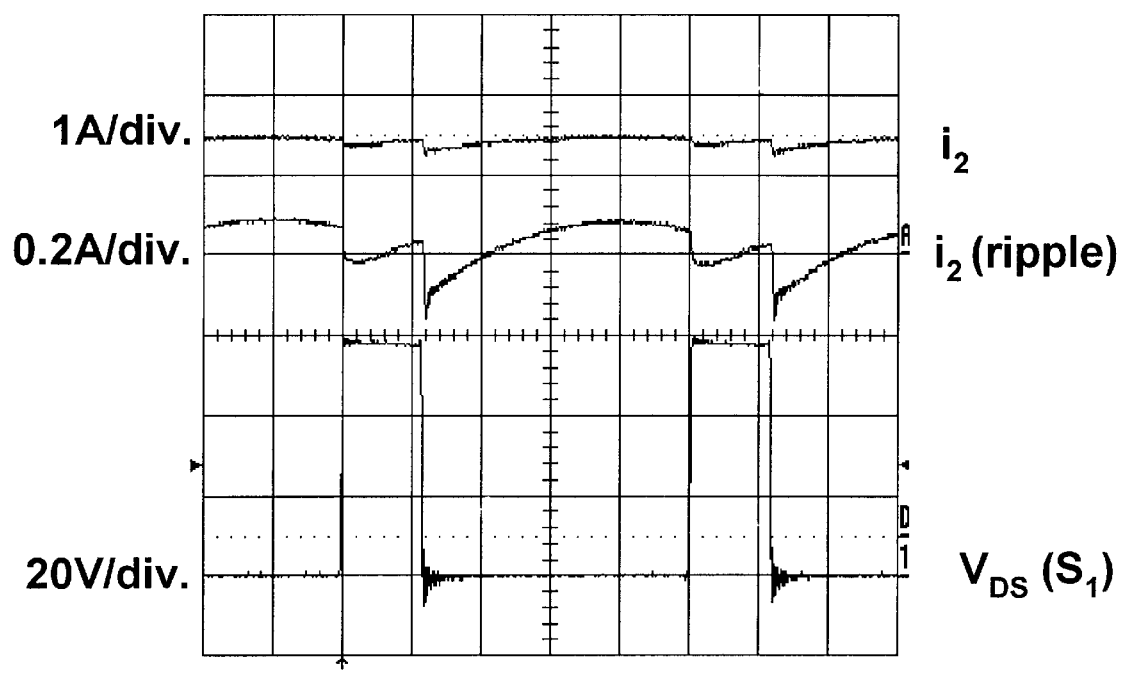
FIG. 93a shows oscilloscope traces where the top trace is the 5 A full load current, middle trace is output ripple current magnified to show remaining 230 mA ripple current when the converter is operating at zero ripple for 13.3 V input.
Figure 93B:
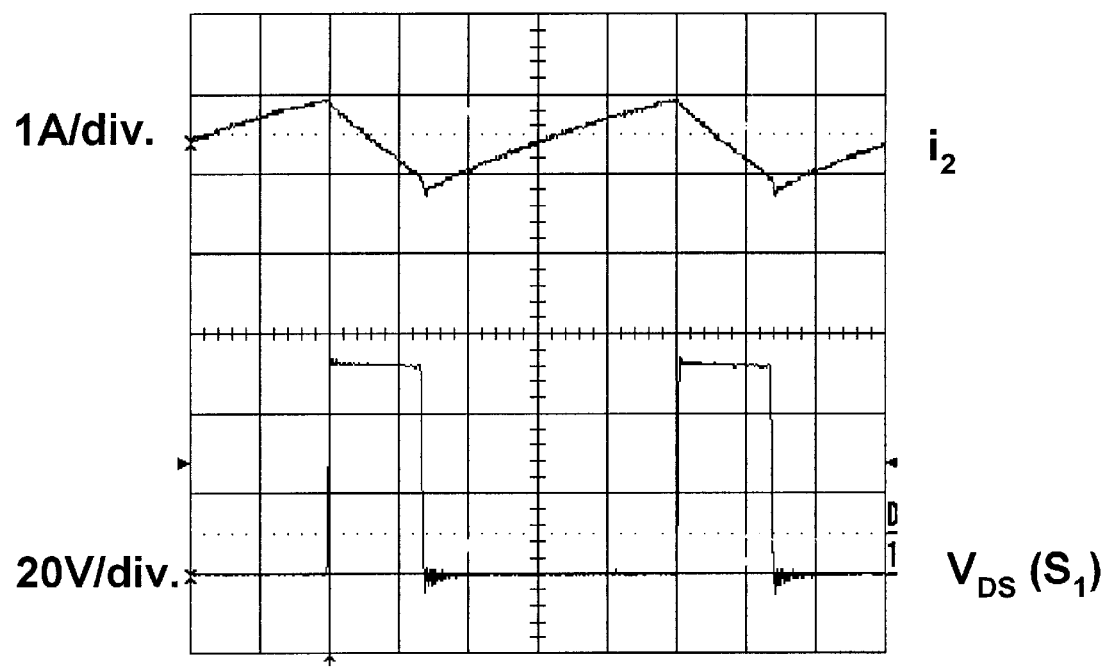
FIG. 93b shows oscilloscope traces where the top trace shows 1 A peak-to-peak output ripple current when operating at 14 V input voltage and away from zero ripple condition.

The DC Transformer design is slightly modified next to allow the observation of the zero output ripple current phenomena at lower duty ratio. Thus, to the original design with a 6 mil concentrated air-gap, another 6 mil paper spacer was added to result in total air-gap of 12 mil on the magnetic left with the output inductor $L_2$ and a 6 mil air-gap on the magnetic leg with the inductor $L_m$. When the input voltage was changed to 13.3 V the output zero-ripple current was observed as shown in FIG. 93a with 1 μs/div time scale. The top trace in FIG. 93a shows the total current $i_2$ with a DC current of 5 A and a superimposed ripple current. The second trace in FIG. 93a shows the enlarged waveform of the ripple current only, showing about 0.2 A peak-to-peak ripple including the jumps due to non-idealities. The jumps are mainly due to the fact that during the soft-switching transition the voltages on the inductors temporarily do not match. The jumps are not observed if the inductors are not coupled. FIG. 93b with 1 μs/div time scale is included for reference purposes, which shows the output ripple current increased to 1 A when the operating point was moved away by increase of the input voltage to 14 V.

Isolated DC Transformer Switching Converter

Several experiments were conducted to verify the following key features of the Isolated DC Transformer switching converter of FIG. 40b:

1. Input inductor and output inductor ripple current measurements;
2. Soft-switching assisted with leakage inductance of the isolation transformer;
3. High efficiency over wide input voltage range.

The prototype of a practical off-line converter operating from a rectified AC line is built to test the Isolated DC Transformer switching converter. The input DC voltage from 210 V to 390 V is converted to an output DC voltage of 5 V at a nominal power of 100 W and operating at switching frequency of 200 kHz. The components with following values were used for the converter of FIG. 40b:

C=47 nf; $C_i$=1 μF; $C_2$=3×1200 μF; Q1=>STU10NB80; $Q_1'$=>STP4NB80FP; $Q_2$ & $Q_2'$STV160NF03L

Figure 37B:
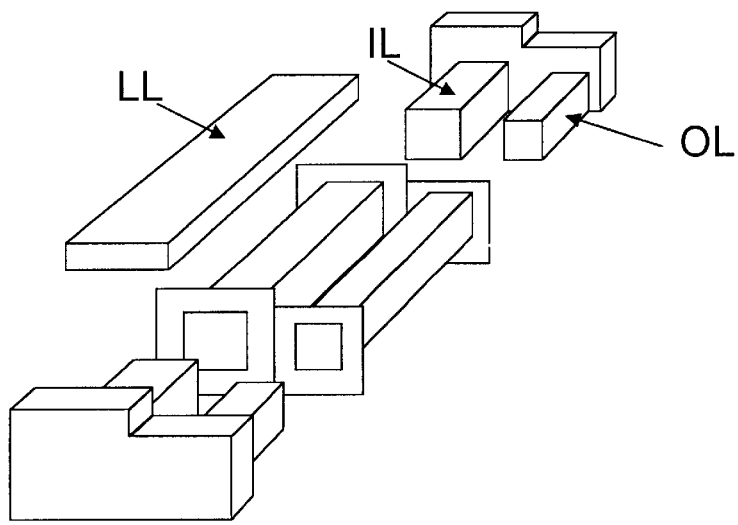

The Isolated DC Transformer was built using the custom magnetic core configuration of FIG. 37b and using the Isolated DC Transformer switching converter of FIG. 37a. The custom core with three magnetic legs was built using ferrite ferromagnetic material. Volume of the Isolated DC Transformer was 0.79 in$^3$.

Input and Output Inductor Ripple Current Measurements

Figure 94A:
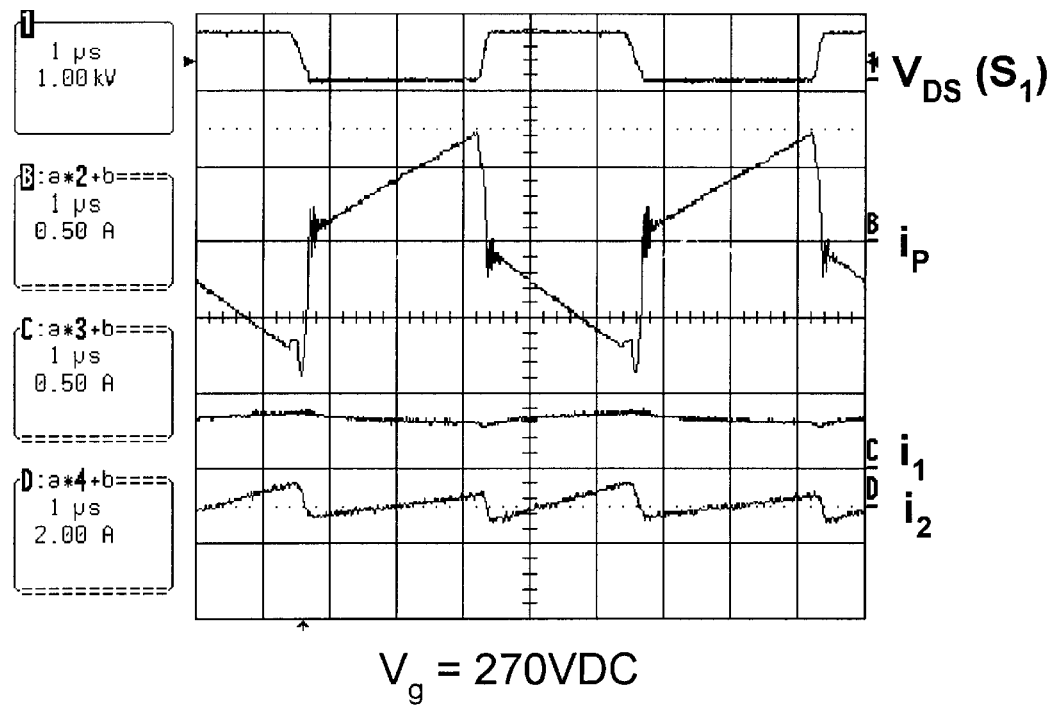
FIG. 94a shows oscilloscope traces of the input and output inductor ripple currents for 270 VDC input voltage.

First the ripple current performance was measured at two operating points. The waveforms shown are in the following order. Top trace is drain-to-source voltage of the main switch $S_1$. Second trace is the isolation transformer primary current, third trace is the input inductor current ripple at 0.5 A/div, and the bottom trace is output inductor current ripple at 2 A/div. FIG.-94a displays these waveforms obtained at 280 V DC input voltage. The input inductor ripple current is only approximately 100 mA peak-to-peak, hence it is practically zero-ripple current. The output inductor ripple current is also very small measuring approximately 1 A peak-to-peak. This is a quite low ripple current, considering that the nominal DC load current is 20 A.

Figure 94B:
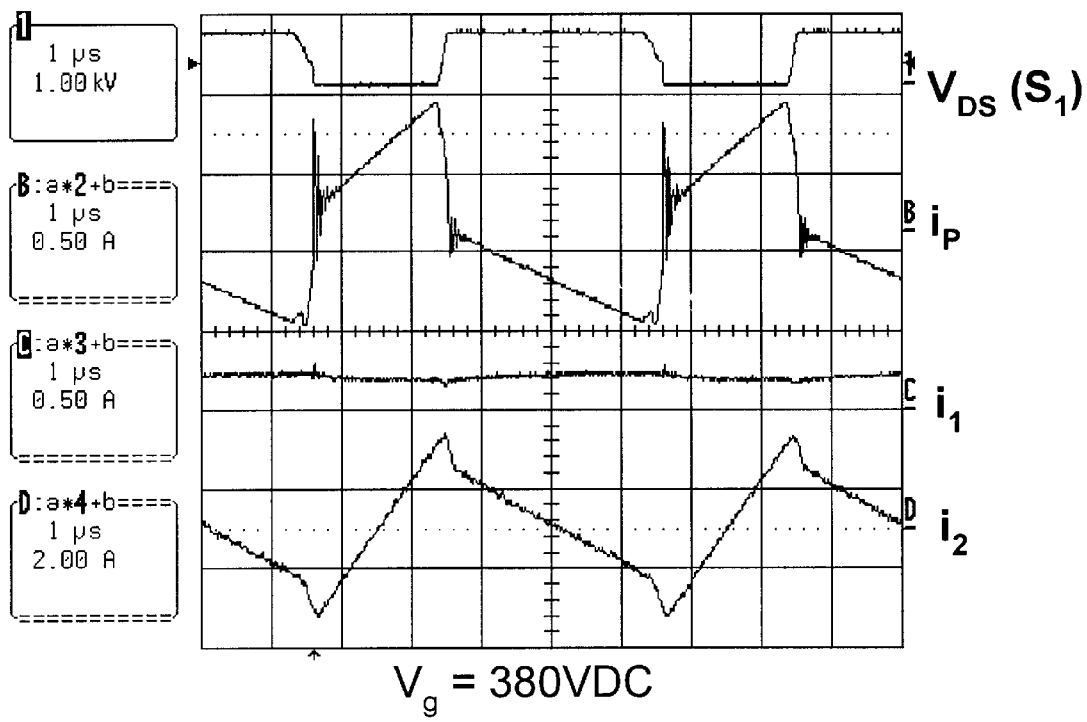
FIG. 94b shows oscilloscope traces of the input and output inductor ripple currents for 380 VDC input voltage.

Another set of measurements is shown in FIG. 94b obtained for an input DC voltage of 380 V. Note that, as predicted, for this wide change in the duty ratio, the input inductor ripple current remained practically unchanged at the same low ripple of 100 mA, which enables excellent EMI noise characteristic. Note also the absence of any spikes in either input inductor or output inductor current, which clearly demonstrates the effectiveness of the soft-switching performance of the converter. The output inductor ripple current has, however, increased to 4 A peak-to-peak.

Soft-switching Using Transformer Leakage Inductance

Figure 95A:
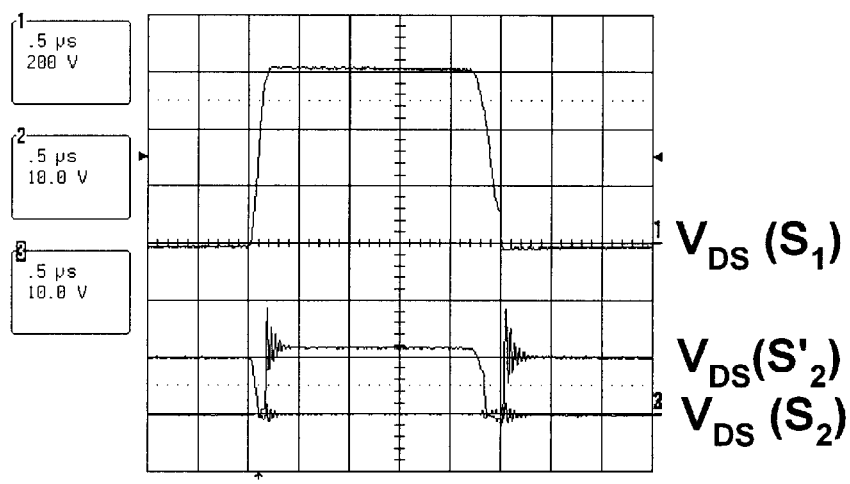
FIG. 95a shows oscilloscope traces of soft-switching waveforms.
Figure 95B:
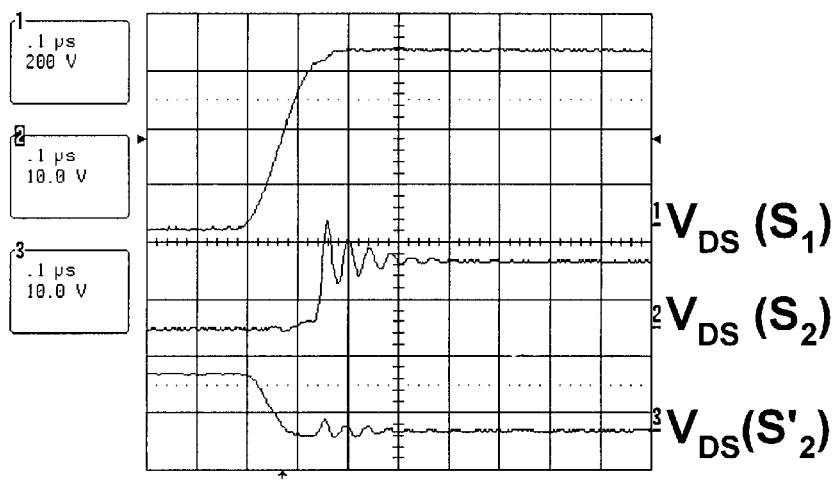
FIG. 95b shows oscilloscope traces of the (2-1) transition enlarged.
Figure 95C:
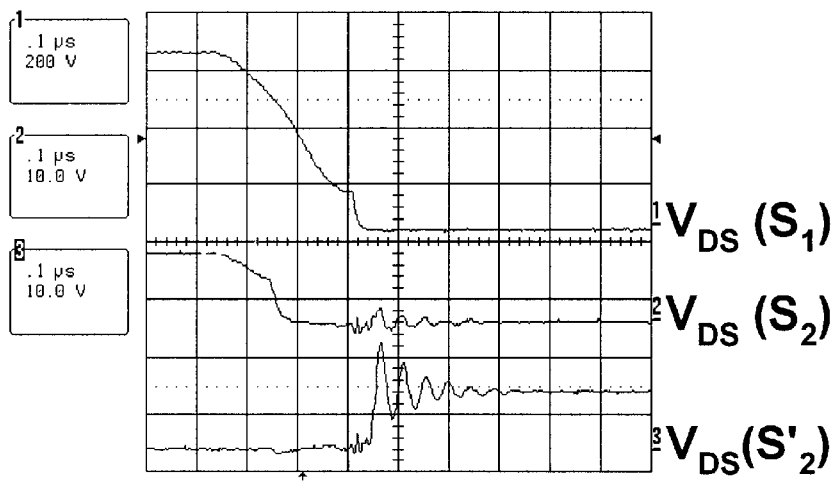
FIG. 95c shows oscilloscope traces of the (1-2) transition enlarged.

In the case of the isolation transformer, the resonant inductor is not needed, since the leakage inductance of the isolation transformer is used instead. The soft switching performance is recorded in FIG. 95a, FIG. 95b, and FIG. 95c. The top trace in these figures represents the drain to source voltage of the main switch $S_1$, and the bottom two traces the drain to-source voltages of the two synchronous rectifier switches $S_2$ and $S'_2$. FIG. 95a displays both ((1–2) transition and (2–1) transition. FIG. 95b shows the same traces as FIG. 95a but magnified to expose (1–2) transition. Finally, FIG. 95c shows the magnified traces for the (2–1) transition. As seen from the waveforms, the soft switching with leakage inductance assistance is shown to be very effective in reducing the switching losses and resulting in well defined and fast transition edges. In addition to its primary function of either elimination or large reduction of the switching losses the soft switching by either of two mechanisms disclosed, has two additional equally important practical benefits:

1. The lossless switching transitions of the input high voltage devices result in their spike-free voltage waveforms, hence in a much reduced voltage stress of these devices compared to hard-switching mode. Consequently, lower voltage rated devices could be utilized leading to their lower conduction losses as well, lower temperature rise, and ultimately more reliable operation;
2. The lossless transition edges for both (1–2) transition and (2–1) transition lead to much reduced Electromagnetic Interference (EMI) problems, which are very severe in hard-switching mode due to the high overshoot voltage spikes and ringing in the voltage waveforms. This ultimately eliminates the need for spike filters and heavy EMI filters which would further boost the overall efficiency over their hard-switching counterparts.

Efficiency Measurements

Figure 96:
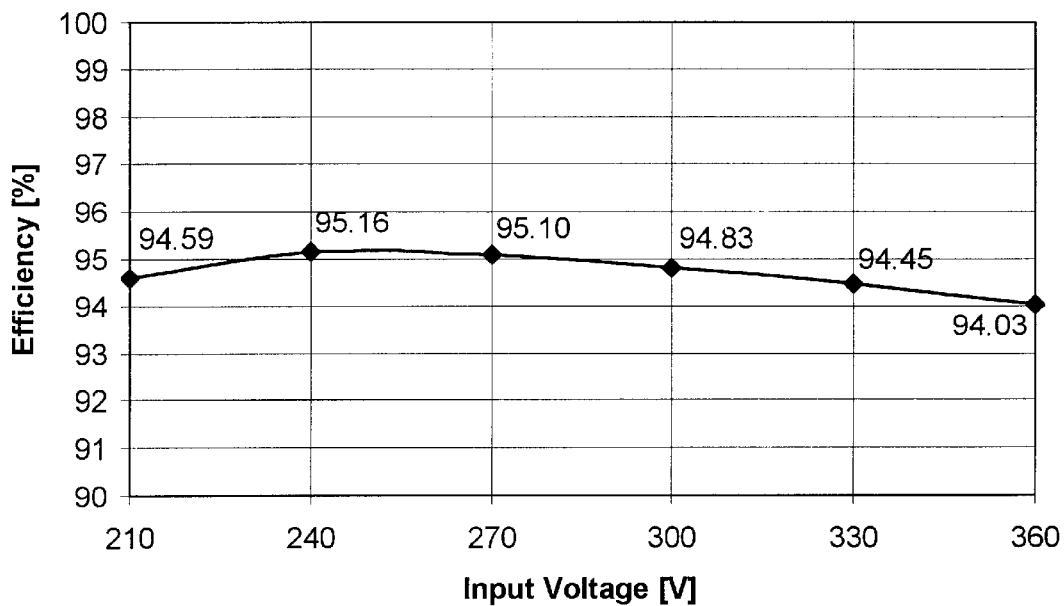
FIG. 96 is a graph of the efficiency of the experimental prototype over an input DC voltage range from 210 V to 360 V.

The efficiency measurements are taken over the operating range from 210 V DC to 360 V DC and the obtained data are displayed in FIG. 96. To highlight the performance of the converter itself, the efficiency measurement did not include the drive losses, but only power stage losses. Although the measurements were made for 100 W output power, due to its inherent high DC overload capability, the converter could be operated at 150 W continuously with only a slight drop of approximately 1% in efficiency. The high efficiency of 95% over the wide voltage range is clearly attributed to the novel Isolated DC Transformer switching converter.

Efficiency Optimization

Figure 97:
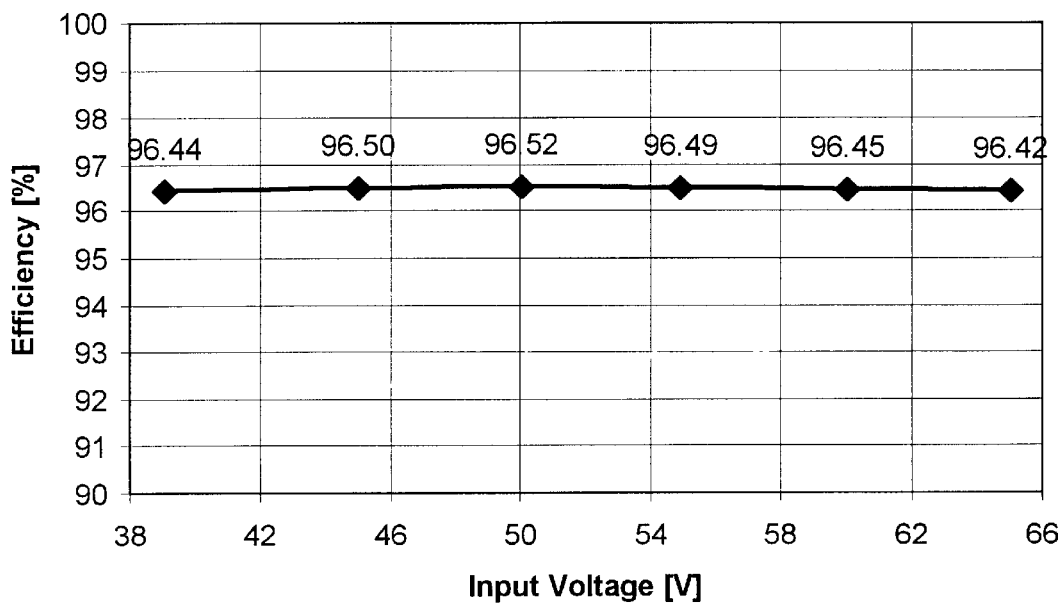
FIG. 97 is a graph of the efficiency of the experimental prototype over an input DC voltage range from 38 V to 66 V.

The experimental prototype of an isolated 50 V to 5 V, 100 W converter operated at 150 kHz switching frequency was built with objective to optimize the efficiency. The Isolated DC Transformer switching converter of FIG. 45 was selected, which included in series with the output a small external inductor built on an RM-7 standard core with 0.23 in$^3$ volume. The Isolated DC Transformer was built with 3 turns for secondary of isolation transformer and two turns for output inductor. This choice together with the built-in leakage inductance resulted in zero ripple output inductor current at duty ratio $D_{ZR}$=0.55. The core for DC Transformer was standard UU core 42220 from Magnetic, Inc., with P type ferromagnetic material. Two such UU cores stacked together and full wound resulted in a total volume of 1.76 in$^3$. The efficiency characteristic over the 38 V to 66 V input DC voltage range is shown in FIG. 97. Note that the high efficiency of over 96.4% is maintained throughout the operating range.

CONCLUSION

Even a cursory look at the present state-of-the-art switching DC-to-DC converters, regardless of their power, reveals that the magnetic components dominate both the overalls size and weight of the converters, and contribute more than half of the total losses.

Almost all attempts in the past to reduce the size of the magnetic components, and thus overall converter size and weight resulted in an inordinate increase of switching frequency. While increase in switching frequency initially allows a smaller size of magnetic components, the much increased power losses in magnetic components (core losses, skin effect and proximity effect) as well as switching and drive losses of semiconductor devices, lead quickly to diminishing returns: the increased losses demand a larger size and weight in the heat-sinks for heat dissipation to reduce the components temperature rise to acceptable levels. In the end, the overall size of the converter is hardly reduced despite smaller magnetics. Thus, the successful solution must offer both a large reduction in size of the magnetic component and substantial improvement in efficiency at moderate switching frequencies.

The present invention fulfills both of these requirements. The new magnetics of the DC Transformer, in conjunction with the special switching circuitry, enables all of the otherwise separate magnetic components of the converter to be combined onto a single common magnetic core in an unprecedented way. Very detrimental large DC bias currents present in each magnetic winding and hence their corresponding large DC flux are processed in such a way that the total DC flux in the common magnetic core is reduced to zero for any operating duty ratio D. The large air-gap considered heretofore as an inevitable part of switching converter magnetics is eliminated entirely in the new DC Transformer. What seemed unavoidable in the past, namely the detrimental storage of the DC energy in the air-gaps previously always present, was also completely eliminated. The resulting magnetic structure behaves like an AC transformer with no DC flux bias at all, hence the switching converter operates with corresponding size reduction and efficiency improvements. Furthermore, due to automatic DC ampere-turns cancellation, the new DC Transformer has bee demonstrated to easily operate with tremendous DC overload capability, which is an order of magnitude larger than the nominal load current.

Another aspect of the present invention is the implementation of special lossless switching operation, which turns ON high voltage switching devices at zero voltage, hence no switching losses, while the low voltage switching devices have negligible switching losses. This, together with operation at moderate switching frequencies, results in the further improvement of the efficiency and reduction in size of the converter as well as in much reduced radiated EMI noise and low stresses on semiconductor switching devices, thus increasing converter reliability. The new converter with its unique DC Transformer structure and special lossless switching operation has results in unexpected and surprising result, namely the substantial reduction of the magnetic components in size and weight with concurrent dramatic efficiency improvement and increase of overload capability as demonstrated by the experimental isolated 50 V to 5 V, 100 W converter with over 96.5% efficiency. For comparison, the present state-of-the-art converters operate at 90% efficiency and have power losses, which are 200% to 300% higher than the power losses of the present invention.

Finally, the present invention provides additional performance improvements, such as zero-ripple current at the input over a wide operating range, as well as zero ripple current at the output for a limited operating range, which contribute to reduced conducted EMI noise. Although the particular embodiments of the invention have been described and illustrated herein, it is recognized that modifications may readily occur to those skilled in the art. Consequently, it is intended that the claims be interpreted to cover such modifications and equivalents thereof.

What is claimed is:

1. A converter for providing power from a DC voltage source connected between an input terminal and a common input terminal to a DC load connected between an output terminal and a common output terminal, said converter comprising:

an input inductor winding, a middle inductor winding, and an output inductor winding placed on a common magnetic core to form a DC Transformer, and each winding having one dot-marked end and an other unmarked end whereby AC voltage applied to said middle inductor winding induces AC voltages in said input and output inductor windings so that said applied AC voltage and said induced AC voltages are in phase at dot-marked ends of said input, output and middle inductor windings;

said input inductor winding connected at said dot-marked end thereof to said input terminal to form an input winding of said DC Transformer;

said output inductor winding connected at said dot-marked end thereof to said output terminal to form an output winding of said DC Transformer;

said middle inductor winding connected at said dot-marked end thereof to said common input terminal and said common output terminal to form a middle winding of said DC Transformer;

an input capacitor, having one end connected to said unmarked end of said input inductor winding an other end of said input capacitor connected to said unmarked end of said middle inductor winding;

an input switch with one end connected to said common input terminal and an other end connected to said unmarked end of said input inductor winding;

an output switch with one end connected to said common output terminal and an other end connected to said unmarked end of said output inductor winding;

a complementary output switch, having one end connected to said unmarked end of said output inductor winding and an other end of said complementary output switch connected to said unmarked end of said middle inductor winding;

a branch comprising a complementary input switch and an auxiliary capacitor, having one end of said complementary input switch connected to one end of said auxiliary capacitor, while an other end of said complementary input switch and an other end of said auxiliary capacitor comprise ends of said branch;

switching time control means for providing a precise sequence and timing of turning ON and turning OFF signals for said input switch, said complementary input switch, said output switch and said complementary output switch;

means for connecting said ends of said branch to said converter whereby during a State-2 interval current through said branch is equal to the sum of input inductor current flowing into said dot-marked end of said input inductor winding and middle inductor current flowing into said dot-marked end of said middle inductor winding reduced by output inductor current flowing out of said dot-marked end of said output inductor winding;

wherein said input switch, said output switch, and said complementary output switch are semiconductor switching devices, capable of conducting the current in at least one direction while turned ON, and sustaining voltage in at least one direction while turned OFF;

wherein said complementary input switch is a semiconductor current bidirectional switching device, capable of conducting the current in both directions while turned ON, and sustaining voltage in at least one direction, while turned OFF;

wherein said semiconductor switching devices and said semiconductor current bidirectional switching device turn ON and OFF at high switching frequency;

wherein a DC-to-DC voltage conversion ratio of said converter depends linearly on a duty ratio D;

wherein for said duty ratio D in a range from 0 to 1, both a DC current in said input inductor winding and a DC current in said middle inductor winding flow into said dot-marked ends of said input and middle inductor windings, whereas a DC current in said output inductor winding flows out of said dot-marked end of said output inductor winding;

wherein for said duty ratio D in a range from 0 to 1, the sum of said DC currents of said input inductor winding and said middle inductor windings is equal to the magnitude of said DC current of said output inductor winding;

wherein said DC Transformer includes an equal number of turns for said input, output, and middle inductor windings and, at said duty ratio D, DC ampere-turns of said input inductor winding and said middle ineductor winding are positive and generate positive DC fluxes which add together, while DC ampere-turns of said output inductor winding are negative and generate negative DC flux to result in net zero DC flux in said common magnetic core;

wherein said common magnetic core has no air-gap;

whereby said net zero DC flux in said common magnetic core enables increased inductances of said input, middle, and output inductor windings and said converter has increased overload capability, and whereby said DC Transformer combines said input inductor winding, said output inductor winding, and said middle inductor winding to obtain efficient DC-to-DC power transfer from said input inductor winding to said output inductor winding with reduced energy storage within said common magnetic core of said DC Transformer, thereby reducing size and weight of said converter by reducing said common magnetic core size and weight while simultaneously increasing efficiency and overload capability of said converter, and providing reduction of electromagnetic interference.

2. A converter as defined in claim 1, wherein said common magnetic core is an UU magnetic core;

wherein said input inductor winding and said middle inductor winding are places side-by-side on one leg of said UU magnetic core;

wherein said output inductor winding is placed on an other leg of said UU magnetic core;

whereby leakage inductance between said input inductor winding and said middle inductor winding provides substantially zero-ripple current in said input inductor winding;

whereby leakage inductance between said output inductor winding and said middle inductor winding provides reduced ripple current in said output inductor winding, and whereby said UU magnetic core and said input, middle, and output inductor windings form a DC Transformer of Type A.

3. A converter as defined in claim 2, wherein an air-gap is positioned on said other leg of said UU magnetic core with said output inductor winding to provide an AC voltage divider between leakage and magnetizing inductances of said output inductor winding, and wherein said AC voltage divider matches induced AC voltage in said output inductor winding to applied AC voltage to said output inductor winding for a fixed duty ratio D;

whereby, for said fixed duty ratio D, said DC current in said output inductor winding has substantially zero-ripple current, and whereby said UU magnetic core with said air-gap and said input, middle and output inductor windings form a DC Transformer device of Type B.

4. A converter as defined as claim 3, including an external inductor connected in series with said output inductor winding to reduce a ripple current in said output inductor winding.

5. A converter as defined in claim 3, wherein said input and middle inductor windings have equal number of turns, which is different from number of turns of said output inductor windings, whereby number of turns of said output inductor winding is adjusted to match induced AC voltage in said output inductor winding with applied AC voltage to said output inductor winding to obtain substantially zero-ripple current in said output inductor winding at a nominal duty ratio D;

whereby said UU magnetic core with said air-gap, said input and middle inductor windings, and said output inductor winding with different number of turns than said input and middle inductor windings form a DC Transformer device of Type C.

6. A converter as defined in claim 5, including an external inductor connected in series with said output inductor winding to reduce a ripple current in said output inductor winding.

7. A converter as defined in claim 3, wherein said common magnetic core includes a separate leakage magnetic leg with no windings and an air-gap in a magnetic flux path with said common magnetic core, wherein said air-gap is adjusted to provide said output inductor winding with substantially zero-ripple current at fixed duty ratio D, whereby said leakage magnetic leg increases the leakage inductance between said output inductor winding and said input and middle inductor windings, and provides reduction of ripple current in said output inductor winding, and whereby said common magnetic core with said leakage magnetic leg and said input, middle and output inductor windings form a DC Transformer device of Type D.

8. A converter as defined in claim 1, wherein said common magnetic core is an EE magnetic core;

wherein said input inductor winding and said middle inductor are placed side-by-side on the center leg of said EE magnetic core;

wherein an additional output inductor winding with same number of turns as said output inductor winding is connected in series with said output inductor winding so that AC voltages at said additional output inductor winding and said output inductor winding are in phase at dot-marked ends and add;

wherein said additional output inductor winding is placed on one outer leg of said EE magnetic core and said output inductor winding is placed on an other outer leg of said EE magnetic core;

whereby leakage inductance between said input inductor winding and said middle inductor winding provides substantially zero-ripple current in said input inductor winding;

whereby leakage inductances between said additional output inductor winding, said output inductor windings and said middle inductor winding provide reduced ripple current in said additional output inductor winding and said output inductor winding, and whereby said EE magnetic core and said input, middle, output, and additional output inductor windings form a DC Transformer device of Type E.

9. A converter as defined in claim 8, wherein air-gaps are positioned on each of said outer legs of said EE magnetic core with said additional output inductor winding and said output inductor windings to provide AC voltage dividers between leakage and magnetizing inductances of said additional output inductor winding and said output inductor winding;

wherein said AC voltage dividers match induced AC voltages in said additional output inductor winding and said output winding to respective applied AC voltages to said additional output inductor winding and said output inductor winding for a fixed duty ratio D;

whereby, for said fixed duty ratio D, said DC current in said output inductor winding has substantially zero-ripple current, and whereby said EE magnetic core with said air-gaps and said input, middle, output, and additional output inductor windings form a DC Transformer device of Type F.

10. A converter as defined in claim 1, further including a separate resonant inductor in series with said input capacitor, wherein said DC Transformer is selected from the group consisting of
(i) said DC Transformer device of Type A
(ii) said DC Transformer device of Type B
(iii) said DC Transformer device of Type C
(iv) said DC Transformer device of Type D
(v) said DC Transformer device of Type E
(vi) said DC Transformer device of Type F;

wherein said input switch, said complementary input switch, said output switch, and said complementary output switch are semiconductor current bidirectional switching devices, capable of conducting the current in both directions while turned ON, and sustaining voltage in one direction, while turned OFF, and said semiconductor current bidirectional switching devices are modeled as comprising parallel connection of an ideal switch, a parasitic body-diode and a parasitic capacitance;

wherein said switching time control means includes precise electronically controlling operation of said semiconductor current bidirectional switching devices whereby an (1-2) transition and a (2-1) transition are obtained during each successive switch operating cycle $T_S$ wherein said (1-2) transition and said (2-1) transition are shorter than said switch operating cycle $T_S$; and said switching time control means provides control signals for respective switches as follows:

said (1-2) transition is initiated by turning said input switch OFF and, when voltage on said complementary output switch is reduced to zero, said switching time control means provides control signal for complementary output switch to be turned ON at zero voltage for zero switching losses, and said (1-2) transition continues until the voltage on said complementary input switch reduces to zero, at which instant said switching time control means provides control signal for said complementary input switch to be also turned ON at zero voltage for zero switching losses, and said (1-2) transition continues until the current through the output switch is reduced to zero, making this the latest instant at which output switch must be turned OFF to complete said (1-2) transition;

said (2-1) transition is initiated by first turning said output switch ON, intentionally before said complementary input switch is turned OFF, to boost the current in said resonant inductor by an additional magnitude which is inversely proportional to a resonant inductance ($L_r$) inductance, directly proportional to voltage difference of DC voltage across said auxiliary capacitor and DC voltage of said DC voltage source and directly proportional to this boost subinterval during which said output switch and said complementary input switch are both turned ON, and when said complementary input switch is turned OFF, the resonant discharge of parasitic capacitance across said input switch and simultaneous resonant charge of parasitic capacitance across said complementary input switch take place during this resonant subinterval in which the total resonant current is comprising three distinct current components, the first one a cosinusoidal resonant current component with said additional magnitude defined above, the second one a sinusoidal resonant current component whose magnitude is directly proportional to voltage difference of DC voltage across said auxiliary capacitor and DC voltage of said DC voltage source and inversely proportional to a characteristic impedance of a resonant circuit comprising said resonant inductor and a resonant capacitance comprising parallel connection of parasitic capacitances of said input switch and said complementary input switch, and the third one a cosinusoidal resonant current component whose magnitude is equal to initial current value in said resonant inductor at the instant when said output switch was turned ON, and at the instant when said parasitic capacitance of said input switch is fully discharged, said switching time control means provides a control signal for said input switch to be turned ON at zero voltage and with zero switching losses to complete said resonant subinterval, and said (2-1) transition continues with a current-reversal subinterval during which the input capacitor current is reversed from being equal to input inductor current to current flow in opposite direction with magnitude equal to current of said middle inductor at which instant the current through said complementary output switch is reduced to zero making this the latest instant at which said complementary output switch must be turned OFF to complete said (2-1) transition;

wherein said resonant capacitance is significantly higher than capacitance of parasitic capacitances across said output switch and said complementary output switch.

11. A converter as defined in claim 10, wherein said (2-1) transition is initiated by turning said complementary input switch OFF and simultaneously turning said output switch ON to start a resonant discharge of parasitic capacitance across said input switch and simultaneous resonant charge of a parasitic capacitance across said complementary input switch with a total resonant current comprising two distinct current components, said second one sinusoidal resonant current component and said third one cosinusoidal resonant current component, and, at the instant when a voltage of said parasitic capacitance of said input switch reaches the minimum value, said input switch is turned ON by said switching means at reduced voltage and with reduced switching losses completing said resonant subinterval and said (2-1) transition continues until the current through said complementary output switch is reduced to zero, making this the latest instant at which complementary output switch must be turned OFF to complete this current-reversal subinterval and said (2-1) transition, and whereby during said (2-1) transition, energy already stored in said resonant inductor facilitates resonant discharge and voltage reduction of said parasitic capacitance of said input switch to complete said (2-1) transition with reduced switching losses and voltage stress on said semiconductor current bidirectional switching devices and increased efficiency of said converter with reduced electromagnetic interference.

12. A converter as defined in claim 10, wherein said (2-1) transition is initiated by turning said complementary input switch OFF to start a linear discharge of said parasitic capacitance across said input switch, and, before a voltage across said input switch drops to the level of said DC voltage source, said output switch is turned ON to force a resonant discharge of said parasitic capacitance across said input switch with a total resonant current comprising two distinct current components, said second one sinusoidal resonant current component proportional to voltage difference of voltage across said input switch present at the instant when said output switch is turned ON and the DC voltage of said DC voltage source and inversely proportional to said characteristic impedance, and said third one cosinusoidal resonant current component, and, at the instant when said voltage across said input switch reaches the minimum value, said input switch is turned ON by said switching means at reduced voltage and with reduced switching losses completing said resonant subinterval and said (2-1) transition continues until the current through said complementary output switch is reduced to zero making this the latest instant at which said complementary output switch must be turned OFF to complete said current-reversal subinterval and said (2-1) transition, and whereby during said (2-1) transition, said complementary input switch and said output switch are both turned-OFF providing said linear discharge followed by said resonant discharge for further voltage reduction of said parasitic capacitance across said input switch, and said input switch and said output switch are turned ON at reduced voltages to complete said (2-1) transition with reduced switching losses and voltages stress on said semiconductor current bidirectional switching devices and increased efficiency of said converter with reduced electromagnetic interference.

13. A converter as defined in claim 10, wherein said (2-1) transition is initiated by turning said complementary input switch OFF to start a linear discharge of said parasitic capacitance across said input switch, and, when voltage of said input switch drops to a level of said DC voltage source, said output switch is turned ON at zero voltage with zero switching losses forcing a resonant discharge of said parasitic capacitance across said input switch with a resonant current comprising only said third one cosinusoidal resonant current component, and, at the instant when said voltage of said input switch reaches the minimum value, said input switch is turned ON by said switching time control means at a voltage lower than said DC voltage source level and with reduced switching losses completing said resonant subinterval and (2-1) transition continues until the current through said complementary output switch is reduced to zero making this the latest instant at which said complementary output switch must be turned OFF to complete said current-reversal subinterval and said (2-1) transition, and when the product of magnitude of said third one cosinusoidal resonant current component and said characteristic impedance is equal to voltage of said DC voltage source, said input switch is turned ON at zero voltage resulting in zero switching losses on all said semiconductor current bidirectional switching devices, and whereby during said (2-1) transition said output switch is turned ON at zero voltage with zero switching losses and at the instant in time when said parasitic body-diode of said output switch would start to conduct, hence reducing current conduction losses of said parasitic body-diode, and said input switch is turned ON at reduced voltage to complete said (2-1) transition with reduced switching losses and reduced voltage stress on said semiconductor current bidirectional switching devices and increased efficiency of said converter with reduced electromagnetic interference.

14. A converter as defined in claim 10, wherein said output switch and said complementary output switch are two-terminal current rectifier switches, which are turned ON or turned OFF in response to operating state and conditions of said converter caused by electronically controlled switching of said input switch and said complementary input switch;

wherein said switching time control means includes precise electronically controlling operation of said input switch and said complementary input switch whereby and (1-2) transition and a (2-1) transition are obtained during each successive switch operating cycle $T_S$, wherein said (1-2) transition and said (2-1) transition are shorter than said switch operating cycle $T_S$, and said switching time control means provides control signals for respective switches as follows:

said (1-2) transition is initiated by turning said input switch OFF and, when blocking voltage across said complementary output rectifier switch is reduced to zero, said complementary output rectifier switch starts to conduct, hence automatically is turned ON at zero voltage for zero switching losses, and said (1-2) transition continues until the voltage on said complementary input switch reduces to zero, at which instant said complementary input switch is turned ON by said switching time control means at zero voltage for zero switching losses while said output rectifier switch is turned OFF by reverse bias voltage applied by converter across said output rectifier switch;

said (2-1) transition is initiated by turning said complementary input switch OFF to start linear discharge of said parasitic capacitance across said input switch, and, when a voltage across said input switch drops to the level of said DC voltage source, blocking voltage across said output rectifier switch is zero, hence said output rectifier switch is automatically turned ON with zero switching losses forcing a resonant discharge of said parasitic capacitance across said input switch with a resonant current comprising only of said third one cosinusoidal resonant current component, and, at the instant when said voltage across said input switch reaches the minimum value, said input switch is turned ON by said switching means at voltage reduced below said DC voltage source level and with reduced switching losses while said complementary output rectifier switch is by the blocking voltage automatically turned OFF to complete said (2-1) transition, and whereby control and drive circuitry for said output rectifier switch and said complementary output rectifier switch are not needed, and when the product of said magnitude of said third one cosinusoidal resonant current component and said characteristic impedance is equal to voltage of said DC voltage source, said input switch is also turned ON at zero voltage resulting in zero switching losses on two said semiconductor current bidirectional switching devices and two said two-terminal current rectifier switches, and whereby during said (2-1) transition said output rectifier switch is automatically turned ON at zero voltage with zero switching losses, and said input switch is turned ON at reduced voltage to complete said (2-1) transition with reduced switching losses and voltage stress on said semiconductor current bidirectional switching devices and increased efficiency of said converter with reduced electromagnetic interference.

15. A converter as defined in claim 10, wherein said complementary output switch is a two-terminal current rectifier switch, which is turned ON or turned OFF in response to operating state and conditions of said converter caused by electronically controlled switching of said input switch, said complementary input switch and said output switch;

whereby control and drive circuitry for said complementary output rectifier switch is not needed.

16. A converter as defined in claim 10, further including an external capacitor connected in parallel with said complementary input switch in order to extend said (1-2) transition and reduce switching losses of said input switch.

17. A converter as defined in claim 10, wherein said resonant inductor has zero inductance, i.e., it is short-circuited, hence said other end of said input capacitor is connected to said other end of said middle inductor;

wherein said (1-2) transition is initiated by turning said input switch OFF to start linear discharge of said parasitic capacitance across said complementary input switch, and when voltage across said complementary output switch reduces to zero, this switch is turned ON by said switching time control means at zero voltage for zero switching losses, while the output switch is simultaneously turned OFF and the linear discharge of the parasitic capacitance of said complementary input switch continues but at reduced rate until the voltage across said complementary input switch reduces to zero at which instant the complementary input switch is turned ON with zero switching losses;

wherein said (2-1) transition is initiated by turning said complementary input switch OFF to start linear discharge of said parasitic capacitance across said input switch, and, when voltage across said input switch drops to the level of said DC voltage source, said input switch is turned ON by said switching time control means at reduced voltage and with reduced switching losses, and said output switch is by said switching time control means simultaneously turned ON with a voltage across said output switch zero and with zero switching losses, and at the same instant said complementary output switch is by said switching time control means turned OFF to complete said (2-1) transition.

18. A converter as defined in claim 17, wherein said output switch and said complementary output switch are two-terminal current rectifier switches, which are turned ON or turned OFF in response to operating state and conditions of said converter caused by electronically controlled switching of said input switch and said complementary input switch;

wherein said switching time control means includes precise electronically controlling operation of said input switch and said complementary input switch whereby an (1-2) transition and a (2-1) transition are obtained during each successive switch operating cycle $T_S$, wherein said (1-2) transition and said (2-1) transition are shorter than said switch operating cycle $T_S$, and said switching time control means provides control signals for respective switches as follows:

said (1-2) transition is initiated by turning said input switch OFF and, when blocking voltage across said complementary output rectifier switch is reduced to zero, said complementary output rectifier switch starts to conduct, hence automatically is turned ON at zero voltage for zero switching losses, and said (1-2) transition continues until the voltage on said complementary input switch reduces to zero, at which instant said complementary input switch is turned ON by said switching time control means at zero voltage for zero switching losses while said output rectifier switch is turned OFF by reverse bias voltage applied by converter across said output rectifier switch;

said (2-1) transition is initiated by turning said complementary input switch OFF to start linear discharge of said parasitic capacitance across said input switch, and, when a voltage across said input switch drops to the level of said DC voltage source, blocking voltage across said output rectifier switch is zero, hence said output rectifier switch is automatically turned ON with zero switching losses, and at the same time said input switch is turned ON by said switching means at voltage reduced to said DC voltage source level and with reduced switching losses while said complementary output rectifier switch is by the blocking voltage automatically turned OFF to complete said (2-1) transition, and whereby control and drive circuitry for said output rectifier switch and said complementary output rectifier switch are not needed;

whereby during said (2-1) transition said output rectifier switch is automatically turned ON at zero voltage with zero switching losses, and said input switch is turned ON at reduced voltage to complete said (2-1) transition with reduced switching losses and voltage stress on said semiconductor current bidirectional switching devices and increased efficiency of said converter with reduced electromagnetic interference.

19. A converter as defined in claim 18,
wherein said switching time control means provides control signals for respective switches as follows:
said (1-2) transition is initiated and completed by simultaneously turning OFF of said input switch and turning ON of said complementary input switch, at which instant said output rectifier switch is automatically turned ON and said complementary output rectifier switch is automatically turned OFF, and
said (2-1) transition is initiated and completed by simultaneously turning ON of said input switch and turning OFF of said complementary input switch, at which instant said output rectifier switch is automatically turned OFF and said complementary output rectifier switch is automatically turned ON.

20. A converter as defined in claim 10,
wherein said middle inductor comprises an autotransformer;
wherein a dot-marked end of a winding of said autotransformer is connected to said common input terminal and said common output terminal, an unmarked end of said winding of said autotransformer is connected to said other end of said complementary output switch, and a tapped end of said winding of said autotransformer is connected to said other end of said input capacitor;
wherein said winding of said autotransformer is placed on said common magnetic core with said input inductor winding and said output inductor winding to form a DC Auto-Transformer;
wherein a DC-to-DC voltage conversion ratio of said converter depends linearly on said duty ratio D;
wherein ratio of number of turns of said winding of said autotransformer to number of turns between said dot-marked end and said tapped end of said winding of said autotransformer provides additional control of DC-to-DC voltage conversion ratio of said converter;
wherein said input inductor winding has the same number of turns as said number of turns between said dot-marked end and said tapped end of said winding of said autotransformer, and said output inductor winding has the same number of turns as said winding of said autotransformer, whereby for said duty ratio D in a range from 0 to 1, zero DC flux is obtained in said common magnetic core;
wherein said common magnetic core has no air-gap, whereby said zero DC flux in said common magnetic core enables increased inductances of said input and output inductor windings and said winding of said autotransformer thereby providing said converter with increased overload capability, and
whereby said DC Auto-Transformer combines said input inductor winding, said output inductor winding, and said winding of said autotransformer to provide increased conversion ratio between said input DC voltage source and said DC load and efficient DC-to-DC power transfer from said input inductor winding to said output inductor winding with reduced energy storage within said common magnetic core of said DC Auto-Transformer, thereby reducing size and weight of said converter by reducing said common magnetic core size and weight while simultaneously increasing efficiency and converter overload capability, and providing reduction of electromagnetic interference.

21. A converter as defined in claim 10,
wherein one end of said input capacitor is connected to said common input terminal and an other end of said input capacitor is connected to said common output terminal;
wherein said dot-marked end of said middle inductor winding is connected to said common output terminal, and
wherein said unmarked end of said middle inductor winding is connected to said unmarked end of said input inductor winding.

22. A converter for providing power from a DC voltage source connected between an input terminal and a common input terminal to a DC load connected between an output terminal and a common output terminal, said converter comprising:
an input inductor winding, an isolation transformer with primary and secondary windings, and an output inductor winding, placed on a common magnetic core to form an Isolated DC Transformer, and each winding having one dot-marked end and an other unmarked end whereby AC voltage applied to said primary winding of said isolation transformer induces AC voltages in said secondary winding of said isolation transformer and said input and output inductor windings so that said applied AC voltage and said induced AC voltages are in phase at said dot-marked ends of said input inductor winding, said output inductor winding and said primary and secondary windings of said isolation transformer;
said input inductor winding connected at said dot-marked end thereof to said input terminal to form an input winding of said Isolated DC Transformer;
said output inductor winding connected at said dot-marked end thereof to said output terminal to form an output winding of said Isolated DC Transformer;
said primary winding of said isolation transformer connected at said dot-marked end thereof to said common input terminal to enable galvanic isolation in said Isolated DC Transformer;
said secondary winding of said isolation transformer connected at said dot-marked end thereof to said common output terminal to enable galvanic isolation in said Isolated DC Transformer;
an input capacitor connected between an unmarked end of said input inductor winding an unmarked end of said primary winding of said isolation transformer;
an input switch with one end connected to said common input terminal and an other end connected to said unmarked end of said input inductor winding;
an output switch with one end connected to said common output terminal and an other end connected to an unmarked end of said output inductor winding;
a complementary output switch, having one end connected to said unmarked end of said output inductor winding and another end of said complementary output switch connected to an unmarked end of said secondary winding of said isolation transformer;
a branch comprising a complementary input switch and an auxiliary capacitor, having one end of said complementary input switch connected to one end of said auxiliary capacitor, while an other end of said complementary input switch and an other end of said auxiliary capacitor comprise ends of said branch;
means for connecting said ends of said branch to said converter preserving galvanic isolation of said isolation transformer;
switching time control means for providing a precise sequence and timing of turning ON and turning OFF signals for said input switch, said complementary input switch, said output switch and said complementary output switch whereby during a State-1 interval no current flows through said branch and during a State-2 interval only AC current flows through said branch;

wherein said input switch, said output switch, and said complementary output switch are semiconductor switching devices, capable of conducting the current in at least one direction while turned ON, and sustaining voltage in at least one direction while turned OFF;

wherein said complementary input switch is a semiconductor current bidirectional switching device, capable of conducting the current in both directions while turned ON, and sustaining voltage in at least one direction, while turned OFF;

wherein said semiconductor switching devices and said semiconductor current bidirectional switching device turn ON and OFF at high switching frequency;

wherein said primary winding and said secondary winding are tightly coupled for reduced leakage between said primary winding and said secondary winding;

wherein a DC-to-DC voltage conversion ratio of said converter depends linearly on a duty ratio D;

wherein turns ratio of said secondary winding to said primary winding of said isolation transformer provides additional control of DC-to-DC voltage conversion ratio of said converter;

wherein for said duty ratio D in a range from 0 to 1, DC currents in said input inductor winding and said primary and secondary windings of said isolation transformer flow into said dot-marked ends of respective windings, whereas DC current in said output inductor winding flows out of said dot-marked end of said output inductor winding;

wherein said input inductor winding has the same number of turns as said primary winding of said isolation transformer, and said output inductor winding has the same number of turns as said secondary winding of said isolation transformer, whereby for said duty ratio D in a range from 0 to 1, net zero DC flux is obtained in said common magnetic core;

wherein said common magnetic core has no air-gap, whereby said net zero DC flux in said common magnetic core enables increased inductances of said input and output inductor windings and said primary and secondary windings of said isolation transformer thereby providing said converter with increased overload capability, and whereby said Isolated DC Transformer combines said input inductor winding, said output inductor winding, and said primary and secondary windings of said isolation transformer to provide galvanic isolation between said input DC voltage source and said DC load and efficient DC-to-DC power transfer from said input inductor winding to said output inductor winding with reduced energy storage within said common magnetic core of said Isolated DC Transformer, thereby reducing size and weight of said converter by reducing said common magnetic core size and weight while simultaneously increasing efficiency and converter overload capability, and providing reduction of electromagnetic interference.

23. A converter as defined in claim 22, wherein said common magnetic core is an UU magnetic core;

wherein said input inductor winding and said isolation transformer are placed side-by-side on one leg of said UU magnetic core;

wherein said output inductor winding is placed on an other leg of said UU magnetic core;

whereby leakage inductance between said input inductor winding and said isolation transformer windings provides substantially zero-ripple current in said input inductor winding, and whereby leakage inductance between said output inductor winding and said isolation transformer windings provides reduced ripple current in said output inductor winding, and whereby said UU magnetic core, said input and output inductor windings, and said isolation transformer windings form an Isolation DC Transformer device of Type A.

24. A converter as defined in claim 23, wherein an air-gap is positioned on said other leg of said UU magnetic core with said output inductor winding to provide an AC voltage divider between leakage and magnetizing inductances of said output inductor winding, and wherein said AC voltage divider matches induced AC voltage in said output inductor winding to applied AC voltage to said output inductor winding for a fixed duty ratio D, whereby, for said fixed duty ratio D, said DC current in said output inductor winding has substantially zero-ripple current, and whereby said UU magnetic core with said air-gap, said input and output inductor windings, and said isolation transformer windings form an Isolation DC Transformer device of Type B.

25. A converter as defined in claim 24, including an external inductor connected in series with said output inductor winding to reduce a ripple current in said output inductor winding.

26. A converter as defined in claim 24, wherein said input inductor winding and said primary winding of said isolation transformer have equal number of turns, wherein said output inductor winding and said secondary winding of said isolation transformer have a different number of turns, whereby number of turns of said output inductor winding is adjusted to match induced AC voltage in said output inductor winding with applied AC voltage to said output inductor winding to obtain substantially zero-ripple current in said output inductor winding at a nominal duty ratio D;

whereby said UU magnetic core with said air-gap, said input inductor winding, said primary and secondary windings of said isolation transformer, and said output inductor winding with different number of turns than said secondary winding of said isolation transformer form an Isolated DC Transformer device of Type C.

27. A converter as defined in claim 26, including an external inductor connected in series with said output inductor winding to reduce a ripple current in said output inductor winding.

28. A converter as defined in claim 24, wherein said common magnetic core includes a separate leakage magnetic leg with no windings and an air-gap in a magnetic flux path with said common magnetic core, wherein said air-gap is adjusted to provide said output inductor winding with substantially zero-ripple current at a fixed duty ratio D, whereby said leakage magnetic leg increases the leakage inductance between said output inductor winding, said input inductor winding, and said isolation transformer windings, and provides reduction of ripple current in said output inductor winding, and whereby said common magnetic core with said leakage magnetic leg, said input and output inductor windings, and said isolation transformer windings form an Isolation DC Transformer device of Type D.

29. A converter as defined in claim 22, wherein said common magnetic core is an EE magnetic core;

wherein said input inductor winding and said primary and secondary windings of said isolation transformer are placed side-by-side on the center leg of said EE magnetic core;

wherein an additional output inductor winding with same number of turns as said output inductor winding is connected in series with said output inductor winding so that AC voltages at said additional output inductor winding and said output inductor winding are in phase at dot-marked ends and add;

wherein said additional output inductor winding is placed in one outer leg of said EE magnetic core and said output inductor winding is placed on an other outer leg of said EE magnetic core;

whereby leakage inductance between said input inductor winding and said primary and secondary windings of said isolation transformer provides substantially zero-ripple current in said input inductor winding;

whereby leakage inductances between said additional output inductor winding, said output inductor winding and said primary and secondary windings of said isolation transformer provide reduced ripple current in said additional output inductor winding and said output inductor winding, and whereby said EE magnetic core, said input, output, and additional output inductor windings, and said primary and secondary windings of said isolation transformer form an Isolation DC Transformer device of Type E.

30. A converter as defined in claim 29, wherein air-gaps are positioned on each of said outer legs of said EE magnetic core with said additional output inductor winding and said output inductor winding to provide AC voltage dividers between leakage and magnetizing inductances of said additional output inductor winding and said output inductor winding;

wherein said AC voltage dividers match induced AC voltages in said additional output inductor winding and said output inductor winding to respective applied AC voltages to said additional output inductor winding and said output inductor winding for a fixed duty ratio D;

whereby for said fixed duty ratio D, said DC current in said output inductor winding has substantially zero-ripple current, and whereby said EE magnetic core with said air-gaps and said input, middle, output, and additional output inductor windings form a DC Transformer device of Type F.

31. A converter as defined in claim 22, wherein said Isolation DC Transformer is selected from the group consisting of (i) said Isolation DC Transformer device of Type A (ii) said Isolation DC Transformer device of Type B (iii) said Isolation DC Transformer device of Type C (iv) said Isolation DC Transformer device of Type D (v) said Isolation DC Transformer device of Type E (vi) said Isolation DC Transformer device of Type F;

wherein said input switch, said complementary input switch, said output switch, and said complementary output switch are semiconductor current bidirectional switching devices, capable of conducting the current in both directions while turned ON, and sustaining voltage in one direction, while turned OFF, and said semiconductor current bidirectional switching devices are each modeled as a parallel connection of an ideal switch, a parasitic body-diode and a parasitic capacitance;

wherein said isolation transformer with a leakage inductance is modeled as a perfectly coupled transformer with said leakage inductance connected in series with a primary winding of said perfectly coupled transformer;

wherein said switching time control means includes precise electronically controlling operation of said semiconductor current bidirectional switching devices whereby two transitions, an (1-2) transition and a (2-1) transition, are obtained during each successive switch operating cycle $T_S$, wherein said transitions are shorter than said switch operating cycle $T_S$, and said switching time control means provides control signals for respective switches as follows:

said (1-2) transition is initiated by turning said input switch OFF and, when voltage on said complementary output switch is reduced to zero, said switching time control means provides control signal for complementary output switch to be turned ON at zero voltage for zero switching losses, and said (1-2) transition continues until the voltage on said complementary input switch reduces to zero, at which instant said switching time control means provides control signal for said complementary input switch to be also turned ON at zero voltage for zero switching losses, and said (1-2) transition continues until the current through the output switch is reduced to zero, making this the latest instant at which output switch must be turned OFF to complete said (1-2) transition, and said (2-1) transition is initiated by first turning said output switch ON, intentionally before said complementary input switch is turned OFF, to boost the current in said leakage inductance by an additional magnitude which is inversely proportional to said leakage inductance, directly proportional to voltage difference between DC voltage across said auxiliary capacitor and DC voltage of said DC voltage source and directly proportional to this boost subinterval during which said output switch and said complementary input switch are both turned ON, and when said complementary input switch is turned OFF, the resonant discharge of parasitic capacitance across said input switch and simultaneous resonant charge of parasitic capacitance across said complementary input switch take place during this resonant subinterval in which the total resonant current is comprising three distinct current components, the first one a cosinusoidal resonant current component with said additional magnitude defined above, the second one a sinusoidal resonant current component whose magnitude is directly proportional to voltage difference between DC voltage across said auxiliary capacitor and DC voltage of said DC voltage source and inversely proportional to a characteristic impedance of resonant circuit comprising resonant inductance ($L_r$) and resonant capacitance ($C_r$), and the third one a cosinusoidal resonant current component whose magnitude is equal to initial current value in said leakage inductance at the instant when said output switch was turned ON, and at the instant when said parasitic capacitance of said input switch is fully discharged, said switching time control means provides a control signal for said input switch to be turned ON at zero voltage and with zero switching losses to complete said resonant subinterval, and said (2-1) transition continues with a current-reversal subinterval during which the input capacitor current is reversed from being equal to input inductor current to current flow in opposite direction with magnitude equal to a magnetizing current of said isolation transformer at which instant the current through said complementary output switch is reduced to zero making this the latest instant at which said complementary output switch must be turned OFF to completer said (2-1) transition;

wherein said resonant capacitance is significantly higher than capacitance of parasitic capacitances across said output switch and said complementary output switch, and whereby said isolation transformer provides a galvanic isolation between said input DC voltage source and said DC load.

32. A converter as defined in claim 31, wherein said (2-1) transition is initiated by turning said complementary input switch OFF and simultaneously turning said output switch ON to start a resonant discharge of parasitic capacitance across said input switch and simultaneous resonant charge of a parasitic capacitance across said complementary input switch with a total resonant current comprising two distinct current components, said second one sinusoidal resonant current component and said third one cosinusoidal resonant current component, and, at the instant when a voltage of said parasitic capacitance of said input switch reaches the minimum value, said input switch is turned ON by said switching means at reduced voltage and with reduced switching losses completing said resonant subinterval and said (2-1) transition continues until the current through said complementary output switch is reduced to zero, making this the latest instant at which complementary output switch must be turned OFF to complete this current-reversal subinterval and said (2-1) transition, and whereby during said (2-1) transition, energy already stored in said resonant inductor facilitates resonant discharge and voltage reduction of said parasitic capacitance of said input switch to complete said (2-1) transition with reduced switching losses and voltage stress on said semiconductor current bidirectional switching devices and increased efficiency of said converter with reduced electromagnetic interference.

33. A converter as defined in claim 31, wherein said (2-1) transition is initiated by turning said complementary input switch OFF to start a linear discharge of said parasitic capacitance across said input switch, and, before a voltage across said input switch drops to the level of said DC voltage source, said output switch is turned ON to force a resonant discharge of said parasitic capacitance across said input switch with a total resonant current comprising two distinct current components, said second one sinusoidal resonant current component proportional to voltage difference of voltage across said input switch present at the instant when said output switch is turned ON and the DC voltage of said DC voltage source and inversely proportional to said characteristic impedance, and said third one cosinusoidal resonant current component, and, at the instant when said voltage across said input switch reaches the minimum value, said input switch is turned ON by said switching means at reduced voltage and with reduced switching losses completing said resonant subinterval and (2-1) transition continues until the current through said complementary output switch is reduced to zero making this the latest instant at which said complementary output switch is turned OFF to complete said current-reversal subinterval and said (2-1) transition, and whereby during said (2-1) transition of said complementary input switch and said output switch are both turned OFF providing said linear discharge followed by said resonant discharge for further voltage reduction of said parasitic capacitance across said input switch, and said input switch and said output switch are turned ON at reduced voltages to complete said (2-1) transition with reduced switching losses and voltage stress on said semiconductor current bidirectional switching devices and increased efficiency of said converter with reduced electromagnetic interference.

34. A converter as defined in claim 31, wherein said (2-1) transition is initiated by turning said complementary input switch OFF to start a linear discharge of said parasitic capacitance across said input switch, and, when a voltage across said input switch drops to a level of said DC voltage source, said output switch is turned ON at zero voltage with zero switching losses forcing a resonant discharge of said parasitic capacitance across said input switch with a resonant current comprising only said third one cosinusoidal resonant current component, and, at the instant when said voltage across said input switch reaches the minimum value, said input switch is turned ON by said switching time control means at a voltage lower than said DC voltage source level and with reduced switching losses completing said resonant subinterval and (2-1) transition continues until the current through said complementary output switch is reduced to zero making this the latest instant at which said complementary output switch must be turned OFF to complete said current-reversal subinterval and said (2-1) transition, and when the product of said magnitude of said third one cosinusoidal resonant current component and said characteristic impedance is equal to voltage of said DC voltage source, said input switch is turned ON at zero voltage resulting in zero switching losses on all said semiconductor current bidirectional switching devices, and whereby during said (2-1) transition said output switch is turned ON at zero voltage with zero switching losses and at the instant in time when said parasitic body-diode of said output switch would start to conduct, hence significantly reducing current conduction losses of said parasitic body-diode, and said input switch is turned ON at reduced voltage to complete said (2-1) transition with reduced switching losses and voltage stress on said semiconductor current bidirectional switching devices and increased efficiency of said converter with reduced electromagnetic interference.

35. A converter as defined in claim 31, wherein said output switch and said complementary output switch are two-terminal current rectifier switches, which are turned ON or turned OFF in response to operating state and conditions of said converter caused by electronically controlled switching of said input switch and said complementary input switch;

wherein said switching time control means includes precise electronically controlling operation of said input switch and said complementary input switch whereby two transitions, an (1-2) transition and a (2-1) transition are obtained during each successive switch operating cycle $T_S$, wherein said transitions are shorter than said switch operating cycle $T_S$, and said switching time control means provides control signals for respective switches as follows:

said (1-2) transition is initiated by turning said input switch OFF and, when blocking voltage across said complementary output rectifier switch is reduced to zero, said complementary output rectifier switch starts to conduct, hence automatically is turned ON at zero voltage for zero switching losses, and said (1-2) transition continues until the voltage on said complementary input switch reduces to zero, at which instant said complementary input switch is turned ON by said switching time control means at zero voltage for zero switching losses while said output rectifier switch is turned OFF by reverse bias voltage applied by converter across said output rectifier switch;

said (2-1) transition is initiated by turning said complementary input switch OFF to start linear discharge of said parasitic capacitance across said input switch, and, when a voltage across said input switch drops to the level of said DC voltage source, blocking voltage across said output rectifier switch is zero, hence said output rectifier switch is automatically turned ON with zero switching losses forcing a resonant discharge of said parasitic capacitance across said input switch with a resonant current comprising only of said third one cosinusoidal resonant current component, and, at the instant when said voltage across said input switch reaches the minimum value, said input switch is turned ON by said switching means at voltage reduced below said DC voltage source level and with reduced switching losses while said complementary output rectifier switch is by the blocking voltage automatically turned OFF to complete said (2-1) transition, and whereby control and drive circuitry for said output rectifier switch and said complementary output rectifier switch are not needed, and when the product of said magnitude of said third one cosinusoidal resonant current component and said characteristic impedance is equal to voltage of said DC voltage source, said input switch is turned ON at zero voltage resulting in zero switching losses on two said semiconductor current bidirectional switching devices and two said rectifier switches;

whereby during said (2-1) transition said output rectifier switch is automatically turned ON at zero voltage with zero switching losses, and said input switch is turned ON at reduced voltage to complete said (2-1) transition with reduced switching losses and voltage stress on said semiconductor current bidirectional switching devices and increased efficiency of said converter with reduced electromagnetic interference.

36. A converter as defined in claim 31, wherein said complementary output switch is a two-terminal current rectifier switch, which is turned ON or turned OFF in response to operating state and conditions of said converter caused by electronically controlled switching of said input switch, said complementary input switch and said output switch;

whereby control and drive circuitry for said complementary output rectifier switch is not needed.

37. A converter as defined in claim 31, further including an external capacitor connected in parallel with said complementary input switch in order to extend said (1-2) transition and reduce switching losses of said input switch.

38. A converter as defined in claim 35, wherein said switching time control means provides control signals for respective switches as follows:

said (1-2) transition is initiated and completed by simultaneously turning OFF of said input switch and turning ON of said complementary input switch, at which instant said output rectifier switch is automatically turned ON and said complementary output rectifier switch is automatically turned OFF, and said (2-1) transition is initiated and completed by simultaneously turning ON of said input switch and turning off of said complementary input switch, at which instant said output rectifier switch is automatically turned OFF and said complementary output rectifier switch is automatically turned ON.

39. A converter as defined in claim 35, further including an auxiliary MOSFET transistor connected in parallel with said output rectifier switch, wherein said switching time control means includes precise electronically controlling operation of said input switch, said complementary input switch, and said auxiliary MOSFET switch, whereby two transitions, an (1-2) transition and a (2-1) transition are obtained during each successive switch operating cycle $T_S$, wherein said transitions intervals are shorter than said switch operating cycle $T_S$, and said switching time control means provides control signals for respective switches as follows:

said (1-2) transition is initiated by turning said input switch OFF and, when blocking voltage across said complementary output rectifier switch is reduced to zero, said complementary output rectifier switch starts to conduct, hence automatically is turned ON at zero voltage for zero switching losses, and said (1-2) transition continues until the voltage on said complementary input switch reduced to zero, at which instant said complementary input switch is turned ON by said switching time control means at zero voltage for zero switching losses while said output rectifier switch is turned OFF by reverse bias voltage applied by converter across said output rectifier switch, and said (2-1) transition is initiated by first turning said auxiliary MOSFET switch ON, intentionally before said complementary input switch is turned OFF, to boost the current in said leakage inductance by an additional magnitude which is inversely proportional to said leakage inductance, directly proportional to voltage difference between DC voltage across said auxiliary capacitor and DC voltage of said DC voltage source and directly proportional to this boost subinterval during which said auxiliary MOSFET switch and said complementary input switch are both turned ON, and when said complementary input switch is turned OFF, the resonant discharge of parasitic capacitance across said input switch and simultaneous resonant charge of parasitic capacitance across said complementary input switch take place during this resonant subinterval in which the total resonant current is comprising said three distinct resonant current components, and before end of said resonant subinterval, said output rectifier switch is automatically turned ON by positive current and at the end of said resonant subinterval and when said parasitic capacitance of said input switch is fully discharged, said switching time control means provides simultaneous control signals for both said input switch to be turned at zero voltage and with zero switching losses and said auxiliary MOSFET transistor to be turned OFF to complete said resonant subinterval, and said (2-1) transition continues with a current-reversal subinterval during which the input capacitor current is reversed from being equal to input inductor current to current flow in opposite direction with magnitude equal to magnetizing current of said isolation transformer at which instant the current through said complementary output rectifier switch is reduced to zero hence turned OFF to complete said (2-1) transition.

40. A converter as defined in claim 35,
wherein the magnitude of said third one cosinusoidal resonant component is made as high as needed by use of the proportionally increased magnetizing current of said isolation transformer to reduce the voltage on said parasitic capacitance of said input switch, and
whereby said isolation transformer is reduced in size and weight.

41. A converter as defined in claim 31,
wherein said input switch, said complementary input switch, said output switch and said complementary output switch are MOSFET devices;
wherein a gate of said output MOSFET device is connected to a drain of said complementary output MOSFET device, and a drain of said output MOSFET device is connected to a gate of said complementary output MOSFET device,
wherein control and drive circuitry for said input MOSFET device and said complementary input MOSFET device use said common input terminal;
whereby said secondary winding provides a drive voltage for both said output MOSFET device and said complementary output MOSFET device enabling self-driven operation of both said output MOSFET device and said complementary output MOSFET device with simplified control and drive circuitry isolated from said input DC voltage source; and
whereby a signal processing circuitry required to transfer proper drive signals to said output MOSFET device and said complementary output MOSFET device through said galvanic isolation between said input DC voltage source and said DC load is not needed.

42. A converter as defined in claim 31, further including two drive windings on a secondary side of said isolation transformer, connected in series and with a junction therebetween connected to said common output terminal;
wherein said input switch, said complementary input switch, said output switch and said complementary output switch are MOSFET devices;
wherein a dot-marked end of one drive winding is connected to a gate of said output MOSFET device;
wherein an unmarked end of an other drive winding is connected to a gate of said complementary output MOSFET device;
wherein said two drive windings provide out-of-phase drive voltages to both said output MOSFET device and said complementary output MOSFET device for self-driven operation with a control and drive circuitry galvanically isolated from said input DC voltage source;
wherein said control and drive circuitry for said input MOSFET device and said complementary input MOSFET device use said common input terminal,
whereby a signal processing circuitry required to transfer proper drive signals to said output MOSFET device and said complementary output MOSFET device through said galvanic isolation between said input DC voltage source and said DC load is not needed.

43. A converter as defined in claim 31,
wherein said isolation transformer is a multiple-output isolation transformer integrated on said common magnetic core to form a Multiple-output Isolated DC Transformer;
wherein said means for connecting said ends of said branch to said converter preserves galvanic isolation of said multiple-output isolation transformer whereby during said State-2 interval, current through said branch is AC current;
wherein turns ratios of said secondary windings to said primary winding of said multiple-output isolation transformer provide additional control of DC-to-DC voltage conversion ratio of said converter;
wherein each output inductor winding for each DC load has the same number of turns as respective secondary winding of said multiple-output isolation transformer, whereby for range of duty ratio D from 0 to 1, substantially zero DC flux is obtained in said common magnetic core; and
whereby said substantially zero DC flux in said common magnetic core provides said converter with increased overload capability.

44. A method for power conversion comprising:
providing an input switch, a complementary input switch, and an output switch being controllable semiconductor CBS (Current Bidirectional Switch) switches, each said controllable semiconductor CBS switch having a parasitic body-diode and a parasitic capacitance in parallel;
providing a complementary output switch being a current rectifier having a parasitic capacitance in parallel;
controlling a State-1 interval and a State-2 interval regulating an output load voltage, each said controllable semiconductor CBS switch being turned ON and OFF during an (1-2) transition and a (2-1) transition which are shorter than said State-1 interval and said State-2 interval;
providing a positive current in a branch with said complementary input switch during said (1-2) transition and a negative current in said branch during said (2-1) transition;
controlling sequence and timing of turn-ON and turn-OFF signals for said controllable semiconductor CBS switches during said (1-2) transition, recycling charge among said capacitances of said switches and turning ON said complementary input switch losslessly at substantially zero voltage;
initiating said (2-1) transition by turning OFF said complementary input switch;
providing a resonant circuit during said (2-1) transition by turning ON said output switch before said parasitic body-diode of said output switch starts to conduct;

exchanging charge between said capacitances of said controllable semiconductor CBS switches losslessly facilitated by said negative current and a voltage across said input switch present when said output switch is turned ON;

turning ON said input switch when voltage across said input switch is at minimum reducing switching losses;

integrating an input inductor winding, a middle inductor winding, and an output inductor winding on a common magnetic core into a DC Transformer;

subjecting said input, middle, and output inductor windings to AC voltages in phase at dot-marked ends of said input, middle, and output inductor windings;

subjecting said input inductor winding and said middle inductor winding to DC currents flowing into said dot-marked ends thereof, thereby to generate a DC flux in one direction in said common magnetic core;

subjecting said output inductor winding to DC current flowing out of said dot-marked end thereof, thereby to generate a DC flux in opposite direction in said common magnetic core, resulting in substration of said DC fluxes in said common magnetic core;

providing a selected number of turns for said input, middle, and output inductor windings to produce equal volts-per-turn and zero total DC Ampere-turns resulting in substantially zero DC flux in said common magnetic core, whereby reducing DC energy storage in said DC Transformer.

45. A method for power conversion as defined in claim 44 wherein said complementary output switch is a controllable semiconductor CBS switch having a parasitic body-diode and a parasitic capacitance in parallel, said complementary output controllable semiconductor CBS switch being turned ON and OFF as a synchronous rectifier to reduce conduction losses by bypassing said parasitic body-diode.

46. A method as defined in claim 45 wherein said common magnetic core is an UU magnetic core further comprising:
integrating said input and middle inductor windings on one leg of said UU magnetic core side-by-side to provide increased leakage inductance between said input and middle inductor windings, reducing ripple current in said input inductor winding substantially to zero;
integrating said output inductor winding on an other leg of said UU magnetic core to provide increased leakage inductance between said output inductor winding and said input and middle inductor windings, reducing ripple current in said output inductor winding.

47. A method as defined in claim 46 further including an air-gap in said other leg of said UU magnetic core, providing an AC voltage divider between leakage and magnetizing inductances of said output inductor winding further reducing current ripple in said output inductor winding.

48. A method as defined in claim 47, wherein said input and middle inductor windings have equal number of turns, which is different from number of turns of said output inductor winding, whereby number of turns of said output inductor winding is adjusted to match induced AC voltage in said output inductor winding with applied AC voltage to said output inductor winding to obtain substantially zero-ripple current in said output inductor winding at a nominal duty ratio D.

49. A method as defined in claim 47 further including a separate leakage magnetic leg with an air-gap in magnetic flux path of said separate leakage magnetic leg further reducing ripple current in said output inductor winding.

50. A method as defined in claim 45 wherein said common magnetic core is an EE magnetic core further comprising:
integrating said input and middle inductor windings side-by-side on the center leg of said EE magnetic core;
splitting said output inductor winding into two split inductor windings each having the same number of turns as said output inductor winding;
integrating said split inductor windings onto two outer magnetic legs of said EE magnetic core;
connecting said split inductor windings in series having their respective AC voltages in phase at dot-marked ends of said split inductor windings;
reducing current ripples in said split inductor windings and said input inductor winding.

51. A method as defined in claim 50 further including air-gaps in each of said outer legs of said EE magnetic core, having AC voltage dividers to reduce current ripple in said split inductor windings.

52. A method as defined in claim 45 wherein said middle inductor winding is replaced with an autotransformer windings forming an Autotransformer DC Transformer with reduced DC energy storage.

53. A method as defined in claim 44 wherein said middle inductor winding is replaced with an isolation transformer windings, forming an Isolated DC Transformer with reduced DC energy storage.

54. A method as defined in claim 53 wherein said complementary output switch is a controllable semiconductor CBS switch having a parasitic body-diode and a parasitic capacitance in parallel, said complementary output controllable semiconductor CBS switch being turned ON and OFF as a synchronous rectifier to reduce conduction losses by bypassing said parasitic body-diode.

55. A method as defined in claim 54 wherein said common magnetic core is an UU magnetic core further comprising:
integrating said isolation transformer windings and said input inductor winding on one leg of said UU magnetic core side-by-side to provide increased leakage inductance between said isolation transformer windings and said input inductor winding, reducing ripple current in said input inductor winding substantially to zero;
integrating said output inductor winding on an other leg of said UU magnetic core to provide increased leakage inductance between said output inductor winding and said input inductor winding and said isolation transformer windings, reducing ripple current in said output inductor winding.

56. A method as defined in claim 55 further including an air-gap in said other leg of said UU magnetic core, providing an AC voltage divider between leakage and magnetizing inductances of said output inductor winding further reducing current ripple in said output inductor winding.

57. A method as defined in claim 56,
wherein said input inductor winding and a primary winding of said isolation transformer have equal number of turns, wherein said output inductor winding and a secondary winding of said isolation transformer have a different number of turns, whereby number of turns of said output inductor winding is adjusted to match induced AC voltage in said output inductor winding with applied AC voltage to said output inductor winding to obtain substantially zero-ripple current in said output inductor winding at a nominal duty ratio D.

58. A method as defined in claim 56 further including a separate leakage magnetic leg with an air-gap in magnetic flux path of said separate leakage magnetic leg further reducing current ripple in said output inductor winding.

59. A method as defined in claim 54 wherein said common magnetic core is an EE magnetic core further comprising:
- integrating said isolation transformer windings and said input inductor winding side-by-side on the center leg of said EE magnetic core;
- splitting said output inductor winding into two split inductor windings each having the same number of turns as said output inductor winding;
- integrating said split inductor windings onto two outer magnetic legs of said EE magnetic core;
- connecting said split inductor windings in series having their respective AC voltages in phase at dot-marked ends of said split inductor windings;
- reducing current ripples in said split inductor windings and said input inductor winding.

60. A method as defined in claim 59 further including air-gaps in each of said outer legs of said EE magnetic core, having AC voltage dividers to reduce current ripple in said split inductor windings.

61. A method as defined in claim 54 wherein said isolation transformer is a multiple-output isolation transformer, forming a Multiple-output Isolated DC Transformer with reduced DC energy storage.

62. A method for lossless switching comprising:
- providing an input switch, a complementary input switch, and an output switch being controllable semiconductor CBS (Current Bidirectional Switch) switches, each said controllable semiconductor CBS switch having a parasitic body-diode and a parasitic capacitance in parallel;
- providing a complementary output switch being a current rectifier switch having a parasitic capacitance in parallel;
- controlling a State-1 interval and a State-2 interval regulating an output load voltage, each said controllable semiconductor CBS switch being turned ON and OFF during an (1-2) transition and a (2-1) transition which are shorter than said State-1 interval and said State-2 interval;
- providing a positive current in a branch with said complementary input switch during said (1-2) transition and a negative current in said branch during said (2-1) transition;
- controlling sequence and timing of turn-ON and turn-OFF signals for said controllable semiconductor CBS switches during said (1-2) transition, recycling charge among said parasitic capacitances of said controllable semiconductor CBS switches and turning ON said complementary input switch losslessly at substantially zero voltage;
- initiating said (2-1) transition by turning OFF said complementary input switch;
- providing a resonant circuit during said (2-1) transition by turning ON said output switch before said parasitic body-diode of said output switch starts to conduct;
- exchanging charge between said parasitic capacitances of said controllable semiconductor CBS switches losslessly facilitated by said negative current and a voltage across said input switch present when said output switch is turned ON;
- turning ON said input switch when voltage across said input switch is substantially at minimum reducing switching losses.

63. A method as defined in claim 62 wherein said complementary output switch is a controllable semiconductor CBS switch having a parasitic body-diode and a parasitic capacitance in parallel, said complementary output CBS switch being turned ON and OFF as a synchronous rectifier to reduce conduction losses by bypassing said parasitic body-diode.

64. A method for reducing DC energy storage in a common magnetic core resulting in a DC Transformer, comprising:
- integrating an input inductor winding, a middle inductor winding, and an output inductor winding on a common magnetic core;
- subjecting said input inductor, middle inductor, and output inductor windings to AC voltages in phase at dot-marked ends of said input inductor, middle inductor, and output inductor windings;
- subjecting said input and middle inductor windings to DC currents flowing into said dot-marked ends thereof, thereby to generate a DC flux in one direction in said common magnetic core;
- subjecting said output inductor winding to DC current flowing out of said dot-marked end thereof, thereby to generate a DC flux in opposite direction in said common magnetic core, resulting in subtraction of said DC fluxes in said common magnetic core;
- providing a selected number of turns for each of said input inductor, middle inductor, and output inductor windings to produce equal volts-per-turn and reduced total DC Ampere-turns resulting in reduced DC flux in said common magnetic core.

65. A method as defined in claim 64 wherein said middle inductor winding is replaced with an isolation transformer windings, forming an Isolated DC Transformer with reduced DC energy storage.

* * * * *